June 2, 1959 R. B. JOHNSON ET AL 2,889,110
BILL FEEDING AND PIERCING DEVICES
Filed June 19, 1953 46 Sheets-Sheet 1

INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY

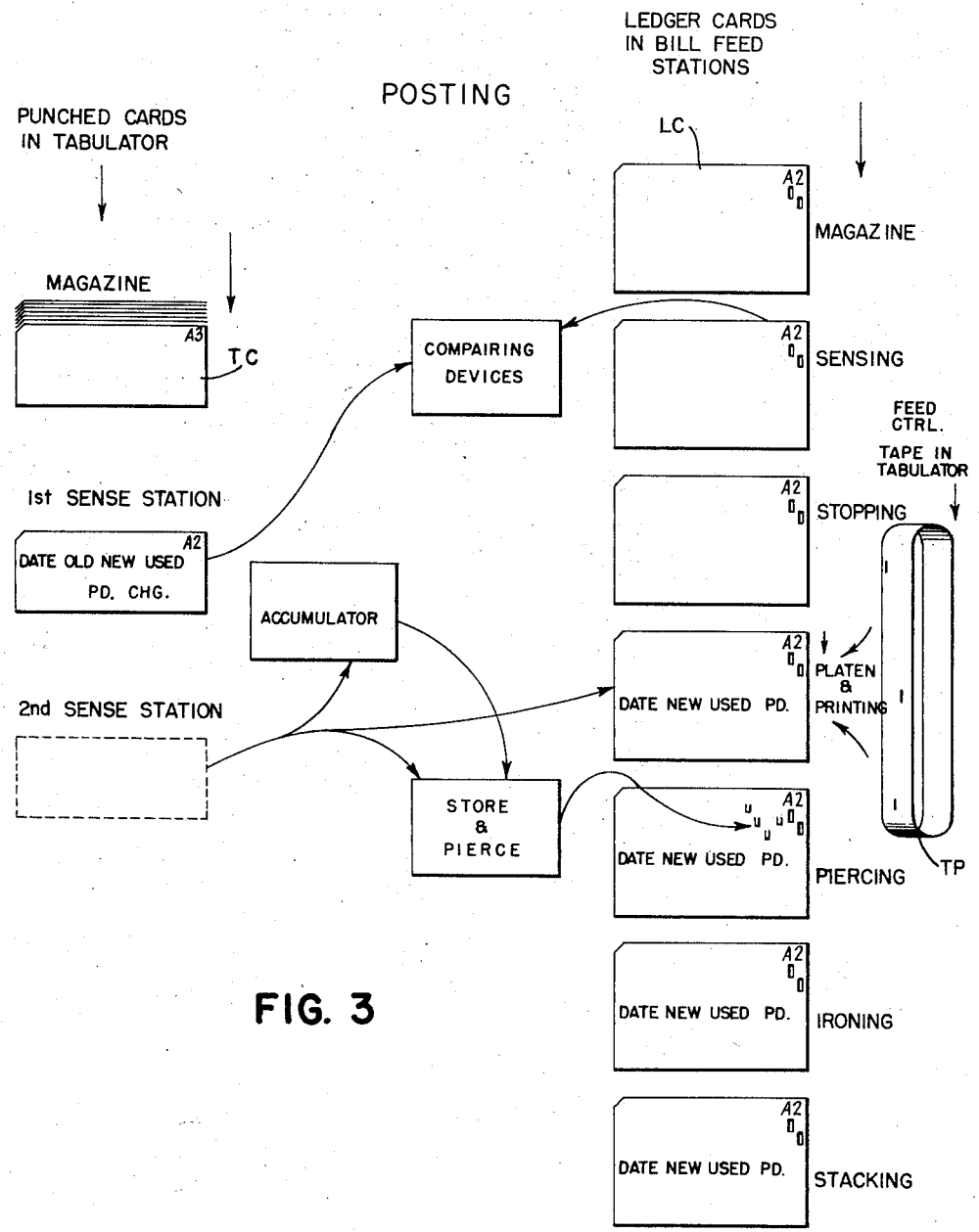

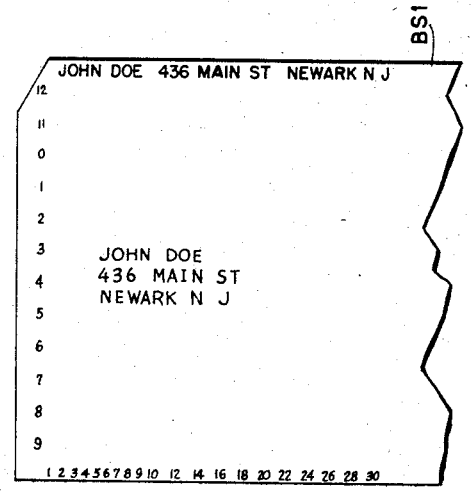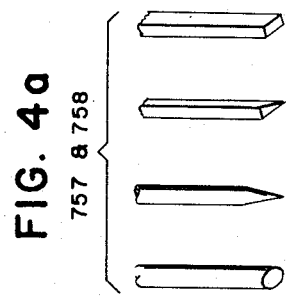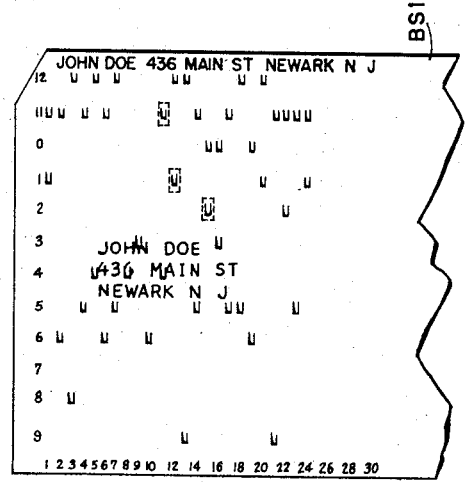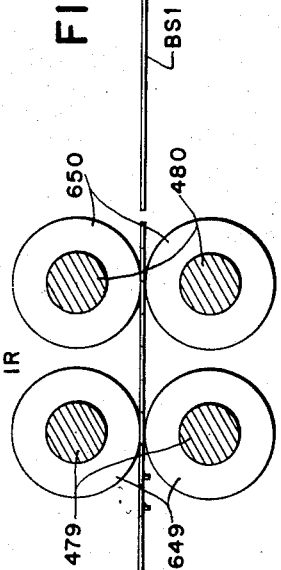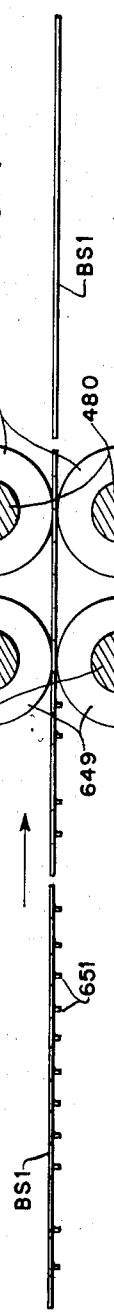

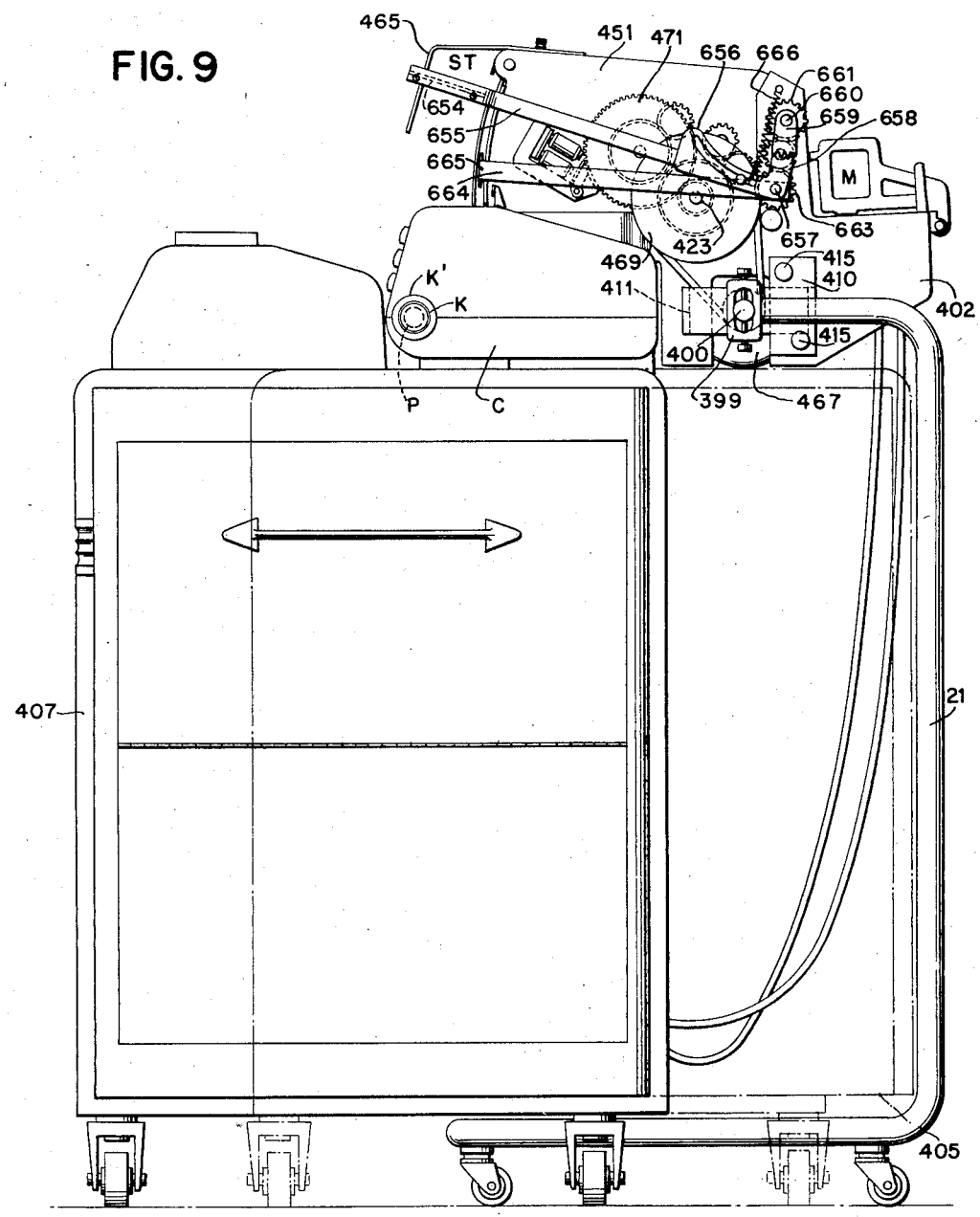

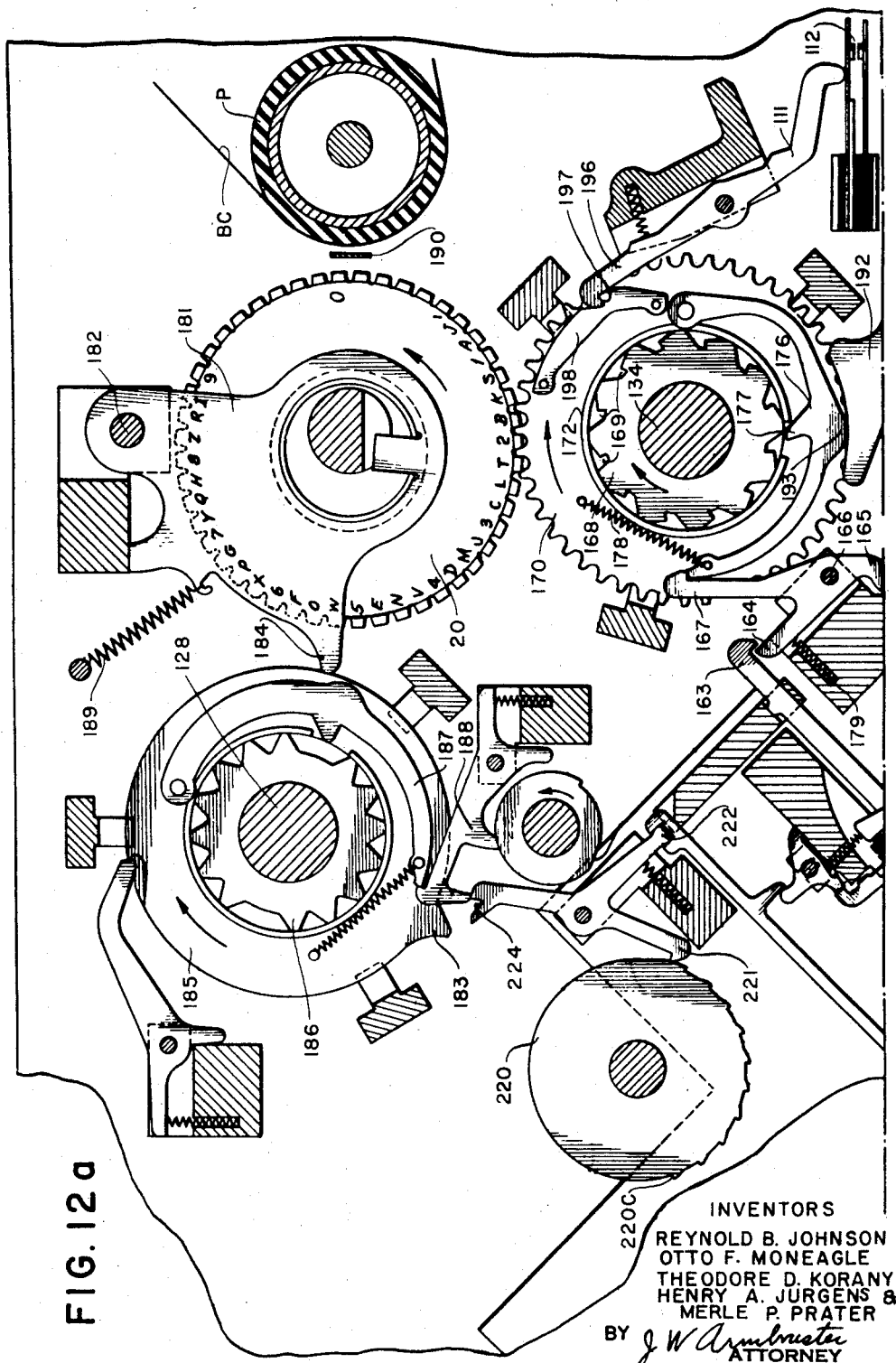

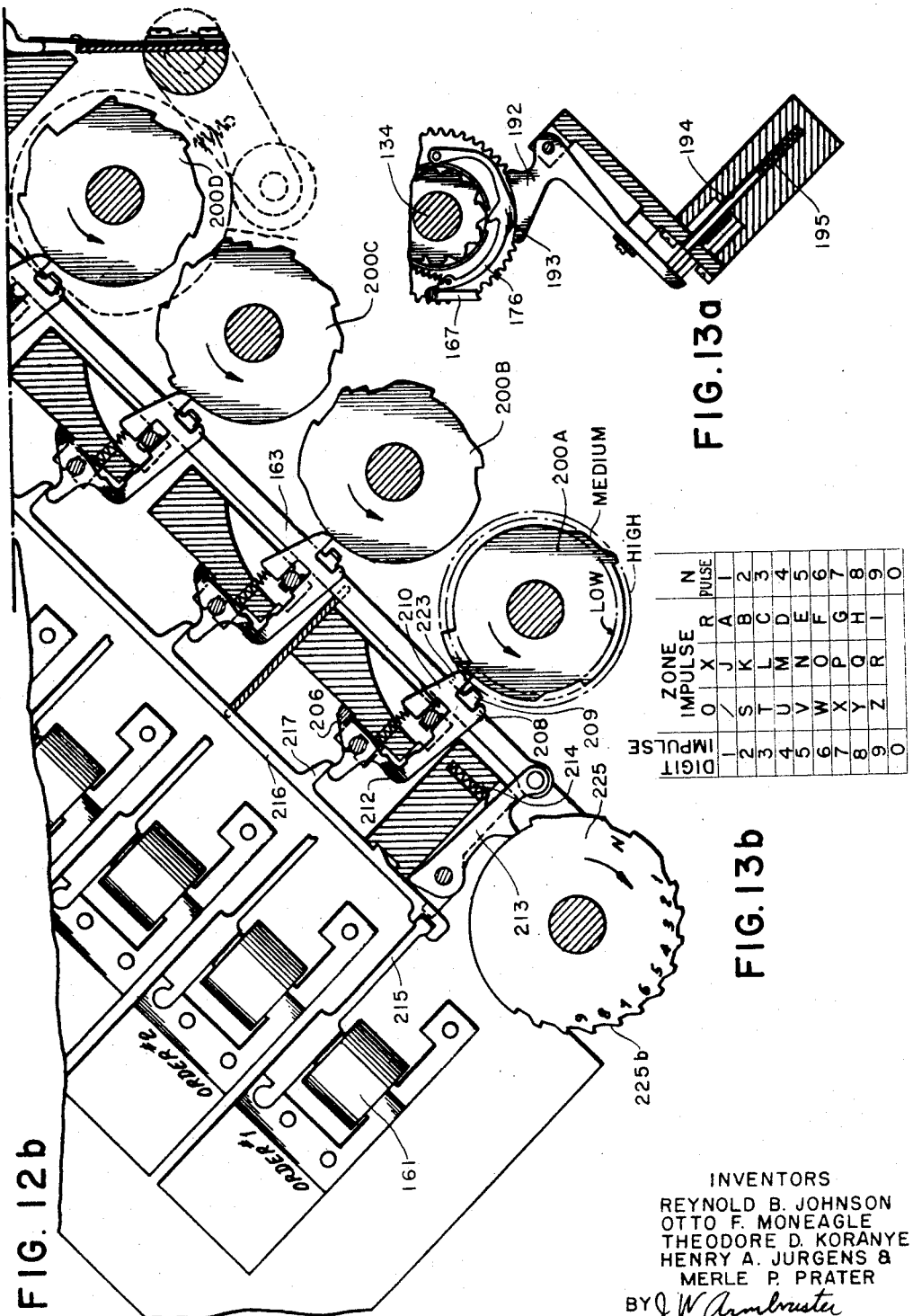

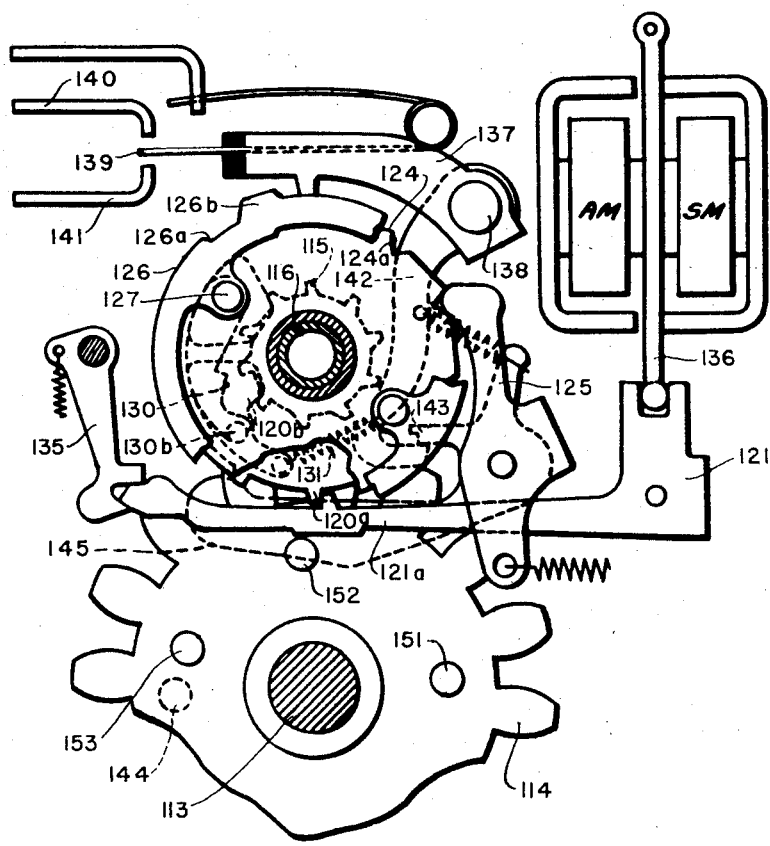

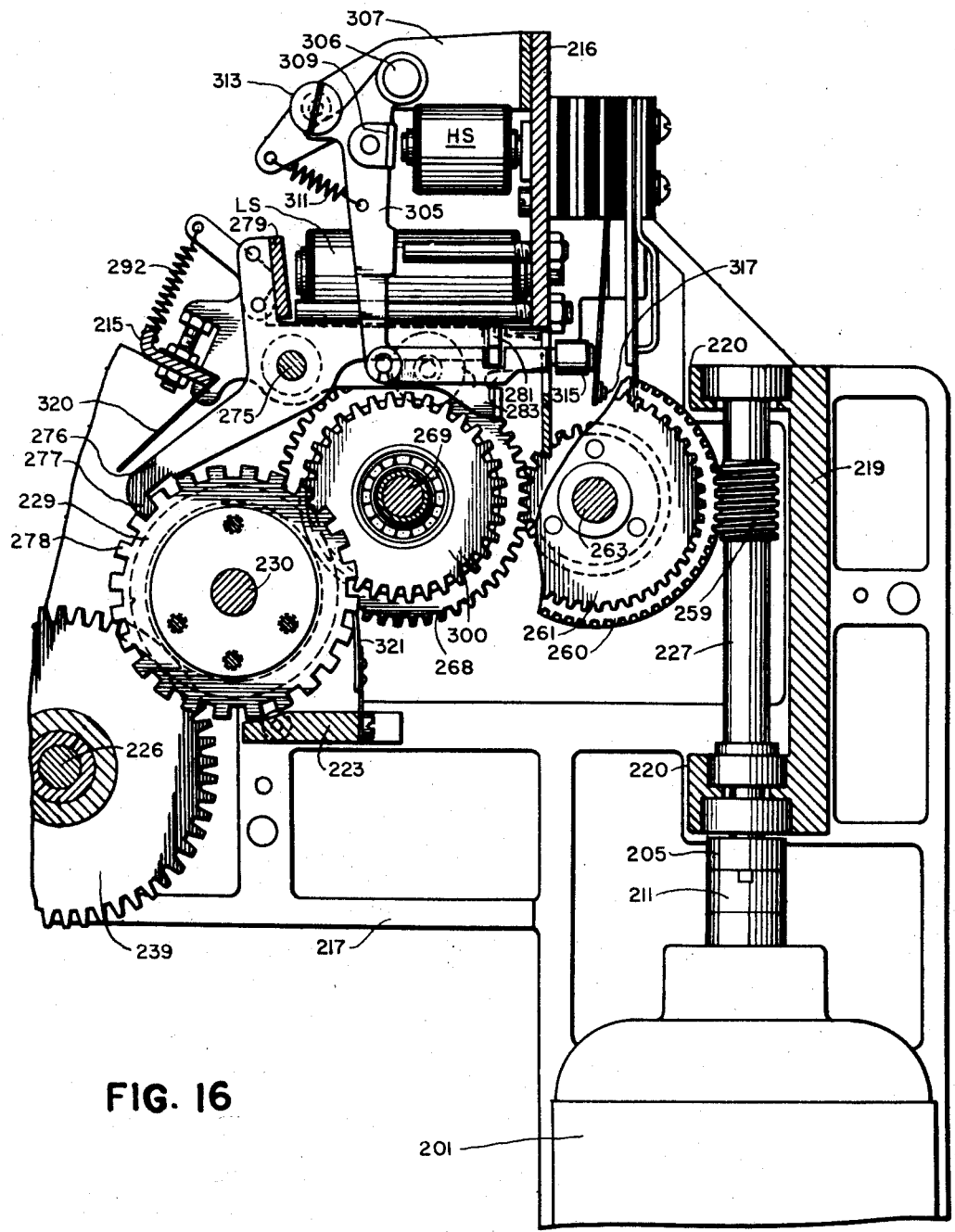

INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY June 2, 1959   R. B. JOHNSON ET AL   2,889,110
BILL FEEDING AND PIERCING DEVICES
Filed June 19, 1953   46 Sheets-Sheet 14

INVENTORS
REYNOLD B. JOHNSON
OTTO F. MONEAGLE
THEODORE D. KORANYE
HENRY A. JURGENS &
MERLE P. PRATER
BY J W Armbruster
ATTORNEY INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY June 2, 1959 R. B. JOHNSON ET AL 2,889,110
BILL FEEDING AND PIERCING DEVICES
Filed June 19, 1953 46 Sheets-Sheet 19

INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY

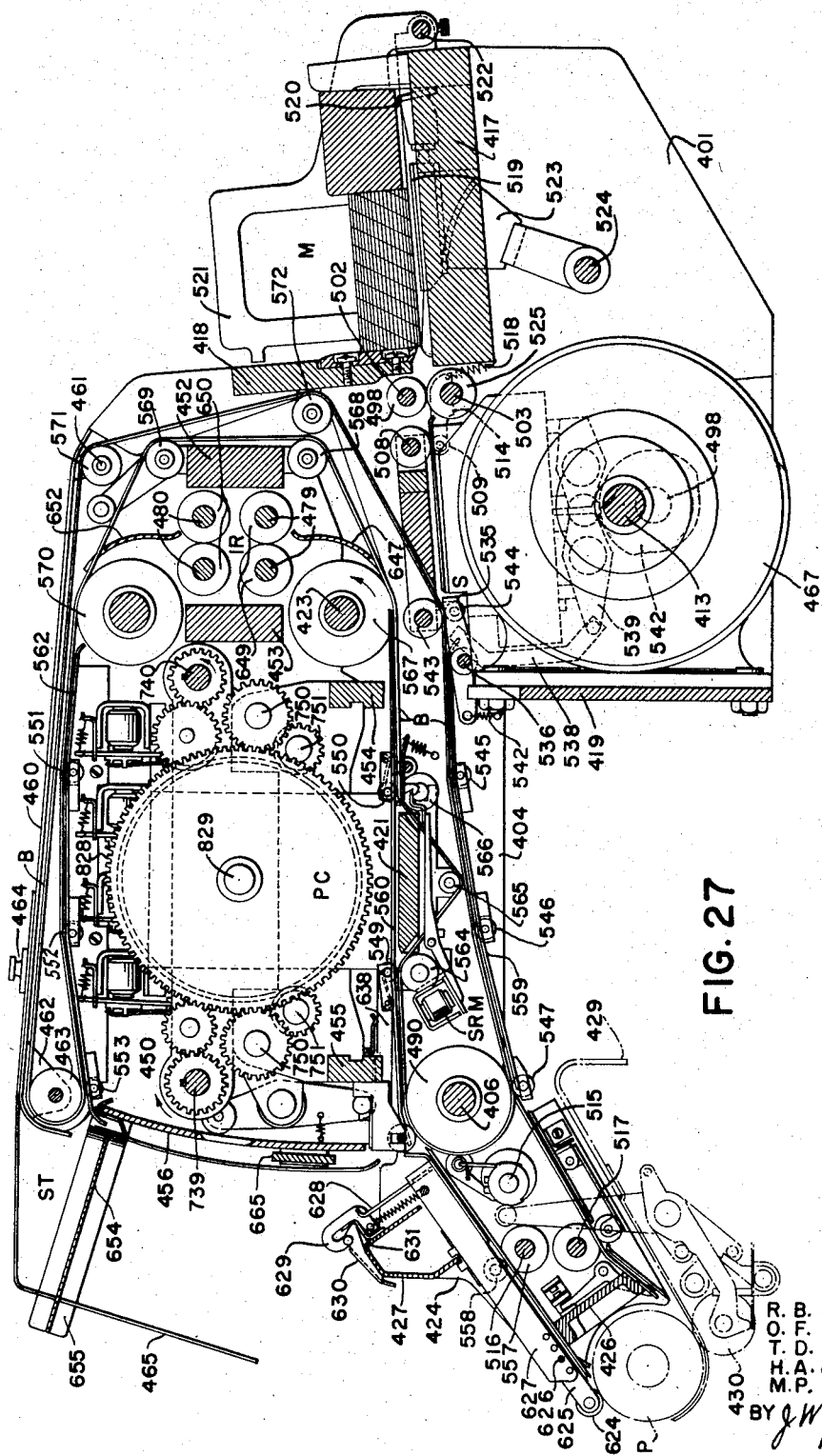

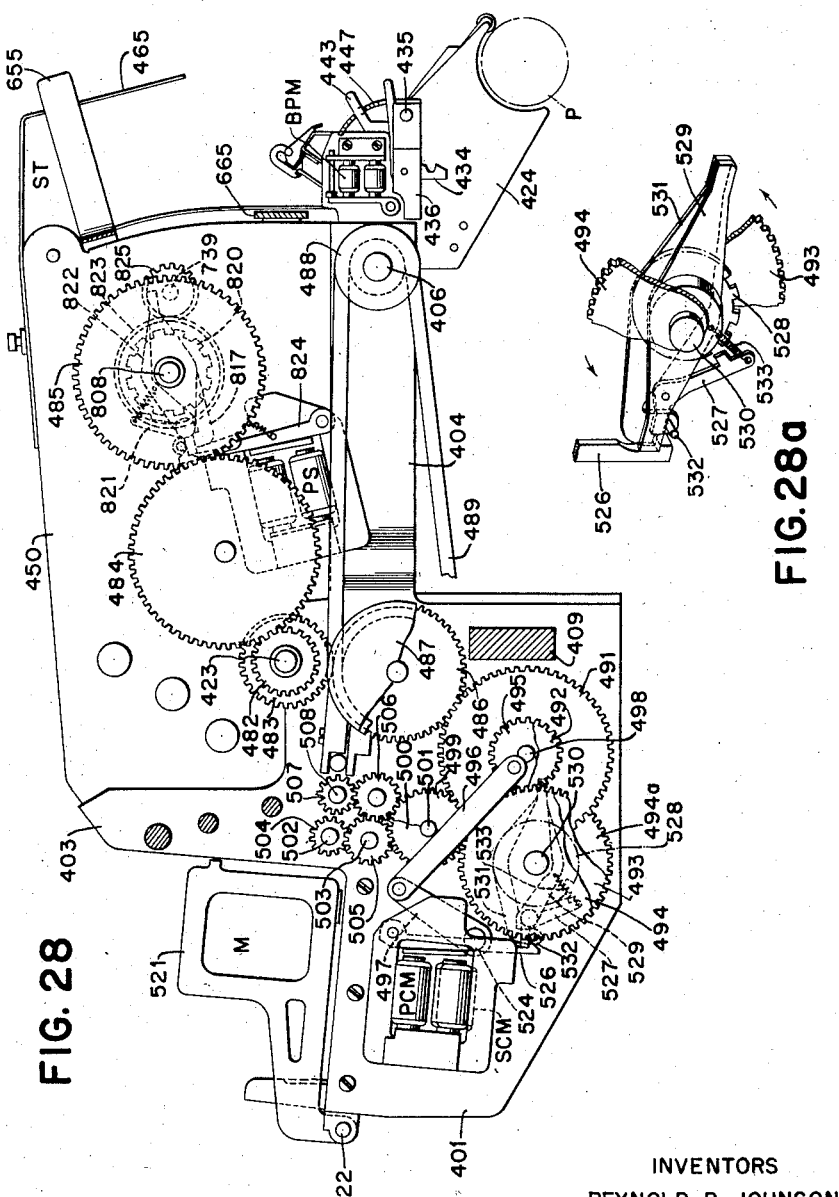

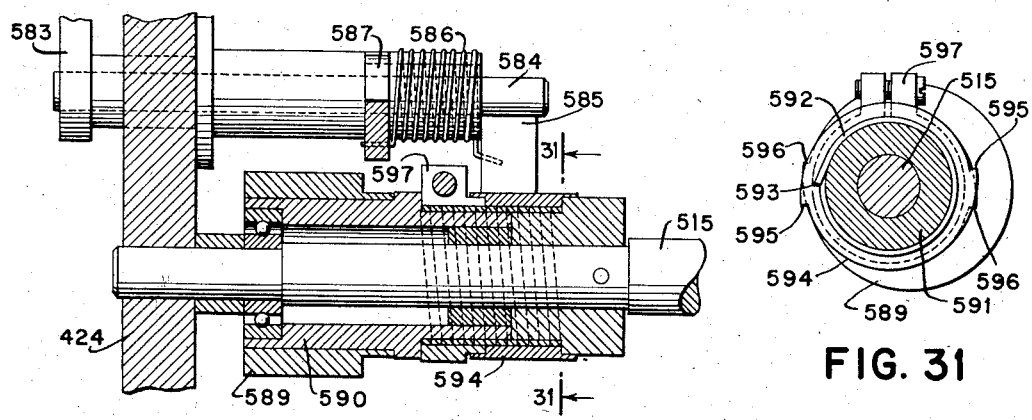
FIG. 30
FIG. 31
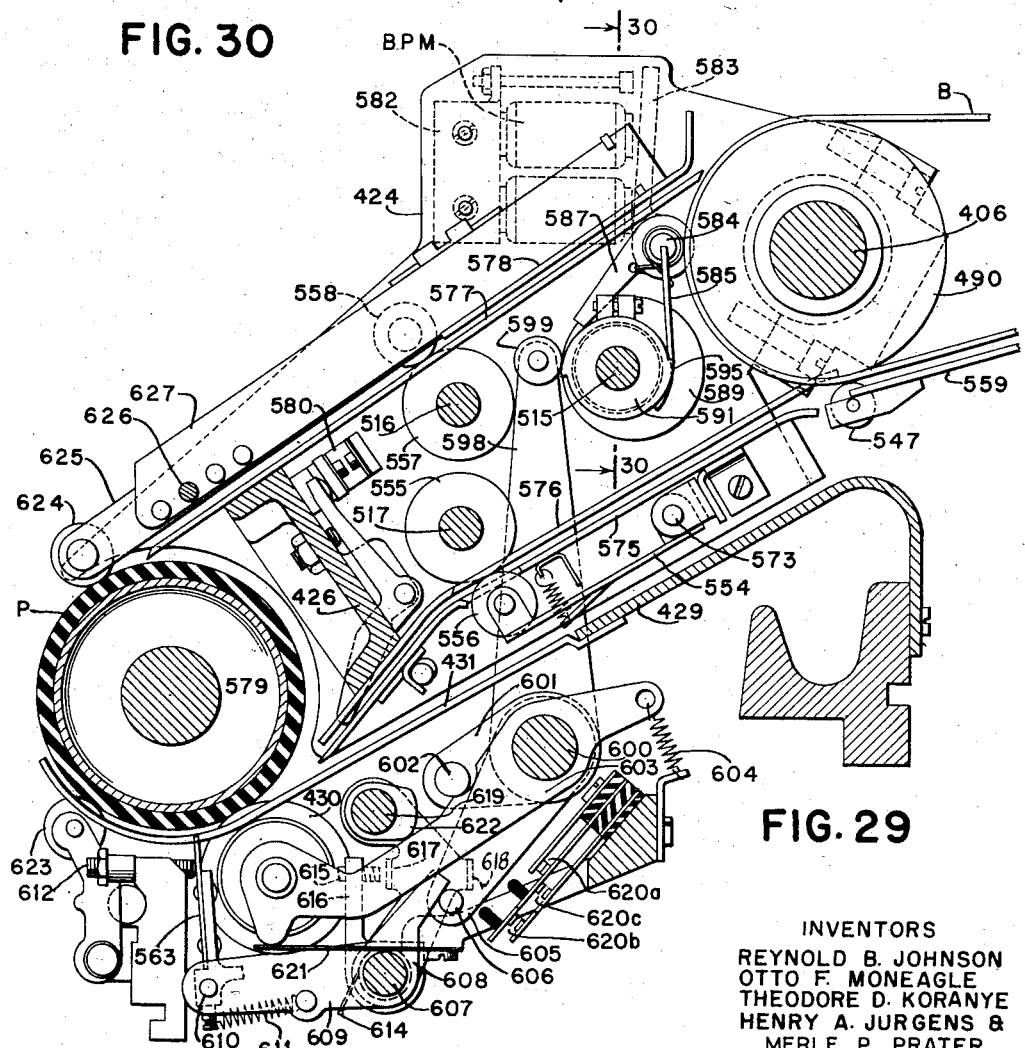
FIG. 29
INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY June 2, 1959 R. B. JOHNSON ET AL 2,889,110
BILL FEEDING AND PIERCING DEVICES
Filed June 19, 1953 46 Sheets-Sheet 23

INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY

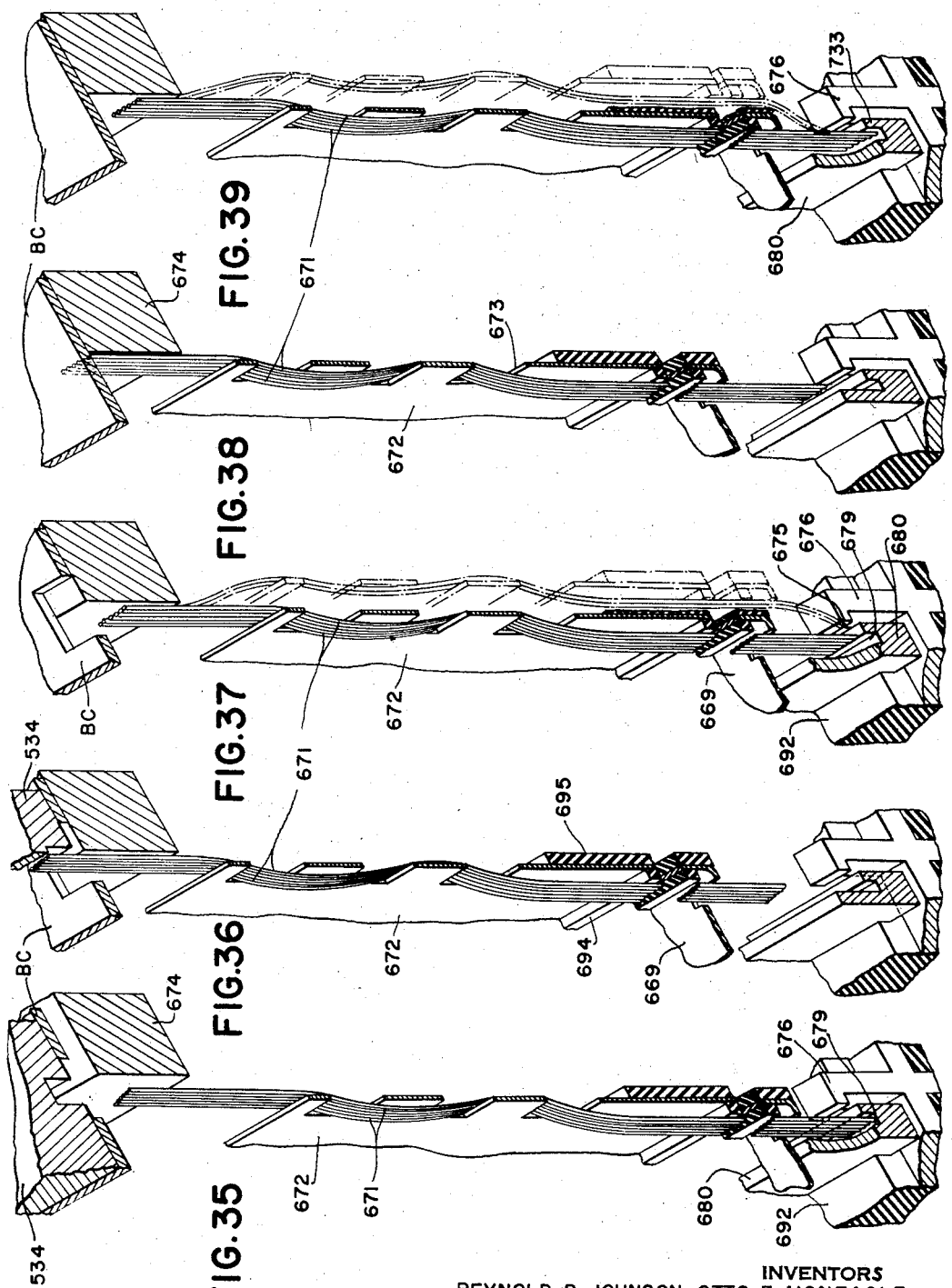

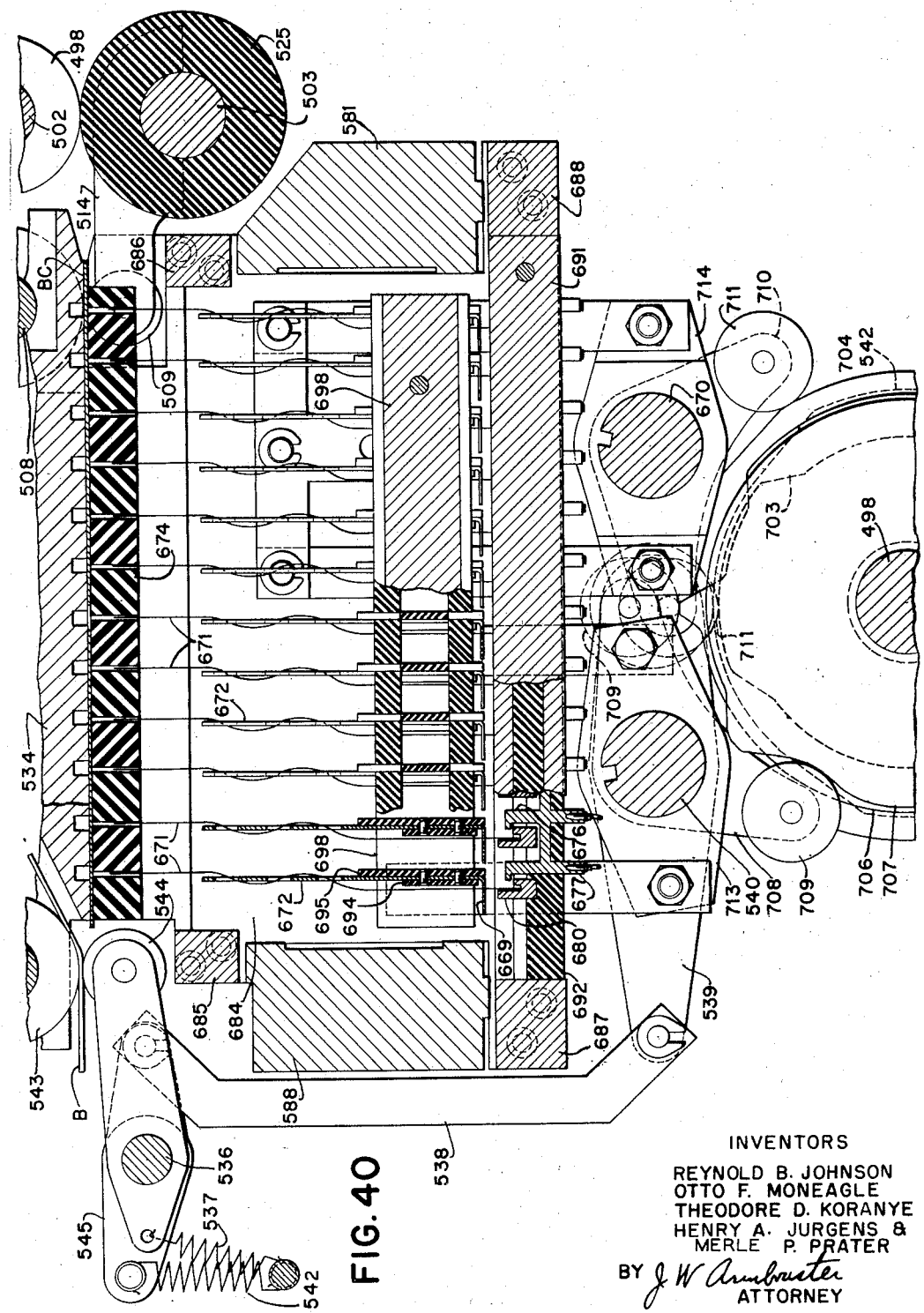

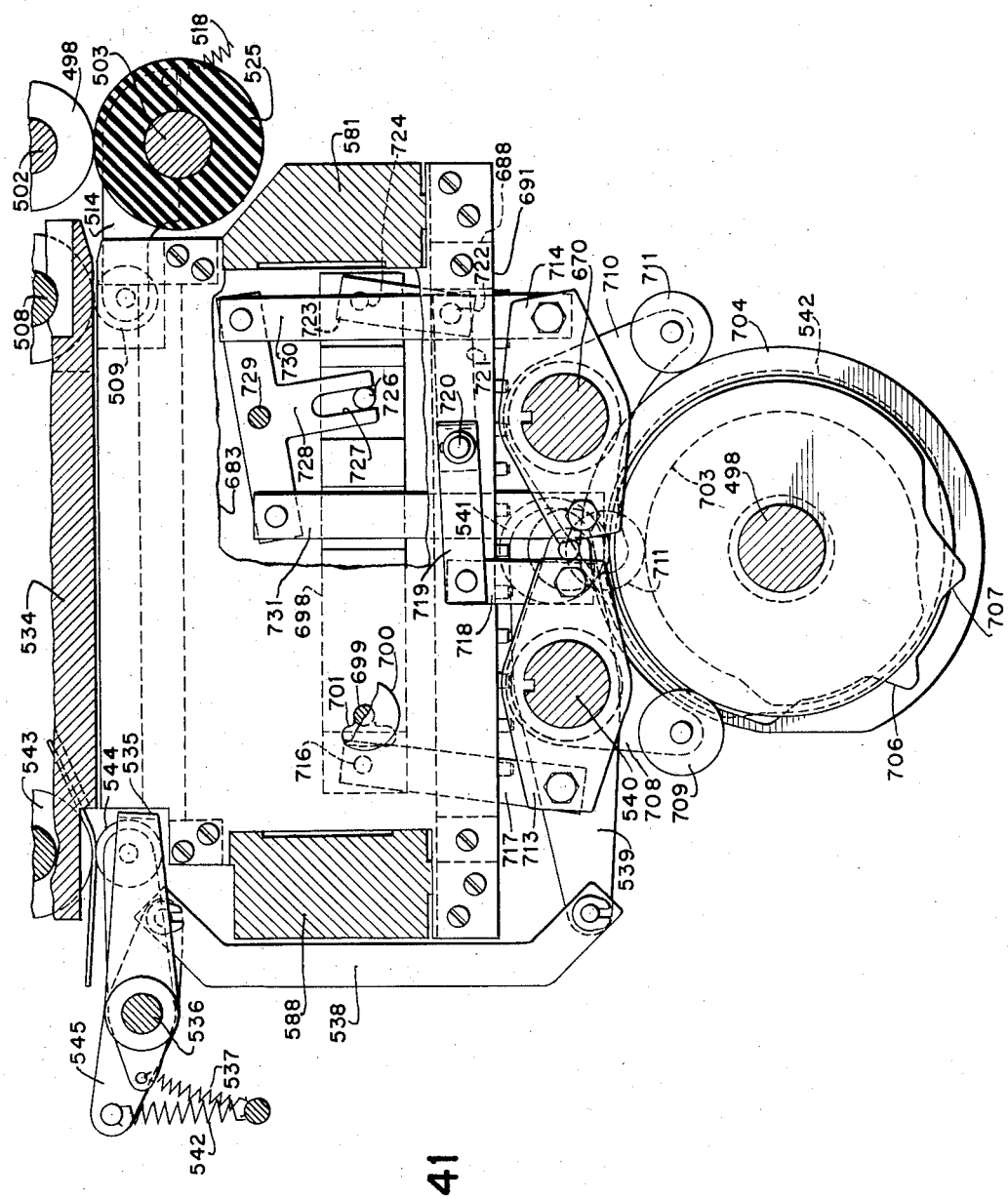

INVENTORS
REYNOLD B. JOHNSON
OTTO F. MONEAGLE
THEODORE D. KORANYE
HENRY A. JURGENS &
MERLE P. PRATER
BY J. W. Armbruster
ATTORNEY

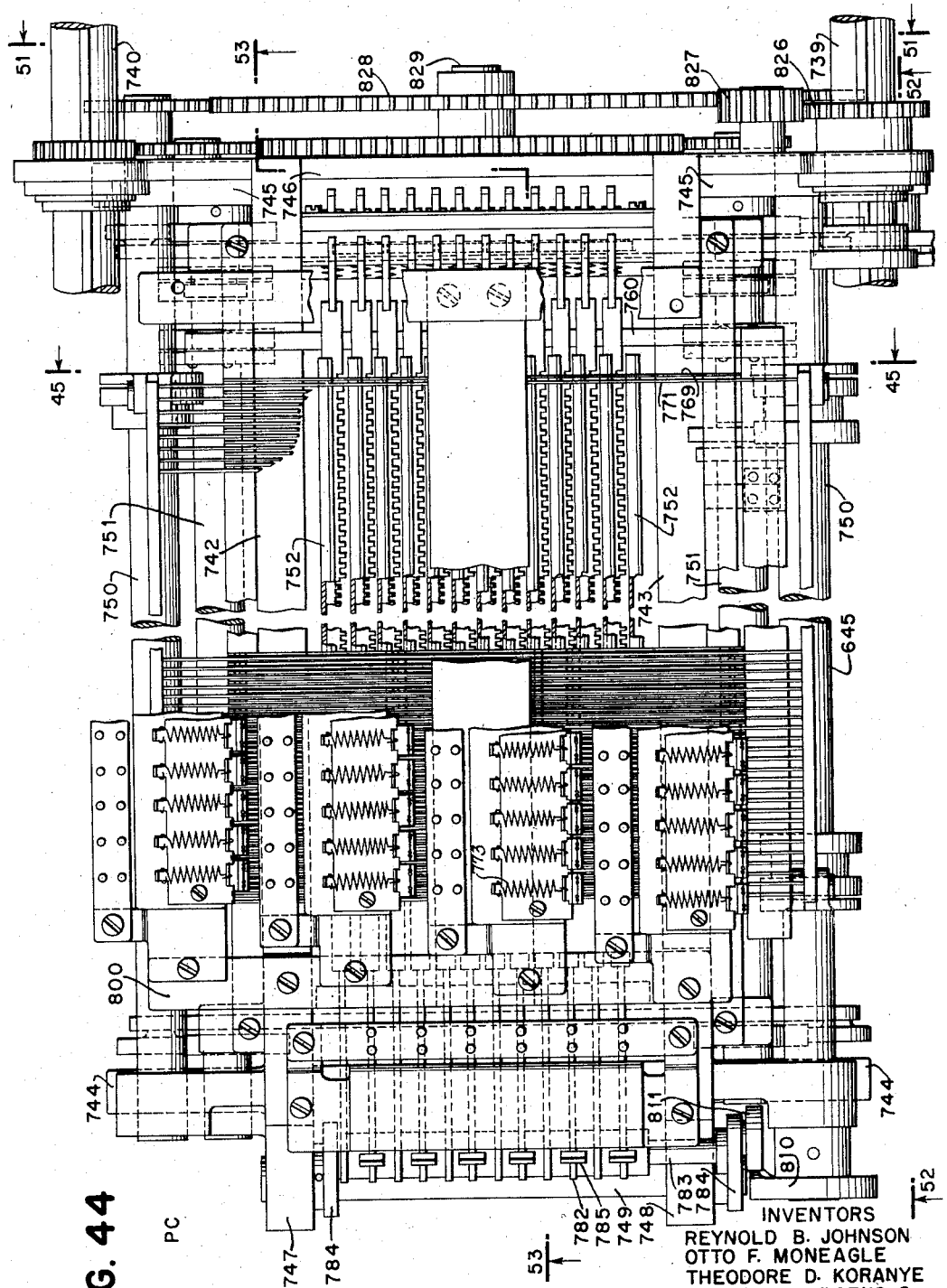

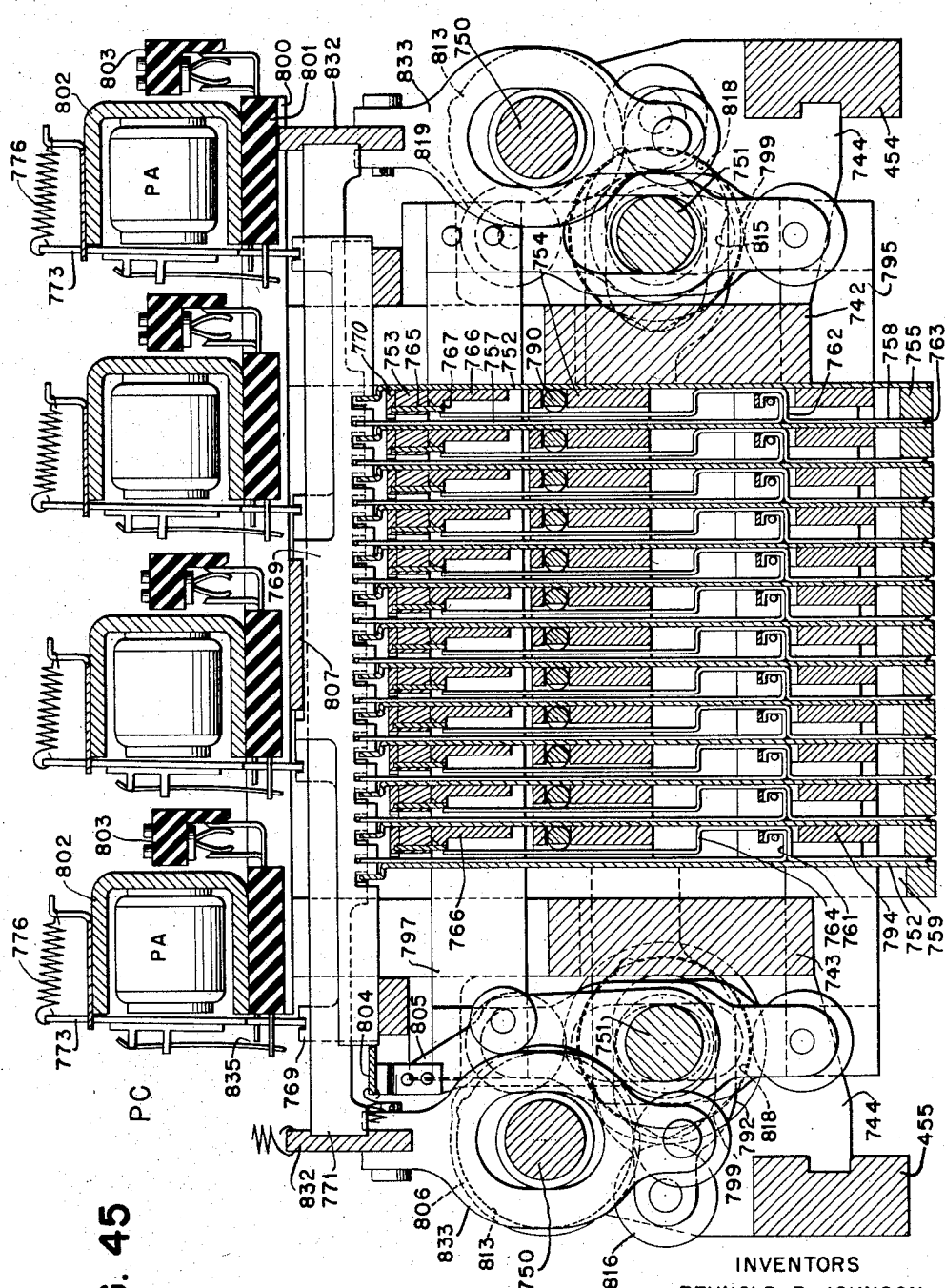

INVENTORS
REYNOLD B. JOHNSON, OTTO F. MONEAGLE
THEODORE D. KORANYE, HENRY A. JURGENS &
MERLE P. PRATER
BY J. W. Armbruster
ATTORNEY

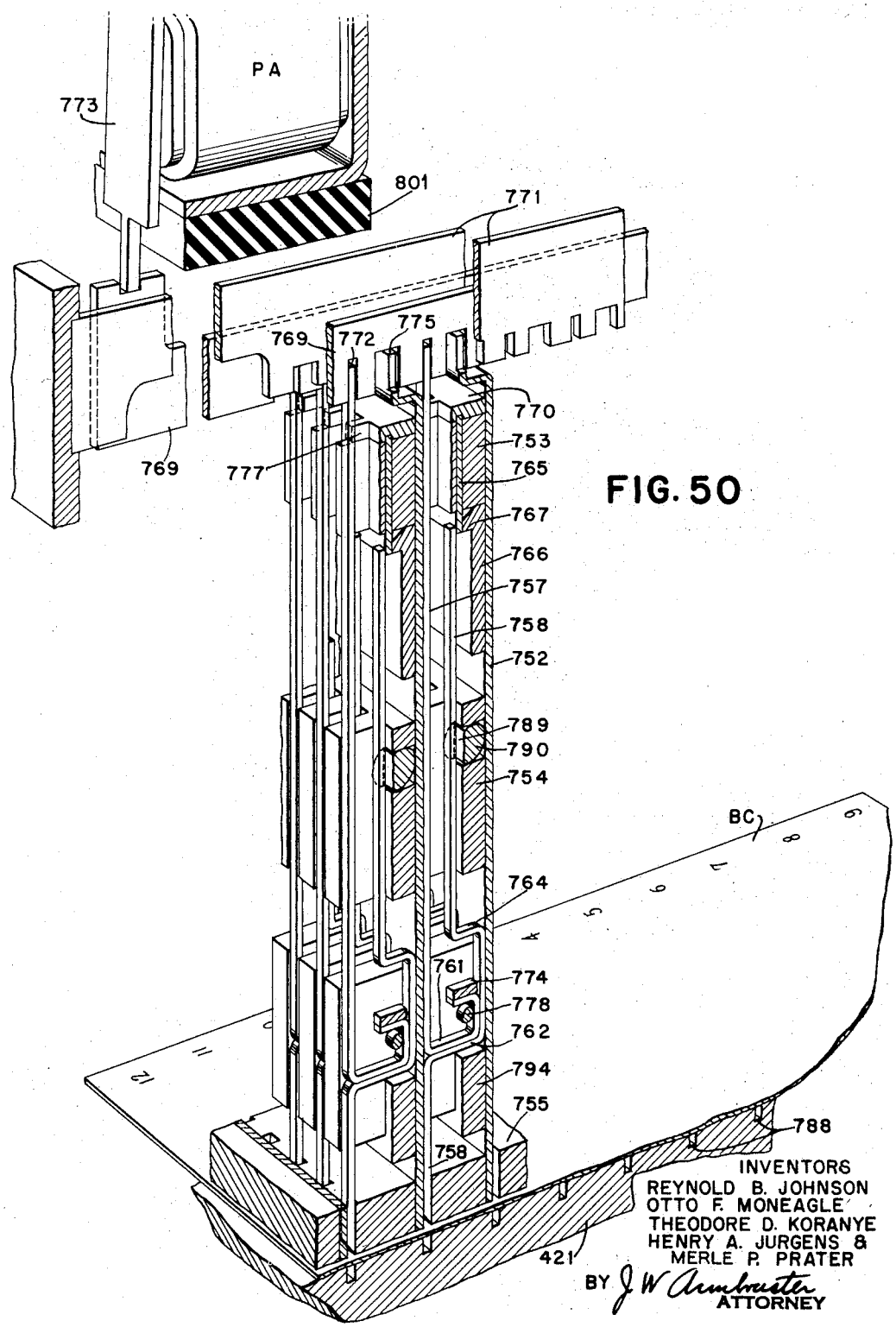

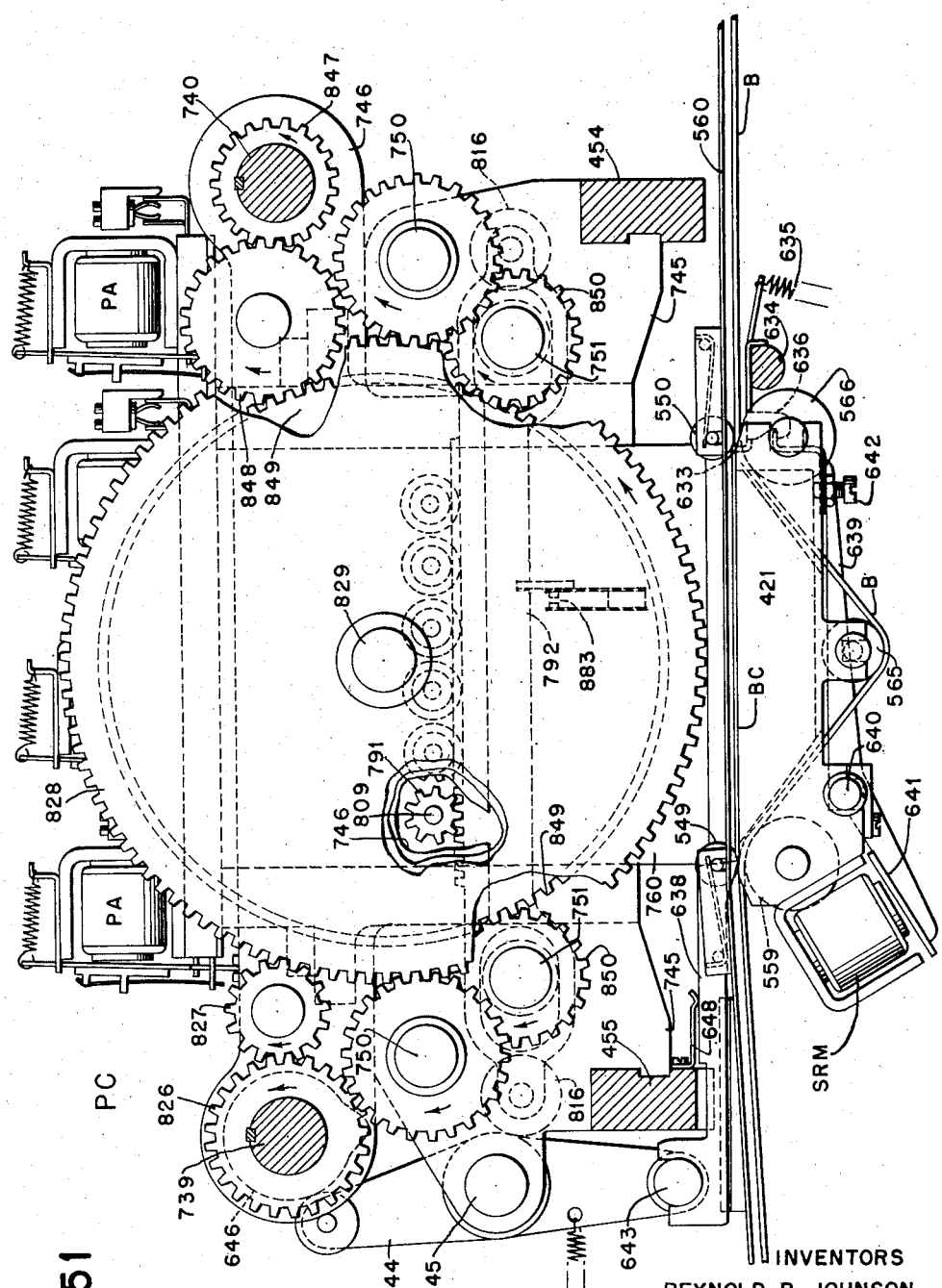

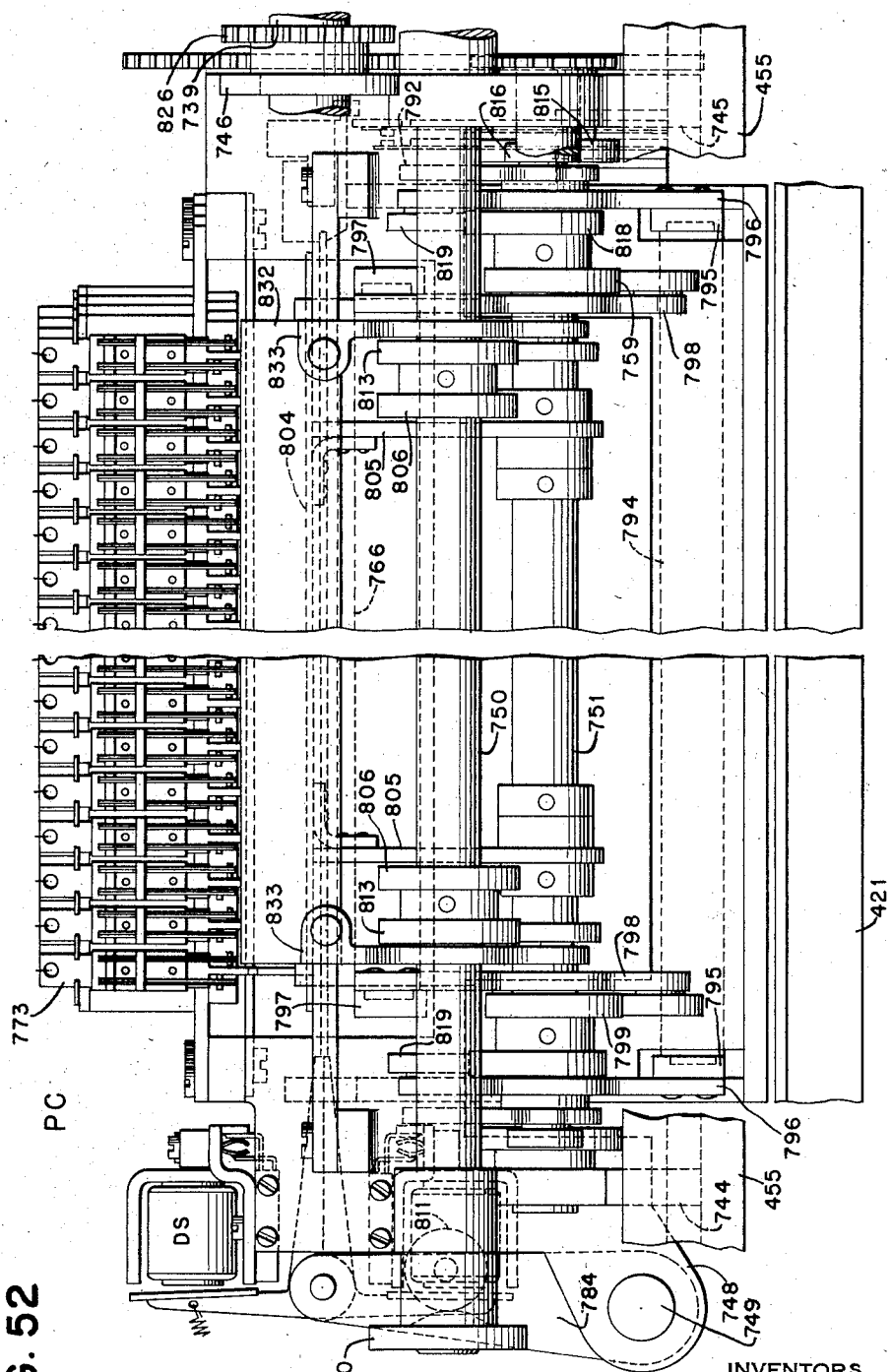

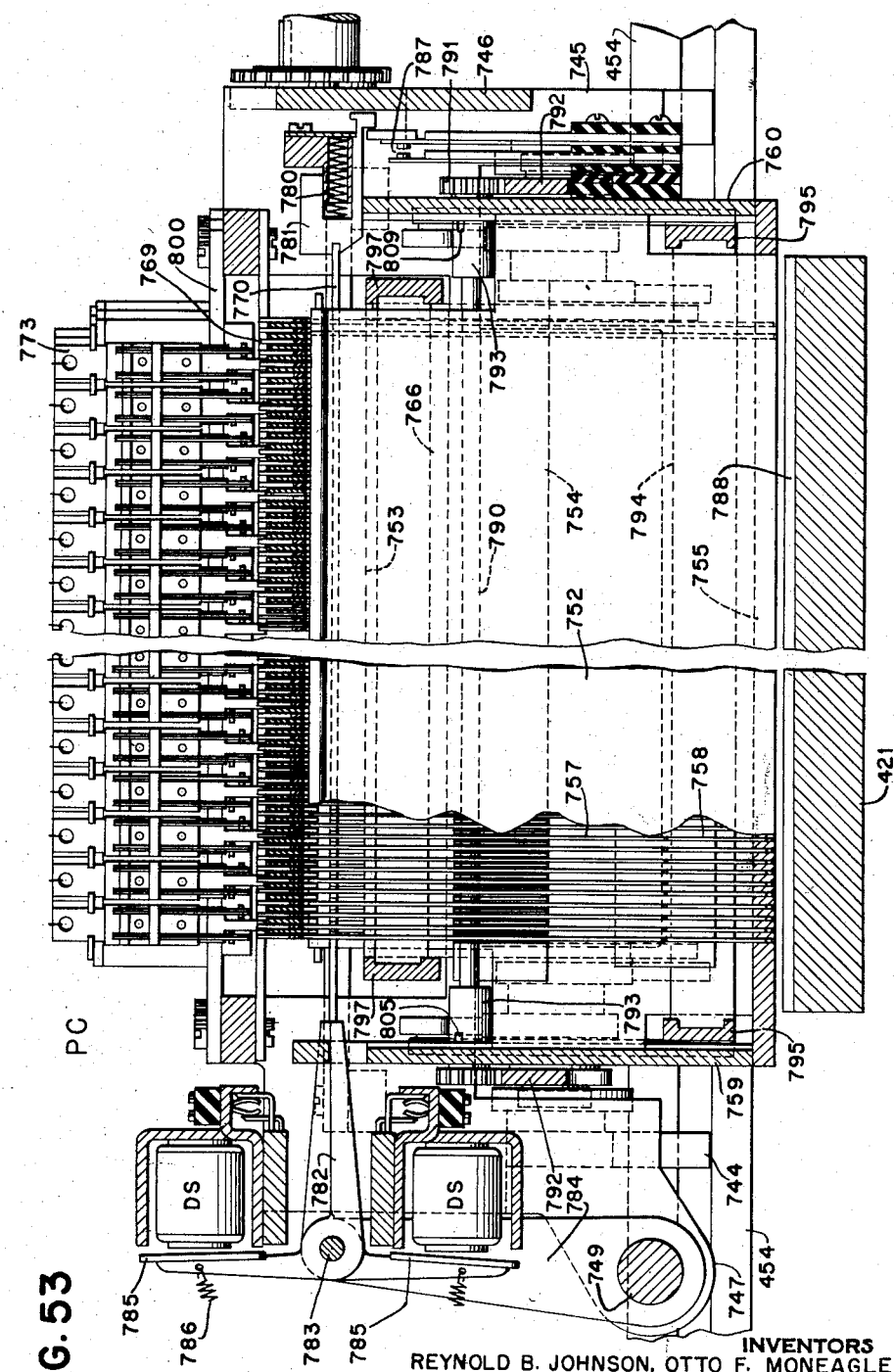

June 2, 1959     R. B. JOHNSON ET AL     2,889,110
BILL FEEDING AND PIERCING DEVICES
Filed June 19, 1953                 46 Sheets-Sheet 43

INVENTORS
REYNOLD B. JOHNSON, OTTO F. MONEAGLE,
THEODORE D. KORANYE, HENRY A. JURGENS
& MERLE P. PRATER
BY J. W. Armbruster
ATTORNEY June 2, 1959  R. B. JOHNSON ET AL  2,889,110
BILL FEEDING AND PIERCING DEVICES
Filed June 19, 1953  46 Sheets-Sheet 44

INVENTORS
REYNOLD B. JOHNSON, OTTO F. MONEAGLE
THEODORE D. KORANYE, HENRY A. JURGENS
& MERLE P. PRATER
BY J. W. Armbruster
ATTORNEY INVENTORS
REYNOLD B. JOHNSON, OTTO F. MONEAGLE,
THEODORE D. KORANYE, HENRY A. JURGENS
& MERLE P. PRATER
BY J. W. Armbruster
ATTORNEY

United States Patent Office 2,889,110
Patented June 2, 1959

2,889,110

BILL FEEDING AND PIERCING DEVICES

Reynold B. Johnson, Palo Alto, Calif., and Otto F. Moneagle, Endicott, and Theodore D. Koranye, Henry A. Jurgens and Merle P. Prater, Vestal, N.Y., assignors to International Business Machines Corp., New York, N.Y., a corporation of New York Application June 19, 1953, Serial No. 362,711

42 Claims. (Cl. 235—61.1)

This invention relates in general to record control tabulating devices and more particularly to an improved form of sheet feeding device coordinated with means for sensing pre-punched data in the sheet, and printing address, items and total data thereon and piercing it to represent such numerical and alphabetical information.

The main object of the invention is the provision of devices for producing an improved form of bill or other accounting instrument. When the bill or the stubs thereof are pierced it is done in such a way as to leave the paper unblemished. The paper disturbed by piercing is rolled or ironed back into the plane of the paper so that index points cannot be detected by the eye.

Another object of the invention is the provision of a portable, self-driven bill feeding device. The device is constructed without a platen so that it is adapted to be wheeled around and connected to a standard printing machine and serve in connection therewith to advance record material to and from the platen. Although the record material is referred to throughout this specification as a bill, sheet, accounting element or instrument, it will be understood that in the majority of cases the record material is in the shape of the well known IBM record card and as such is either imperforate or formed with perforations before entering the bill feed device. The bill feeding device is designed to handle extra widths and lengths of record material usually in the form of two IBM cards connected side-by-side, one of which is usually a whole card and the other a card or card portion subdivided by perforated lines of weakness to sectionalize it into two or more stub sections.

Throughout this specification a distinction should be kept in mind of the difference between the original perforated data or record cards which are used to control the tabulator as differentiated from the blank bill cards which pass through the bill feeding device and receive impressions and cuts as printed and pierced information from the data cards and the accumulators controlled thereby. The data cards are usually in the form of name and address cards and cards distinguishing items and prices of materials or services such as those provided by utility companies. The example taken to illustrate the present case is one wherein a utility company having records in the form of perforated data cards desires to send out bills to customers and also establish ledger records for home office purposes.

A feature and object of the invention is the provision of means for providing an unblemished record such as bill or check and yet have the same contain information in the form of data indicia with weakened indicia areas. A bill record which is to be mailed out and handled by a customer has requirements more exacting than those of a record held in an accounting office. The novel record of this invention not only meets the needs by presenting a better looking bill, but it is also a bill suited for better machine control after being handled.

Heretofore, when an accounting record contained perforations, it was marred by the broken outline of the surface which some times cut out or distorted parts of the printed matter. The perforation edges also became distorted when handled and bent and interfered with stacking and free feeding motion of the cards with respect to each other. In the present instance the problem is solved by piercing rather than punching the record material and then restoring the displaced record material back to its original position. In other words, the punch wires used in the present case are arranged with slanted pointed ends to cut the record material without forming a chad. In the preferred form shown, piercing is accomplished by cutting a U-shaped flap in the record material and then ironing such flaps back into the surface of the record material so that to all appearances the record is without blemish. With the record in this condition, printing may be performed all over the record instrument and to all appearances it seems like an ordinary check or bill. However, when the record is presented subsequently to sensing devices as part of a system of accounting, the weakened sections are detected by proper sensing devices just as though they were regular perforations. As an alterntive of the U shaped rectangular chadless form of index point there is use of a piercing means of the shapes and even that comprising a pointed needle which when projected through record material causes a circular projection on one side which when ironed back never completely closes the puncture. The remaining perforation is so small as to be unnoticed but still effective in connection with electrical card sensing devices.

Another object of the invention is the provision of means for concurrently setting devices for accumulated, printed and pierced manifestations in a record instrument from the same impulse. A common impulse from a single source is routed simultaneously through all three data receiving devices for the bill. Heretofore, in many instances the operation of perforating was carried out in a different machine from that used to accumulate and to print upon the same record. That required checking to insure that there was agreement between related totaled, printed and perforated information. In the present instance since the same electrical impuses are used simultaneously to set up the accumulating, printing and piercing devices there is assurance that results will be similar without need for subsequent checking.

A feature of the piercing devices is the economical nature of the construction. By the use of bent wires and flat notched slides the cost of the unit is minimized even though used for full card index point capacity of 12×80, or 960 positions.

A feature of the piercing devices is the storage arrangement whereby related data to be pierced may be set up at various times and from various sources such as from more than one tabulator card reading cycle and from the total readout of an accumulator. After a series of related set up cycles of data put in storage to be pierced for one account, piercing is finally accomplished simultaneously for all parts of stored data. Storage of the data to be pierced is effected by merely snapping the upper ends of certain piercing wires under overhanging lips of operating bails. When the time for piercing arrives, all bails are lowered and push down on the set pierce wires, the lower ends of which have sharp edges or points to puncture or cut a flap in the bill.

Therefore an object of the invention is the provision of piercing devices settable in separate stages from different sources to pierce a record instrument such as a bill. For example, in the piercing of a utility bill, part of the piercing device may be set up from the first or account identification card of a group of cards related to a certain customer. Thereafter a number of items are added from said related data cards into an accumulator and also used to set up portions of the piercing unit. In a third step of operation, the total is read off the accumulator and also used to set up part of the piercing device. After all the sensing and reading operations are accomplished, the piercing device is operated and in one stroke pierces the bill with the information from the three sources. Of course, control may be derived from only one source or a combination of less than three sources to use the piercing device as a reproducer or summary card punch.

Another feature of the bill feeding device is its coordination with sheet feeding devices of the kind controlled by a perforated tape. Since the perforated tape has flexibility in adjusting the tabulator platen to various printing line positions, such flexibility is brought into use in connection with the advance of the bill when it passes from the bill feeding device to the platen before being drawn back into the bill feeding device.

Another object of the invention is the provision of sheet feeding controls for coordinating the positioning of a series of sheets in sequential order as they pass through a series of stations along the path of each sheet when going through the bill and sheet feeding device. As a sheet such as a ledger sheet is advanced out of the magazine, it is brought into a first sensing station wherein prepunched information therein (i.e. in one section of the sheet) is compared with one or more data cards as they pass through the tabulator. After this sensing operation, the sheet is advanced further into a position just short of the platen and there held until the proper time for an advance before taking the place of the preceding sheet on the platen. When printing of the preceding sheet is finished as revealed by the indication of a group control change in the tabulator and total printing therefrom, the new sheet is spaced to the platen and there the tape feeding controls take over, usually to advance it to the first address line print receiving position. Thereafter, the sheet is advanced from address to item and from item to total printing positions as determined by the feed control tape. After receiving all the printed information, the sheet is advanced away from the tabulator platen and back again into the sheet feeding device which conducts it to the piercing station where it is held momentarily while the punch wires descend to pierce the sheet material according to the data set up in various stages while the sheet was progressing towards the piercing station. Directly after piercing is accomplished, the sheet is carried further between such ironing rollers which restore the pierced material back into the plane of the sheet. After passing through the ironing rollers, the sheet is directed back towards the front of the machine where it is thrown into a stacker. The path of motion of the sheet is in the form of a letter S with the platen at one rounded part of the path and the ironing rollers at the other rounded section of the path, and the magazine and stacker at the lower and upper ends respectively.

Another object of the invention is to provide optionally employed units of mechanism for carrying on various kinds of accounting paper work such as the recording of bills, checks, ledger records etc. in cooperation with a common handling device. In the present instance the feeding mechanism for the bill feed is adjustable to handle record materials of various lengths and widths in order to feed a range of business instruments the size of which may vary from that of a check to that of a ledger card. Although the bill feed devices include sensing, printing and piercing units, it will be understood that not all such units are used all the time. Instead they are used in combinations according to the kind of business transaction to be recorded. Therefore, although all record materials advance through the bill feeding device past the sensing station not all have effect in connection therewith and the same is true of the printing and piercing operations.

Another object of the invention is to provide a platenless sheet feed device mounted on a cantilever extension of a frame with castors. An advantage of this construction is in the ability to roll the feed device to any of a number of tabulator printers of different kinds. The overhanging part of the sheet feed is adapted to fit over the ordinary paper table and thus bring sheets to the platen just as though they were inserted separately by hand. Attachment is made by latches with eccentric pivots on the sheet feed engaging studs on the tabulator and being drawn tight by turning the pivots. As the sheets leave the platen they are conveyed further by the sheet feed devices to piercing, ironing and stacking stations therein.

A feature of the invention is the provision of a novel economical form of card sensing device including frictionally held wires which are raised into contact with the bill and those going through perforations therein are displaced so that the lower ends are raised with respect to the wires of other imperforate index points. As a result, when the wire holders are shifted transversely with the lowered wire ends against a recessed ledge, the raised wires are bowed and come into contact with electric conductors and send pulses indicative of the bill perforations.

An object of the invention is to use the sensing devices of the preceding paragraph in a comparing device for comparing the cards in the bill feed unit with the cards in the tabulator. The comparing devices are provided for sensing prepunched data such as an account number on an incoming bill and comparing that with the account number perforations of supposedly related data cards being analyzed in the tabulator for control over printing and piercing of the bill.

A further object of the invention is the provision of a bill feed device with articulated sections some of which are raised and opened for inspection and service and the part nearest the platen is adjustable to direct the flow of record material over the tabulator paper table and directly onto the platen.

A still further object of the invention is to provide a multiple belt feed drive for conveying the bill blanks or cards from one station of the bill feed to another as soon as it leaves the sensing station therein. The belts are looped short of or detoured around the platen, piercing and ironing stations so that action therein is independent of the belt drive.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 is a diagrammatic view of the various elements used in the machine such as record cards, ledger cards, machine units and stations as they are interrelated for an operation such as posting.

Fig. 4 is a detailed view of a portion of a bill card which has been pierced to represent data printed thereon.

Fig. 4a shows a variety of optional piercing wire points with the selected point used at the left.

Fig. 5 is an end view of a pierced card showing the depressed flap portions of the card.

Fig. 6 is a side elevation view showing pairs of ironing rollers cooperating with a pierced card to roll back and restore the flaps in the card back into the plane of the card.

Fig. 7 is an end view of a card shown with the plane surfaces restored after ironing.

Fig. 8 is a detailed view of a record card such as that shown in Fig. 4 but with its surface restored after ironing.

Fig. 9 is a side elevation view showing the assembled tabulator and bill feeding device and illustrating some of the bill feed driving mechanism.

Figs. 12a and 12b are sectional elevation views of the alphabet printing mechanism in the tabulator. They are to be assembled with Fig. 12a above.

Fig. 13a is a detailed view of a printer wheel overthrow preventing mechanism.

Fig. 13b is a chart showing the code of perforations in twelve card index point positions for selecting the numeric and alphabetic type.

Fig. 14 is a side elevation view of one order of an accumulator in the tabulator.

Fig. 15 is also a view in side elevation of the accumulator shown in Fig. 14 but showing the parts in an operated position.

Fig. 16 is a sectional elevation view showing the driving connections for the sheet feeding device in the tabulator.

Fig. 27 is another elevation view of the bill feed devices in a section taken along line 27—27 in Fig. 25.

Fig. 28 is a side elevation view looking at the outside of the bill feeding device and taken along line 28—28 in Fig. 25.

Fig. 28a is a detail view of the picker clutch shown in Fig. 28.

Fig. 29 is a sectional detail view of the portion of the bill feeding device extending to the rear of the platen of the tabulator.

Fig. 30 is a sectional detail view of the spacing control clutch comprising a spring drive for the cam operating the stop for the bill sheet as it approaches the platen.

Fig. 31 is a sectional view of the clutch shaft and spring as shown along line 31—31 in Fig. 30.

Fig. 35 is a perspective view showing the sensing devices of one index point position in the bill feed sensing unit as the sensing wires appear in the home position.

Fig. 36 is a perspective view of a sensing mechanism with the sensing wires projected up through a perforation in the ledger card.

Fig. 37 is a perspective view showing the sensing wires lowered and shifted sidewise to establish contact indicative of the sensing of a perforation in a card.

Fig. 38 is a perspective view showing the sensing mechanism with the sensing wires raised but encountering an imperforate area of the record card.

Fig. 39 is another perspective view showing the aftermath of the operation of Fig. 38 whereby the sensing wires are lowered and shifted but fail to establish contact because they were depressed relative to the wire holder by obstruction in the form of the card imperforate area.

Fig. 40 is a sectional elevational view taken through the sensing mechanism in the bill feeding device.

Fig. 41 is a side elevation view of the sensing mechanism showing the operating devices for shifting the sensing wires.

Fig. 44 is a plan view of the piercing unit which is in the bill feeding device.

Fig. 45 is a sectional elevation view of the piercing devices as they appear when viewed along line 45—45 in Fig. 44 showing the piercing unit in the bill feeding device.

Fig. 50 is a perspective view in section showing a few orders of the piercing device as they are assembled.

Fig. 51 is a side elevation view showing the operating mechanisms for shifting the various slides and rocking the restoring rods of the piercing unit.

Fig. 52 is an end elevation view showing other parts of the operating mechanism cooperating with the piercing unit.

Fig. 53 is a longitudinal sectional elevation view taken along line 53—53 in Fig. 44 and showing the control means for the piercing wires and the setting wires in the piercing unit.

Figure 1:
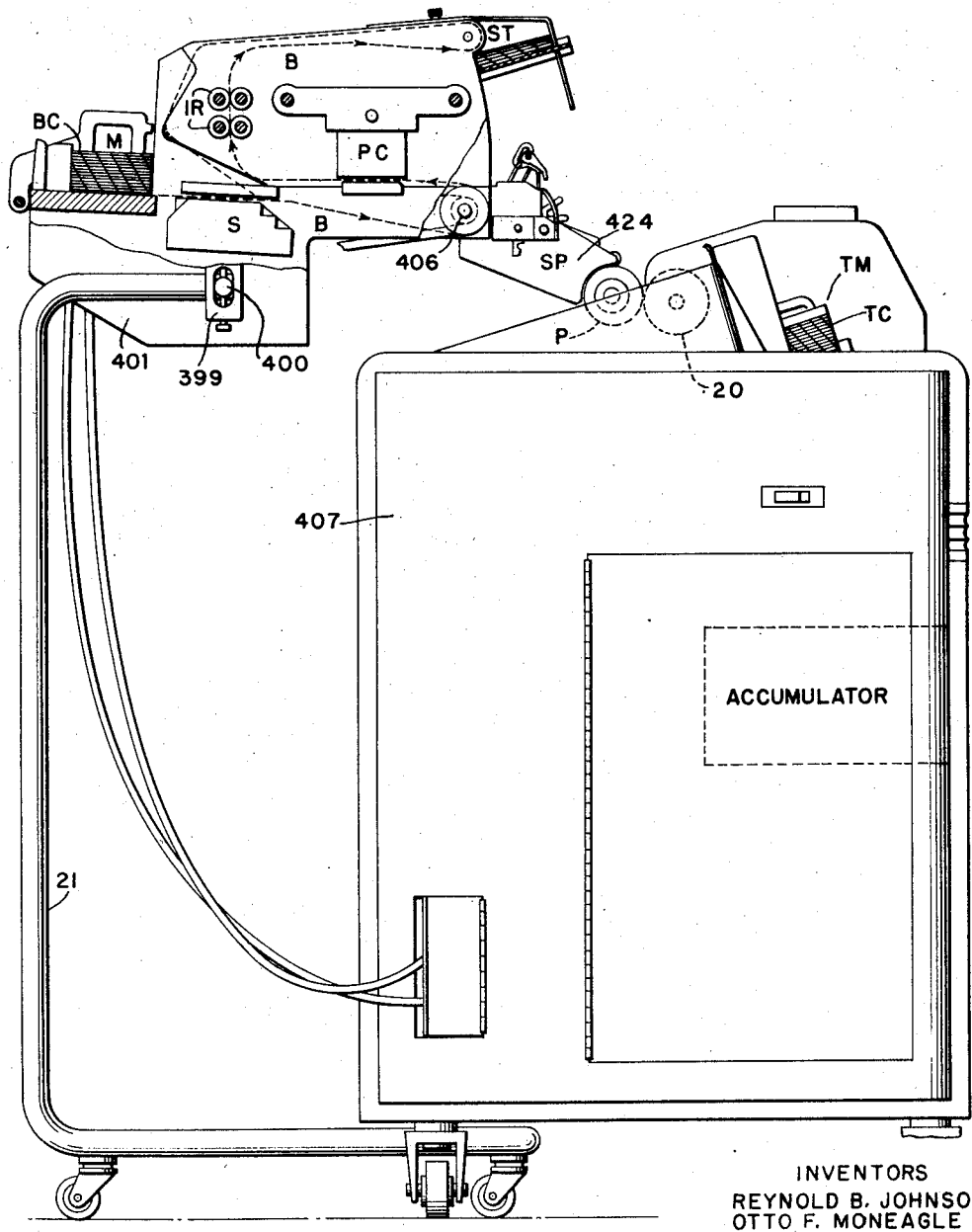
Fig. 1 is a side elevation view showing the tabulator and attached bill feeding unit, the latter being shown in section.

Figs. 54a to 54j when taken together form a wiring diagram illustrating the electrical controls of the bill feeding devices as they are coordinated with the controls of a tabulator.

In order to make definite at the outset the distinction between what is old and what is new, reference may be made to the drawing figures to point out that Figs. 11–24 and 54a–54h are in the main illustrative of old tabulating mechanism and controls relating to card sensing, accumulating printing and tape feed controls which form the background or setting in which the novel bill feeding, sensing and piercing controls are set forth. The tabulator used for purposes of illustration as a printing device is the one disclosed in the Rabenda Patent 2,569,829, filed on May 3, 1949 and issued on October 2, 1951.

The machine in general

The main purpose of this specification is to point out the controls and cooperation between a novel form of bill printing and piercing device and a tabulator. The bills are in the form of cards which are sensed, pierced and printed upon in such a fashion as to have advantages over similar instruments produced heretofore.

With reference to Fig. 1 a general discussion may be given of the components of the connected devices and the way they have effect upon a bill. There is noted that the tabulator 407 is designed to stand separately and has print wheels 20 to automatically print upon thin record sheets or continuous forms at a platen P. The tabulator contains the usual components of card feeding and sensing devices for entering data into accumulating and printing mechanisms and also devices to read the totals of the accumulator and control the printer to print such totals. Then too, in the usual fashion, the record cards TC sensed are ordinarily arranged in groups and automatic group control devices between successive sensing stations detect changes of such groups and automatically initiate total taking and printing operations.

As is usual in such tabulating machines the one side of the platen P is exposed for the insertion and removal of record sheets. In this application advantage is taken of that accessibility by wheeling into place an auxiliary feeding device which is without a platen but furnished with all the other feeding controls for bringing record or bill forms to and from the platen.

Associated with the platen in the tabulator is the usual form of tape feed controls for governing the positioning of the record while it is on the platen so that it is advanced for line spacing movements between heading and address portions to item portions and from item portions to predetermined total line positions. The tape feed controls also govern overflow detection and ejection of a record after recording thereon has been completed.

Now referring more specifically to the elements of the bill feed device which is shown at the upper upper left part of Fig. 1 as a sort of a cantilever extension of an L shaped frame 21 designed to be self-supporting and adapted to be wheeled into place and connected to any one of a number of tabulators or other printing devices so long as the one side of the platen P is accessible and the controls of the printer are coordinated with the controls of the bill feed device which are about to be enumerated in a general way.

The magazine M holding the blank bill records BC is seen to be at the lower left portion of the cantilever extension. These bill forms BC are usually record cards similar to those used to control the tabulator. However, they are often provided with extra stub sections and also made in various sizes to become instruments in various accounting work other than that of billing; for example, check making, ledger posting or other kinds of accounting controls may also be passed through the bill feeding device and in conjunction with the tabulator receive and impart information necessary to produce a complete accounting procedure.

Returning now to the path of motion of the bill BC through the bill feed and the various units of mechanism encountered in such path, it is noted that the first station the bill enters after leaving the magazine is a sensing station S. There, any pre-punched data such as an account identification may be sensed and compared with supposedly similar account identifications on record cards TC being sensed in the tabulator at the same time. In this way, it is definitely established that the data about to be recorded and pierced in the bill properly belongs thereon.

In Fig. 1 the dotted lines with arrows represent a conveyor belt feed for the bills to carry them from station to station. The belt is seen to describe an endless path in the shape of a U lying on its right side. The part of the belt path affecting the bill is in the shape of an S which the bill enters at the lower left side after coming out of the sensing station S.

The bill BC is carried from the sensing station S further to the right into a stopping station SP where it is held in readiness to be drawn around the platen when the platen has finished with a preceding bill. At the proper time, usually occasioned by total printing and ejection of the preceding bill, the bill at the stopping station is released and advanced and drawn part way around the platen P of the tabulator.

While at the platen P the bill BC is divorced of most of the controls of the bill feed and instead comes under the control of the printer, accumulator and tape feed advancing controls of the tabulator. It is only when the recording operations have been completed and the bill card is ejected from the platen that the bill feed devices again take over and carry the bill to the piercing station PC.

At the piercing station PC the bill BC is pierced to represent a variety of information in such a fashion as to prevent marring its appearance. This is done by piercing rather than punching the data in the record. At selected index points the record material is pushed out in the form of a flap. There is no chad produced. Instead the flap remains on the card and is restored back in place later in such a position as to be unnoticeable but yet have a U shaped line of weakness which is used in other machines, to either operate upon the card with the chadless index points to convert them to regular rectangular holes, or to use the chadless record to control the punching of a standard card with rectangular holes.

These chadless perforating devices at PC have another desirable constructional feature in that they are designed to set up or store received information in several fields and in different cycles before piercing in one operation. For example, the account identification may be derived from the first card passing through the tabulator and stored in the piercing unit early in a series of cycles devoted to one bill preparing operation. Later in that same series of cycles another part of the piercing mechanism may be operated to store the gross and net charge amounts for electric consumption derived from item record cards passing through the tabulator. Still later other parts of the piercing unit may be controlled from accumulators of the tabulator when they are read to take out totals indicating utility charges involving such things as merchandise bought, repairs, old balance amounts etc. By the time the bill card reaches the piercing station and is properly situated therein all of these parts of data relating to the bill have already been set up in the storage part of the piercing unit and then in one stroke the wire piercing needles of all sections of the piercing unit descend and pierce the data into one or more sections of the bill card and stubs.

After the piercing operation at PC, the bill card is conducted further to the left and upward through two sets of ironing rollers IR which push the extending flaps of the pierced index points back into the plane of the bill card so that to all appearances it is imperforate.

The final motion of the bill is upward and to the right and then carried into a stacker ST for holding the completed bills.

Record materials and cooperating units of mechanism

Figure 2:
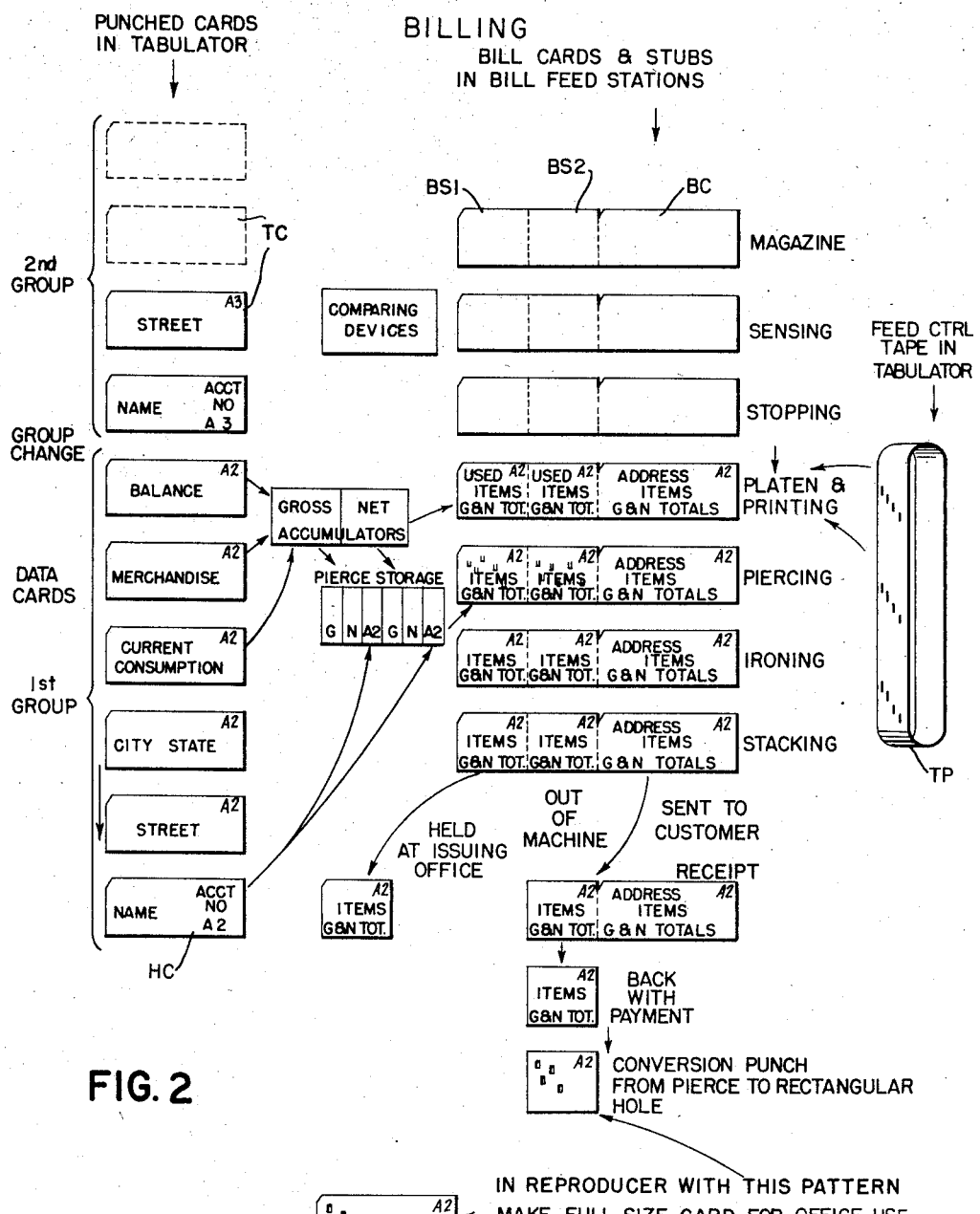
Fig. 2 is a diagrammatic view showing the various elements such as cards, bills, machine units and stations in the machines as they are interrelated for a billing operation.

In Figs. 2 and 3 are shown samples of the kinds of operations possible with the use of the present bill making devices. In Fig. 2 the example is one of public utility billing wherein not only are complete bills BC made for the customer, but there is also set up, pierced, and recorded, stub sections to aid in the accounting procedures of the issuing office. Fig. 3 shows a posting application wherein the bill feed devices operate upon an enlarged ledger posting card designed to aid the accounting controls of an issuing office.

In Fig. 2 the arrangement of record elements and diagrammatic representations of the various units and stations of the tabulator and bill feed device are designed to illustrate the difference between the cards of the tabulator and the cards of the bill feed and the controls thereover. At the left there is shown a series of two groups of record cards which are the ones that are passed through the tabulator in order from the bottom up. At the right center of the illustration is a number of bill cards with stub sections, said cards being placed at intervals to illustrate the various stations in the bill feeding device through which the bills pass in succession as they are completed. Although the same card is shown simultaneously at all stations, it will be realized that this is not a reality and is not the actual happening in the machine, but it is merely illustrative of the successive appearance of one bill card as it progresses from station to station.

Reading upward along the identifications of the tabulator cards at the left, it is seen that for the production of a sample bill card there may be involved, successively; name, street, city-state, current consumption, merchandise and balance cards TC, all of the same account as identified by the account number A2. This account number is perforated in the tabulator cards as is all the other information and it is sensed by successive sensing stations in the tabulator to control the usual group control devices for detecting the end of one group and the beginning of an incoming group. The second card group A3 is shown in Fig. 2 but does not play any part in the production of the bill shown.

Before going into the controls derived from the tabulator to have effect on the bill making devices it is believed advisable to trace the course of the bill card as it proceeds through the bill feeding stations. Looking along the right side of the vertical progression of bill cards it is seen that they are labelled to represent the seven main stations encountered along the path of a bill as it progresses through the bill feeding device as already mentioned with reference to Fig. 1. It is noted that the successive stations are identified as magazine, sensing, stopping, printing, piercing, ironing and stacking.

In the particular problem involved in Fig. 2, when the bill reaches the second station, i.e. the sensing station, the sensing devices are ineffective because at the time it is not necessary to compare the blank bill with the related account cards of the tabulator. However, an operation of this kind will be discussed hereinafter with reference to the posting operation of Fig. 3.

Returning now to the advancement of the bill card to the stopping station and then beyond into the printing and piercing stations, it is at the latter two stations that most of the bill making controls are effected. When a bill card is brought from the stopping station to the platen and thus arranged to receive recording from the tabulator printing device, thereafter in that one station its advancement for a line spacing, long feeding and ejection is controlled no longer by the bill feeding device but by the endless feed control tape TP in the tabulator as shown diagrammatically at the extreme right side of Fig. 2. Most of the recorded information on the bill card is derived directly from the second card sensing station of the tabulator to put the data such as name, account number, address, old meter reading, new meter reading, current used, gross charge, net charge, merchandise identification and amount, repair identification and amount and old balance amount on the bill. As such items are read off the cards in the tabulator and used to control the printer of the tabulator, they may also be directed to set up the storage part of the piercing mechanism and also when representing amounts directed into the accumulators of the tabulator as illustrated diagrammatically by the showing of gross and net accumulators. Finally, when all items of that particular account have been sensed, as determined by the group change detected in the tabulator, then a total reading and recording operation is initiated and the total is printed near the bottom of the bill card. At the same time, the totals are read off the accumulators and stored in the piercing unit and there await the progression of the bill card into the piercing station.

In the illustrative showing, the bill form is operated upon in the piercing station to be pierced in the two stub sections of the bill form. This is done all in one stroke and the piercing storage device is again receptive of other information for an oncoming bill card. It will be noted that the piercing in such stub sections is directly over the printed matter and would have a marring effect on such matter if performed in the usual fashion to punch out rectangular holes. However, in the present device, the appearance is restored to normal in the following station which is the ironing station designed to roll back all the extending flaps caused by piercing and thus restore the smooth surface of the bill card and stubs before they are thrown into the stacking station.

In order to aid in an understanding of the uses of the various portions of the bill form when it is taken out of the bill feeding device, a number of other steps are shown at the lower part of Fig. 2 to illustrate what happens to the bill portions in accordance with some accounting procedure. As illustrated, the left hand stub portion is held at the issuing office while the main bill card section and the attached stub are sent to the customer. The customer may hold the main bill portion as a receipt or memo, or have it stamped at the office upon a receipt of cash when turning in the stub. However, in most instances, the stub is returned with a check and it is this customer's stub section which is used upon return for many subsequent accounting procedures to credit the customer's account and prepare for sending out new bills. As illustrated diagrammatically, at the lower part of Fig. 2, when a stub section is brought back it is converted into a card portion having regular rectangular holes. Then it is further converted into a full size tabulating card having rectangular holes. That card is then matched with other bill cards for sending of subsequent bills and also to control the posting of ledger records to be held at the issuing office. It is with such posting controls that the illustration in Fig. 3 is concerned.

In Fig. 3 the tabulator and bill feed controls are shown arranged to take care of ledger records in an issuing office as recorded on a large size ledger card LC under control of single account cards passed through the tabulator. The punched account cards are shown at left as they appear when stacked in a magazine and also in the positions wherein the one account card A2 is at a first sensing station before passing to the second sensing station of the tabulator. While the record card is at the first sensing station of the tabulator, the account identification A2 thereon is compared with the account identification which is prepunched in the ledger card LC. When the ledger card arrives in the sensing station of the bill feed device, such account number perforations are sensed and are synchronized with the sensing of the punchings in the supposedly related card in the tabulator, and if the two compare then the devices are permitted to continue to function and recording is later effected on the ledger card.

The ledger card passes through the same seven successive stations of the bill feed device as already outlined in connection with bill making. The various stations are so proportioned and the magazine and the stacker made adjustable to receive the cards of an extra size as illustrated in connection with ledger posting. When the ledger card reaches the platen to receive printing, it is also controlled by the feed control tape TP of the tabulator as mentioned before. While at the platen it is recorded upon by the printing devices of the tabulator as adjusted by the card in tabulator to signify the pertinent data in connection with a ledger record such as the date, new reading, amount of current used and amount paid (this amount paid information was derived from the returned stub of Fig. 2 and put into the tabulating card of the A2 account before this ledger posting operation was started). Of course, not all the data of the card need be recorded on a ledger posted line since the card in the tabulator has other old reading and charge amount identifications which are to be used later for making out a current consumption card, but of no concern in the present example. However, when the tabulating card reaches the second sensing station, amount information therein is put into the accumulator of the tabulator at the same time that the same sensing station controls recording on the ledger card and as a third control, information derived from the second sensing station in the tabulator may be used to set up the storage portion of the piercing unit to provide pierced information such as the amount paid in data along with other amounts from the accumulator and pierced in the ledger card. After the ledger card is pierced it passes successively into the ironing and stacking stations in the usual fashion.

The pierced card or stub

In connection with Fig. 2 it was explained that certain portions of the bill card were pierced in positions sometimes occupied by printing. In order to show the effect of this more clearly, a number of figures, Figs. 4–8 inclusive, are shown to illustrate the condition of the card when pierced and how it appears when pierced and before and after ironing. In Fig. 4 a card portion BS1 is shown with a name and address printed thereon superimposed over piercing alterations in the card in the same area. There it is seen that rectangular holes in the same positions would have a definite marring effect and in some cases illegibility would result in connection with the central address lines of print. Fig. 5 shows how the pierced flaps extend below the bottom surface of the card before the card is drawn through the ironing rollers IR which are shown cooperating therewith in Fig. 6. After passing beyond Fig. 6 and over to Fig. 7 it is seen that the card has both surfaces restored coplanar and when observed face up, as shown in Fig. 8, the printing thereon is unmarred and the weakened sections of the chadless index points are not apparent to the eye. However, such weakened portions are detectable by light spring fingers in a manner set forth in other patent applications.

Order of presentation

Before describing the details of the bill feed controls, it is believed advisable to consider first the various units of mechanism or components of the tabulator machine with which the novel kind of automatic form printing device is associated. The various units to be considered include the card feeding and sensing means, the data accumulating and printing means, and the tape controlled record feeding means. These electromechanical parts are described first, then the bill feed mechanism, and then the electrical controls for them and between them are taken up with reference to the wiring diagram.

Framework of tabulator card feed unit

The tabulator card feeding unit (Fig. 11) is preferably of the construction more fully described in the application of G. F. Daly, Serial No. 629,576, filed November 19, 1945, now Patent No. 2,510,559. The unit has a lower or bottom section mounted upon a base of the card controlled machine and an upper hinged section which also carries the stacker parts of the card feeding unit.

The framework for the bottom or lower section of the unit consists of a pair of spaced side frames 11 with the rigidity of the lower section of the unit being provided by cross members 12 and 13.

The framework of the upper section consists of side frames 14 and such side frames are suitably spaced by cross members which include a plate 16. The upper framework is hinged to the lower section or portion of the unit on a pair of studs extending outward from the frames 11.

The card stacker 22 comprises a base plate 23 and two side plates 24, each of which is pivoted on a stacker drum shaft 47 and the stacker is thus pivoted about the lower section. A catch 25 latches the card storage stacker in normal position. The stacker receives the cards TC fed by the stacker mechanism after such cards have passed through the sensing stations to control functions in the card controlled tabulator.

Figure 11:
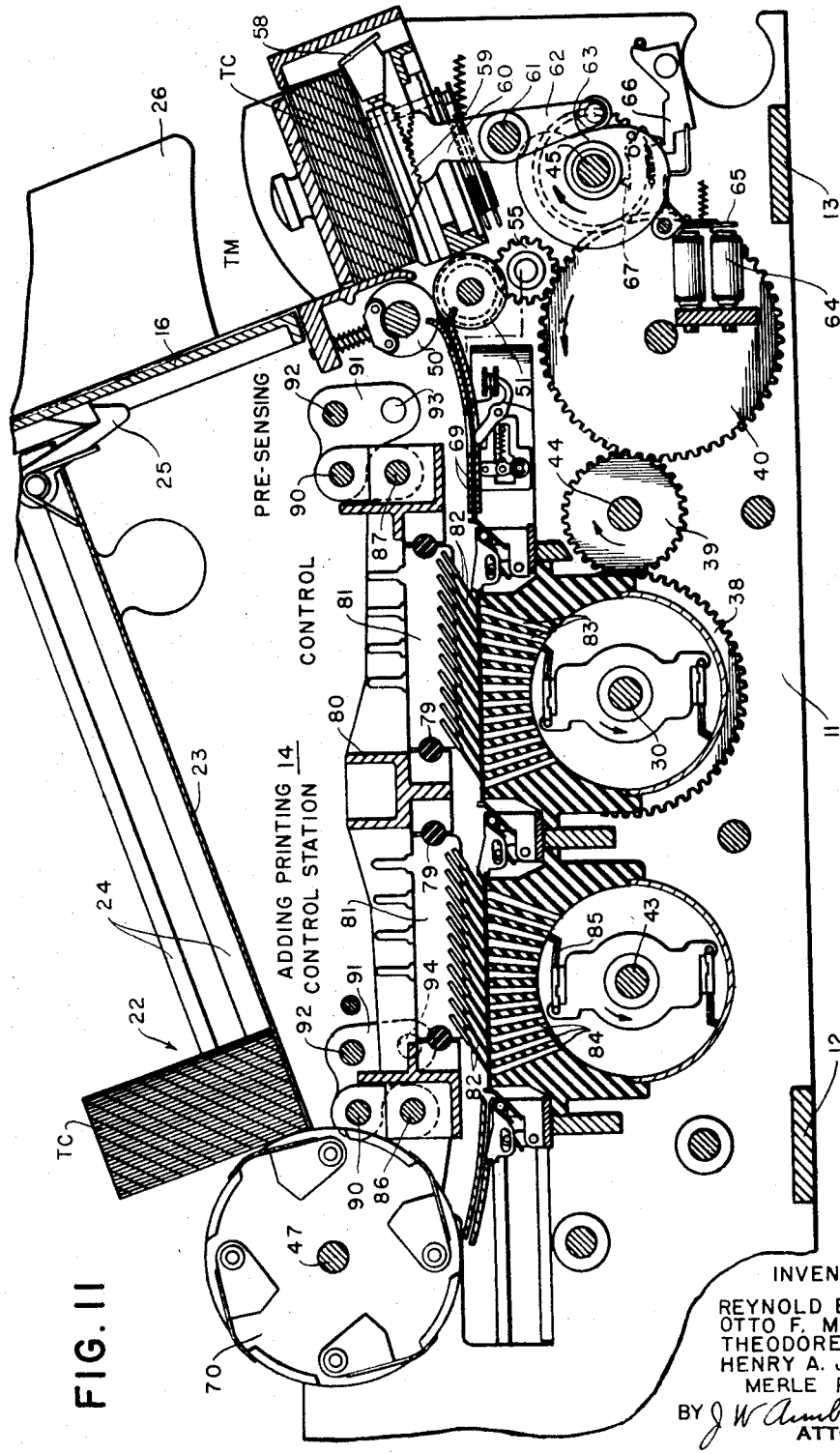
Fig. 11 is a sectional view of the record card analyzing device in the tabulator.

Suitable side plates 26 together with the cross plate 16 provide a card supply magazine TM from which cards are fed singly for their presentation to analyzing stations to be subsequently described. Plate 16 is carried by the upper section and is the rear wall of the magazine. The side plates 26 are split as shown in Fig. 11 so that the upper part can be carried by the side plates 14 and the complementary portions can be carried by the lower section of the unit. This enables the upper portion of the card supply magazine to swing upward when the upper section is rocked.

All of the gear drives and rotating shafts of the card feed unit are carried by the lower portion of the unit. The power for driving the card feeding unit is derived from a continuously operating main drive shaft geared to shaft 30 and having a 2–1 gear ratio so that for one revolution of the main shaft, shaft 30 is rotated counterclockwise as viewed in Fig. 11, one-half revolution per machine cycle.

Shaft 30 has secured to it a gear which drives a train of intermeshing gears which are mounted outside of the main side frame 11 to operate shafts 43 and 47.

Inside the side frame 11, a gear 38 secured to the main drive shaft 30, drives a train of gears 39 and 40.

For feeding the cards TC which emerge from the card supply magazine TM, top edge foremost and printed face down, there is provided cooperating feeding rollers 50 and 51 mounted on shafts carried by the lower portion of the card feeding unit. Lower feeding roller 51 has secured thereto a gear meshing with an idler gear 55 which is driven by the gear 40.

Card feed from supply magazine

A conventional card picker is provided to feed cards singly from the supply magazine TM and includes a card picker 58 having a swivel mounting on a slidably mounted rack 59, all of which parts are carried by the lower portion of the card feeding unit. Said rack 59 is operated by a segment arm 60 secured to a rocker shaft 61 to which there is secured a follower arm 62 operated by a cam 63.

To effect selective card feed operations there is provided the usual one revolution clutch which includes a card feed control magnet 64. The armature 65 thereof rocks a clutch release arm 66 which enables a pawl 67 pivoted on the cam 63 to engage a notch formed in a disk secured to the one-revolution drive shaft 45. When such clutch engagement is effected, shaft 45 will drive the cam 63 a complete revolution at the end of which time the clutch release arm 66 will be in a position to disengage the pawl 67.

By electrical circuits to be subsequently described an impulse is transmitted to the clutch control magnet 64 to feed the lowermost card to the rotating feeding rollers 50, 50 which advance the card to the first sensing station, known as a "presensing station." As the card emerges from the feeding rollers 50, 51, it is guided by spaced plates 69 which are carried by the lower portion of the card feeding unit and are located at the presensing station.

Stacker drum

After the card TC has been twice analyzed and it emerges from the second analyzing station it is engaged and received by a stacker drum 70 which receives the card, turns it over and deposits it in the card storage magazine 22 in the same order as the cards are originally stacked in the supply magazine TM.

It is preferable to positively grip the cards TC to feed them from station to station without resorting to the expedient of card feeding rollers, because when such cards are released by the grippers they are free to be repositioned by aligning devices, if disaligned. As Patent 2,510,559 discloses, the horizontal end clamps seize each card and reciprocate the gripper frames to feed the card from the station in which it is located to the left to the next station. These stations are indicated in Fig. 11 as the "Presensing Station," the second or "Control Station" which is used for control purposes as customary in card controlled accounting machines, and the third station designated as "Adding-Printing Control Station" having the functions of this legend.

Tabulator card and analyzing mechanism

The analyzing mechanism in Fig. 11 has been devised for analysis while at rest of a card TC of the type shown in the patent to C. D. Lake, No. 1,772,492, granted August 12, 1930. In general, the card has perforations which are arranged in vertical columns and in twelve horizontal rows, and through which perforations electrical circuits are made to control functions of the machine.

A frame 80 carries for each analyzing station a plurality of current carrying members 81, one for each card column and each carrying a plurality of angularly positioned analyzing brushes 82 which encounter the perforations and pass through to complete the electrical circuit. Plates 81 are insulated from each other and are attached to the frame 80 by insulating rods 79. By an electrical connection to each plate 81, current is supplied to the electrical analyzing brushes 82. For each card column, a set of brushes 82 makes selective contact through the perforations in the column to extensions 83 of emitter contact points 84. A brush readout 85 driven by the shaft 43 or 30 counterclockwise makes successive contact with the contact points 84 to transmit impulses in the order 9 to R at differential times, dependent upon the location of the perforation sensed in the card.

The above described arrangement of analyzing brushes and readout commutator is duplicated for each card column and the assembled arrangement is duplicated for the Adding-Printing Control Station and the Control Station, the commutator readouts being driven by the shafts 30 and 43.

The analyzing brush carrying frame 80 is carried by the upper portion of the card feeding unit and is mounted between the side plates 14 in the following manner: At the ends of the frame 80, studs 86 and 87 carried thereby are the pivotal connections of short vertical links each of which is also connected by a stud 90 to a related bell crank 91 which is pivoted upon a rod 92 carried by the side frames 14. An outer link is connected by studs 93 and 94 to the bell cranks 91 at the same side of the frame 80. Said outer link is the controlling member of a parallelogram linkage by means of which the analyzing frame 80 is independently hung so that by a cam movement, the analyzing frame 80 may be elevated and lowered insuring the passage of the analyzing brushes through the related perforations. While the specific description has been confined to the supporting structure for one side of the analyzing support frame, shown in Fig. 11, the same type of support is provided for the other side of said frame.

In Fig. 11 the analyzing frame is shown in the depressed position with the readout commutators in the rotated position they occupy shortly after the emitter impulses are initiated.

During the time that the emitter impulses are being transmitted, the card gripper frames with opened grippers are returned with a slow return stroke, thus enabling the cards to be held in the analyzing position. After the analysis of all index point positions by the sensing commutators which occurs by about 180° in the cycle, and prior to the movement of the gripper frames to feed the cards to the next station, the bell cranks 91 are rocked to elevate the analyzing frame 80, positioning all the analyzing brushes out of contact with the cards in the analyzing stations.

Near the end of the machine cycle, or at about 330°, cam means is again effective to reverse the movements of cranks 91 which results in the depression of the analyzing frame and maintenance of the frame in lowered position during the time of emission of the impulses by the readout commutators.

While the movement of the frame downwardly exerts pressure on the flexible brushes 82 to cause them to project through the perforations and make firm electrical contact, it is desirable also to effect a slight lateral movement of the frame 80 so as to wipe the brushes over the card and if in contact with a commutator contact point 83 to wipe the brush thereover to make an efficient electrical contact. This is preferable effected by displacement of the frame 80, Fig. 11, slightly to the right when the brushes are in contact with the card to be analyzed.

Amount and number entering in the tabulator

As already noted, the present invention is preferably embodied in a machine of the record controlled type wherein amounts and other numbers such as page, invoice, and account numbers are entered into an accumulator or accumulators according to the digit representations on perforated records which are passed successively through the tabulator.

Some of such entered numbers are merely stored as in the case of an account number, other numbers have a unit added thereto regularly as in the case of page and invoice numbers, still other numbers such as amounts are added to each other in a plurality of denominational orders.

Therefore, it is intended that the amounts be selectively entered under control of some form of digit entering and controlling devices and entered into an accumulator to be added to arrive at totals.

The accumulators

In Figs. 14 and 15 the driving shaft 113 is driven by a main drive shaft so as to make one revolution for each cycle of operation. For each denominational order of the total accumulator, shaft 113 has a gear 114 secured thereto which drives the accumulator wheel clutch mechanism. The accumulator and clutch driving mechanism are preferably of the construction shown in Lake et al., Patent No. 2,326,653 and includes a ratchet 115 which is free on post 116 and integral with a gear 117 driven by gear 114 (Fig. 14). Rotatably carried by post 116 is a disk 120 having ten teeth 120a adapted to be engaged by a tooth 121a on the long arm of a clutch lever 121 to hold the disk against rotation in a counterclockwise direction.

At the side of disk 120 is an accumulator wheel 124 rotatable on post 116 and provided with ten peripheral notches 124a. Wheel 124 may take any of ten rotative positions with the values 0, 1, . . . 9. A spring-pressed lever 125 engages with a notch 124a of wheel 124 to hold the wheel impositively and to center it in the value position into which it has been rotated. A transfer cam 126 is fixed to the side of wheel 124 and a stud 127 in wheel 124 extends through an opening in disk 120 to pivotally carry a clutch dog 130. A spring 131 urges the tooth of dog 130 to engage ratchet 115. In the positions shown in Fig. 14, the clutch lever 121 is in declutching position, its tooth 121a is restraining rotation of disk 120 counterclockwise and dog 130 is clear of ratchet 115. The dog 130 is being held clear of the ratchet by coaction of a pin 130b on the dog with a cam edge 120b of disk 120.

When the clutch lever 121 is dropped to cause its tooth 121a to release the disk 120 for counterclockwise movement, the spring 131 is effective to rock the dog 130 into engagement with ratchet 115. During this movement of the dog 130 its pin 130b rides along the cam edge 120b and cams the disk counterclockwise until its tooth 120a previously engaged by tooth 121a is to the right of the latter tooth. The parts are then in the cluching position shown in Fig. 15, and the wheel 124 is coupled to the driving device 115, 117 for rotation. Through engagement of the pin 130b of the dog 130 with cam edge 120b, the disk 120 is forced to rotate counterclockwise together with the register wheel.

When the clutch lever 121 is returned to the upper declutching position, its tooth 121a intercepts a tooth 120a of disk 120 and stops the disk. Accumulator wheel 124 and dog 130 continue rotating while cam edge 120b of disk 120 cams the pin 130b outwardly until it is again in its outer position. As the pin 130b is cammed outwardly, clutch dog 130 moves clear of ratchet 115 and declutches the accumulator wheel from the driving means. The accumulator wheel is then held and centered in its new value position by lever 125. A spring-urged latch 135 serves to hold lever 121 in either clutching or declutching position.

The clutch lever 121 has a short arm swiveled to the lower end of an armature 136 which is disposed between an advance magnet AM and a stop magnet SM. Energization of magnet AM rocks armature 136 clockwise to lower lever 121, and energization of magnet SM rocks armature 136 counterclockwise to raise the lever 121.

When the wheel 124 is in its 0, 1, . . . 8 positions, the cam 126 holds a carry lever 137 pivoted at 138 in the position shown in Fig. 14, where a contact blade 139 (insulated from lever 137) takes a midposition between contact elements 140 and 141. When the wheel is in its 9 position, a tooth on lever 137 is dropped into a cut 126a of cam 126 and blade 139 contacts element 141. When the wheel 124 passes from the 9 to 0 position, a rise 126b rocks lever 137 to cause blade 139 to engage element 140. When the lever is so rocked, an arm 142 integral therewith is engaged and held by a spring-urged latch 143 which maintains the contact engagement between 139 and 140 until a pin 144 on gear 114 strikes an arm 145 integral with the latch 143 to release lever 142. The accumulator is also provided with a mechanical knock-off or declutching mechanism which comprises three pins 151, 152, and 153 secured to the side of gear 114 and adapted during rotation of gear 114 to ride in succession under an edge of clutch lever 121.

Assuming the clutch lever to be in the lower position when either pin 151, 152 or 153 engages lever 121, it cams it upwardly into the position of Fig. 14 to disengage the clutch. The knock-off pins are effective at fixed points of the cycle. Knock-off pin 151 is used when entries are made according to a combinational hole system, knock-off pin 152 is used for clutch disengagement at the end of an entry, and 153 at the termination of a unit carry.

*Total readout*

The accumulator shown herein is provided with an electrical total readout which may be of the form shown and described in the patents to C. D. Lake et al., No. 2,232,006 and No. 2,136,636. Since the construction of the electrical total readout is well known in the art, it is only shown diagrammatically in the wiring diagram of Fig. 54h. As shown therein, rotatable with an accumulator wheel of each order is brush 154 which makes contact with a common current conducting segment 155 and with one or another of the digit points or segments 146 according to the digit representation of the accumulator order. The same digit contact points 146 are interconnected by wires marked 0–9, or they may be strips engaged by brushes 154. The digit segments 146 receive digit impulses transmitted by cam contacts and according to the digit positions of each readout order, selected impulses are transmitted to the printer control magnets.

The present machine is provided with a printing mechanism which is adapted to print items and totals entered in an accumulator. As will be clearer later on, the accumulator values are read out from the readout as decimal representations and the impulses are used to control the printer.

*Alphabet printing mechanism*

The machine is preferably provided with alphabet type and the impulses transmitted by the commutators select such type so as to print, aside from numerals, letters making up words or abbreviations, for thus printing each line derived from the card analyzed.

The printing mechanism shown herein is of the kind shown and described in complete detail in the patent to R. E. Page and H. S. Beattie, No. 2,436,071, dated March 16, 1948.

The alphabet type are selected by impulses according to the card perforation code shown in Fig. 13b. The particular 0, X, and R impulse determines which of the several type of a group selected by an impulse 1–9 will be printed. For example, if the impulse is "2" and no pilot impulse is utilizer, i.e., neither the 0, X, or R impulse, the digit 2 will be printed. If an impulse is also at 0 such impulse will select the type S; if the X impulse, type K will be selected and if the R impulse, type B will be selected.

Each impulse 1–9 selects a group of three non-numeral type and also a numeral type. As will later be described, if a numeral type is to be selected for printing, the printing impression will be taken at the "N" point in the machine cycle, which point is after the R zone impulse. The alphabet type selection is provided for by taking printing impressions before the time a numeral type would have been printed and this is effected under control of the 0, X and R impulses.

If the impulse is 9 alone, a printing wheel 20 (Fig. 12a) will be rotated counterclockwise until the "9" type is at the printing line and then the printing wheel 20 will be rocked by the N pulse to effect printing impression. It will be noted that if an additional impulse such as an R is delivered then, under control of this impulse, the printing wheel will be rocked earlier than for printing the digit 9 to take an imprint from the I type. The X zone impulse will rock the printing wheel 360 to take an imprint still earlier to print R, and the impulse 0 even still earlier to print Z.

The same principle of operation is provided for selecting the type of the other groups of alphabet type and the operation of the printing mechanism for effecting type selection and printing impressions will now be described further.

The impulses are transmitted under control of each readout commutator in the order 9, 8, 7 . . . 1, 0, X, and R.

When the 9–1 impulses are transmitted a circuit is closed to a printing control magnet 161 (Fig. 12b) and for each column there is such a printing control magnet. In the present machine, this initiation is effected by the actuation of an operating link 163 (Fig. 12a) at a differential time. For selection of type groups determined by the impulses 9–1, such operating link 163 is shifted to the left at differential times at about the middle half of the operating cycle. During this time, shaft 134 is being rotated at a uniform speed of rotation. The shifting of the operating link 163 at differential times is provided herein to transmit a differentially timed mechanical impulse to trip the type selecting clutch shown in Fig. 12a, and now to be described.

For each printing order there is pivoted on a rod 166 a triple armed member consisting of arms 164, 165 and a clutch release arm 167.

Shaft 134 has secured thereto a tube 168 which is fluted transversely along its periphery to provide clutch notches 169. Tube 168 constitutes the driving clutch member. Encircling the clutch tube 168 is a plurality of gears 170, there being one gear for each order of the printing mechanism. For mounting the gears 170 on the clutch tube 169, each gear has integral therewith a flange 172. By means of slotted spacing members the gears 170 are separated to allow independent rotation and also to locate a clutch pawl 176 which is pivoted on the related gear to cooperate with the clutch release arm 167. The clutch release arm 167 normally holds the clutch pawl 176 in such a position that its tooth 177 is out of engagement with any of the clutch notches 169 of the clutch tube 168. When the clutch release arm 167 is rocked as a result of the actuation of the operating link 163 at a differential time, the clutch is engaged because a spring 178 attached to clutch pawl 176 will rock the latter in order that the clutch tooth 177 will engage a clutch notch 169 determined by the differential time the operating link 163 is actuated. The described clutch is the printing type selecting clutch and causes the differential rotation of the printing wheel 20, since the gear 170 and the printing teeth of the type carrying wheel 20 are meshed.

Figs. 12a and 12b show the arrangement of the printing devices for a single order and the machine is preferably provided with a number of such devices for printing a plurality of characters.

If the operating link 163 was shifted as a result of the 9 impulse, the clutch release arm 167 would be rocked at this time and pawl 176 would be released and rocked by spring 178 so that the clutch tooth 177 engages a clutch notch 169 and printing wheel 20 will thereafter rotate to such position as to successively present the characters Z, R, 1 and 9 of the group selected by the 9 impulse (see Fig. 13b) to the printing line. The differential time at which the operating link 163 is actuated determines the extent of counterclockwise rotation of the printing wheel 20 necessary to select a group of type for printing. After the predetermined extent of rotation of the printing wheel 20 has been effected and the printing impression has been effected, with the type selecting clutch still engaged, the printing wheel 20 will continue to rotate until the free end of the clutch pawl 176 strikes the clutch release arm 167 which, in the meantime, has been brought to its normal position, by means of a compression spring 179 (Fig. 12a). When such disengagement is effected the printing wheel 20 is at the normal position shown in Fig. 12a.

Each printing wheel 20 is carried by an arm 181 loosely pivoted upon a rod 182 and provided with a rearwardly extending follower extension 184 which is operated by a cam projection 183 of a cam disk 185 which constitutes a driven member of a printing clutch.

Shaft 128 rotates a clutch tube 186 fixed thereto, and likewise encircling the clutch tube 186 is the driven clutch disk 185 upon which is pivotally mounted a clutch pawl 187. Clutch disk 185 and parts carried thereby are guided similarly to gear 170. Associated with the clutch pawl 187 is a clutch release arm 188. When the clutch engagement is effected between the clutch pawl 187 and one of the clutch notches of the clutch tube 186, the disk 185 will be rotated in a clockwise direction, whereby the cam projection 183 will cooperate with the follower extension 184 to rock arm 181 about the rod 182 against the action of a return spring 189. The engagement of the clutch now being described is effected at differential times when the printing control magnet 161 for each order is energized for the second time under control of one of the 0, X and R impulses.

At the present time, it should be understood that while the 0, X and R impulses are being transmitted the clutch release arm 188 will be rocked to clutch release position. As a result of this clutch engagement, the cam extension 183 approaches the follower extension 184 at the time shaft 134 is rotating at a diminished speed to present the type of a selected group successively to the printing line. Thus, the particular type which is to be selected from the selected group for printing will depend upon the differential time that the printing control magnet 161 receives a second impulse and, therefore, the time at which the printing clutch is engaged. If the 0 impulse is transmitted, the printing clutch is engaged at the earliest time so as to select the first alphabet type of the selected group. If the impulse is X, the printing clutch is engaged at a later time when the next alphabet type of the selected group is at the printing position and obviously when the impulse is R, the printing clutch will be engaged at a still later time when the third successive alphabet type of the selected group is at the printing position. By the engagement of the printing clutch at a differential time, the desired alphabet type and the numeral type of the selected group may be selected.

When the printing clutch engagement has been effected, each cam 185 will cooperate with the related follower extension 184 to rock the associated printing arm 181 to force the printing wheel 20 against the usual inking ribbon 190 and platen P around which is positioned the card to be imprinted. As each arm 181 is rocked against the action of the spring 189, the printing wheel 20 is being rotated counterclockwise but, since the printing wheel is now rolling over the gear 170, the rolling action will cause an equal and simultaneous rotation in a clockwise direction. Both of these opposite rotations will, in effect, cause the printing wheel to be immobile with respect to its rotation when it moves to the right to strike the platen P, the type striking the platen squarely and firmly to cause a legible impression.

After the printing operation, when cam extension 183 of the cam disk 185 passes by the follower extension 184, spring 189 will now be effective to return the type wheel carrying arm 181 to normal position and the extension 184 now bears against the circular peripheral edge of the cam disk 185.

After the printing operation, since the type selecting clutch is still engaged, the printing wheel 20 continues to rotate as previously stated until the clutch pawl 176 which, in the meantime, has been positioned to normal, thereby disengaging the type selecting clutch when the printing wheels are at a normal position.

The printing clutch continues its engagement for a complete rotation of the cam 185 and clutch disengagement is effected by the engagement of the clutch pawl 187 with the clutch release arm 188.

It has been found in practice that when the disengagement of the pawl 176 for the type selecting clutch is effected by striking the clutch release arm 167, there is a tendency of the clutch pawl 176 to rock counterclockwise about its pivotal point, unduly stretching the spring 178. To prevent this action a cushioning arrangement is provided to hold the pawl 176 and is shown in Fig. 13a. In a preferred arrangement this constitutes for each type selecting clutch a double arm 196. One arm cooperates with a cam portion 193 of the clutch pawl 176 and the other arm bears against a spring pressed plunger 194 inserted in an aperture 195 partly filled with oil. As the clutch pawl 176 comes around to its normal position, it will strike the clutch release arm 167, forcing its clutch tooth 177 out of the clutch notch 169 it previously engaged, and the cam portion 193 of the clutch pawl 176 will strike one arm of the double arm 192, forcing the opposite end downwardly to press the plunger 194. This will force the oil out of the bottom of the recess 195 and around the plunger, thus providing a cushioning action on the arm 192 to restrain the clutch pawl 176 so that it cannot move too far outward.

As the free end of the clutch pawl 176 strikes the clutch arm 167 there is a tendency to cause the gear 170 to rebound counterclockwise. This action is prevented by the cooperation of a spring-pressed detent 196 with a shoulder 197 of a plate 198 secured to each gear 170. When the normal position of the clutch is reached, the detent 196 will engage the shoulder 197 to prevent such rebound and retain the clutch parts in their normal position.

Translating and impulse converting arrangement for the printer

The purpose of the above entitled arrangement herein is to translate and convert differentially timed electrical impulses to mechanical impulses and delay the transmission of each mechanical impulse to a later point in the cycle for the purpose of selecting a group of type corresponding to the differentially timed electrical impulses transmitted.

The converted and delayed mechanical impulse is used for the purpose of type group selection. The arrangement for one denominational order is shown in Figs. 12a and 12b.

Cams 200A, 200B, 200C and 200D are driven one revolution for each cycle of operation of the machine. It will be noted that these cams differ in their cam contours and in the particular cam portion which is effective in each point of the operation cycle. Each of the cams is provided with cam heights which are identified by three dotted circles associated with the cam 200A, which circles are of three different diameters and represent the heights of the cam contours as "low," "medium" and "high."

Each cam 200 cooperates with a related releasing and blocking member 210. The reason that the member 210 is called releasing member is that when elevated a predetermined distance by the "medium" or "high" cam portion of the related cam 200 it will release the operating link 163 for movement, but when in its normal lower position (due to the "low" cam portion) it will block the link 163 against movement. Each member 210 is slidably mounted vertically and in cooperation with a three armed latch pawl 206. Interposed between the pawl 206 and the assoicated member 210 is a compression spring, the spring functioning to urge the member 210 downwardly so as to always press against and contact with the cam contour of the related cam 200. Each member 210 is provided with a shoulder cooperating with a lug 209 formed as an integral part of the link 163.

The link 163, referring to Fig. 12a, is slidably mounted at the right end, and referring to Fig. 12b the other end of the link 163 is seen to be dependently hung by arm 213, which arm has a cam follower extension. The arm 213 is urged to the left and is effective for action under control of a cam 225 to serve as the source of a mechanical impulse transmitted to link 163 at a differential time to rock the clutch release arm 167 to initiate type group selection.

Assuming now that a "high" cam portion has positioned the member 210 to its maximum height, the shoulder 208 will be above the lug 209 and the member 210 is now in such position that the compression spring 207 will be effective to rock the member 210 clockwise so that a hooked extension 212 will catch over the latch end of pawl 206, provided that at this time the pawl 206 is rocked counterclockwise due to the concurrent transmission of an impulse at the time the member 210 is in its highest position. If the pawl 206 is not rocked slightly counterclockwise, no latching of the member 210 will take place.

For the purpose of rocking the pawls 206 to latch those members 210 which are at their highest position at the time an impulse is transmitted, it will be seen that each magnet 161 when energized attracts an armature 215 and rocks the same so as to shift a related connected link 216 to the left. Depending from the link 216 are four integral extensions 217, each of which cooperates with the related pawl 206. The result of this construction is that the impulse directed to the magnet 161 will shift the link 216 and rock the four pawls 206 concurrently but only that pawl 206 is effective for latching the related member 210 is one of which the associated member 210 has been elevated to its highest position.

To prevent the armature 215 from sticking to the core of the magnet 161 due to residual magnetism, it is desirable to provide means to positively restore the link 216 and armature 215 to normal by mechanical means timed with the rotation of the cams 200. To this end there is provided a magnet knocked off cam 220 notched as shown. A follower arm 221 of a clutch release arm 224 cooperating with the cam 220 has a mechanical connection 222 with the link 216.

At the time the impulses 9–1 are transmitted under control of a readout commutator, one or more cams 200 will have their "high" portions in cooperation with the latching members 210. At the time the 9 impulse is transmitted the high portions of cams 200A and 200C will be effective. At the time the 8 impulse is transmitted only cam 200A will have a high portion effective at this time. For all of the impulses 9–1, this condition may be represented by the following table:

| Impulses: | Members 210 latched |
|---|---|
| 9 | 210A, 210C |
| 8 | 210A |
| 7 | 210B, 210C, 210D |
| 6 | 210B, 210C |
| 5 | 210B, 210D |
| 4 | 210D, 210C |
| 3 | 210B |
| 2 | 210C |
| 1 | 210D |

It is obvious from the above table that members 210 are latched singly or in predetermined combinations so that at the termination of the transmission of the impulses 9–1, some of the members 210 will be latched and others will not be latched and therefore free to be positioned according to the contour of their cams during their subsequent rotation. It is explained that once a member 210 is latched it is not free to thereafter move upwardly and downwardly in accordance with the subsequent cam contour of the related cam, but remaining unlatched members can do so.

Cam 225 through driving means to be subsequently explained, is driven synchronously with the cams 200 and 220 and cooperates with the follower extension of arm 213.

After latching of members 210 in predetermined combinations the contour of the cams 200A, 200B, 200C, and 200D which are thereafter effective will determine the time in the operating cycle that the operating link 163 will be moved to the left in a manner now to be described in detail:

After one or more members 210 are latched in combination according to the impulses transmitted as indicated in the preceding table, the further rotations of the cams 200 will raise and lower the remaining unlatched members 210 according to the cam contours of the respective cams, but during said further rotation of the cams the link 163 will be restrained against movement by one or more of such unlatched members until a point is reached in the operating cycle when the cams related to the unlatched members concurrently present cam operations of "medium" height to the unlatched members. It will be recalled that since the latched members 210 are so positioned that they do not restrain the movement of the link 163 under the influence of the spring 214 and further the elevation of any unlatched member by a cam portion of "medium" height will also unlock the link 163, it is obvious that when both of these conditions exist for four of the latches 210, the link 163 is then free to move under the influence of the spring 214 and cam 225. This will be made clear by reference to a particular example.

If, for example, the 9 impulse is selected, members 210A and 210C are latched due to the "high" cam portion of their respective cams 200A and 200C and such latching of members 210A and 210C occurs at the start of the operating cycle when the 9 impulse is transmitted. At this time the members 210A and 210C are latched in the highest position so that they unlock the operating link 163 at such positions. However, cams 200B and 200D in their subsequent rotation continue to raise and lower the related unlatched members 210B, 210D and one or the other of such unlatched members 210B, 210D will restrain the operating link 163 from movement until near the middle of the operating cycle, at which time both cams 210B and 210D, through their "medium" high cam portions, shift related latching members 210B and 210D to unlock the link 163. At this time cam follower extension of the arm 213 will cooperate with the notch 225b designated "9" in Fig. 12b. Operating link 163 is now unlocked at four points and the movement of the link to the left is effected by spring 214. The link will now operate the clutch release arm 167 and therefore engage the type selecting clutch to initiate the rotation of the printing wheel 20 to select the group of type 9, Z, R, and I.

At the proper part of the operating cycle, the speed of rotation of the type wheel is decreased to successively present the type of the selected group in the order Z, R, I, and such type is selected for printing in accordance whether the pilot impulse is 0, X or R.

Upon transmission of such 0, X and R impulses, the second energization of the magnet 161 again attracts its armature 215 and shifts link 216. The latter thereupon rocks the clutch release arm 224 to unlatch the clutch release arm 188 of the printing clutch. At this time a low portion 220C of cam 220 cooperates with the cam follower extension 221 so as not to restrain the rocking of clutch release arm 224. Cam disk 183 will now rotate clockwise and the cam extension will strike the follower extension 184 at the time the selected type is at the printing line to effect the printing impression.

Other special signs may be printed under control of combinations of digit perforations with the code perforations 0, X or R as set forth in the patent to R. E. Page et al. 2,438,071, issued March 16, 1948 and copending H. S. Beattie et al., application, Serial No. 74,424, filed February 3, 1949.

Each detent lever 196 is shaped with a downwardly extending arm 111 for closing a pair of contacts 112, which is used to control accumulation and transfer of totals. The lever is cammed in a clockwise direction early in the cycle of movement of the printer clutch by a cam shape on the plate 198 fastened to the side of gear 170. Since the timing of the printer clutch release is digital, and proportional to the value of the digit to be printed, the release can cause closure of contacts 112 for control of accumulation.

Whenever the number entered in an accumulator is also listed, the impulse controlling the accumulator magnets is derived from closure of the contacts 112, Fig. 12a, in the printer. In other words, the record is sensed to control the printer, and then the printer in turn, while being adjusted to select a numeral type, also selects the addition of the identical number in the accumulator. In this way there is assurance that the number printed is the same as the number added.

When numbers are to be accumulated without being listed, then a direct connection may be made between the card sensing devices and the accumulator magnets.

Tape control of sheet feed

The feed controls for the record strip R is of the tape controlled variety such as that shown in greater detail in the Mills et al. Patent 2,531,885, filed on August 9, 1945 and issued on November 28, 1950.

Referring to Fig. 9, a tape control mechanism C is shown in a general way as it appears attached near the right end of platen P. Wrapped around the platen is a record card before which the type wheels 20, Fig. 1, are rotated into the printing positions. At the right end of the platen P, Fig. 24, the shaft extends into the tape control casing and ends with a pair of knobs K and K', the former having direct connections to the platen and the latter having gear connections arranged so that a vernier adjustment may be made to regulate the location of the printing line. Extending on the front of the casing is a panel PL holding the five manipulative controls for regulating the record sheet advancement. A knob L controls the line space movements for different extents of feed and for selective line spacing under control of the tape mechanism. A second knob D is provided for disabling the connections between the perforated tape unit and the platen.

The three keys extending across the top of the panel PL are provided to control the operation of the tape feeding unit. The SC key at the left is used to space the tape to bring it into a controlling position under manipulative control. The central key RE is a restoring control for governing the movement of the perforated tape to bring it around into the initial position. This corresponds with a prearranged normal position of the record card, so that both the record and the tape are ready to be moved in synchronism. A key SO at the right is used for stopping the operation of the tape control mechanism whenever desired.

The feeding controls are illustrated in coordination with a record controlled alphabet printing tabulator. In the printing of bill cards, control is exercised by a sequence of record cards arranged to print alphabetic data such as names, addresses and dates, in combination with other detail cards perforated to represent items and amounts to be recorded, accumulated, totaled and charged to the various customers. Such type of cards are shown in Figs. 2 and 3 and the cards there represented are used to control printing on other cards such as BS1, BC and LC.

Heading cards HC, Fig. 2, when found in a plurality of sets for one account group, may be distinguished by special heading group identifying perforations. These heading identifying perforations are used to select the various tape sensing brushes for determining the stopping position of the print receiving card for locating the first line of each heading or detail group.

There is further record feeding control provided in the form of X detecting devices for sensing the change from cards having heading perforations to those following detail cards lacking such identification. Upon such a change of X to no X cards, the bill card is advanced to the position designated to receive the first item impression. Thereafter, when the detail records are controlling for recording, the bill is advanced in line spacing under control of the usual circuit breaker and cam contacts.

There is still further distinction between the various cards in a sequence related to more than one account. Group number perforations are used to distinguish between the cards relating to different customers. Therefore, upon the passage of the last detail card and advancement of the first heading card of the incoming group, there is detected a change in the group numbers and the machine is controlled to take a total and record the total on the predetermined total line selected by a tape perforation. After the total is printed, skipping is again initiated and limited by a tape perforation and a cooperating brush which is selected to carry the record sheet over into position to record the first heading line on the second form.

The sheet feeding control unit

Figure 23:
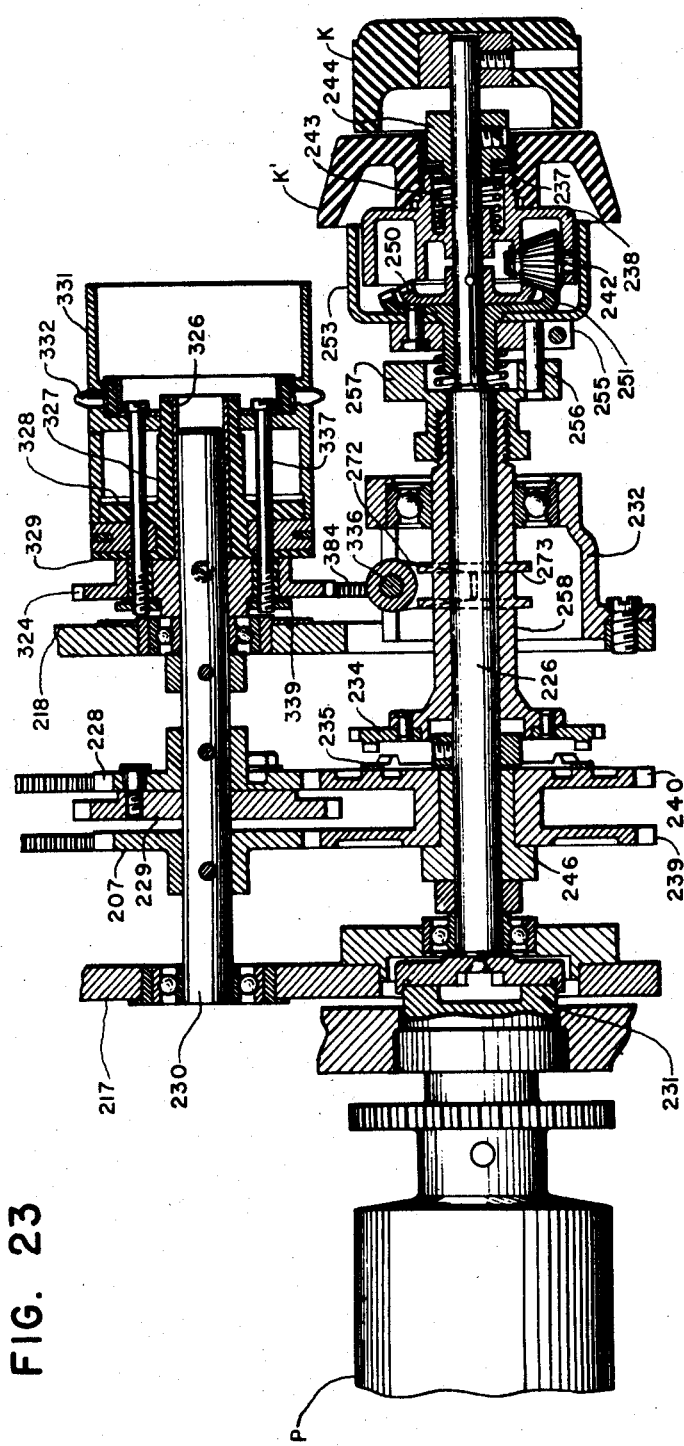
Fig. 23 is a sectional view showing the driving connections between the platen, the driving clutches and the pin wheel for advancing the feed control tape.

The feeding controls are supported in the main between a pair of frames 217 and 218, Fig. 23, the former being fastened against the outside of the right machine frame 212, and the latter suspended further to the right to carry a platen shaft extension and a tape pin feed drum.

In Fig. 16, it is seen that a heavy vertical casting 219 is located near the rear of the unit and serves as a tie between the side frames. At the top of the mechanism another tie in the form of plate 616 is secured between the two frames. Near the center of the mechanism, a cross bar 223 serves to tie the two frames 217 and 218 together. A front tie plate 215 also extends across the upper center of the feed unit.

Figure 17:
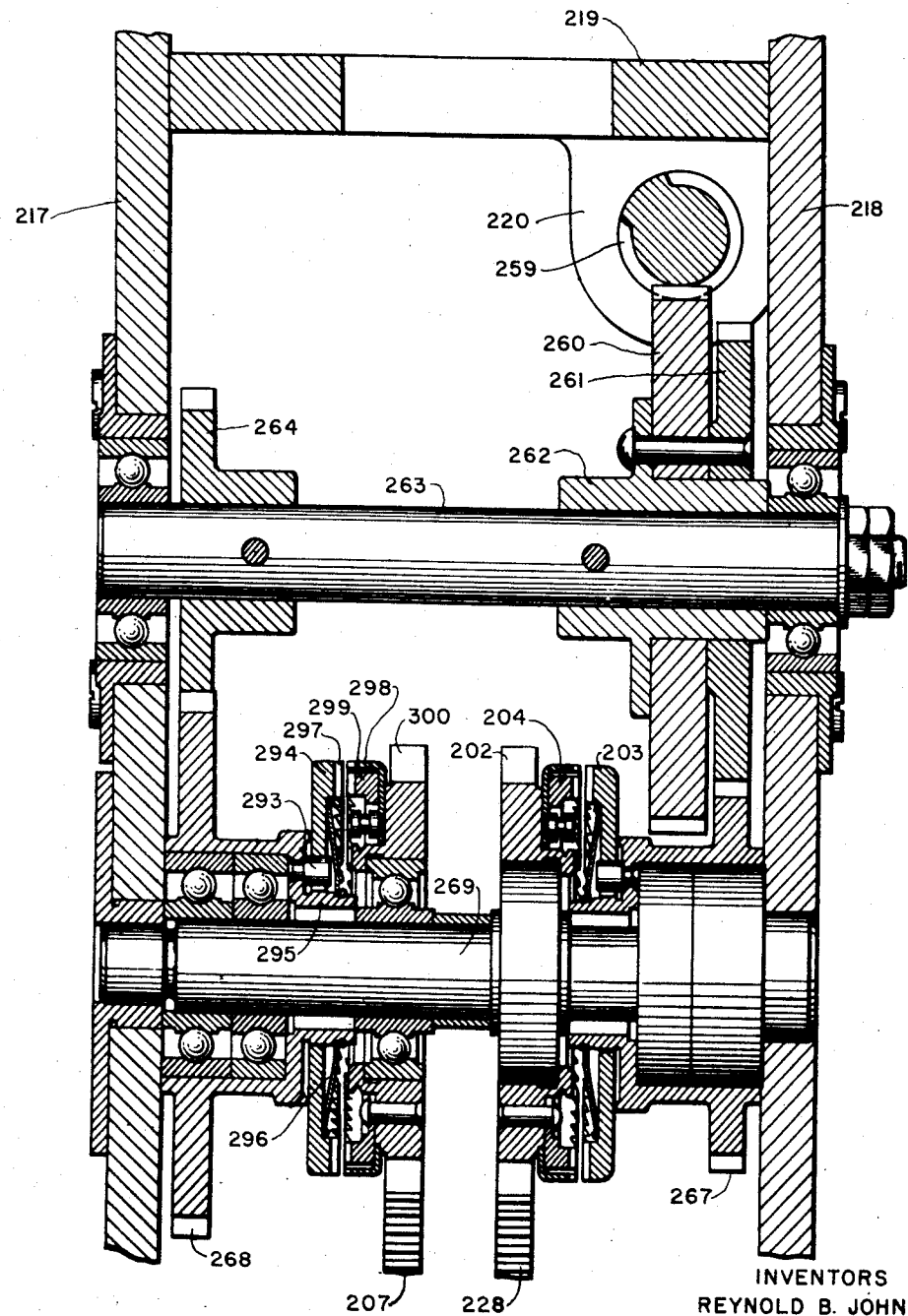
Fig. 17 is a sectional plan view showing the driving connections to a pair of clutches for governing the advancement of the record sheet at low and high speeds in the tabulator.
Figure 24:
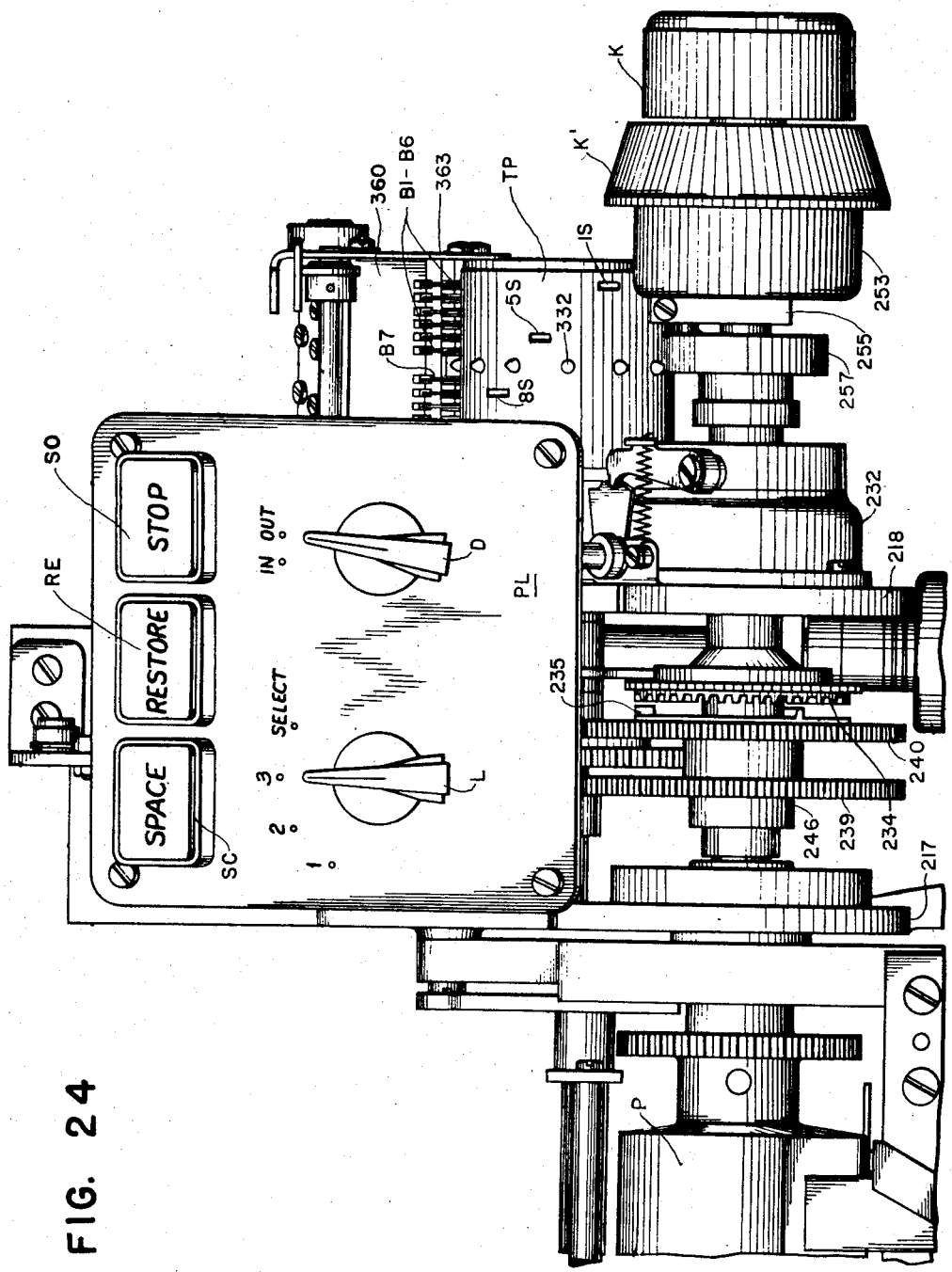
Fig. 24 is a front elevation view showing the platen extension shaft and the control panel supporting the manipulative elements for regulating tape control of line spacing and restoration of the feed controls.

In Figs. 16 and 17, it is seen that the heavy bracing frame 219 is formed with a pair of ears 220 for guiding the main drive connections. A motor 201 (Fig. 16) is fastened to the outer frame 218 in a vertical position and the upper end of its shaft is attached to a flexible coupling 211. This coupling is engaged with a clutch disk 205 fastened to the lower end of a drive shaft 227. Cooperating with shaft 227 is a set of three bearings, one bearing being located in the upper ear 220 and the two lower bearings being mounted in the lower ear 220, the former being a thrust bearing to take up the pressure given by the driving worm 259 fastened near the upper end of shaft 227. The motor 201 and the connected worm drive mechanism is operated continuously and the drive connections therefrom to the clutches are terminated only by operation of a stop key SO (Fig. 24).

Reference to Fig. 17 reveals that the vertical worm 259 is in mesh with a worm wheel 260 fastened along with a gear 261 to a hub 262 attached to a horizontal drive shaft 263. This shaft not only carries the high speed control gear 261 but also has attached thereto a smaller gear 264 for a driving connection to a clutch for low speed operation.

Meshing with gears 261 and 264 are a pair of gears 267 and 268 freely mounted on a clutch shaft 269. The gear 268 is the larger of the two to cooperate with the small driving gear 264 for low speed operation. Extending from the outer wall of the hub of gear 268 is a driving pin 293 protruding into a slot cut in the annular clutch disk 294 assembled loosely on a cylindrical shoulder 295 extending from the hub of gear 268. Although this clutch disk 294 is loosely arranged on the end of the gear, it is held against the gear by a spider spring 296 fastened to the shoulder 295 and having spring fingers pressing disk 294 against the side of the gear hub. Disk 294 is formed with an annular ring of driving teeth 297 normally separated from matching teeth on a clutch shroud 298 which is loosely assembled over a toothed clutch ring 299. The teeth of shroud 298 are slightly longer and higher than teeth 299 so that, if the movable clutch member is located with the teeth abutting, then the shroud tooth causes the moving tooth 297 to ride down into the next stationary tooth 299. Disk 294 is mounted opposite shroud 298 and the driving ring 299 fastened to a driven gear 300 also loosely mounted on shaft 269 and supported thereon by a bearing. Gear 300 is normally held from rotation by a locking disk to be described hereinafter and the driving connection is established by tipping disk 294 with reference to gear 268. When the upper end of disk 294 is tilted or tipped, the spider spring yields in that particular direction and the teeth on the opposing clutch members mesh to provide a driving connection.

The other gear 267 is also provided with a similar clutch driving disk 203 and a driven disk 204 attached to a gear 202.

Cooperating with gears 300 and 202 are a pair of intermediate gears 207 and 228 (Fig. 29) mounted with a locking disk 229 on a shaft 230 which passes through bearings in both side frames and extends beyond the outer side frame 218 and there it supports the tape driving drum.

The two clutches shown in Fig. 17 are used for different kinds of control in advancing the record strip. The low speed clutch including driving disk 294 is used most of the time and is called into operation for line spacing and overflow skipping. The other clutch including disk 203 shown at the right and comprising high speed gearing is called into operation as an incident to the printing of totals. A pair of magnets is used to operate camming mechanism for closing one or the other of the two clutches. But before describing the details of the means for operating the clutches, it is believed best to follow the driving connections from the clutches to the platen.

The platen shaft extension

The driving connections are not direct from the clutches to the platen shaft. Instead, a platen shaft extension is provided to carry adjustment and vernier regulating knobs as platen controls removable along with the entire feed control unit. Not only is the entire platen extension removable, but within the unit is a clutch connection making it possible to disconnect the tape feed control so that the sheet feeding operation may revert directly to the ordinary manual operation of the platen knobs.

Referring to Fig. 23, it is seen that the extension shaft 226 extends to the right of the platen clutch 231 and is supported by bearing arrangements in the two feed unit frames 217 and 218. The left end of extension shaft 226 is supported near the bottom of the frame 217. The middle of shaft 226 is supported by another bearing fixed in a hollow bearing cup 232 fastened to the outer side of frame 218. Fixed to the left end of shaft 226 is a coupling disk shaped with an annular flange which embraces the periphery of the locking clutch disk 231 fastened to the stationary platen shaft. The coupling is shaped with notches to coincide with the extensions formed on the clutch member 231 thereby providing a driving connection between the stationary part of platen and the removable unit with extension shaft 226.

At the right end of extension shaft 226 is fastened the platen adjustment knob K formed with a metallic center carrying a set screw for securing the knob to the shaft. This knurled knob K is used for line space adjustment of the platen and long feed movement in graduations greater than line space movements. Alongside knob K is another knurled knob K' provided to regulate adjustments to a fine degree through a vernier mechanism which is used to select the exact location of printed matter with respect to definite recording spaces on the bill cards. The motion of vernier knob K' is not communicated directly to the extension shaft but passes through bevel gearing, making possible a relatively fine movement of the shaft for a comparatively large movement of the knob.

The inside of vernier knob K' is threaded to provide means for connecting it to the threaded shoulder 237 formed on the cup-shaped driving member 238 loosely mounted on shaft 226. Member 238 is formed with a pair of flanges or annular rings between which is loosely pivoted a bevel pinion 242. Member 238 is formed on the threaded side with an annular groove in which there is pressed an expansion coil spring 243 tending to hold the bevel pinion in operation. As a means for backing up the spring 243, a collar 244 is fastened to shaft 226 by a set screw.

Cooperating with bevel pinion 242 is a pair of bevel gears 250 and 251, the former being pinned directly to shaft 226 and the latter attached to the inside of the cup-shaped shroud 253. Also attached to the shroud 253 and located on the outer surface thereof is a driving pin holder 255 carrying a pin 256 through which the driving force from the clutches mentioned hereinbefore is communicated to the platen. Pin 256 projects into an opening formed in the wall of a sliding bushing 257 threaded on one end of a long sleeve 258 carrying a clutch disk 234 cooperating with another clutch disk 235 fastened to the side of a unitary arrangement of a pair of gears 239 and 240 meshing with the intermediate gears 207 and 228. It will be remembered that gears 207 and 228 communicate the driving action from the low speed and high speed feed control clutches. The operation of driving from either feed clutch is communicated down to the gears 239 and 240 and from that point on it is optional whether the drive is to be communicated to the platen, depending on the axial position of the sleeve 258 to engage or disengage clutch 234, 235.

When the driving action comes through the clutch sleeve 258 from the feed control clutches, then the outer bevel gear 251 becomes the driver and the bevel pinion 242 merely serves as a connection to the inner bevel gear 250 which connects directly to the extension shaft 226 and the platen P.

Returning to consideration of the drive from the feed control clutches, it is noted that the gear unit comprising gears 239 and 240 is fixed to a bushing 246 loosely mounted on shaft 226. The bushing is confined between a pair of fixed collars for taking up the thrust produced when the clutch connection is established. The stationary part of the clutch connection is the ring 235 fastened to the side of gear 240 and provided with a series of teeth extending toward the teeth formed on the side of the clutch disk 234 fastened to a flange on sleeve 258.

The position of the connecting sleeve 258 is regulated by a manipulative control ending in an arm 272 having an extension fitted in a circular groove 273 between a pair of flanges formed on sleeve 258. However, before considering all details of the manipulative control, it is believed best to consider first the means for controlling the low speed and high speed clutches and effecting the driving motions already described.

Figure 19:
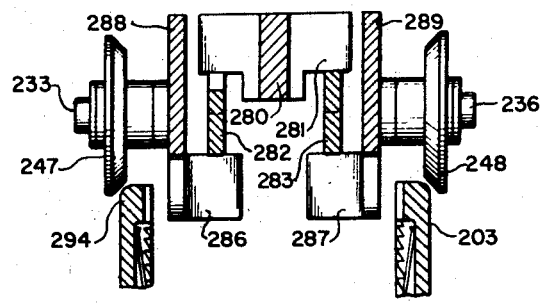
Fig. 19 is a detail sectional elevation view showing the clutch selection controls.
Figure 20:
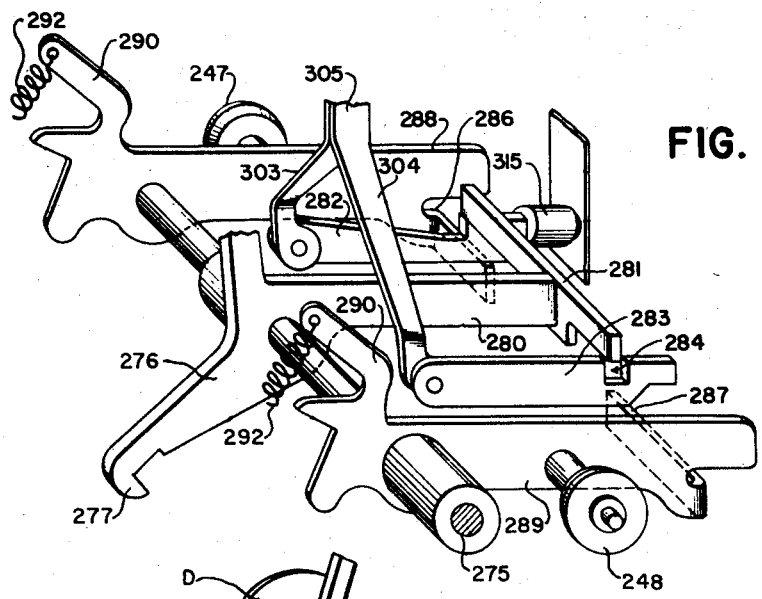
Fig. 20 is a perspective view showing the mechanism for selecting one or the other of the two sheet advancing clutches.

Referring to Figs. 16, 19 and 20, it is seen that a pair of magnets HS and LS control a set of camming mechanisms for operating one or the other of the two clutches. If magnet LS (Fig. 16) is operated alone it is a sign that the low speed clutch is to be operated to drive the platen connections to advance the record sheet for line spacing or overflow movements. When the other smaller magnet HS is energized shortly before the magnet LS, it is an indication that the connections are to be varied so that a high speed clutch is closed to advance the platen and the bill card as an incident to a total printing operation.

In Fig. 16, it is seen that the large magnet LS is mounted on the cross plate 216 and that the other magnet HS is also mounted thereon directly above it.

Extending across the unit between the side frames 217 and 218 is a shaft 275 which acts as a pivot for a locking lever 276 having a hooked end 277 for cooperating with the teeth 278 formed around the periphery of the locking disk 229. Lever 276 not only serves to perform the function of keeping the drive gearing locked in a normal condition, but it is also formed with two other extending arms, one of which carries the armature 279 located opposite the pole pieces of the low speed magnet control magnet LS. The third arm 280 (Fig. 20) extends toward the rear of the machine and carries a cross bar 281 which is used to operate the camming mechanism for throwing one or the other of the two clutches into an operated condition. Cross bar 281 does not act directly on the clutch shifting parts but instead it works through a pair of interposer slides 282 and 283. In Fig. 20 it is seen that the left slide 282 is so shaped that the top surface abuts against the under side of one end of bar 281, while, on the other hand, a notch 284 in the other slide 283 is normally presented under the opposite end of bar 281. Underlying the slides 282 and 283 are offset lugs 286 and 287, the former being part of an operating lever 288 for the low speed clutch and the latter being formed on a lever 289 which is provided to cam the clutch for the high speed train of connections. Both levers 288 and 289 are loosely pivoted on shaft 275 and extend forwardly and have raised elbows 290 for abutting against the front face of the armature piece 279. A pair of springs 292 (Fig. 16) are connected between the extending ends of the levers and the cross bar 215. They tend to rock the levers 288 and 289 in a counterclockwise direction which is the opposite of the direction for producing a clutch closing motion.

In Figs. 19 and 20, it is seen that the operating levers 288 and 289 are provided with outwardly extending studs 233 and 236 for carrying camming disks 247 and 248. The cam disks are loosely mounted on the studs for rotatable movement, but they are closely confined to prevent end play. Disk 247 (Fig. 19) is situated so that the slanted cam surface thereon cooperates with the outer rounded periphery of the movable clutch disk 294 forming part of the low speed drive. The other cam disk 248 mounted on lever 289 is similarly located with respect to the other clutch connecting disk 203 which is part of the high speed drive. It is noted that the slanted cam surfaces of the two clutch disks face in opposite directions because the closing motion for the low speed clutch is toward the right while the closing motion needed for operating the high speed clutch is toward the left.

Before pointing out how the parts are operated to engage one or the other of the clutches, it is believed well to explain how the interposer slides 282 and 283 (Fig. 20) are shifted to set the mechanism. In Fig. 20 it is seen that both arm 303, which is pivotally connected to slide 282, and arm 304, which is pivotally connected to slide 283, are slanted upward toward a common point and joined with an armature lever 305 pivoted at 306 (Fig. 16). This pivot is provided on a bracket 307 attached to the vertical plate 216.

Attached to lever 305 is a cross piece 309 serving as an armature in cooperation with the interposer magnet HS which is operated for high speed purposes. A spring 311 tends to draw the lever 305 in a clockwise direction so that an extension thereon abuts against the stop stud 313. When lever 305 is in the normal position, the slides 282 and 283 are located as shown in Fig. 20 with the first mentioned slide in position to be operated and the second slide presenting the notch 284 which makes it free from operating control.

Extending from the left slide 282 is an insulated button 315 (Fig. 16) abutting against a flexible contact blade forming one side of a pair of contacts 317.

Assuming that the parts are in the normal position and that the low speed magnet LS is the only one energized, then the armature 279 (Fig. 16) is attracted and the operating lever 276 is rocked in a clockwise direction. This motion serves first to disengage the locking tooth 277 to permit free rotation of the gearing drive. At the same time, the cross bar 281 (Fig. 20) is lowered and carries down before it the cooperating interposer slide 282 and this in turn depresses the lug 286 on the left hand operating lever 288. Since this lever carries the camming disk 247, it operates to shift the clutch disk 294 (Fig. 19) toward the right and engage the low speed clutch with the constantly operating part of the gearing. In this way operation of the magnet LS alone causes advance of the record sheet as driven by the low speed gearing.

When lever 276 (Fig. 16) is rocked clockwise by energization of the magnet, it comes into contact with a leaf spring 320. This spring tends to restore the lever to the normally disengaged position which is assumed when the magnet becomes deenergized. The hooked end 277 of lever 276 is tapered to find its way between teeth 278 so that the stopping wheel 229 can be brought to a definite locked position. Cooperating with the opposite side of the wheel is a reverse lock overthrow preventer in the form of a blade 321 mounted on a spring fastened to the rear of the cross bar 223.

Assuming that the gearing is to be connected for a high speed operation, then the interposer magnet HS (Fig. 16) is energized first and serves to rock lever 305 in a counterclockwise direction and shift the two slides 282, 283 (Fig. 20) so that the former presents a relieved portion under the left end of cross bar 281 and the latter is shifted rearwardly so that the notch 284 is carried away from the under side of the right end of cross bar 281. With slide 283 in an abutting position between cross bar 281 and the lug 287 on lever 289, then upon energization of the other magnet LS and consequent clockwise operation of lever 276, downward movement of the connected bar 281 is communicated through slide 283 to lug 287 and serves to rock lever 289 in a clockwise direction. Since this operating lever 289 is the one carrying camming disk 248 associated with the high speed disk 203 (Fig. 19), the high speed clutch is closed and the driving connections are established from the motor through the high speed drive to the platen.

As an incident to the shifting of the interposer slide 282 (Fig. 20) button 315 is shifted and contacts 317 (Fig. 16) are closed to provide circuit connections to call in magnet LS directly after energization of magnet HS.

Provisions are made to advance the control tape TP (Fig. 24) in synchronism with the movement of the bill cards by means of gearing connection from the two clutches described hereinbefore. The point at which the two drives are connected is shown in Fig. 23, where it is seen that the intermediate gear shaft 230 extends to the right of the outer frame 218 and carries a tape feeding pin drum 331. This drum has pins cooperating with a central line of feed perforations in the tape TP (Fig. 24). After the tape is formed in a continuous band, it is placed on the pin feed wheel to register with the first bill card and thereafter provides a control medium through the rectangular feed control perforations which are positioned with respect to lines on the bill card where recording is to be started or ended.

Most of the perforations in the tape are concerned with stopping control for limiting the advance of the card after feeding has been started by X hole control, digit sensing, group change, total recording, etc. However, there is one control provided by the tape for initiating rather than terminating feeding, and that is the overflow control for limiting the extent of printing near the bottom of a card, so that skipping takes place to carry the card out and a second card in for continued recording at the first heading or detail line on the second card.

Considering now the actual mechanical arrangement of the pin feed wheel, it is noted in Fig. 23 that a gear 324 is secured to shaft 230 by a set screw which fastens it alongside the frame 218. Alongside gear 324 is fitted a sleeve 326 carrying an insulation hub 327 formed with a pair of flanges 328, 329. Assembled on the insulation member 327 is the metallic drum 331 provided with a line of radial perforations through which project the feeding pins 332.

All of the feed wheel parts are assembled by means of a series of stay rods or bolts 337 which project through insulation bushings in gear 324 and are threaded in a retaining washer 339 placed alongside gear 324. The periphery of the metallic drum 331 is used as an electrical conductor for impulses through the brushes which cooperate with the tape and sense the perforations therein to determine the location and timing of the feed control impulses.

Figure 22:
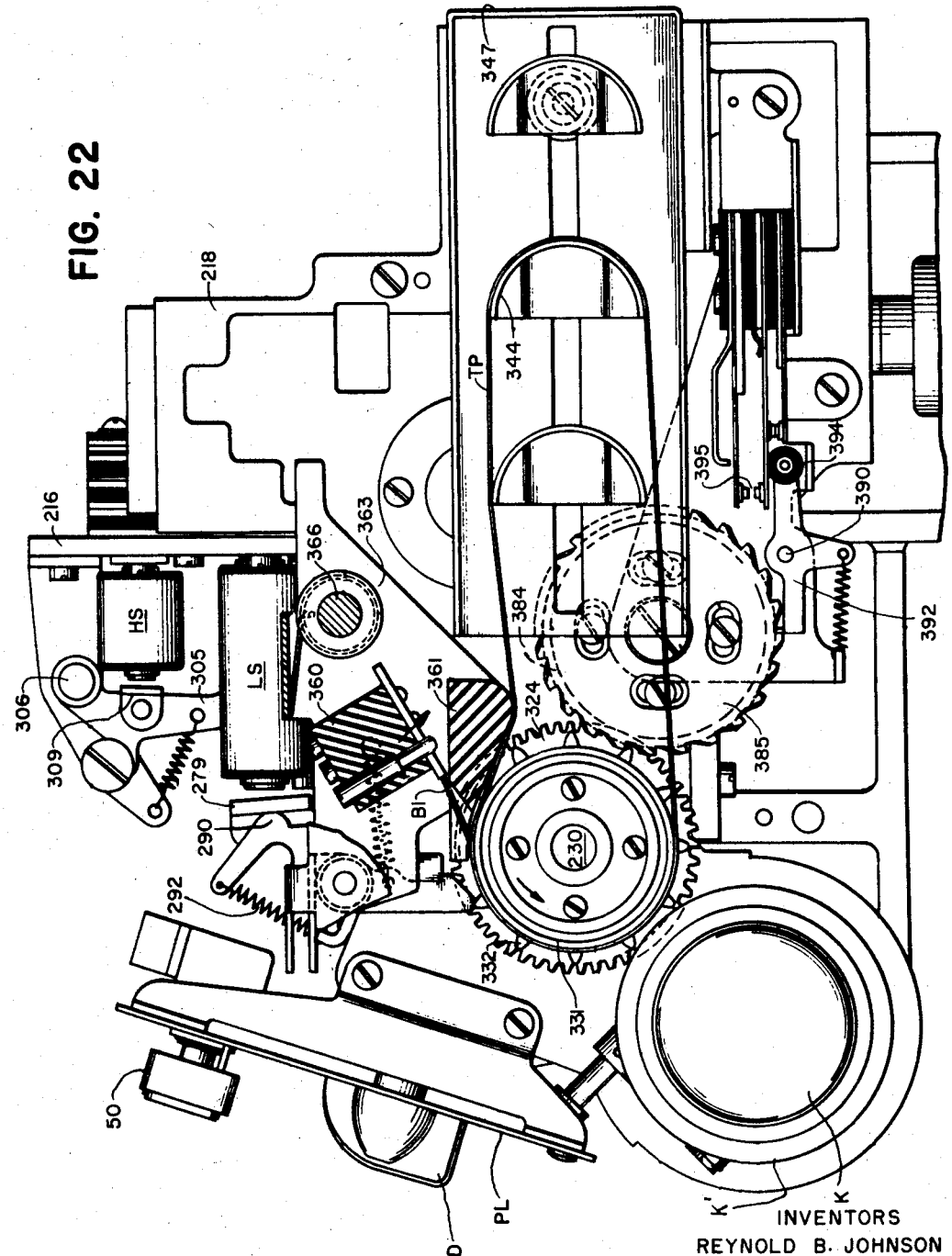
Fig. 22 is a side elevation view of the perforated tape controls with the cooperating brush holder in section.

In the side elevation view, Fig. 22, it is seen that while the left loop end of tape TP is drawn around the feed drum 831, the right end of the tape is guided by a curved guide 344. There are two other such guides fastened in a sliding box 347 fastened to spacers extending from the frame 218.

The tape sensing brushes

Figure 18:
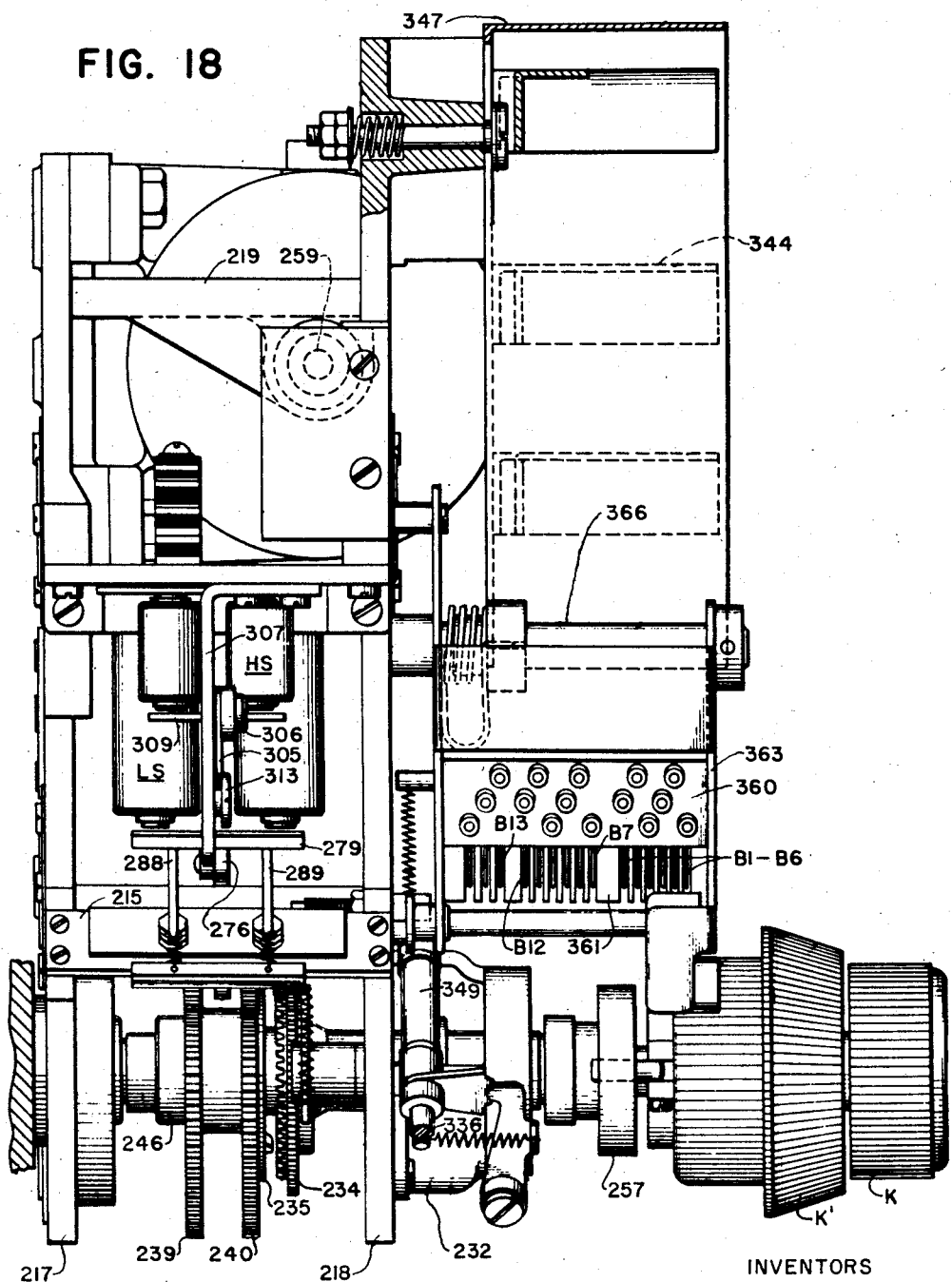
Fig. 18 is a plan view showing the entire tape feed control mechanism of the tabulator and the driving extension on the platen shaft.

Provisions are made across the tape TP (Fig. 24) for twelve channels wherein appear the rectangular feed control perforations 1S–12S. These channels are evenly divided with six punch locations on each side of the circular pin feed openings. In Figs. 18 and 22, it is seen that a square insulation bar 360 carries a series of brushes B1–B13. The plan view, Fig. 18, shows that the first six brushes B1 to B6 are located on the right and then there is a second group of six brushes B7 to B12 in the center and a third group of brushes B13 at the left. The two groups of six brushes each are separated by the space required for the pin feed control. Brush B13 is a common contact brush cooperating with the metallic drum 331 outside the area of the tape, so that it is in continuous contact with the drum.

As a means for confining the ends of the brushes B1–B13, a slotted insulation bar 361 is extended across the tape and has a fork-shaped front with insulation projections interspersed between the brushes.

Both insulation cross bars 360 and 361 are mounted in a rockable frame 363 so that the brushes may be lifted away from the tape when the tape is to be changed. The brush frame comprises a U-shaped member with a cross bar and a pair of side pieces and between which the insulation bars are fixed. The entire brush unit is pivoted on a stud 366 extending from the frame 218.

In order to prevent sparking of the brushes at the tape and to properly time and limit the length of the impulses directed through the tape, a circuit breaker ratchet is provided and geared to the pin feed drum to rotate in synchronism therewith. In Fig. 22 it is seen that a gear 384 is in mesh with the gear 324 already mentioned as secured to the pin feed drum 331. Adjustably secured to the side of gear 384 is a ratchet wheel 385. Pivoted at 390 on the outside of the frame is a contact operating lever 392. The lever has a lug cooperating with the teeth on ratchet wheel 385 and the lever extends rearwardly to carry an insulation roller 394 underlying a pair of normally open contacts 395. A spring tends to rock the lever in a clockwise direction and hold it in cooperation with the circuit breaker wheel. As the wheel rotates in synchronism with the pin wheel, and upon the passage of a feed control perforation position, the rear lever arm is rocked upward by one of the teeth, and the contacts 395 are closed after the presentation of a perforation.

The record feed control panel

The feed control unit is provided with its own set of operating control keys and levers for setting the device for desired line spacing and operating control. Referring to Fig. 24, it is seen that a control panel PL is the mounting for the three control keys, i.e. space key SC, restore key RE and stop key SO. Also mounted on the panel are the line space control lever L and the declutching lever D. The space key SC is provided for selecting hand operated line spacing control and also for advancing the bill card and the control tape in long feeding when it is desired to advance a card independent of the tape control. The restore key RE is provided to close circuit connections for energizing the tape control magnets, so that the tape is advanced to the normal or home position, which is aligned so as to coincide with the presentation of the top of the bill card at the printing line on the platen. The stop key SO is provided to open circuit connections to disable the tape control magnets when there is need for emergency stop.

The line space control lever L is settable to one of three positions, the first two making circuit connections for selection of a succession of progressively greater line space movement for one or two steps. The third position is one making the line spacing movement independent of any pre-arranged number of steps other than the degree of motion selected by the perforations cut in the twelfth channel of the control tape. In other words, this "select" line space control is tape control of line spacing.

Figure 21:
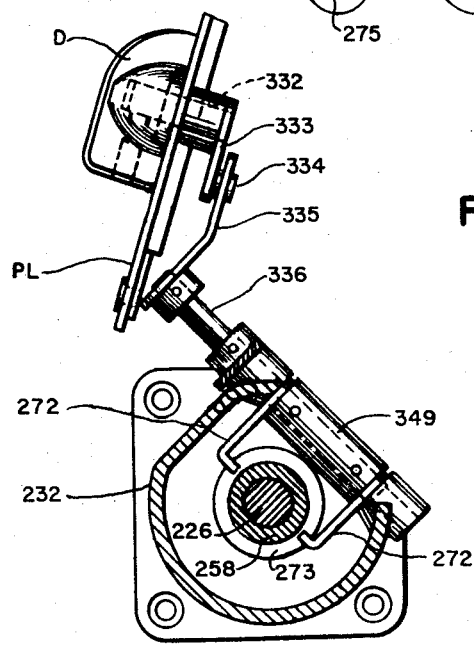
Fig. 21 is a side elevation view of the manipulative control for disconnecting the platen from the tape feed control mechanism.

In Fig. 21, it is seen that the declutching lever D is provided with a projecting shaft 332 to which is secured an arm 333 having a hub abutting against the inner surface of the panel PL. Extending from arm 333 is a stud 334 projecting in a notched opening in the end of a lever 335 secured to a slanted shaft 336 carried in bearings formed on the bearing block 232 described earlier in this specification. Also secured to shaft 336 is a long hub 349 carrying a pair of bent arms 272 for engaging in the grooved section 273 (Fig. 23) formed on the clutching sleeve 258 already described. When lever D (Fig. 24) is rocked clockwise to the "out" position, the train of connections is operated so that shaft 336 (Fig. 23) is rocked counterclockwise to push the sleeve 258 to the right and disconnect the connection 234, 235 between the feed control clutches and the platen.

In the detailed part of the foregoing sections of the description, reference is mainly to known forms of card sensing, printing, accumulating and tape feed controlling mechanisms of the tabulator. In the sections to follow there is presented the novel parts of the bill feed unit including the bill card feeding, sensing, printing, piercing, ironing and stacking devices.

*Bill feed framework*

It is already noted with reference to Fig. 1 that the bill feed unit is supported on L.-shaped support tubing 21 with castors. Two of such heavy pipe supports 21 are stiffened with cross bars and tied together at the base. At the upper ends of the two supports 21 (Figs. 9 and 10) there are welded slotted blocks 399 to receive and adjustably fasten heavy studs 400 extending from the main side frames 401 and 402 of the bill feed unit.

Figure 26:
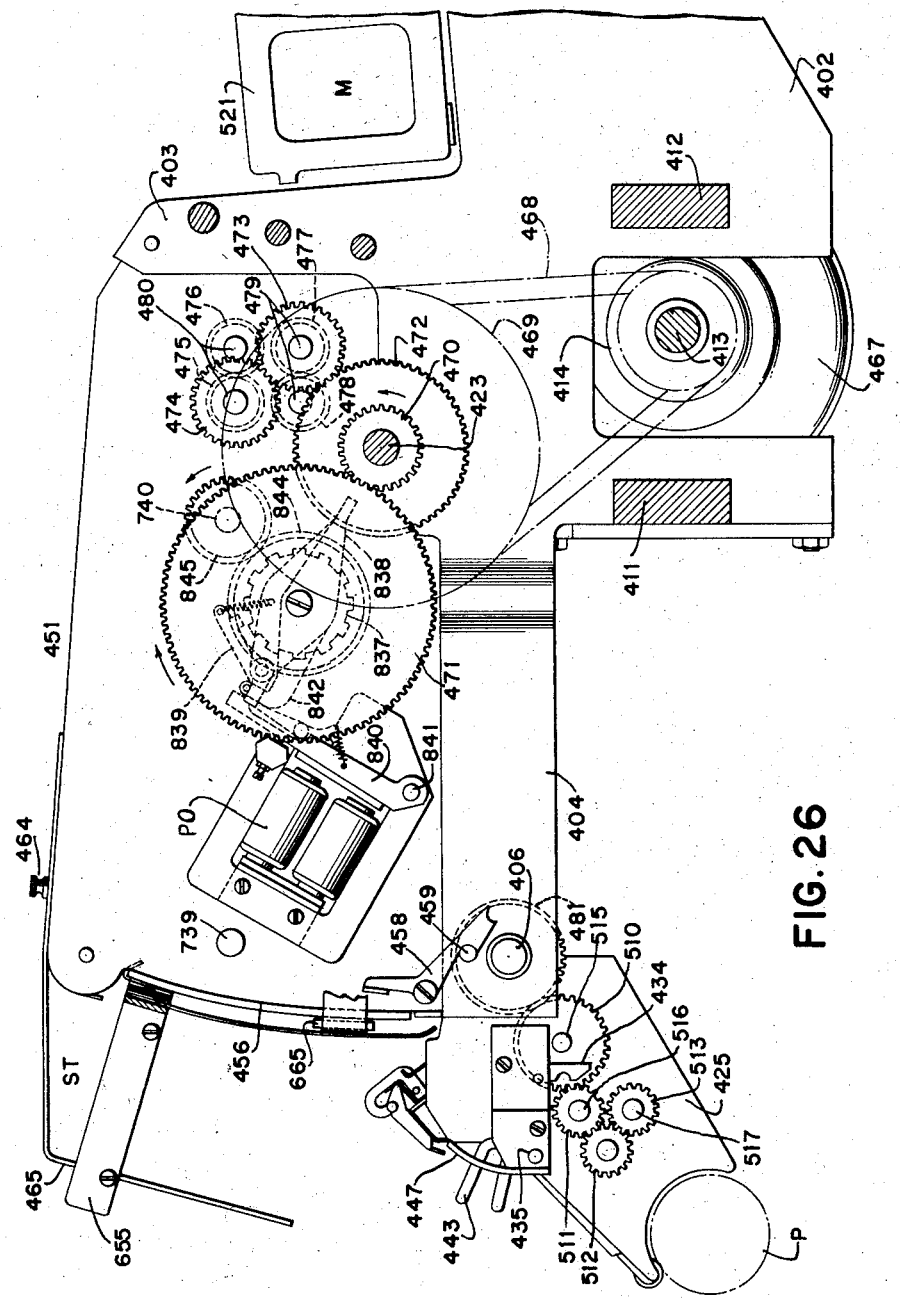
Fig. 26 is a side elevation view taken along line 26—26 in Fig. 25 and showing the driving mechanism for parts of the bill feed device.

The shape of the main frames is best shown in Fig. 26 where frame 402 is seen to have a large lower portion, an upward extension 403 and a forward horizontal extension 404 encircling the shaft 406.

Stud 400 at the left side (Fig. 10) extends from a plate 408 on a block 409 secured to the left frame. At the right side (Fig. 9) stud 400 extends from a T-shaped bridge plate 410 secured to two bars 411 (Fig. 26) and 412 spanning the gap in frame 402 for an extension of the motor shaft 413 and the pulley 414 thereon. Two safety pins 415 (Fig. 9) extend from plate 410 to catch the unit when it is loosened in blocks 399.

The two main side frames 401 and 402 are tied together in a rigid way by a series of cross bars and plates best seen in Fig. 27. These ties include a magazine base frame 417, a throat plate 418, a motor support plate 419, a feed roller bar 420, and a die support bar 421. These parts with the frames constitute what may be called a lower frame section and they furnish a fixed base for two articulated sections, a front platen section pivoted on shaft 406 and an upper frame section pivoted on shaft 423.

The frame of the platen section (Figs. 26, 27 and 28) includes two side plates 424 and 425 tied together by a front transverse channel 426 (Fig. 27) and an upper sheet metal channel or box 427. This section is pivotally mounted on the shaft 406 and confined between the main side frame extensions 404.

A pair of handles 428 (Figs. 1 and 10) are fastened to the tops of plates 424 and 425 and these are grasped by the operator when maneuvering the Bill Feed unit over the tabulator to fit the forward section of the unit onto the paper table 429 (Fig. 27) of the tabulator and near the rear of the platen P where the usual feed rollers 430 press against the lower side of the periphery of the platen.

As the small forward section of the Bill Feed is brought over and onto the platen P it is clamped there and through the pivoted connection to shaft 406 the whole Bill Feed is also registered with the tabulator. The parts for connecting the two machines are best shown in Figs. 32, 33 and 34.

Extending from both sides of the tabulator carriage side frames are slotted assembly guide plates 432 and latching pins 433. Cooperating with these pairs of connectors and mounted on the bill feed platen section frames are latches 434 for pins 433 and studs 435 to fit into the slots of plates 432. In Fig. 28 it is seen that a bracket 436 is fastened to side plate 424 and carries the pin 435 and the pivoted latch 434. And on the other side, as seen in Fig. 26, a bracket 437 carries a similar pin 435 and a latch 434.

Figure 32:
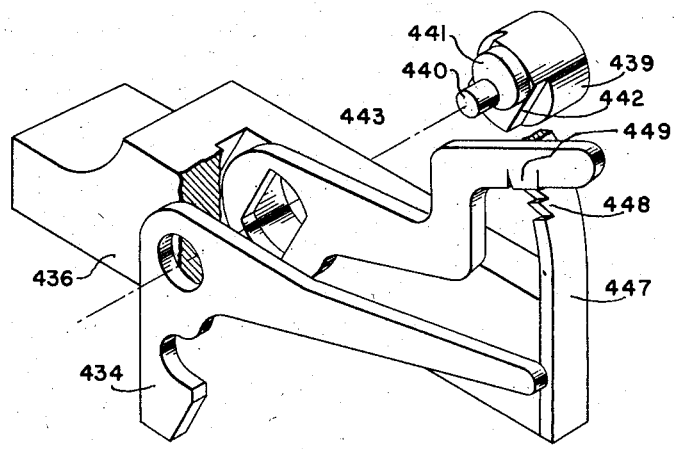
Fig. 32 is an exploded perspective view showing the parts for latching the bill feeding unit on to the tabulator.

In the perspective showing of Fig. 32 it is seen that the bracket 436 is adapted to carry an eccentric stud which has a large tenon 439, a small tenon 440, an eccentric portion 441 and a milled portion 442. The eccentric portion 441 is encircled by the latch 434 and the milled portion 442 is engaged by a clamping arm 443. There is also provided a compression spring 445 (Figs. 33 and 34) which is constantly pressing against the latch 434 to cause it to snap over and lock onto pin 433.

Figure 33:
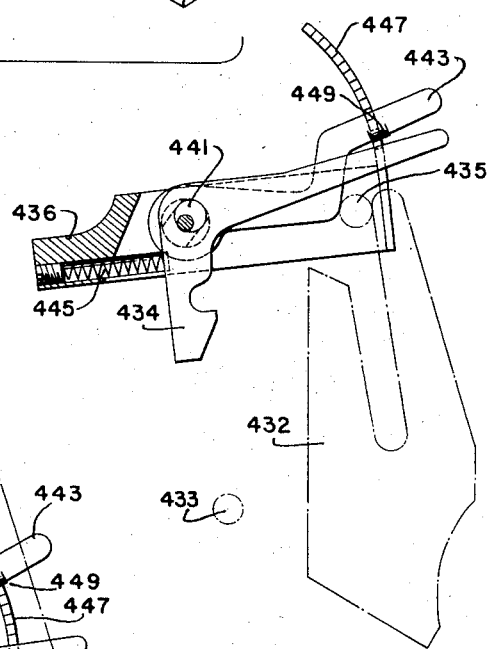
Fig. 33 is a side elevation view showing the latching parts before they are connected.
Figure 34:
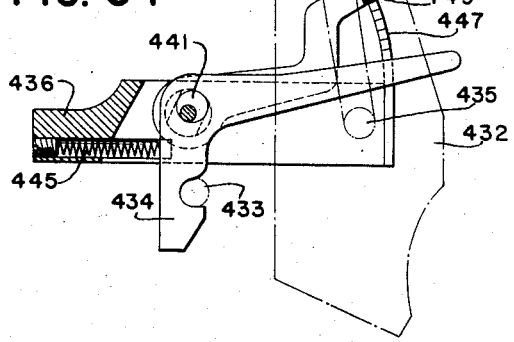
Fig. 34 is another elevation view showing the latching parts connected to hold the bill feeding attachment on to the tabulator.

As the bill feed is being maneuvered into engagement with the carriage, the latches 434 and arms 443 are all held in the position shown in Fig. 33 which may be regarded as the preliminary latching position.

Referring to Figs. 33 and 34 there is shown a curved ratchet 447 attached to the end of the bracket 436. Between the ratchet 447 and arm 443 there is an amount of flexure and the arrangement is for biasing the ratchet teeth 448 into engagement with a tooth 449 forming a part of the arm 443. The latching and clamping means is also duplicated with respect to the right end of the bill feed as shown in Fig. 26.

The clamping action is realized when the arms 443 are raised to the position shown in Fig. 34. This action rotates the eccentrics 441 upwardly thereby drawing the latches 434 tightly against pins 433 and clamping the bill feed to the tabulator.

Returning to consideration of more of the framework, the upper section pivoted on shaft 423 (Fig. 27) holds the bill piercing and ironing devices as well as part of the belting for carrying the bill cards to the stacker. This upper section is held between two large side plates 450 and 451 (Fig. 25) which are pivoted on shaft 423 and held together by a series of cross members such as heavy bars 452 and 453, the pierce unit support bars 454 and 455, and a curved front sheet 456.

Figure 10:
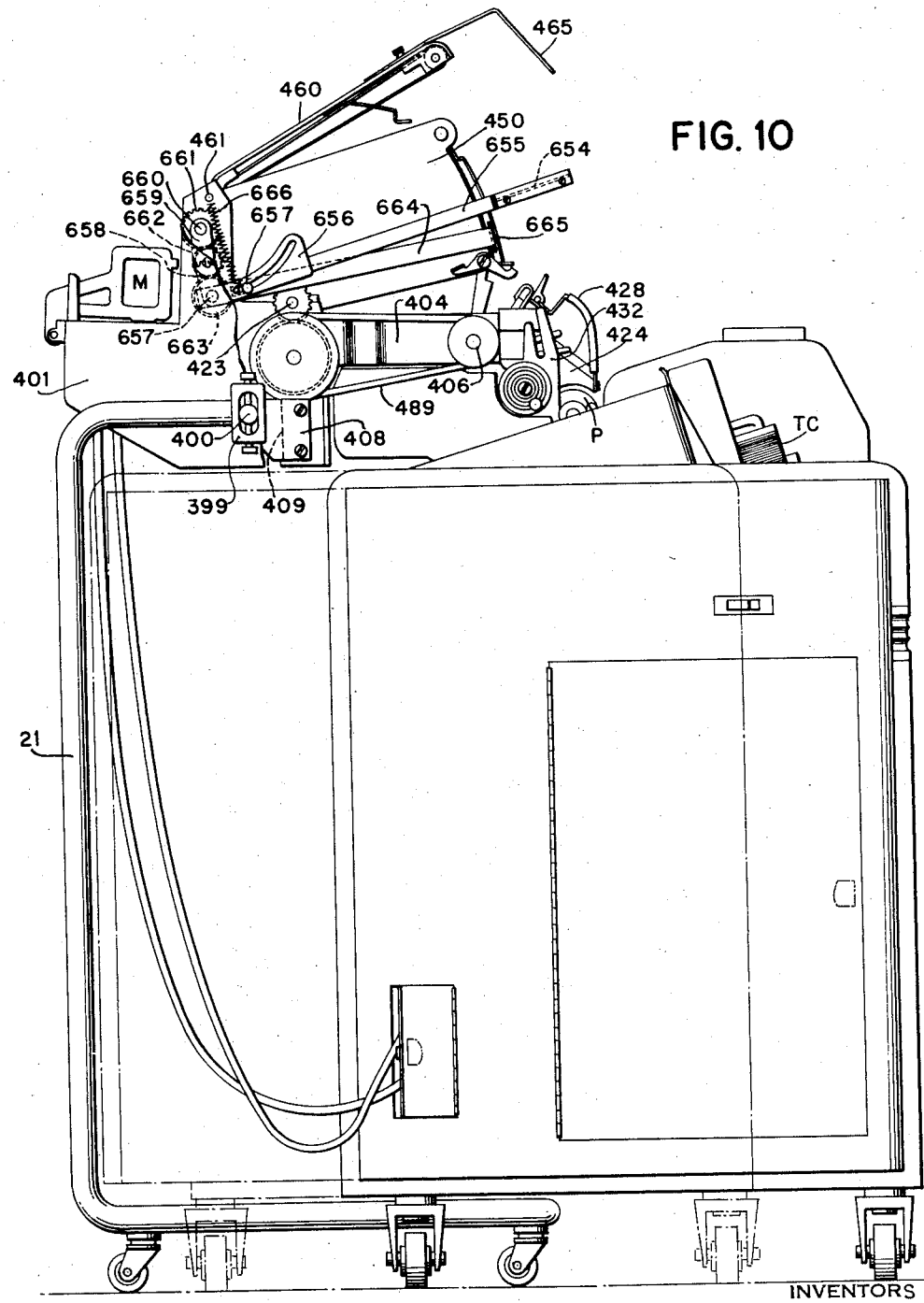
Fig. 10 is another side elevation view of the tabulator and assembled bill feeding device, the latter being shown with some of the units unlatched and raised in a position making them accessible for inspection and servicing.

A latch 458 (Fig. 26) pivoted on the side of plate 451 serves to engage a pin 459 on the lower section 404 and lock down the upper section. However, this latch may be rocked and the upper section released and lifted and held so by putting the curved end of latch 458 on top of pin 459. Then the parts appear as shown in Fig. 10 with all sections opened for inspection, repair and removal of cards in a jam. There it is also noted that the top or cover plate 460 is pivoted at 461 and swung up with respect to the upper section frames 450, 451.

This top plate 460 finds use not only as a swinging cover but also is the mounting for a series of inner brackets 462 on which are pivoted the stacker rollers 463 for the feed belts B. And to the top of cover 460 is adjustably secured by thumb screws 464 a thin sheet with forwardly and downwardly extending stacker stop fingers 465.

*The drive mechanisms*

Referring to Fig. 27 it is seen that a bill feed operating motor 467 is secured to the rear of plate 419. The shaft 413 of the motor extends outside the left main frame 402 (Fig. 26) and there carries a pulley 414 with a belt 468 driving a large pulley 469 fastened to shaft 423. Also fastened to shaft 423 is a small gear 470 in mesh with a large gear 471 for driving the clutch which selectively operates the piercing device to depress the pierce wires through the bill and for restoring the wires as noted hereinafter.

Also fastened to shaft 423 is a gear 472 for driving a train of gearing 473, 474, 475 and 476, also 477 and 478 fastened to the pairs of ironing roller shafts 479 and 480.

Drive shaft 423 extends across the entire bill feed unit and projects from the right side (Fig. 28) where it carries a pair of fixed gears 482 and 483. The former drives a large idler 484 which in turn meshes with the large clutch gear 485 of the clutch which operates parts of the piercing unit to shift the digit slides sequentially and also for depressing the offset wire bails to act in effect as the piercing set up actuator.

Gear 483 drives a gear 486 connected to a pulley 487 which drives a pulley 488 and shaft 406 by means of belt 489. In Fig. 27 it is seen that shaft 406 carries a series of pulleys 490 around which are wrapped the front ends of the six long endless belts B which carry the bill cards through the bill feed.

At the end of shaft 406 opposite the end with pulley 488 is attached a gear 481 (Fig. 26) which drives a train of gearing 510, 511, 512 and 513 for operating the feed shafts 515, 516, and 517 also shown near the platen P in Fig. 27.

Gear 486 (Fig. 28) also effects other drives by causing rotation of gear 491 which is loosely mounted on shaft 498 but coupled with a pinion 492 meshing with the drive gear 493 of the picker feed clutch. When the clutch is effective, a gear 494 is driven and it in turn drives the pinion 495 which acts as a crank for the picker linkage 496 and 497. Pinion 495 is fixed to shaft 498 and drives it whenever the magazine feed operates and thus causes a sensing operation as revealed more fully hereinafter.

Gear 494 also drives a gear 500 with a connected gear 499, all of which are loosely pivoted on a stud 501. A pair of shafts 502 and 503 near the throat of magazine M carries feed rollers and also carries meshing feed pinions 504 and 505, the latter of which is driven by gear 499. Gear 499 also meshes with an idler pinion 506 for driving a pinion 507 on another feed shaft 508. In Fig. 27 it is observed that the shafts 502, 503 and 508 carry feed rollers for conducting an issued bill card beyond the magazine M.

*The advance of bill cards*

Figure 25:
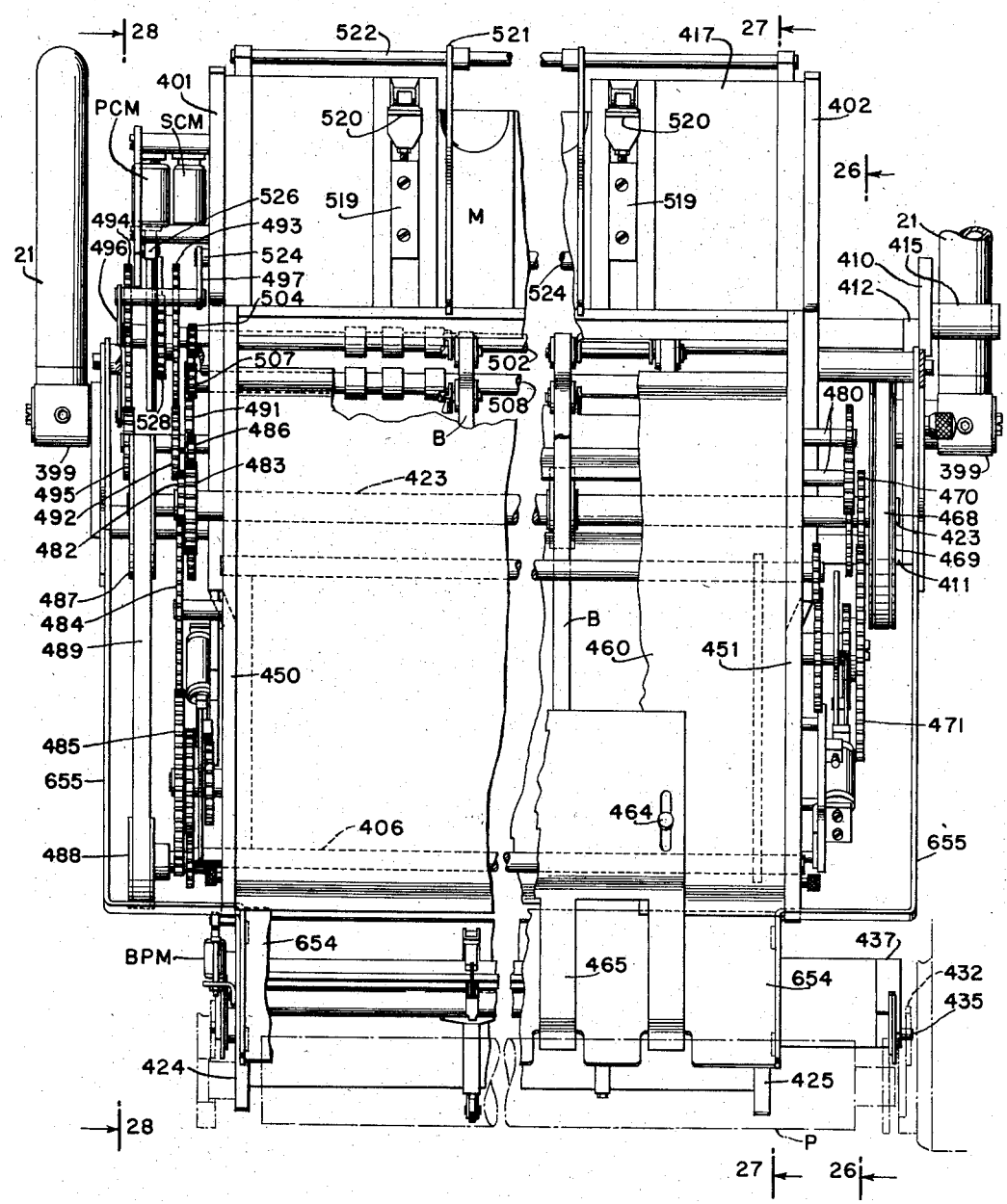
Fig. 25 is a plan view of the bill feeding device with a section cut out to show a feed conveyor belt.

In Figs. 25 and 27 it is seen that the bill card magazine M has the base plate 417 for supporting a series of slides 519 with picker knives 520 for engaging the edge of the bottom card and feeding the cards singly and successively in the bill feed. A pair of side wall members 521 are adjustable along a horizontal rod 522 to confine cards of single, double, or fractional widths such as extra length bills with portions of cards as stubs. Operating sectors 523 are fastened to a shaft 524 (Fig. 28) which is at the end of the picker drive linkage 496 and 497 mentioned hereinbefore. On every revolution of gear 495, the sectors are rocked and slides 519 (Fig. 27) are reciprocated to pick off the bottom card and move it to the left between the feed rollers on shafts 502 and 503.

Picker operation is magnetic clutch controlled and dependent upon energization of clutch magnet PCM (Fig. 28) which rocks armature lever 526 and permits engagement of a pawl 527 pivoted on a double winged stop appendage of gear 494 with the notched disk 528 secured to gear 493. When so connected, the clutch provides a driving train from the gear 491 to the gear 495 acting as a crank for the linkage 496, 497 to rock shaft 524 and operate the picker.

Behind the picker clutch PCM, 527, 528 is a similar sensing unit clutch with a magnet SCM and parts duplicating the picker clutch parts, the only difference is that the clutch disk which is also fastened to gear 493 operates a clutch pawl on a gear 494a which is in mesh with a pinion 495a behind gear 491 and fastened to shaft 498 to drive it.

In Fig. 28a it is seen that pawl 527 is pivotally mounted on the inside of the double armed clutch connecting lever 529 which is loosely pivoted on stud 530 but attached to the driven clutch gear 494. Alongside pawl 527 and loosely pivoted on stud 530 is a pawl release lever 531 also double armed and provided with an extending pin 532 which underlies the short extension of pawl 527. A spring 533 tends to pull the pawl towards the clutch disk, but normally the pawl is held out by pin 532 because said pin is on lever 531 which along with lever 529 is held latched up by armature latch 526. When released, levers 529 and 531 are separated slightly because pawl 527 presses down on pin 532 and rocks the levers apart until at the half revolution mark when one or the other of the pairs of extending lever points are engaged by latch 526 which first engages lever 531 to rock the lever and act through pin 532 to rock the pawl disengaged, and next engages lever 529 to stop the driven parts including gear 494.

It is already noted that gear 494 drives gear 495 which is the driver of shaft 498 and also a crank for the picker feed to issue a bill card out of the magazine.

Upon emerging from the magazine M (Fig. 27) the bill card is fed into a first pair of feed rollers on shafts 502 and 503 which are driven by gears 504 and 505 (Fig. 28) as already noted as being rotated during card feeding operations. Both roller shafts are journalled in the side frames 401 and 402 (Fig. 25). The rollers on the upper shaft 502 (Fig. 27) are pressed down against the lower rollers by compression bearing springs (not shown) to maintain the two in firm engagement with the card.

Following the first set of feed rollers, there is a second set of rollers, the upper rollers being on shaft 508 which is journalled in the side frames 401 and 402, and on which are attached the roll portions which are in cooperation with the small lower feed rollers 509. As shown in Fig. 27, each roller 509 is carried on an arm 514 which has a bearing surface embracing the feed roll shaft 503. The arm 514 is urged in the direction of the upper feed roller by means of a spring 518. From these feed rollers the bill card is fed into the sensing station S, later to be separately described, and held therein until another feed cycle is signalled.

During the closing portion of the feed cycle the card enters the sensing station S and is arrested therein by a card stop 535. The card feed cycle terminates shortly thereafter with the card in position for sensing, the front edge of the card being held against the card stop and the trailing portions of the card being held between the rolls 508 and 509. The sensing cycle is then initiated and towards the closing portion thereof, the card stop 535 is retracted below the card line to allow passage of the card which will be moved by the rolls 508 and 509 upon initiation of the immediate next card feed cycle. After leaving the sensing station, the card is fed into the carrier system which conveys the card to the bill positioning station located just short of reaching the carrier platen P.

The card stop mechanism at the sensing station S includes the stop bail 535 (Figs. 27 and 41) which has side arms encircling the shaft 536 and an extension to which is attached a spring 537. To another extension of bail 535 there is articulated the upper end of a link 538 which at its lower end is pivotally connected to a cam follower lever 539 loosely mounted on shaft 540. At the opposite end of lever 539 is a roller 541 which rests on the cam 542 rotated by shaft 498 and shaped to raise the roller at the end of each card sensing operation so that lever 539 is rocked counterclockwise and link 538 and bail 535 are lowered to allow the card to move to the left.

Directly behind the card stop 535 are the pair of feed rollers 543 and 544, the former being one of a series of such rollers for guiding the belts B and the latter pressing against the belt as held by a lever 545 loosely pivoted on shaft 536 and urged upward by a spring 546. When the stop 535 is withdrawn, the rollers 508 and 509 become effective again to move the card slightly to the left where its front edge is caught between the constantly moving belts B and cooperating rollers 544 to move the card toward the platen.

Referring to Figs. 1 and 27, it is noted that the belt carrier system comprises a series of six endless belts B in cooperation with feed and guide rollers. As shown in Fig. 27 these endless belts cooperate with rollers numbered from 543 to 553, inclusive, which merely rest on the belts to advance the cards. Of these nine sets of rollers, the first three sets 543—547 are pivoted in blocks secured to the underside of a guide plate 559 attached between forward frame extension 404 in a position to press the rollers upward against the underside of belts B. A somewhat similar guide plate 560 is attached to the lower edges of the upper section frames 450 and 451 and serves to guide cards through the piercing unit. Guide plate 560 is slotted to allow rollers 548 which are loosely mounted in blocks 561 to descend into contact with belts B. It is also slotted to permit sliding action of rollers 549 for selective feeding of a card out of the piercing unit as explained hereinafter. Feed rollers 550 are on blocks secured to the top of guide plate 560. The other three sets of feed rollers 551—553 are pivotally mounted in blocks secured to the underside of a guide plate 562 fastened between the tops of the upper section frames 450 and 451 and situated so as to press the rollers against the underside of the stacking loops of the belts B.

As noted hereinbefore, the belts B are driven by gear and pulley connections to shaft 406 as seen in Fig. 28. The drive wheels 490 (Fig. 27) on shaft 406 are only one set of a series of sets of wheels or pulleys around which the belts B are drawn to conduct the cards along the bill feed path. Such guide wheels include 543, 490, 564–570, 463, 571 and 572 in order of appearance from the exit end of the sensing unit S and back there again.

Returning to consideration of the movement of the card after leaving the sensing station S, it is noted in Fig. 27 that beyond rollers 543 and 544 the card is carried toward the platen by belts B as aided by rollers 545, 546, and 547.

The forwardly extending part of the bill carrier system is seen to be located between the belt drive shaft 406 (Fig. 29) and the tabulator platen P. This part of the system is used to convey the bill to and from the carriage platen P. It is articulated for a short pivoting movement to provide the flexibility needed to place it directly above, and coordinated with, the platen paper table 431 of the tabulator. Referring to Fig. 26, it is seen that the rear edge of frame 437 is spaced near the straight front end of frame 404 and thus a limit stop is provided for movement of the small forward appendage with respect to the remainder of the bill feed device.

After leaving the sensing station S (Fig. 27) the bill is carried forward by means of the belts and rollers 545, 546 and 547. From this last roll 547 the bill is directed to the bill positioning station located just prior to the tape carriage platen P where the bill is arrested and held by means of a gate 563 (Fig. 29) until the platen is ready to receive it for the carriage.

For guiding the bill to and from the carriage platen, card guides 575, 576, 577 and 578 are provided. These guides are secured by screws to the end frames 424, 425 and channel member 426.

For transporting the bill to and from the platen P (Fig. 29) feed rolls 555, 556, 557 and 558 are provided, and of these 556 and 558 are urged into operation by springs and are thereby driven by friction. The rolls 555 and 557 are provided with respective gears 513 and 511 (Fig. 26) both in mesh with an idler gear 512. Motion to gear 511 is supplied by a gear 510 secured to a shaft 515 journalled in the side frames 424 and 425. Gear 510, in turn, meshes with the gear 481 secured to the shaft 406 which rotates in the manner earlier described.

The feed roll shaft 517 (Fig. 29) carries a series of the rubber covered brass rollers 555 separated from one another by means of spacers. The pressure exerted by the cooperating rollers 556 causes friction between the brass rollers and the cooperating shaft 517 which is continually running. This arrangement of individual rollers insures the even impositive feeding of the bill card against the stop gate 563 forming a part of the positioning station to be described. Pressure rollers 556 are pivotally supported by spring urged arms 554 pivoted at 573 on brackets under plate 575. A card lever 579 is used to close contacts 580 to indicate the presence of a bill card at the station where it presses against gate 563 preparatory to going around the platen.

There is also a frictional drive effecting the rotation of the feed rolls carried by shaft 516. Here the feed roll proper is a rubber roll 557 freely carried by the shaft 516 and driven therefrom by means of a friction arrangement comprising a compression spring pressing against a flange forming a part of the feed roller, and another flange forming a part of the driving shaft 516.

Bill positioning devices

As the bill card is advanced beyond the belts B (Fig. 29), and carried to the left by rollers 555, 556, it is stopped short of the platen P by the gate 563. Pressure feed rollers 430 and gate 563 are made effective in alternation so that when the gate is raised to stop the bill the rollers are lowered away from the platen. At the proper time for feeding the bill, the positions are reversed so that the gate 563 is lowered out of the way while the pressure rollers 430 are raised to engage the bill with the platen which then turns to position it for print impression reception. Control over the gate and pressure rollers is exercised by a bill positioning magnet BPM, a clutch controlled thereby, and a train of parts shown in Figs. 29, 30 and 31.

A bracket 582 (Fig. 29) for supporting magnet BPM is mounted on the outside of side frame 424. Cooperating with the magnet is an armature 583 which is fastened to a shaft 584 that is pivoted in frame 424 and carries on its inner end a clutch release stem 585. Wound around a collar between stem 585 and a detent 587 loosely pivoted on shaft 584 is a coil spring 586 which tends to swing the detent towards the stem at all times. The stem releases the driving part of a clutch and the detent holds the driven part of the clutch.

Referring to Fig. 30, the cam clutch arrangement comprises a cam 589 attached to a sleeve 590 journalled on two bearings bath of which are carried loosely on the continually running shaft 515 which extends into frame 424. A shouldered collar 591 is pinned to and thereby driven with shaft 515. A coil clamping spring 592 encircles both the collar 591 and the sleeve 590. The right end of the spring, as seen in Fig. 31 engages a recess 593 formed in a collar 594 encircling the spring, said collar being provided with a pair of latching teeth 595 disposed for engagement with the stem 585. A similar pair of latching teeth 596 is provided on the cam 589 but disposed oppositely for detenting action with the detent 587. A clamp 597 is tightened around the left end of spring 592 to fasten it to the right end of the sleeve 590.

When both detent and stem are engaged, the condition attending detent latching is a partial overthrow which causes the coil to expand accordingly and thereby free itself from the periphery of the cooperating collar 591.

The bill positioning magnet BPM is energized to trip the clutch for a half turn of cam 589 to stop the bill and later energized a second time to again trip the clutch to bring cam 589 around back to the home position whereby the bill is released to advance around the platen P. When the magnet is energized, the armature 583 is rocked counterclockwise, stem 585 is disengaged and the tension of the spring 592 causes a contraction thereof, causing a gripping action between the spring and the collar 591. The motion from the collar is then imparted by means of the spring to the cam 589 which operates an arm 598 extending down into the carriage to operate the pressure rollers and gate.

Arm 598 carries on its upper end a roller 599 which is pressed to the right against cam 589. At the lower end, arm 598 is attached to a shaft 600 which also carries affixed thereon a series of arms 601 with studs 602 for rocking down arms 603 to lower the pressure rollers 430 pivoted thereon out of action. Springs 604 tend to hold the rollers in action and arm 598 in operation. Also fixed to shaft 600 is an arm 605 with a pin 606 for operating the gate controlling crank comprising a shaft 607 with an arm 608 pressing against pin 606 and a connected pair of arms 609 which carry pivoted at 610 on the end, the gate 563 which is rocked by a spring 611 against an adjustable stop screw 612. The crank comprising arms 608 and 609 is prevented from rocking too far clockwise under the urging of a spring 614 by means of an adjustable stop screw 615 on a third arm 616 fixed to shaft 607, said screw 615 abutting against a tab 617 on a part 618 spanning shaft 607 and an upper shaft 619.

In review it may be noted in Fig. 29 that when magnet BPM is first energized, the clutch is engaged to turn cam 589 for 180° and it thereby rocks arm 598 to the left and depresses arms 601 and 605. The one arm lowers the pressure rollers 430 while the other arm allows the gate 563 to rise to an effective bill stopping position. A second energization of the magnet causes a return clockwise movement of arm 598 and consequent lowering of the gate and reengagement of the pressure rollers since it is then time to advance the bill around the platen.

Leaf springs 621 are provided to press under arms 603 to cause a quick return of rollers 430 to feed position upon the release of operating arm 598 for clockwise movement.

When the tape controlled carriage is set up for continuous form feeding independently of the bill feed unit, then the rollers 430 are normally held disengaged from the platen by means of a series of cams 622 on shaft 619, the shaft being manually positioned by a lever, not shown, attached to said shaft.

The parts below paper table 431 are in the tabulator and remain there when the bill feed unit is removed.

Bill card spacing at the platen

Once the bill card is on the platen P (Fig. 29) and held thereon by pressure rollers 430 and smaller advanced pressure rollers 623, it then partakes of the line spacing, spacing skipping and ejection control movements of the platen as imparted by the tape controlled feed mechanism which is described hereinbefore under several headings starting with "Tape Control of Sheet Feed." It is believed sufficient to note here that any desired heading, item, body or total line on the bill or check form may be brought to the printing line automatically under control of the perforated feed control tape.

As the bill card is guided around the platen by rollers 430 and 623 it is guided still further by several small rollers 624 which are in adjustable holders 625 settable along the top of the platen to direct the leading card edge between guide plates 577 and 578.

The roller holder 625 is provided with trunnions 626 (Fig. 27) fitting into one of several pairs of side holes in a sleeve 627 which is slidable laterally along the length of the platen and under the cross member 427. Sleeve 627 is guided along under member 427 by a notched extension engaging under one wall of the member. An upstanding rearward extension 628 of sleeve 627 is notched to engage a manipulative means comprising a pair of articulated toggle arms 629 and 630 which can be folded to clamp on an angle 631 fastened to the side of member 427.

Continuation of the belt feed

When advanced beyond rollers 624 and the platen, the card is engaged between feed rollers 557 and 558 which direct it further upward and to the right into the bight between rollers 548 and belts B, whereupon the belts take over to carry the card for the remainder of the travel to the stacker.

It is noted hereinbefore how the bill card is stopped at the sensing station S and held also at the positioning point just short of the platen. Now it is to be considered how the card is advanced to, but stopped at, the piercing station (Fig. 51) shortly after going to the right of rolls 548 and 549. Rollers 549 are mounted at a position just over the point where belt B is diverted downward around roller 565. Therefore, when the bill card is advanced against a stop 633 it is almost entirely free of the belt drive and there is only a slight urging of it against stop 633 by roller 549 and belts B stroking at the trailing end, so that after a card is brought to the piercing position it is allowed to remain immovable during piercing before it is engaged by a feed pawl 638 which is shifted forward into contact therewith to push it toward the exit of the piercing station.

In Fig. 51 it is seen that the stop 633 is one of several such members fastened to a shaft 634 loosely pivoted in the side frames and urged into the stopping position by a spring 635. One of the stops is formed with a downwardly extending hook 636 in cooperation with the end of a stop retraction lever 639 which is pivoted at 640 and formed with an armature piece 641 directly under the stop retracting magnet SRM.

After piercing has been effected, magnet SRM is energized and it causes lever 639 to rock clockwise about pivot 640 and press down on hook 636 to rock shaft 634 counterclockwise and lower all stop abutments 633 to open the path for bill card advancement.

Shortly after the stops 633 are removed, the rear end of the card is engaged by feed pawl 638 which pushes it to the right and into engagement with feed roller 550 and belts B which carry it further into the machine. The feed pawl 638 is mounted as a slide and has a notch with which is articulated the stud 643 on the lower end of an operating lever 644 pivoted on shaft 645. At the top end of lever 644 there is a roller which cooperates with a cam 646 that is rotated for each piercing cycle and formed with a raised portion to rock the lever counterclockwise late in each cycle and thereby operate pawl 638.

After leaving the piercing station (Fig. 27) the bill card is carried over to the right and under feed roller 567 where it is deflected upward by a card guide 647 to the ironing station IR.

As explained hereinbefore with reference to Fig. 26, the pairs of ironing roller shafts 479 and 480 are geared together and driven by a gear 472 to rotate continuously in a direction (Fig. 27) to elevate a card caught between feed roller pairs 649 and 650 on shafts 479 and 480. As the card passes pressure is exerted thereon by rollers 649, 650 and the extending flaps or chads of the pierced card index points are ironed back into the planes of the card faces to make them substantially level and flat. As shown in Fig. 5, there is a condition after piercing wherein the small pierced flaps 651 extend almost at right angles to the surface of the card. As the card passes through the ironing rollers the flaps are pressed or ironed back into the holes they left behind when pierced. Then the card presents a smooth unmarred appearance as in Figs. 7 and 8, and yet points of weakness are at all pierced points and are later susceptible to sensing and regular punching when appearance no longer matters.

While being elevated above the top ironing rollers 650 (Fig. 27) the card encounters a deflector 652 which directs it between the belts B and large feed rollers 570. Then the card is carried to the left between the belts B and the long card table 562, there being spaced sets of rollers 551, 552 and 553 cooperating with the belts to conduct the card all the way over into the stacker ST.

*The stacker*

Referring to Figs. 9, 10 and 25–27 there is shown a stacker plate 654 carried by a pair of arms 655 disposed on either end thereof. In Fig. 10, the front arm 655 is shown attached to a fulcrum member 656 carried on a stud shaft 657 conveniently attached to the side frames. A sector member 658 also encircles said shaft 657 and is attached to said member 656. The sector 658, in turn, meshes with another sector 659 attached to a shaft 660 journalled in the side frames and having an arrangement on the opposite end duplicating that just explained. A gear 661 is also attached to said shaft 660 and meshes with an idler 662, in turn meshed with another gear 663 which is free on shaft 657 but fastened to a bail arm 664, the opposite end of said arm 664 being attached to a bail 665. It may be appreciated from Figs. 9 and 25 that the elements described are duplicated on the other end of the bill feed. The bail 665 acts as counterbalance which is applied through the gear train described against the weight of the stacker. For every card entered upon the stacker plate there is a corresponding change in the positions of the stacker plate 654 and balance bail 665.

There is also provided an adjustment for maintaining the proper balance between said balance bail and stacker for every type of bill that may be processed through the bill feed. This adjustment (Fig. 10) comprises a tension spring 666 attached on one end to a rod 461 secured to the frame of the machine and the other end is attached to a stud carried on a block 667 which is adjustably disposed and fastened in a slot formed in the arm member 656.

The several preceding sections of this specification deal with the advance of the bill card from the magazine to the stacker. During such an advance the card is stopped twice, first at the sensing station S (Fig. 27) and second at the piercing station PC. Now it is proposed to set forth in detail the mechanism and controls for sensing and piercing the card.

*The bill card sensing devices*

When a bill card is brought forward out of the magazine M and held at rest against the stop 535 (Fig. 27) it is in position to be sensed and at that time all of the perforated index point positions of the bill are over the upper ends of a series of groups of wires 671 (Fig. 40). In Fig. 40 the sensing wires appear as only twelve spaced vertical wires, one for each of the usual twelve columnar index points of the IBM card perforating code. However, when viewed perspectively or from the end as seen in Figs. 35–39 and 43, it is apparent that several wires 671 are assembled side by side as one set or group for each card index point. The upper ends of a set of wires 671 (Fig. 37) are directly under a related card perforation position and they are arranged in a line across the narrow width of the rectangular perforation. Usually alignment is good enough so that all wires of a set protrude through a perforation; however, sensing by fewer wires is sufficient. Should any other size, kind, or shape of index point card treatment be used, the wire set would be equally effective in sensing because upward movement through the card by any one wire of a set is just as effective as displacement of all.

There is provided a slotted vertical holder 672 (Fig. 43) for the wire sets of each row. Across each holder there is arranged a series of vertically aligned columnar openings 673 for receiving all the sensing wires 671 which cooperate with one digital row of card index points. The horizontal spacing of the openings 673 corresponds to the columnar spacing of the perforation columns of the card. Three vertically aligned and spaced openings 673 are provided for each set of sensing wires 671 which are threaded through the openings as shown in Figs. 35–39 so that they are flexed and, in tending to straighten, they bear against the walls of the holder 672 and are frictionally and flexibly held thereon.

Figure 43:
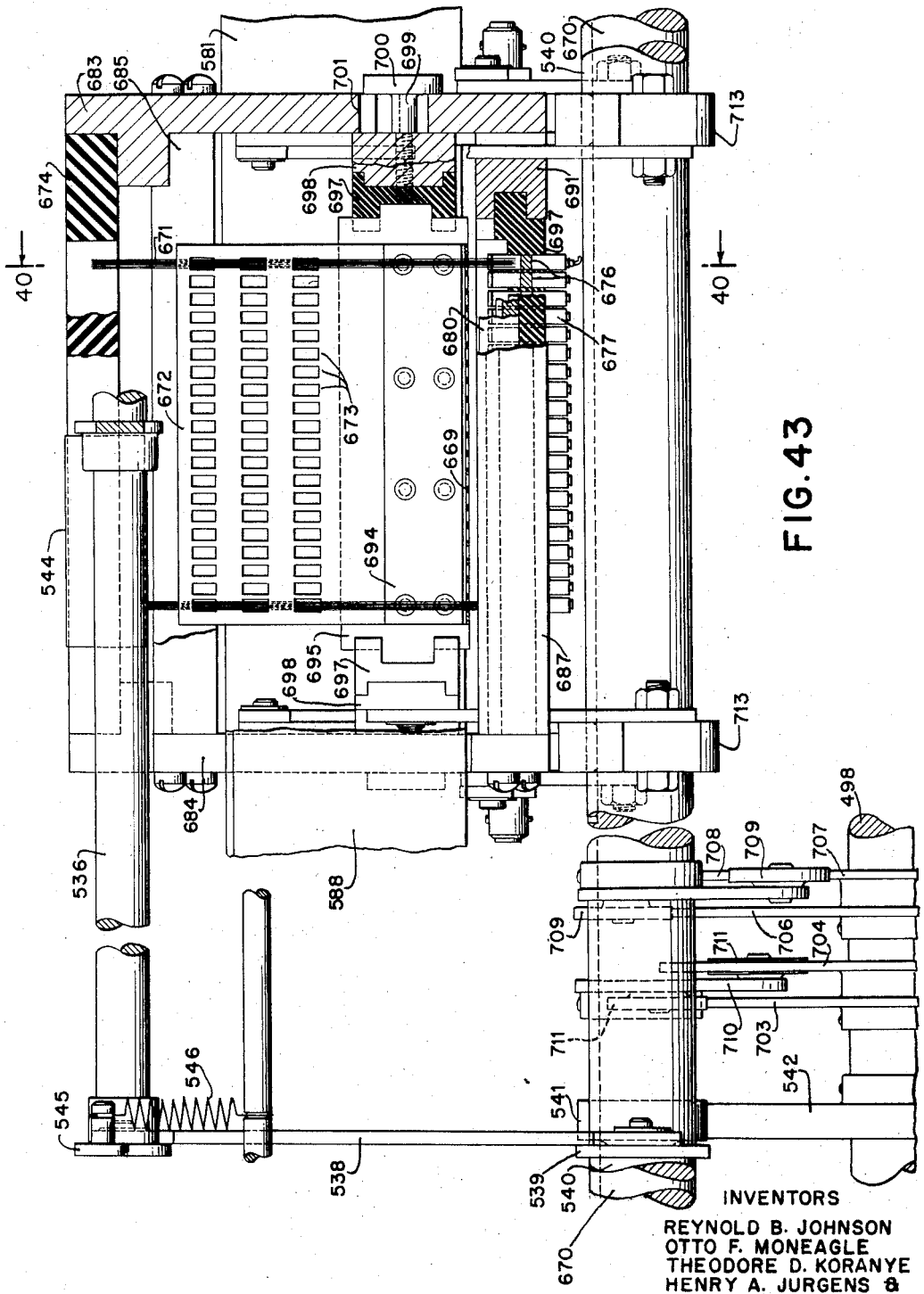
Fig. 43 is an end elevation view partly in section showing the sensing wires and associated current conducting devices of the sensing unit in the bill feeding devices.

The sets of wires 671 are supported in the vertical position and frictionally held perpendicular to the horizontal card sensing channel or slot which is between the notched upper guide bar 534 (Fig. 40) and the slotted lower channel bed plate 674. The vertical slots in plate 674 serve to confine and guide the upper ends of the wire sets to the index point positions. When the bill card BC appears horizontally between bars 534 and 674, its front end abuts against stop 535 (Fig. 27) and it is held there momentarily for static sensing by the wires. After the wire holders are lowered, the card is free to be advanced because the analysis thereof is stored in the setting of the wires on the holders. As illustrated in Fig. 43 only twenty orders or columns are shown as sufficient for group number or account number comparisons, but the same construction is applicable for the full width of the card.

Figs. 40 and 43 show the parts in the last quarter of an operating cycle when a card is about to be sensed, but Fig. 41 is with the parts in a normal position.

The card perforations are sensed by lifting all sets of wires and abutting the upper ends against the lower face of the card. At all imperforate index points the wire ends are obstructed and shifted downward with respect to the other wire sets which are permitted to rise vertically unobstructed through the card perforations and maintain a high position on the holder. After the holders are lowered with the displaced wires, the holders are shifted horizontally as illustrated in dotted lines, Fig. 37, whereupon the bottom portions of those wires with raised ends are brought against a top shoulder 675 on a denominational contact bar 676 for completing electrical connections for a card sensing circuit between the wire holder 672 and the bar 676 which has pluggable outlets 677 (Fig. 40) for use as described hereinafter in connection with the wiring diagram. In the case of those wires 671 which were not permitted to rise through card perforations, they are forced downward relative to the rising holder 672 and then later, when the holder is lowered, such wires have their lower ends so positioned and depressed as to fit into a notch 679 of a fixed digital retainer bar 680 and be prevented (Fig. 39) from going to the right when holder 672 is so shifted, and thereby fail to touch bar 676. Accordingly, no circuit is established by depressed wires, which is as it should be, because they represent imperforate card positions. Figs. 35, 36 and 37 show successively the raising, lowering and horizontal shifting of a set of wires in sensing a perforation to establish a circuit. Figs. 38 and 39 show the wire positioning attending the abutment of a card imperforate position and holding of the lower wire ends to prevent contact closure with a resulting lack of circuit connections.

The framework of the sensing unit is shown quite well in the views Fig. 40 and Fig. 43 which appear as sectional views. The main portion of the sensing mechanism is supported between two main cross bars 581 and 588 which extend across the machine between two main side frames. A pair of sensing unit side frames 683 and 684 are shaped to be keyed on to the cross bars 581 and 588 and affixed thereto in a selected position to underlie a predetermined field of the card when it is in the sensing position. The sensing unit side frames are spaced apart by a series of cross bars 685–688 which extend across the unit near or at the four corners thereof. The upper inside portions of the side frames 683 and 684 are formed with shoulders to receive the insulation plate 674 which is mentioned hereinbefore as the part which is slotted to guide the upper ends of the sensing wires 671. Fastened across the lower part of the sensing unit is an insulation base or contact bar holder formed with an interior insulation plate 692 (Fig. 43) and a pair of outer U-shaped rails 691 which are fastened to the side frames 693 and 694 to hold the contact and retaining bars 676 and 680 suspended in such positions as to cooperate with the lower ends of the sensing wires. The way that the contact and retaining bars are embedded in and separated from each other in the insulation 692 is best shown in the sectional views.

From the foregoing, it may be observed that the outer frame of the sensing unit is a sort of immovable boxlike structure with the top portion giving guidance to the upper ends of the sensing wires for cooperation with a card and the lower portion having pluggable contact bars with which the lower wire ends cooperate to selectively establish conact when related perforations are sensed. Within this outer immovable frame is an inner oscillating and reciprocating structure for carrying the sensing wires and for giving them the vertical sensing movement and horizontal contact establishing movement referred to hereinbefore. Attention may now be directed to this inner movable framework for holding the wire holders.

Figure 42:
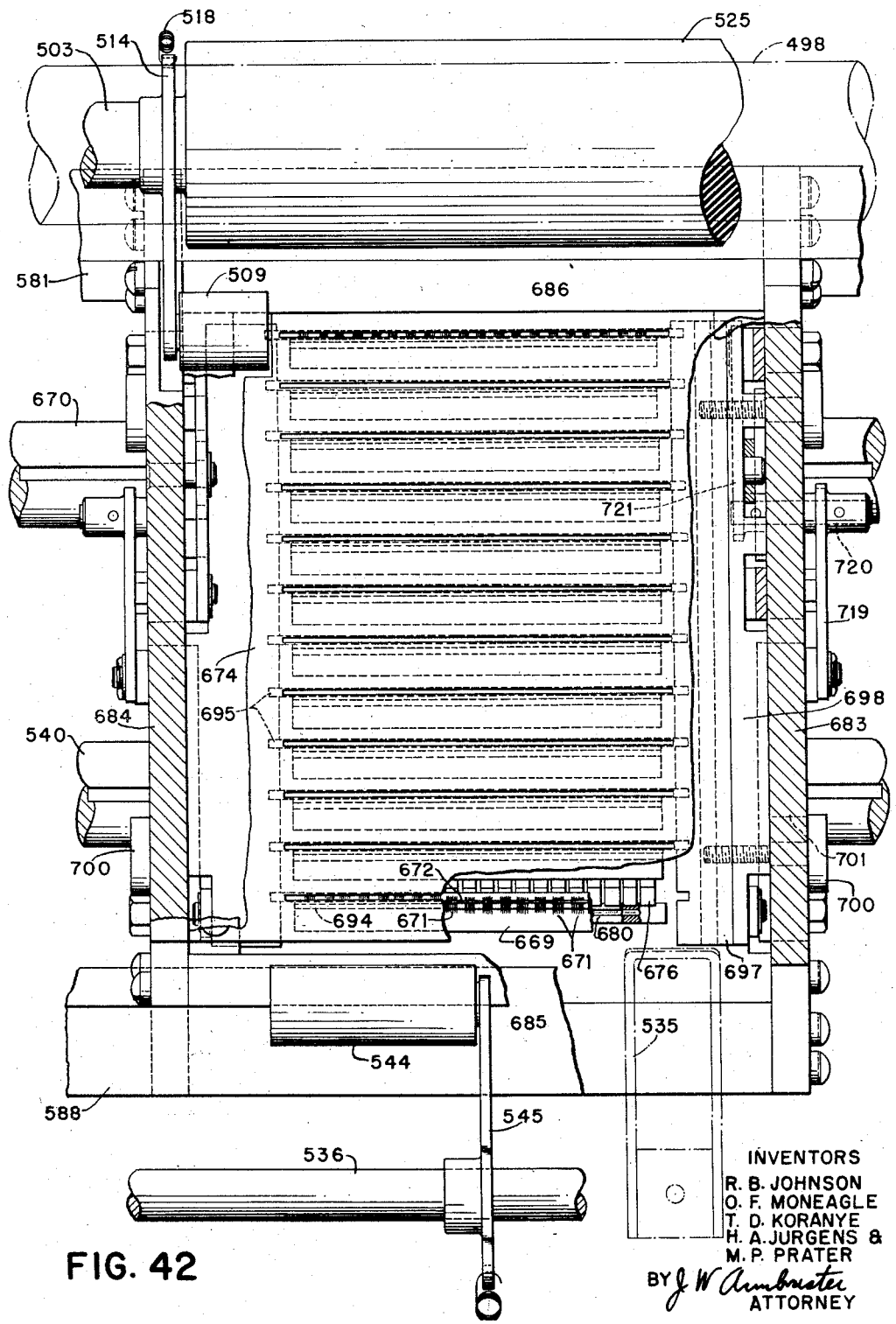
Fig. 42 is a plan view of the sensing mechanism in the bill feeding devices.

Referring to Figs. 42 and 43 it is noted that the twelve thin plates or wire holders 672 are provided with sheets of insulation 694 and 695 which are also shown in Fig. 40 as riveted on oppositive sides of the plate 672 for purposes of insulating the wire holder from the frame of the machine. The lower end of the wire holder 672 is formed with a flange 669 which not only strengthens the holder but also provides openings for guiding and confining the lower ends of the sensing wires 671.

Turning back to Figs. 42 and 43, it is noted that the insulation sheet 695 extends beyond both sides of the wire holder and it is by means of these extending insulation ends that the several wire holders are secured to insulation bars 697 which are in turn secured to side rails 698 confined by the inner faces of the sensing unit side frames 683 and 684. The inwardly facing sides of insulation bars 697 are formed with notches and a centralized horizontal slot for receiving and confiining the ends of the insulation plate 695 and in this way the bar not only separates the sensing mechanism electrically from the metallic framework of the machine but it also spaces the wire holders regularly to cooperate with regularly spaced digital perforation positions of the bill card BC. The side rails 698 and all the parts contained therebetween including the insulation bars 697 and the several wire holders 672 and all the parts thereon form a unit which is reciprocated vertically and horizontally between the sensing unit side frames. In order to guide this interior movable frame it is provided on each side with a pair of extending studs 699 which are formed with inwardly projected threaded portions for fastening together the side rails 698 and the insulation bar 697, and extending therefrom is a shouldered portion which is slightly larger than the thickness of the sensing unit side frames. On the outside of the side frames, each stud 699 is formed with an enlarged head 700 which confines the movable frame for reciprocation within the side frames.

Reference to Fig. 41 reveals that shouldered portions of the four studs 699 project through T-shaped slots 701 formed in pairs in the two side frames for limiting and guiding the movement of the inner frame for the vertical and horizontal movements mentioned hereinbefore.

Linkages are attached to the side rails 698 (Fig. 43) and it is through positive main and return cams 703, 704 and 706, 707 on driving shaft 498 that the sensing unit frame is reciprocated horizontally and vertically by means about to be described.

For the purpose of imparting vertical movement there is provided a bell crank 708 (Figs. 41 and 43) keyed to shaft 540 and carrying two cam follower rollers 709 resting on cams 706 and 707, said cams operating the shaft 540 clockwise (Fig. 41) and then counterclockwise for each sensing operation in order to lift and lower the sensing wires as illustrated in Figs. 36 and 37. Shortly thereafter, the sensing unit is given a horizontal movement as illustrated by the dotted line position in Fig. 37 and that movement is caused by the rocking of a bell crank 710 (Fig. 41) keyed to shaft 670 and carrying a pair of cam follower rollers 711 resting on the periphery of cams 703 and 704 (Fig. 43), said cams rocking shaft 670 first clockwise to straighten the sensing wires for the vertical lift and then counterclockwise to make contact and hold in position (while twelve spaced pulses are sent differentially through different shifted wires) before the sensing frame is again brought to the other horizontal position. As part of the initial cyclic motion, the frame is lowered slightly by the vertical parts controlled by cams 707 and 708, to depress the pins 699 in the lower lobe of the T slot 701 as shown in Fig. 41, and this serves to realign the sensing wires 671 by pushing their lower ends against a common bottom plane.

Keyed onto shaft 540 (Figs. 41 and 43) are two operating levers 713 which are spaced apart to coincide with the sides of the movable sensing frame and form an operating bail to adjust it vertically. A somewhat similar pair of levers 714 (Fig. 41) are keyed on shaft 670 and articulated to paired linkages to act as a bail to shift the sensing unit frame horizontally.

Referring to Fig. 41, the side rail 698 is connected by means of a stud 716 to a link 717 loosely attached to the lever 713 keyed to shaft 540. The right end of said lever 713 connects to a link 718 in turn connected to an arm 719 affixed to a short shaft 720 which passes through frame 683 (Fig. 42) and is loosely pivoted therein and carries on the inside, another arm 721. The opposite end of said arm 721 carries by means of a stud 722 (Fig. 41) another link 723 further attached by means of a stud 724 to the right end of the rail 698. The parts of the foregoing description are duplicated with respect to the construction and operation of the other rail 698 carried on the opposite side of the unit. The rails are further adapted to be held in a slideable relationship with the side frames by means of the flanged pin extensions 700, the tenon portions of which pass through the openings 701 provided in the side frames and are held into threaded engagement with their associated rails 698 (Fig. 43) and the insulation carrier channel members 697.

The rails are guided for horizontal reciprocation by means of the following arrangement shown in Fig. 41. Here there is shown a pin 726 attached to the right rail 698 and confined for horizontal movement in a slot 727 provided in a T-shaped arm 728 pivoting on a stud 729 extending inward from frame 683. The two upper ends of the T-shaped member are appropriately connected to the upper ends of a pair of vertical links 730 and 731 both in turn connected to an arm 714 keyed to the shaft 670 journalled in the side frames of the bill feed. The foregoing is also duplicated with respect to parts for shifting the opposite rail 698.

Because of the double cam actuators 703, 704 and 706, 707 (Fig. 43), both sensing unit operating linkages for horizontal and vertical movement are positively driven in both directions, forward and back.

Referring to Fig. 41, the timing relationship between the shafts 540 and 670 is such that when shaft 540 is displaced angularly to raise the sensing unit, shaft 670 is accordingly stationary in order that the T member 728 may accurately guide the rails vertically by means of the pin and slot arrangement 726, 727. The shaft 670 becomes operative thereafter to shift the rails 698 to the right by means of the T members which are now displaced counterclockwise.

The purpose of the foregoing arrangement may be appreciated by referring back to Figs. 35, 36 and 37. In Fig. 35, for example, the sensing wires 671 are shown in the retracted inactive positions with respect to members 680 and 676, the latter being used for readout pulses when touched. On the right, Fig. 37, the sensing wires (dotted lines) are shown in touching operative positions with respect to members 680 and 676.

In Figs. 35–39 there is shown a card BC presented to the sensing wires for a search thereof to determine the presence or absence of holes. It will be recalled that the wires are held by friction in the carrier plate and when an upward shift thereof is made in the manner described, the wires are adjusted accordingly, that is, those for which no holes are presented are shifted relative to the carrier and to those which find holes. After the set up operation, the carriers are shifted downwardly far enough to where the bottoms of the displaced sensing wires 671 (Fig. 39) move below the top of the vertical abutment 733 along one edge of bar 680. Immediately thereafter the carriers are shifted to the right thereby bringing some unshifted wires into contact with bar 676, but the wires displaced by lack of a card hole are locked to the left by abutment 733 and do not make contact with 676. After all digital pulses are sent through contacting wires, the carriers are shifted horizontally to move the wires away from bar 676, and then the carriers are depressed vertically a slight amount to realign the sensing wires and prepare them for another upward excursion to sense card perforations.

The timing of the bill sensing devices may be studied by reference to the cams on shaft 493 as shown in Fig. 41. Since the reading of a bill card by the shifted wires is in a sense stored therein, after such wire sensing has been made and the wires lowered, the bill card is then free to be advanced further into the bill handling unit. Therefore, while digital pulses are being directed through the contacting wires, the related bill card is advanced and the next bill card is brought into the sensing unit. Late in each bill handling cycle the picker clutch magnet PCM (Fig. 28) is pulsed and the clutch is effective to operate the picker drive to start a bill card advancing from the magazine M to the sensing unit. At about the mid point of a cycle, the cam 542 (Fig. 41) allows the closing of the gate 535 to stop the incoming bill card in the sensing position and hold it there for about one quarter of a cycle during which time the sensing wires are raised and lowered. Directly thereafter the gate is lowered and the card is permitted to feed out of the sensing unit. During the third quarter of the cycle the cams 703 and 704 are effective to shift the sensing frame 698 so that the wires therein are straightened vertically and not pressed against the sensing bar 676 as shown in Fig. 37. It is at this time that the other cams 706 and 707 (Fig. 41) first lower the sensing frame to line up all the sensing wires 671 (Fig. 35) by abutting them against the bottom of groove 679. Then the frame is raised to lift all the wires and project some of them through bill card perforations wherever found. Shortly thereafter the frame is again lowered partway (Fig. 37) to the position wherein the frame is ready to be shifted to the right to bring some of the wire ends against contact bar 676 as shown in dotted lines, and that horizontal shift is brought about by the final dip in cam 703 and rise on cam 704 which control the horizontal shift of the sensing frame.

The cranks on shafts 540 and 670 (Fig. 41) are all keyed thereon to be operative in all axial positions. This adapts the sensing unit to be adjusted laterally across the bill feed unit so that the twenty positions or columns of sensing wires may be placed where desired with respect to main and stub fields of bill card sections to read out predetermined data.

When the larger size ledger cards LC (Fig. 3) are handled there is no difference in the mode of stopping and sensing the element. However, the tail end of a large card or sheet trails behind the sensing station and out of the range of control. At the piercing station the same relationship exists, with the forward edge of the ledger card stopped by a positive member and the rear end frictionally engaged for feeding at the proper time.

*The bill piercing unit*

After a bill card BC is sensed and printed upon at the sensing station S (Fig. 27) and platen P, it is advanced into the piercing station PC wherein it is pierced with digital and alphabetic indicia representative of data such as an account number, gross and net totals, etc., as shown diagrammatically in the example of Fig. 2. The piercing unit has a storage feature whereby settings of sets or fields of interposer wires are held over a period, and full operation of piercing all fields is carried on later in one stroke.

The piercing operation involves the cutting of a small chadless flap or incision of the card stock at selected index points. These chadless holes are later sensed in another machine and converted into regular rectangular perforations at the same positions or in different fields or in different cards. There are many advantages to using the pierced form of hole rather than direct punching of rectangular perforations in the present instance. Among such advantages are the lightness of construction in using thin piercing wires rather than the heavier stiff punches on the overhanging bill feed unit. Then there is also the element of economical construction because the wires do not require close fitting die openings but pierce into wide channel grooves which are cheap to form. An improved appearance is also a factor because the cut flaps are ironed back in place to be imperceptible when handled by customers.

The interior parts of the piercing unit are best shown in Figs. 44–53, while Fig. 27 is the best showing of how the unit PC is assembled above the card stop at the station between feed rollers 549 and 550. On Fig. 28 is shown the pierce setup clutch controlled by magnet PS for determining when shaft 739 is to be operated for moving slides and bails to set the interposer wires of the pierce unit. The other side of the operating mechanism is shown in Fig. 26 where there is depicted the operating clutch controlled by magnet PO for operating shaft 740 which is used to lower and raise the piercing wires in the actual piercing operation.

The framework of the piercing unit PC (Fig. 27) is tied together to carry most of the piercing mechanism as a removable unit which is placed above the die plate 421 and slidably adjusted along the side rails 454 and 455 before being secured in place. The frame includes a pair of main cross bars 742 and 743 (Figs. 44 and 45) extending through the entire unit and carrying side pieces 744 (Fig. 45) for keying to the bars 454—455 at the left side and lower side pieces 745 (Fig. 51) for engaging with bars 454—455 at the right side. An upper side frame 746 at the right is extended to encircle shafts 739 and 740 and carry pinions which are keyed to the shafts in all positions, whether piercing a main bill field, either stub field, or all parts of a bill.

At the left side of the unit (Figs. 44, 52 and 53) ears 747 and 748 extend from bars 742 and 743 to carry a shaft 749 which is the support for arms operating to shift some twelve digit slides as explained hereinafter.

In order to support pairs of shafts 750 and 751 (Figs. 45 and 51) for use, respectively, as set up and pierce means, the end pieces 744 and 745 are provided with bushings.

The lateral and longitudinal cross section views, Figs. 45 and 53, are good showings of the interior construction of the pierce unit. Fig. 45 shows the twelve positions of piercing as they correspond to the usual twelve columnar index point positions of an IBM card. Fig. 53 shows the denominational or ordinal spacing of the piercing wires which is of eighty positions for a standard card but of less or greater number for bill and stub cards. Each position, Figs. 45 and 50, comprises a pair of vertical confining wall plates 752 welded to a series of fixed upper, middle and lower bars 753, 754 and 755 which are notched and slotted for vertical guidance of a pair of interposing and piercing wires 757 and 758. In each of the 12 x 80 grid like openings of the frame there is such a pair of wires. Reference to Fig. 53 reveals that both ends of the plates 752 and bars 753, 754, 755 are fastened in accurately spaced relationship on end plates 759 and 760 which complete the boxlike container of the wire guides.

Turning again to Figs. 45 and 50 to note the shapes of the wires, it is seen that interposer wire 757 extends above bars 753 and it is at this upper end where it is adjusted and selected. The bottom of wire 757 is bent horizontal and upward as a sort of coil 761 which nests on top of an angular bend 762 in the piercing wire 758. Below the bend 762 the piercing wire 758 extends down with a pointed end 763 being confined between plate 752 and a notch in bottom bar 755. Extending upward from bend 762, the wire 758 has another bend 764 which brings it alongside bar 754 and in a groove therein which guides it so that its upper end is alongside a fixed plate 765 fastened to bar 753 and extending below it. Alongside plate 765 is a shouldered bar 766 which is movable to push the pierce wire down but is normally stationary with the shoulder 767 aligned with the bottom of plate 765. The top part of pierce wire 758 is formed with a normal spring set or tension tending to snap it to the right (Fig. 45) so that as soon as it is pushed down, the upper wire end snaps under the shoulder 767 of bar 766 and ready for piercing.

Before going into detail about the operating and control mechanisms, it is believed advisable to explain with reference to Figs. 46–50 just how each interposer wire is selected and shoved down so that it in turn shoves down the pierce wire slightly to lock it under bar 766 as a sort of storage setting of piercing selection which selections may be done at different times and in different cycles before piercing is effected in one downward stroke of all bars 766.

Figure 48:
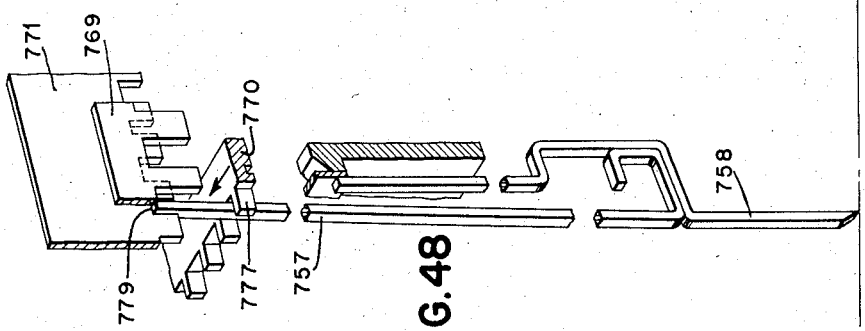
Fig. 48 is a further diagrammatic view showing the second motion imparted to the moved end of the settable wire when it is shifted by a digit slide operated at a time in the cycle agreeing with the time of operation of the column slide.
Figure 46:
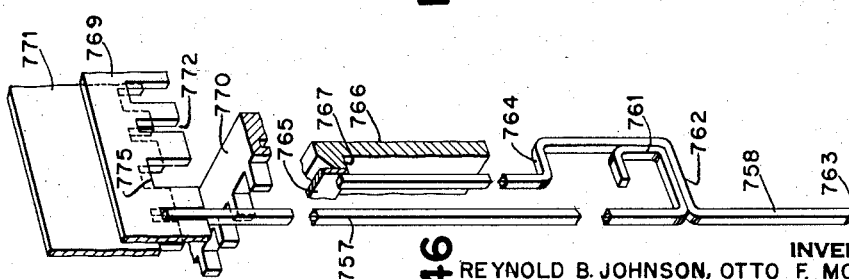
Fig. 46 is a diagrammatic view showing the piercing parts in the home position as associated with the upper end of a settable wire for adjusting a cooperating piercing wire.

Figs. 46-49 show successively the different positions of the top of the interposer wire 757 when it is selected, shifted and depressed to set or store the selection of the related piercing wire 758. Cooperating with the upper end of each interposer wire 757 are three slides; a column slide 769 which is denominational or ordinal as the name implies, a digit slide 770 of which there are twelve, one for each digital and zoning row of eighty wires, and a column depresisng bail slide 771 alongside each column of wire ends. In Fig. 46 the slides and wire end are shown in the normal position with the upper end of interposer wire 757 engaged by a notch 772 in column slide 769 but out of touch with the other two slides. The object of the slide arrangement is to place the wire end under bail slide 771 so that the wire 757 can be depressed. But the wire end does not leave the slide 769 unless the movement of slide 769 to the right (Fig. 47) corresponds with the timing of the particular digit slide 770 to the left (Fig. 48). Slide 769 is moved selectively and timed differentially by a pulse which comes from reading a card perforation or reading an accumulator wheel setting. Slide 770 is one of twelve which are operated invariably and successively in the order 9, 8, 7, 6, 5, 4, 3, 2, 1, 0, 11, 12. It is a matter of timing that causes one of the twelve wires of a column to be shifted to the right and then to the left. In other words, although all twelve wire ends of a column are shifted when slide 769 moves to the right as in Fig. 47, it is at such a time or instant just before a certain one of the digit slides 770 engages just one of the twelve ends to push it to an effective position. It is assumed in the illustration that the timing of the impulse and column slide movement is such as to correspond with the particular digit side time, i.e. a "4" pulse is operative and the slide 770 is the "4" digit slide.

When an impulse is directed into the pierce unit from a card reading or an accumulator total reading, it goes to one of the eighty or more columnar punch adjusting magnets PA (Fig. 50), the armature 773 of which has an extension fitting into a notch in the top of the related column slide 769. Upon energization of PA, the armature 773 is rocked to the right and slide 769 is so shifted with the slender slots 772 therein engaging the wire ends and the wider slots 775 acting as motion limiting stops in cooperation with the upper bent ends of plates 752. A spring 776 (Fig. 45) attached to armature 773 tends to rock it clockwise and restore column slide 769 back to the left after its momentary vibration to the right.

Turning back to Fig. 47 and consideration of the first movement of the upper end of interposer wire 757, it is noted to be toward the right as caused by the shift of column slide 769 due to the pulsing of pierce control magnet PA as just explained. As a result of the wire end movement to the right, the end is placed in the path of a tooth 777 extending from the digit slide 770.

Assuming that the timing of the movement of slide 769 is suited to the timing of the particular digit slide 770 shown; i.e., a shift of 769 at "4" and the slide 770 of Fig. 48 is the "4" slide, then the tooth 777 strikes the side of wire end 757 and pushes it as shown by the arrow to place the end in a slot 779 in the under side of the column depressing slide 771. Digit slide 770 is propelled by a compression spring 780 (Fig. 53) which is in a holder 781 fastened to the right end of the slide. As shown, spring 780 is under tension but is prevented from moving the slide because there is abutting the opposite end of the slide the tip of one of a series of twelve bell crank armatures 782 loosely pivoted on a rod 783 held between bail arms 784 fixed to shaft 749. Because of space limitations, the crank armatures 782 are placed alternately with raised and lowered vertical armature pieces 785 cooperating with two rows of digit slide control magnets DS arranged six in a row. The right ends of cranks 782 extend through slots in box plate 759 and are urged by springs 786 to stop in a normal position abutting the ends of respective digit slides 770. The slide release magnets DS are pulsed seriatim and at the appropriate digital time the near crank 782 is rocked clockwise to lower the right end and free the digit slide 770 for movement to the left as propelled by spring 780. Each holder 781 has a shoulder for closing related contacts 787 which may be connected in a checking circuit. All twelve slides 770 are restored together later in the cycle by oscillation of arms 784 as explained hereinafter.

In Fig. 50 it is seen that the tooth pitch of the teeth 777 on slides 770 is considerably wider than the size of the interposer wire 757. Because of this wide tolerance it is made feasible to energize the controlling magnets for both slides 769 and 770 by circuits employing a common circuit breaker as noted hereinafter with reference to the circuit diagram.

Returning to the showing in Fig. 48 it is now evident that once a digit slide 770 pushes an interposer wire 757 to the left and under depress slide 771, it holds it there until the end of the pierce setting entry part of the cycle for all twelve index points. The digit slide magnets DS are wired to an impulse source such as a digit emitter for timing differentially the twelve pulses to the respective slide release controls.

Figure 49:
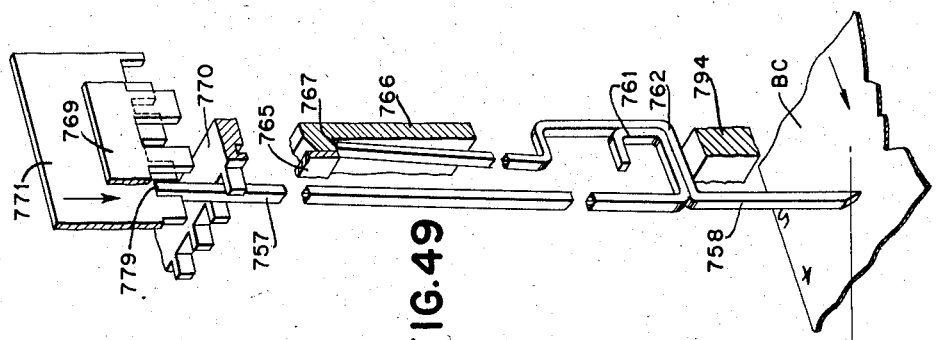
Fig. 49 is a still further diagrammatic view showing the third and final motion of depression of the upper end of the settable wire to cause the related piercing wire end to be depressed to a position under its operating means in readiness for piercing.

Fig. 49 illustrates what happens as the next step in the pierce storage action. After all wire settings are made by all slides 770 from 9–12, the columnar depressing slide 771 is lowered, and since certain selected wires 757 are in notches 779 and in the plane of the slide, they are pushed down. Such operated interposer wires 757 then impart their downward movement to the related piercing wire 758 because the bottom coil 761 of the interposer nests on top of and within the stop or angle 762 formed on the pierce wire 758. The extent of downward action is not far enough to cause wire 758 to pierce the card, but it is far enough to carry the upper end of pierce wire 758 below the shoulder 767 on bar 766 and then because of the clockwise tension or set tendency built into the top end of wire 758, it snaps in to the right under shoulder 767. Now the piercing wire 758 is set up for storage of data to be subsequently pierced. Since the bars 766 are not necessarily depressed directly thereafter, the setting may be held over for other cycles of entry during which other wires may be set up as explained with reference to Figs. 47–49 without disturbing those wires previously set by other interposers. In other words, the wires of the pierce unit may be set from different sources on different cycles and card piercing effected only when it is evident that all pertinent data is stored. For example, in the piercing of a bill card it may be desired to store the setting of an account number from a first card reading of a group and then store settings of progressive, gross and net totals of accumulators operated by amounts of the group before effecting the piercing of all related data in the bill card BC. Movement of the interposer wire is limited by a pair of stops 774 and 778 (Fig. 50) which project into the path of the tail on the coil 761 at the lower end.

With respect to Fig. 49 it can also be explained that piercing is finally effected by lowering bar 766 (of which there are twelve for all the rows of wires) so that shoulder 767 pushes down on the upper end of wire 758 to drive the bottom pointed end through the card BC in a sort of chisel cut which will shear on three sides and bend down a card index point flap or chad which is held on the card by the uncut fourth side. The card is supported by the base plate 421 (Fig. 50), which is formed with columnar grooves or channels 788 into which the pointed wire ends protrude with the flap portions which are later ironed back in place as explained hereinbefore. Bar 766 is lifted quickly to the normal posiiton to be ready to receive the next data settings.

As the first action to restore the piercing wire 758, the upper end of it is pushed out from under shoulder 767. This is done by an eccentric portion 789 (Fig. 50) or flat cut which is part of a rod 790 cooperating with all wires of one digital row. Fig. 51 shows that six such rods 790 extend through the right side and carry pinions 791 in mesh with a rack 792 which is oscillated at the proper time to operate the rod eccentrics. Fig. 53 reveals that the other six rods 790 extend to the left through box plate 759 and also carry pinions 791 operated by another rack 792.

While the upper ends of the piercing wires 758 (Fig. 50) are still pushed outward by the periphery of rods 790, the pairs of wires 757 and 758 are restored upward by bars 794 which underly the angle portions 762 on wire 758. When restored upward, the upper end of piercing wire 758 is again placed alongside the fixed plate 765 and the upper end of interposer wire 757 is again lifted to the normal position in slot 772. Bars 794 (Fig. 53) extend through the length of the unit and are attached to two end bail bars 795 (Fig. 52) carried on the bottoms of four cam follower links 796 with rollers cooperating with cams 797 on the pierce operating shafts 751. By a somewhat similar set of connections, the bars 766 (Fig. 50) extend across the unit and are attached to two end bail bars 797 (Fig. 52) carried on the tops of four cam follower links 798 with rollers cooperating with cams 799 on operating shafts 751.

As a sort of general summary of the operations attending interposer wire operation and piercing wire operation, it may be pointed out now with reference to Fig. 50 that the sequence of operations of parts 769, 770 and 771 contributes to storage operation, and that is followed in the same or another cycle by operations of parts 766, 790 and 794 for piercing and restoring operations. Before going into detail regarding the operation of these six punch unit controls it is believed well to first point out the general arrangement of the drive connections. There are provided two different clutches and trains of drive gearing, one for the parts actuating the interposer wire setup for storage and another for the cams operating the piercing and restoring parts. In Fig. 28 is shown the magnet PS and the clutch for driving shaft 739 which in Fig. 51 is seen to have gearing connections for driving the two shafts 750 that carry the cams for the initial controls of the interposer setting. In Fig. 26 is shown the magnet PO and the clutch for driving shaft 740 which in turn (Fig. 51) drives the two shafts 751 carrying the cams for the final operation of piercing and restoring.

It is already explained that the first operation of interposer wire setting (Fig. 47) is the shifting of the column slide 769 by a related magnet PA, Fig. 45. In Figs. 44 and 45 it is seen that these magnets PA are arranged in four lines of staggered units on top of an open frame 800 (Fig. 53) with spaced insulation bars 801 (Fig. 45) each having fixed thereon a series of U-shaped holders 802 containing a magnet PA. Behind each holder and electrically connected thereto are contact strips for a removable plug socket board 803. The armatures 773 of pierce control magnets PA depend in four different lines so that in any one line every fourth slide 769 has an upstanding lug with a notch for receiving the lower end of the armature. When a magnet PA is impulsed from a hole in a card or an accumulator total reading, etc., the related armature 773 is swung to the right and the connected slide 769 is pushed to the right with all twelve related interposer wire ends 758, one of which will be engaged by an active digit slide 770 to carry it at right angles to a selected position. A stop bar 807 cooperates with a wide cut out in the top of slides 769 to limit their movement to the right and back to normal position.

When a digit slide 770 becomes active and shifts to the left (Fig. 50) to move the upper end of interposer wire 757 out of notch 772 and at right angles to slide 769 to put it in an effective position, slide 770 stays so shifted until near the end of the piercing cycle. Then there is the problem of restoration which involves the placement of all wire ends back into the respective notches 772 in slides 769. This is accomplished with four successive short movements of the slides; first a short right movement of slide 770 to take the wire end away from the notch in the slide 771, second a short movement of slide 769 to the right to align notch 772 with the position of wire end 757 where its initial set or spring keeps it against slide 770, a third a further short movement to the right by slide 770 to place the wire end in notch 772, and fourth a retracted left movement of slide 769 to move the wire ends out of the path of tines or teeth 777 and back to normal position. The first and third restoring movements which are those of slides 770 are produced by a face cam 810 (Figs. 44 and 52) which cooperates with a follower roller 811 on the arm 784 (Fig. 53) which is part of the operating bail already noted as tripped for operation by successive operations of magnets DS. The second and fourth wire restoring movements are those of slides 769 (Fig. 45) and they are caused by a bail bar 804, the movements of which are now to be considered.

The wire restoring means includes the bail bar 804 which is common to all slides 769 and supported on a pair of bail arms 805 (Fig. 52) pivoted on shaft 751 and provided with cam follower rollers resting on cams 806 secured to the set up shaft 750. A spring is used to restore bail 804 (Fig. 45) but it is moved positively to the right by the cams 806 and all slides 769 are then positioned to align the slender notches therein with the interposer wire ends while they are reengaged. Finally, the bar 804 is drawn to the left and all slides 769 follow thereafter as urged by armature springs 776 to again be in the home position and dependent upon energization of magnets PA for initial operation.

Before going into detail regarding the operating cams for the various parts of the operating controls for the set up portion of the piercing operation, it is believed advisable to first point out the operating connections to and from the clutch on Fig. 28 controlled by magnet PS for initiating the preliminary operations of a card piercing cycle. It is explained hereinbefore that a drive shaft 423 has a gear 482 in mesh with an idler gear 484 which in turn drives a gear 485. The latter is rotatable on a stud 808 and carries a notched clutch disk 820 which cooperates with a selectively operated clutch pawl 821. This pawl is pivotally mounted near the end of one of a pair of extending arms on a driven member 822 secured to a gear 823. The piercing set up release magnet PS has an armature 824 associated therewith and it is the hooked end of the armature which holds pawl 821 retracted so that it is normally out of engagement with constantly revolving disk 820. However, upon energization of magnet PS, armature 824 is swung counterclockwise and to the left, releasing pawl 821 which then engages disk 820 and the clockwise motion of gear 485 is communicated to gear 823. In mesh with gear 823 is a pinion 825 fixed to one end of the shaft 739 which extends through the entire unit and not only serves as an adjustable support for the pierce unit but also provides the main drive to the set up operating shafts 750 shown in Fig. 51. Member 822 is double ended and swings through only 180° (Fig. 28) before being again engaged by armature 824 and pawl 821 is disengaged at that intermediate point by a secondary carrier lever 817 which is alongside member 822 and formed to disengage or engage the pawl as caught or released at the remote point.

Keyed onto shaft 739 (Fig. 51) is a gear 826 which is freely mounted in a bushing on the frame member 746. Gear 826 meshes with an idler pinion 827 which in turn drives the large central gear 828 pivoted on end frame stud 829. Gear 828 meshes with two side gears 830 each of which is fixed to the end of one of the pair of related set up control shafts 750 (Fig 44). Before going into detail about the control cams on shafts 750 it is believed best to take up the happenings in sequence attending a set up operation and they involve first the setting of the digit and column slides by magnets DS and PA.

It is noted hereinbefore with reference to Fig. 53 that as an incident to each piercing set up cycle the slides 770 are released by magnets DS seriatim. This is done invariably and the timing of the twevle magnets DS is in the regular sequence 9, 8 . . . 12, so that at each appropriate instant a particular digit slide 770 is moved. Concomitant therewith, but selective as to one particular instant is the action of a column slide 769 by a magnet PA (Fig. 50). This magnet is energized by the reading of a perforation in a card or from a reading of a total and the timing is in accord with the value of the data sensed. For example, if a "4" is sensed then the related magnet PA is energized to shift slide 769 at a time when the "4" slide 770 is also effective, and the result is that the "4" interposer wire 757 is the one of the twelve that has the upper end shifted over under the depressing bail slide 771. In the case of alphabetic representations there are two such timed movements and a double shift of wire ends to form a digit and zone code wire setting of two out of twelve for other than digit values. It is evident from the foregoing that the initial steps of a set up operation depend only on timed energization of magnets PS, DS and PA and they are independent of operation of cams on shafts 750 which function thereafter for other set up operations as about to be considered.

After the ends of selected wires 757 (Fig. 50) have been shifted over by slides 769 and 770 and placed under slides 771, it is required that all slides 771 be lowered at about the mid point of the cycle, in order to push down the selected wires 757 and cause the ends of wires 758 to snap under shoulders 767. Both ends of all column depressing slides 771 (Fig. 45) are seen to be affixed to end bars 832 which extend along both sides of the unit and are spring urged upwardly to the normal raised position. Pairs of hanger links 833 are on the bars and fixed thereto near the ends (Fig. 52) and encircle shafts 750 adjacent to four cams 813 (two of which are seen in the view and a similar pair are opposite thereto). Follower rollers on the bottom of the hangers 833 press upward against the periphery of the cams 813 so that when the bumps on the four cams strike the rollers, all four hangers and both bars 832 are lowered carrying slides 771 down and driving before them the selected wire ends to depress the interposer wires 757 and wires 758 as already explained.

Late in each set up cycle it is required that the slides 770 (Fig. 53) which have been tripped off the ends of the armature cranks 782 be restored and ready for another set up. This is done invariably after piercing time and irrespective of whether or not piercing occurs on that particular cycle.

It is already noted that each digit slide 770 is adapted to be controlled by an associated digit slide magnet assembly DS having a depending armature 782 shown latched against the digit slide. Because of space limitations some of the magnets DS are offset and their depending armatures are configured accordingly. Both sets of armatures 785 are carried on the shaft 783 supported by the pair of arms 784 secured to a shaft 749 journalled in the side frames. The arm 784 (Figs. 44 and 52) is provided with a roller 811 adapted for cooperating with a restoring cam 810, attached to the front one of the shafts 750 pivotally journalled in the side frames. Cam 810 is a face cam which is formed with a notch to allow springs to rock arms 784 counterclockwise after the mid point of the cycle and thus reengage the horizontal points of cranks 782 (Fig. 53) against the shifted ends of slides 770. The cam 810 is formed to shove the slides 770 partway back and then hesitate until slides 769 are placed with the wire receiving slits in position, and then the cam 810 pushes slides 770 back to normal position and at the same time restores the wire ends.

Thus, near the end of each set up cycle, the restoring cam 810 becomes effective to restore all digit slides 770 back to their normal positions. To appreciate this action and the purpose for having the wide tooth separation on the slide 770, reference is now directed to Fig. 50. Here it can be appreciated that the status of the wires 757 in any column, prior to restoration, is such that the wires which have been selected to effect a piercing set up are finally nested in the bail 771, the remaining unselected wires are returned to their initial positions within their related slide 769. Now then, in order to restore the selected wires, and to avoid any interference, the following action takes place. The restoring cam 810 shifts the slide 770 to the right just enough to displace the tine 777 to a midway position, meanwhile the selected wire engaged in the slide 771 has not been shifted because of the separation between the wire and its related tine. The next logical step is to shift by means to be described the column slide 769, thereby presenting the space 772 in the path of the selected wire. Finally, the restoring cam 810 completes its operation by fully restoring the slide 770 to the right thereby carrying the selected wire into the opening 772 and immediately thereafter the column slide 769 is shifted back to its original position carrying therewith the selected wire back to its initial unselected position. In the case of the unselected wires 757 it is obvious that the tine 777 must be shifted as described to the midway position before the slide 769 containing the unselected wires can be shifted, otherwise, if the slide 769 were shifted first, an interference would result between the tine 777 and the unselected wire.

For shifting the column slides 769 in the operation just described there is provided the following means. Referring to Figs. 45 and 52, there is shown a restoring bail 804 carried by a pair of arms such as 805 shown in Fig. 52. Each arm 805 is loosely pivoted on the near shaft 751 and each arm carries a roller disposed for cooperation with a related cam 806 forming part of the cam assembly attached to the shaft 750. Springs hold the bail rollers in constant contact with the cams. As best seen in Fig. 45, the restoring bail 804 is disposed to cooperate with the column slides 769 to shift the same back and forth to receive the selected wires near the end of the cycle.

Provision is also made for checking the status of the column slides 769 by the means of checking contacts generally identified at 835 (Fig. 45) and located on the armatures 773 of the column slide operating relay magnets PA. This contact 835 is designed to be used in a circuit including a similar contact operated by the associated printing control element of the tabulator. By this means it is possible to check between the tabulator contacts and the pierce unit contacts through circuits embracing both contacts to ensure that the data set up for printing is similarly set up for piercing.

Although piercing may be effected in any cycle along with the set up of data from any source, it usually occurs on a total reading and pierce set up cycle following the detection of a group change on the control cards in the tabulator section of the machine. Assuming that such a change is detected and that the machine is plugged to effect piercing under such conditions, then the first thing that happens is the energization of clutch magnet PO (Fig. 26) to make effective the pierce operating cam shafts.

Referring to Fig. 26 it may be noted that a magnet PO controls a clutch for connecting the main driving source to the cam shafts for operating the piercing mechanism. It is noted hereinbefore that the motor 467 has driving connections to a gear 471 to operate it constantly in a clockwise direction. Fastened to the gear 471 and freely rotatable on center 836 is a clutch disk 837 which is alongside a normally stationary clutch lever 838 which is also pivoted on 836. Lever 838 is double ended and on one side carries a pivotally mounted clutch pawl 839 which is crank shaped and has one arm caught under a hook on an armature lever 840 pivoted at 841. The upper end of the pawl 839 is formed with a tooth designed to engage in disk 837 and so urged by a spring but normally held disengaged by the armature 840. However, when the associated pierce operating magnet PO is energized the armature is attracted to the left and the pawl is released to swing clockwise and engage the constantly revolving disk. The carrier lever 838 swings through only 180° before being again engaged by the armature lever 840 and pawl 839 is disengaged at that intermediate point by a secondary carrier lever 842 which is alongside lever 838 and formed to act on the pawl as caught or released at the remote point to disengage or engage the pawl.

Attached to lever 838 and rotatable therewith is a gear 844 also pivoted loosely on center 836 and in mesh with a gear 845 fastened to the end of shaft 740. For each half revolution of gear 844, shaft 740 is rotated one full revolution in a counterclockwise direction.

Turning from Fig. 26 to Fig. 51 in order to explain the interior workings of the piercing operating controls, it is noted there that shaft 740 is of the same keyed construction and spacing as the other drive shaft 739 so that the unit frame 746 is adjustable thereon.

Rotatably assembled on frame 746 is a drive gear 847 keyed onto shaft 740 and in mesh with an idler gear 848 which drives a large gear 849 pivoted on center 829. Also in mesh with gear 849 are two gears 850 each of which is secured to one of the two piercing control shafts 751. Since gear 847 is rotated a revolution in a counter- clockwise direction for each pierce cycle, the proportions of the connections shown are designed to rotate the two shafts 751 one revolution in a clockwise direction for each piercing cycle.

Before going into detail regarding piercing, it may be pointed out with reference to Fig. 50 that piercing involves the sequential operation of three members to push the wires 758 through the card BC and then restore such wires. First the piercing bars 766 are lowered to push the wires down, then the rods 790 are twisted to swing out the wires from under shoulder 767, and finally the restoring bars 794 are lifted to raise and restore the wires 757 and 758.

Interposer wires 757 also have a lateral restoring action to bring the tops of the wires over into slots 772 as already explained, but it is the final longitudinal movement of such wires that is caused by the lifting of bars 794. When once lifted the wires remain raised due to the frictional contact with the guide walls which is provided by the pressure of the initial set or angle of the wires overcome in assembly.

The piercing action is effected in the following manner. Referring to Fig. 45, it may be seen that a series of these bars 766, twelve in all, are employed. In Fig. 53, it is noted that each bar 766 is connected to a pair of bails 797 and the manner in which these bails are reciprocated in unison may be explained from the construction shown in Figs. 45 and 52. Here we find each end of a bail 797 attached to an arm 798 provided with an elongated slot by virtue of which said arm is guided for vertical movement on a shaft 751. The arm carries a roller which cooperates with a cam 799 forming a part of a cam assembly pinned to the shaft 751. There are four such arms 798 and cams 799, two for each of the shafts 751, so that full support and concurrent action is imparted at all four corners of the bail structure.

In operation both bails 797 are vertically reciprocated in unison thereby causing the piercing bars 766 to press the piercing wires 758, engaged therewith, through the card. Although the bars 766 are raised immediately the full restoration of the wires is enforced positively thereafter by the action of restoring bars 794 as about to be considered.

The restoring of the piercing wires 758 and their related interposing or offsetting wires 757 is effected by restoring bars 794 of which there are twelve in all as may be appreciated in Fig. 45. In Fig. 53 it may be seen how each restoring bar 794 is connected to a pair of operating bails 795, the latter bails being reciprocated at the end of the piercing operation to restore the piercing and offsetting wires by the means now to be described.

Referring to Fig. 52, it may be seen that only the front connections to the two bails 795 are shown, the rear connection being exact duplications thereof.

The bail 795 is secured by means of rivets to a slotted arm 796 surrounding the shaft 751. The upper portion of said arm 796 carries a roller 819 cooperating with a cam 818 forming a part of the cam assembly of which the cam 799 is also a part. On the right hand side of Fig. 45 the other connections to the other side of bails 795 are seen to be similarly duplicated.

During the upward action of the restoring bails 794 the piercing wires are carried upward therewith and these wires in turn carry the offsetting wires to their normal positions as may be appreciated from Fig. 50 where the two wires are seen to be nested at 761 and 762.

There is also an attendant action which causes the piercing wires 758 to be disengaged from under the shoulders 767 of their respective piercing bars 766. This action is effected by means of the camming rods 790 of which twelve are employed as shown in Fig. 45. Each rod is milled with slots 789 (Fig. 50) which when parallel to the related wires permit engagement between the wires and the piercing bail. The rotation of the rods 790 accordingly causes a camming action which thereby disengages the wires from the bail. As noted with respect to Fig. 50, the slots in guide bars 754 provide the bearing surfaces for these camming rods 790. Referring to Fig. 53, each rod 790 has an end portion 793 in the form of a coupling provided with a spline by means of which a connection is established to a cooperating keyway forming a part of a pinion stud shaft 809 suitably journalled in members 759 and 760 suitably attached to the main frame structure. A pinion 791 is attached to each of said stud shafts 809 and engaged to one of a pair of racks 792 disposed for horizontal movement during the restoring action about to be described.

Because of space limitations, the twelve camming rods 790 have their drive connections staggered on either end, there being an additional rack 792 employed on the other end of the unit and similar to the one shown best in Fig. 51. Thus, every other rod 790 is driven from one or the other of the two racks 792. The free ends of the rods terminate at the inside face of the frame plates 759 and 760 shown in Fig. 53. The manner in which the racks are operated will now be described.

Referring to Fig. 51, the front rack 792 is formed with a pair of slots surrounding the shafts 751 and on which it is guided for reciprocation. The rack 792 carries a pair of rollers 816 both in cooperation with cams 815 on opposite shafts 751. At a time in the cycle just prior to the lifting of wires 758, cams 815 are effective through racks 792 and pinions 791 to twist rods 790 (Fig. 50) to swing notch faces 789 as cams to rock outward against wires 758 and push the upper ends thereof away from shoulder 767 until the wire end has passed the ledge.

Although emphasis throughout has been to a form of index point treatment defined as piercing and chadless point cutting, it will be realized that by forming the wire ends in different shapes as shown in Fig. 4a there will result different sizes, shapes and styles of holes, radiating ruptures, or restored chads. In addition to the generally square shape of the piercing wires 757 and 758 illustrated generally in Figs. 46–50, it will be realized by noting the round, pointed, triangular and rectangular wire shapes in Fig. 4a, that such wires and the index points resulting therefrom, pierced and ironed, are also effective in operating on a record element.

Referring to Fig. 51 there is shown supported on block 421 the means for stopping the bill card BC in the piercing unit. This means includes a card stop 633 attached by screws to a shaft 634 whose end portions, not shown, are suitably journalled in the side frames of the bill feed unit. A spring 635 is adapted to bias and thereby project the stop 633 into a card stopping position. The stop is provided with a latch portion 636 adapted for cooperation with an extended portion forming a part of an armature 639 suitably pivoted at 640 and disposed for cooperation with a controlling magnet assembly SRM suitably attached to the framework of the bill feed unit. Energization of said magnet SRM after piercing has been effected causes the stop 633 to be retracted below the card path over belts B thereby enabling free passage of the card BC into the feed rolls 550 and the cooperating belts B which carry it to the right and out of the piercing unit.

An adjusting screw 642 is provided on the armature for adjusting the position of the card stop 633 above the card line. The block 421 serves also as a die for the piercing wires of the piercing unit.

There is also provided a means for feeding the card out of the piercing unit after a piercing operation providing the card stop 633 is in a non-effective position. This feeding means comprises the card pusher 638 having a socket end portion removably encircling a stud 643 attached to the arm 644 carried freely on the shaft 645 suitably journalled in the side frames of the piercing unit. A roller is carried by the arm and is disposed for cooperation with a cam 646 attached to the shaft 739. The feed point of pusher 638 is sufficiently blunted to ride over the card and ride up against leaf spring 648 whenever the card is obstructed by stop 633 which remains effective during all set up cycles except one accompanied by a final piercing operation.

The wiring diagram

Figure 54A:
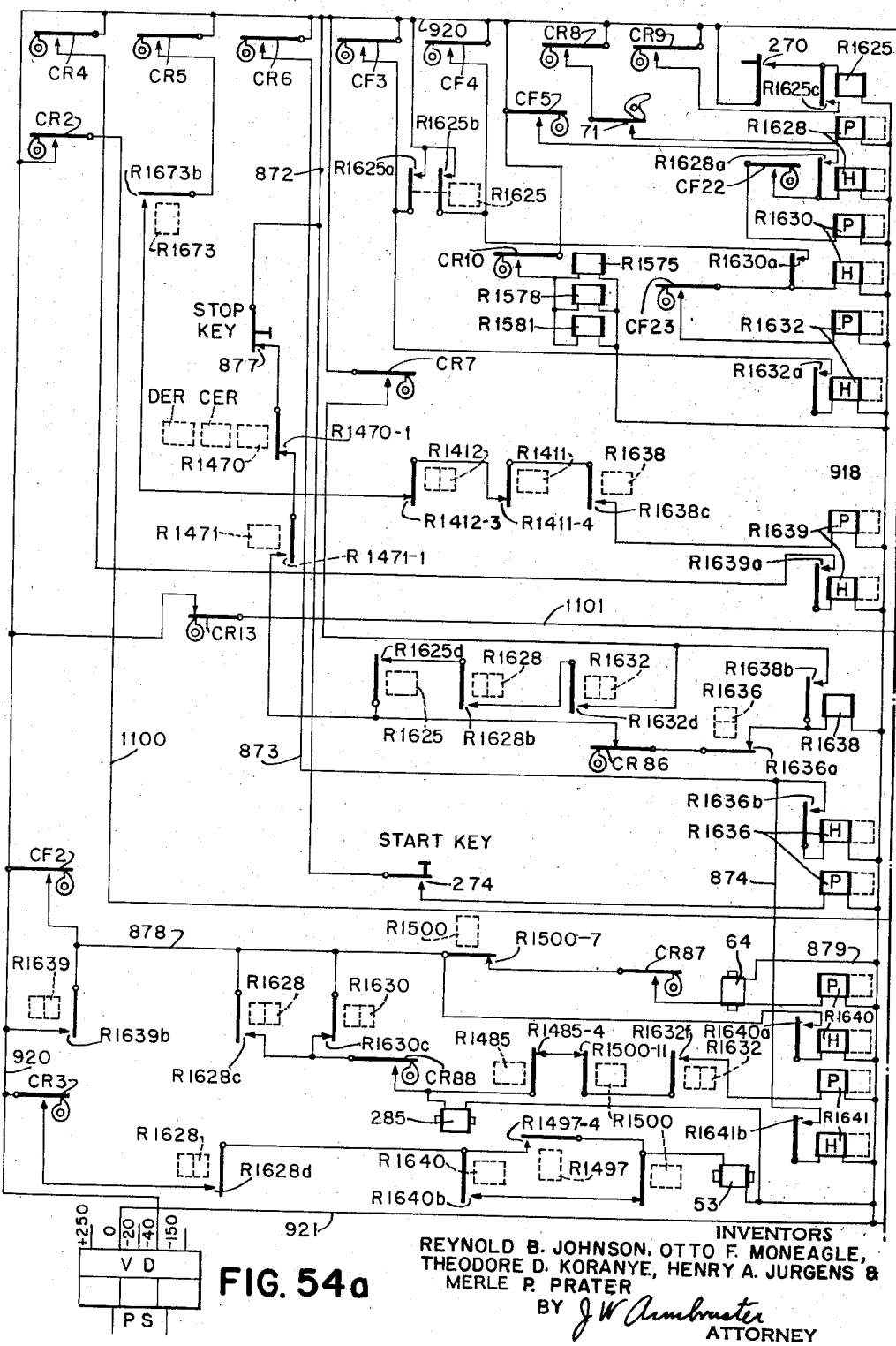
Figure 54B:
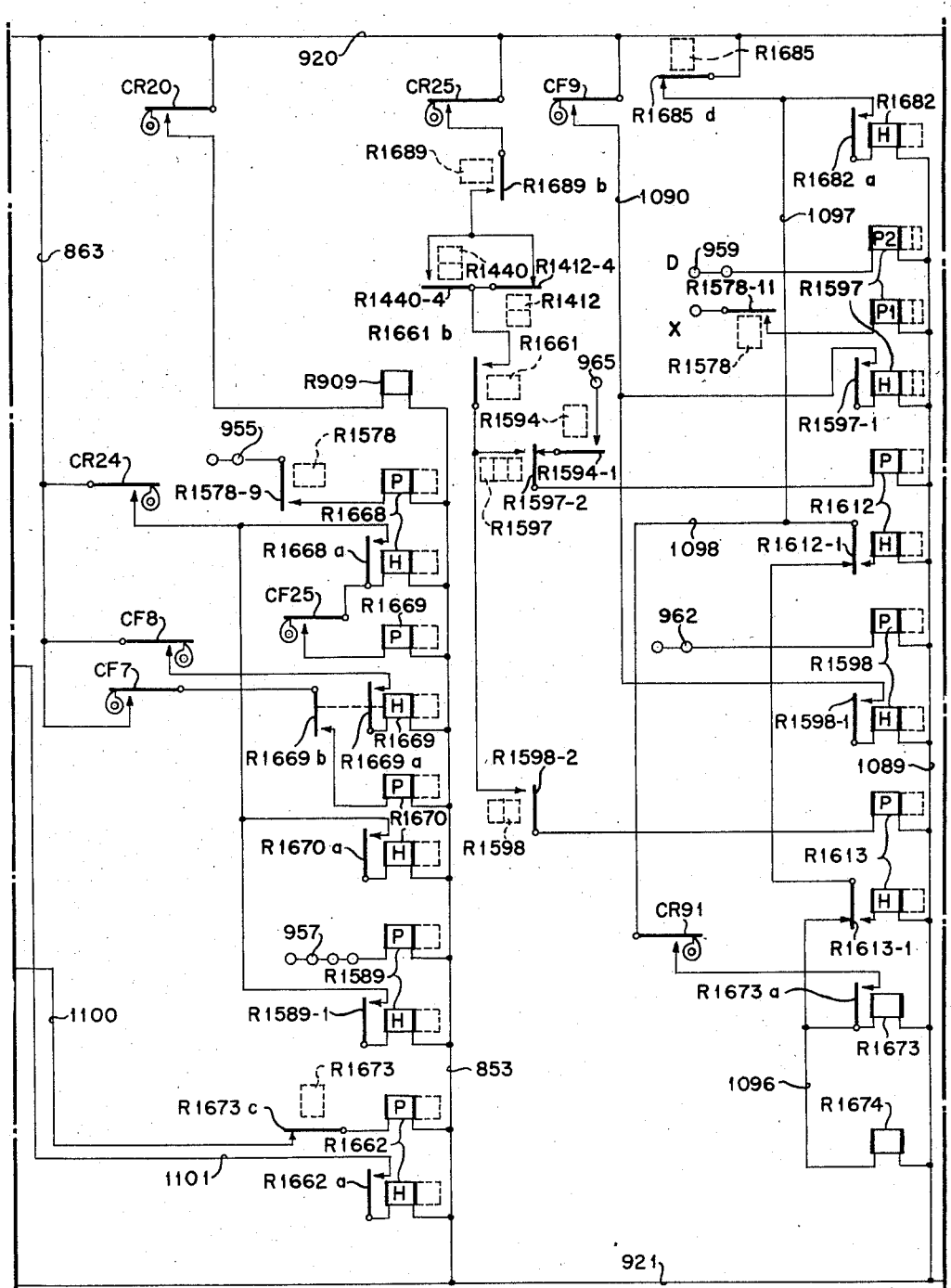
Figure 54C:
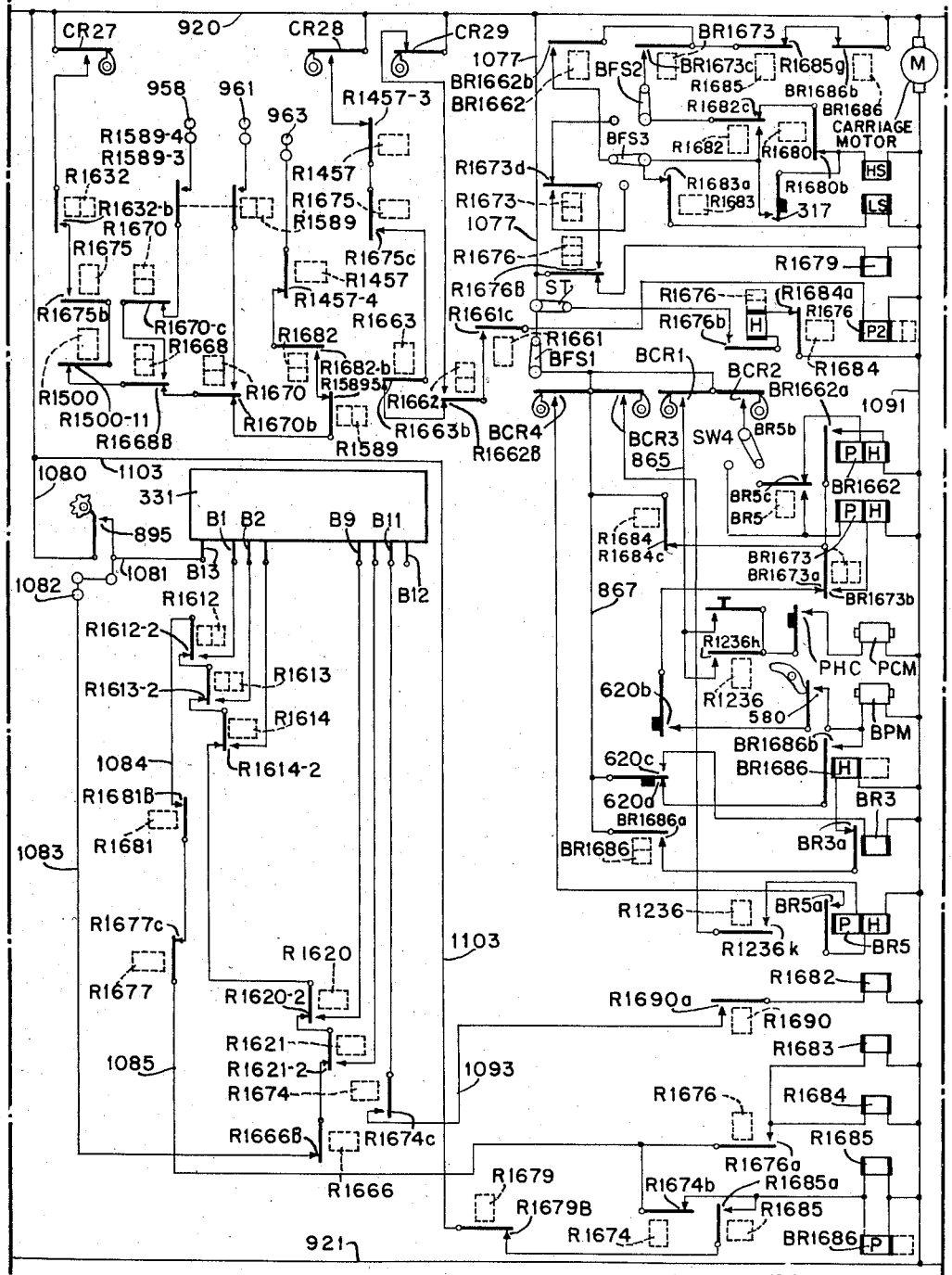
Figure 54D:
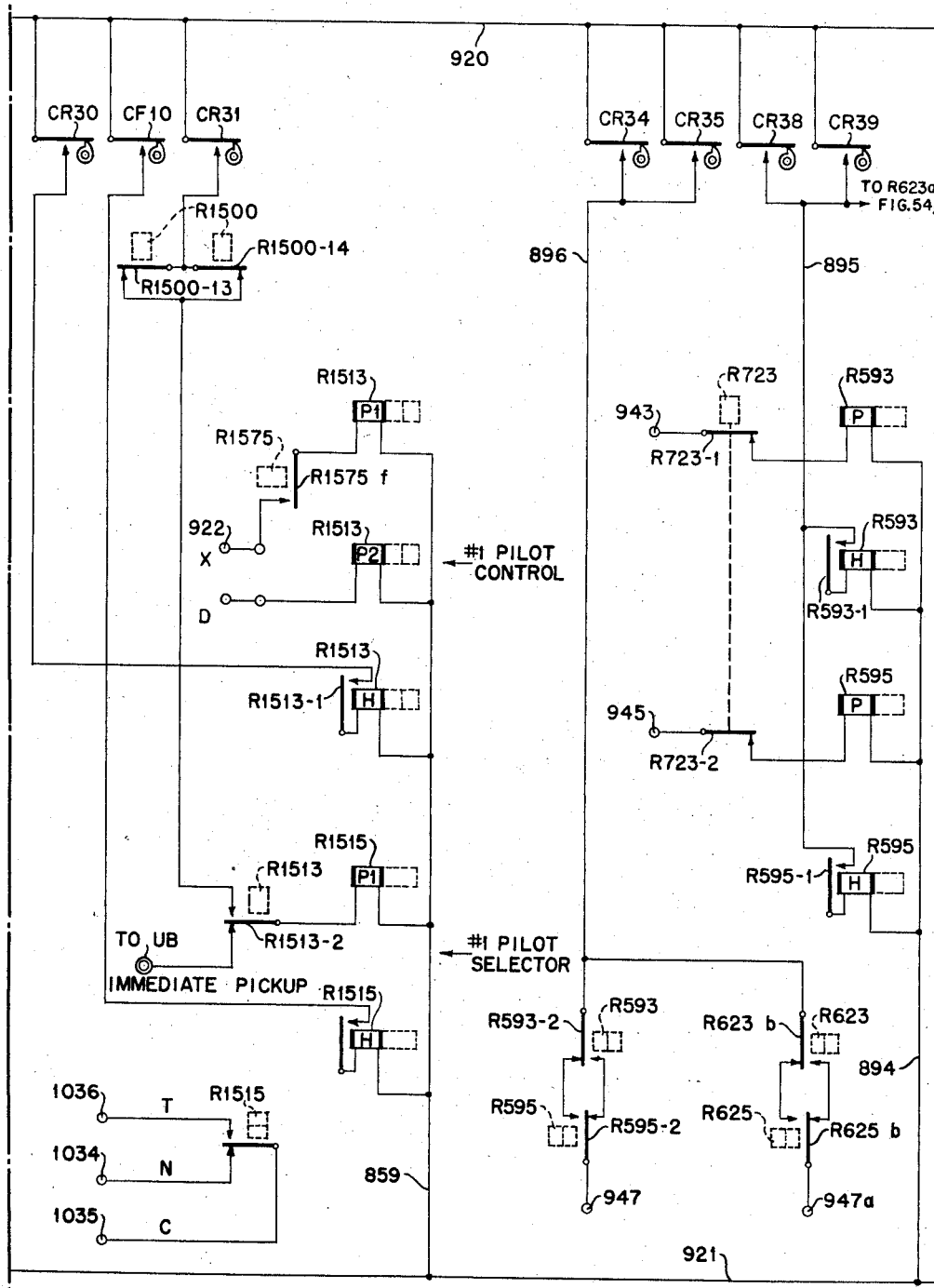
Figure 54E:
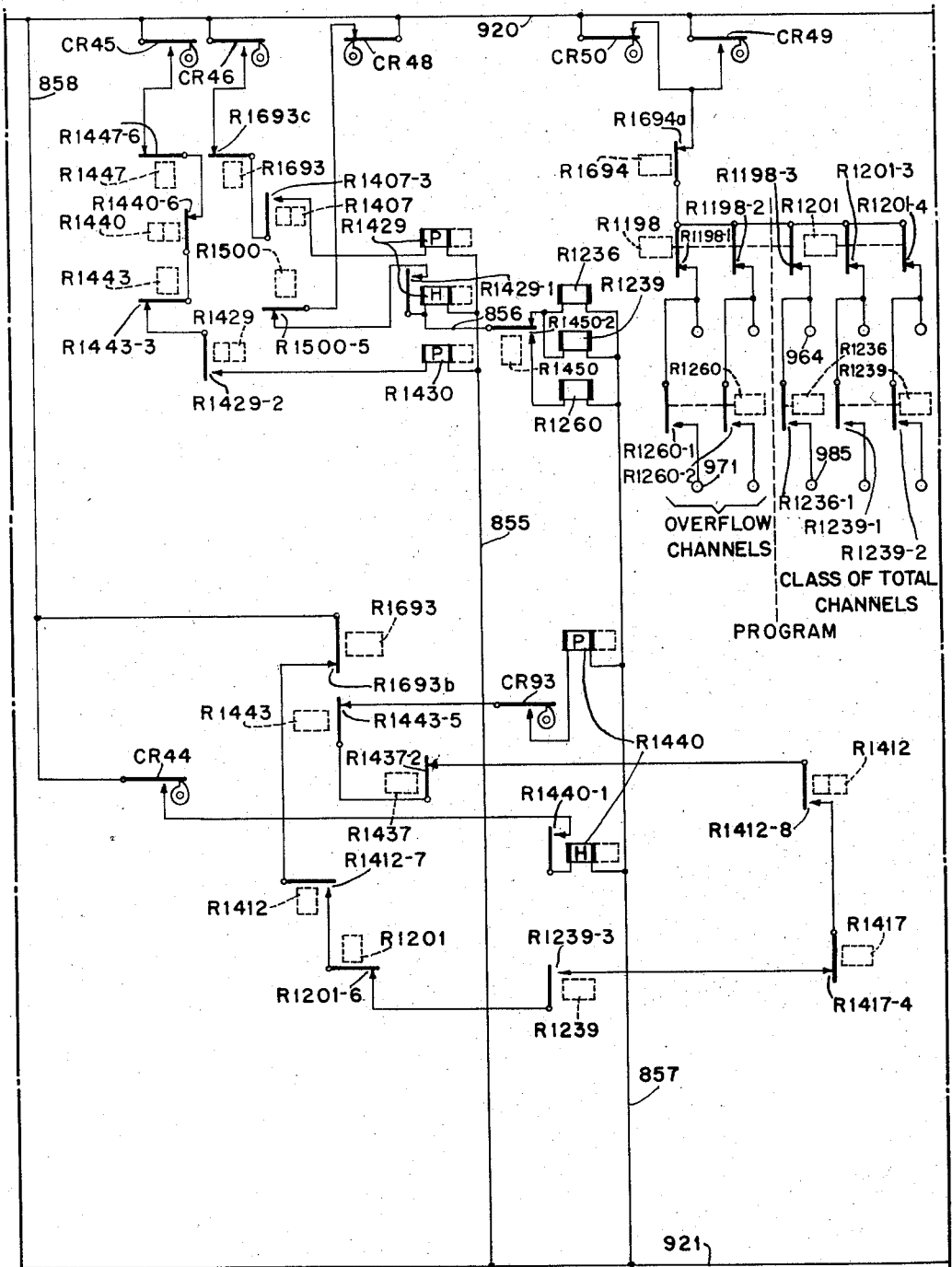
Figure 54F:
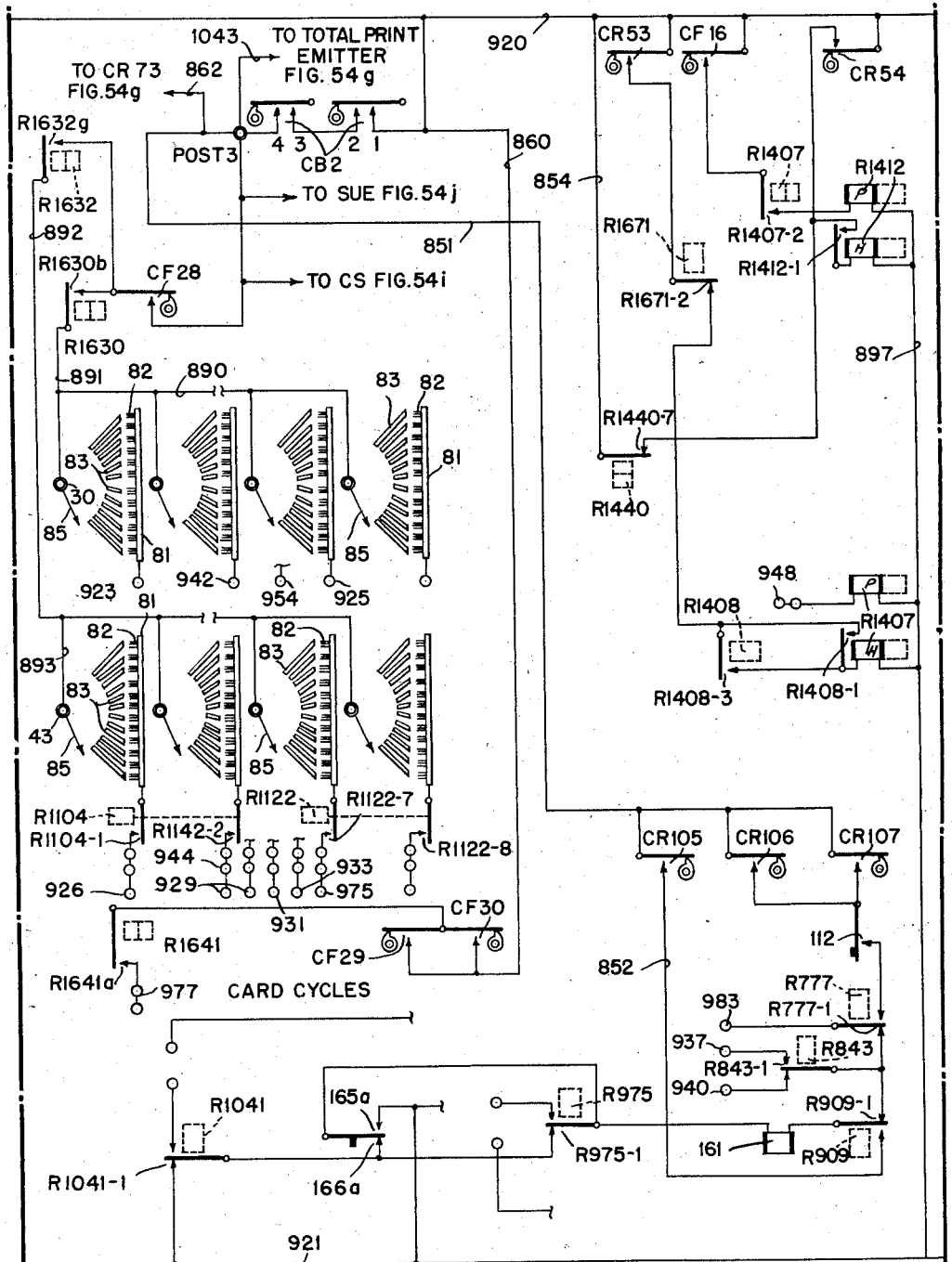
Figure 54G:
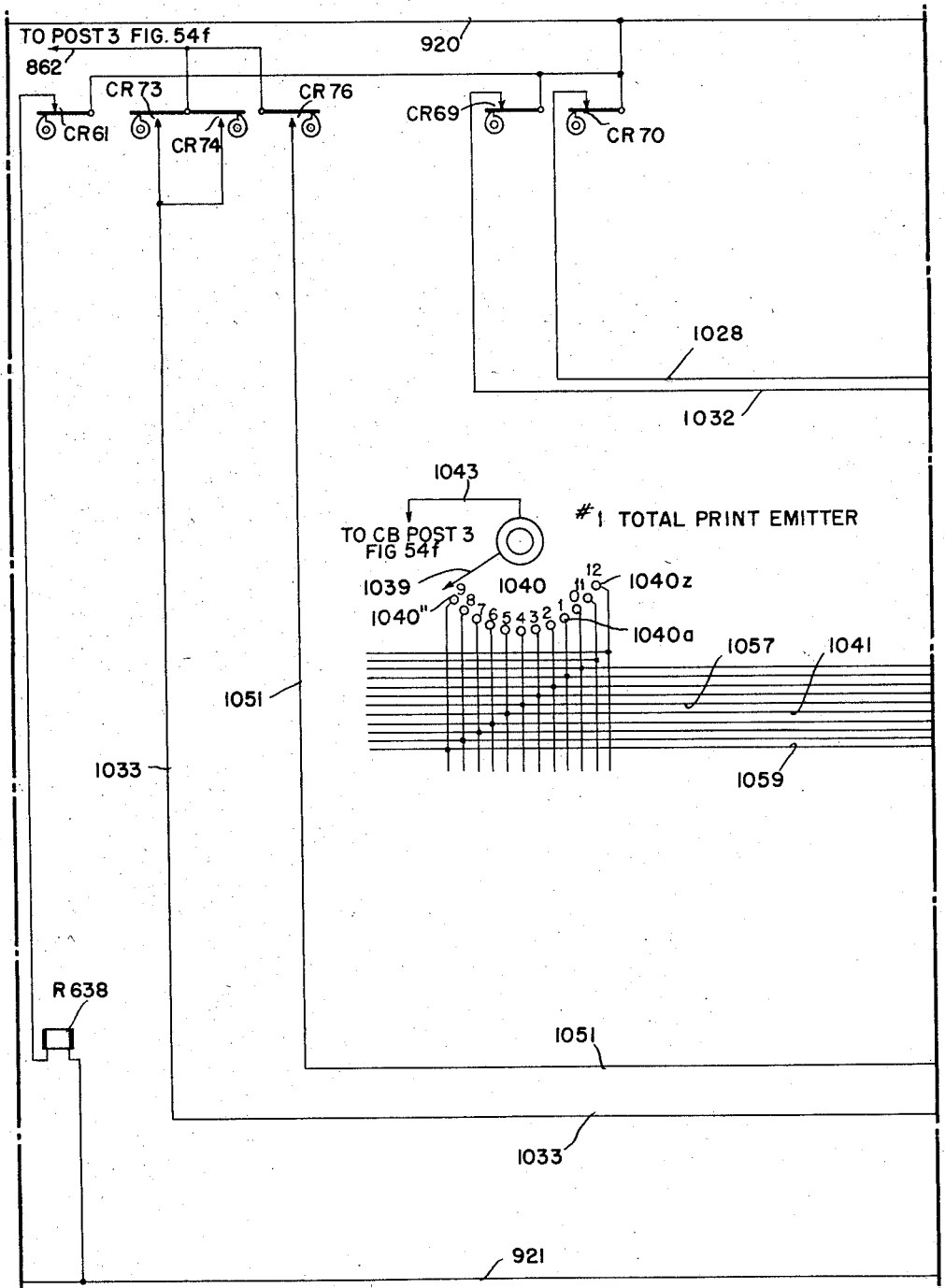
Figure 54H:
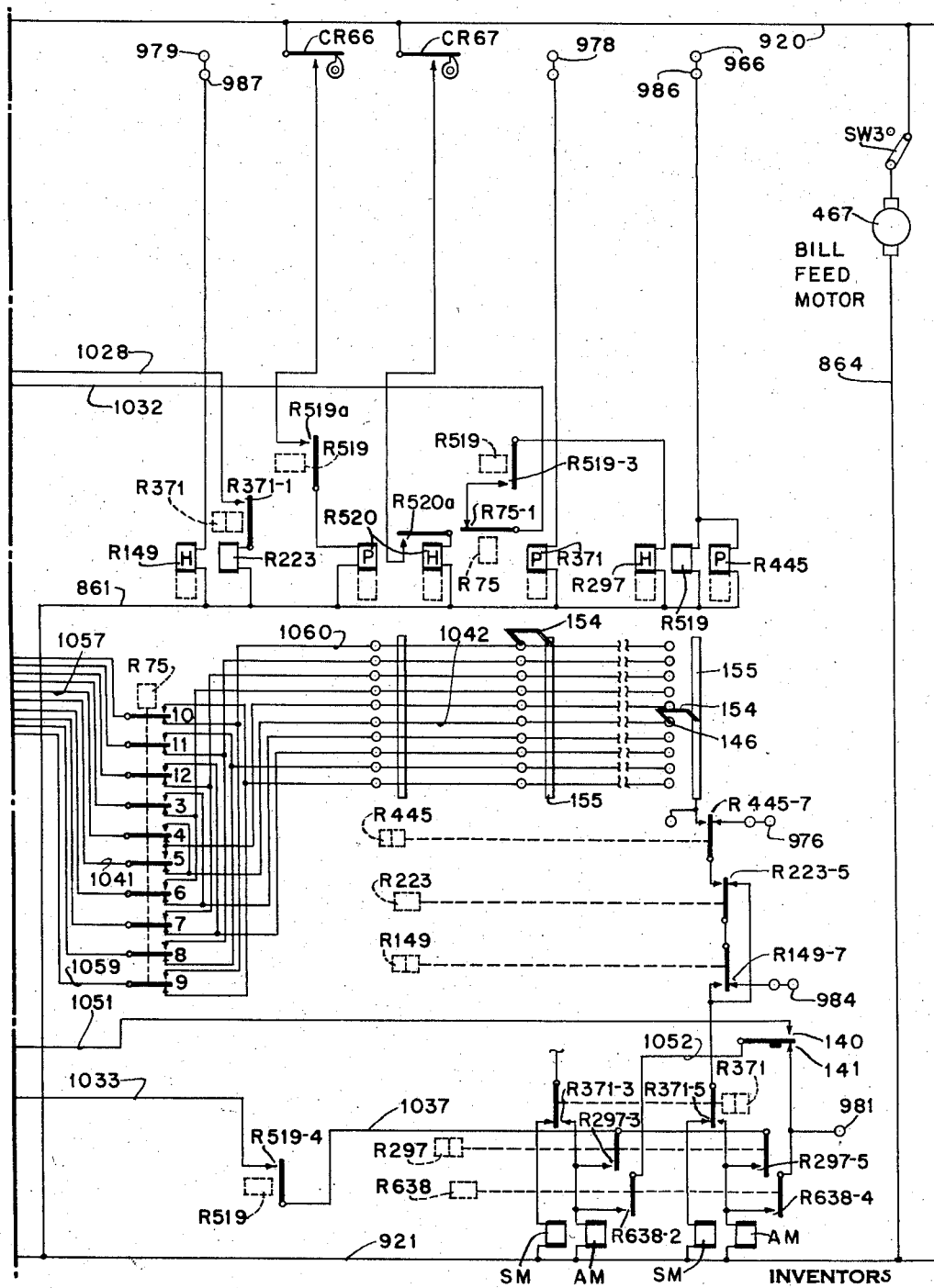
Figure 54I:
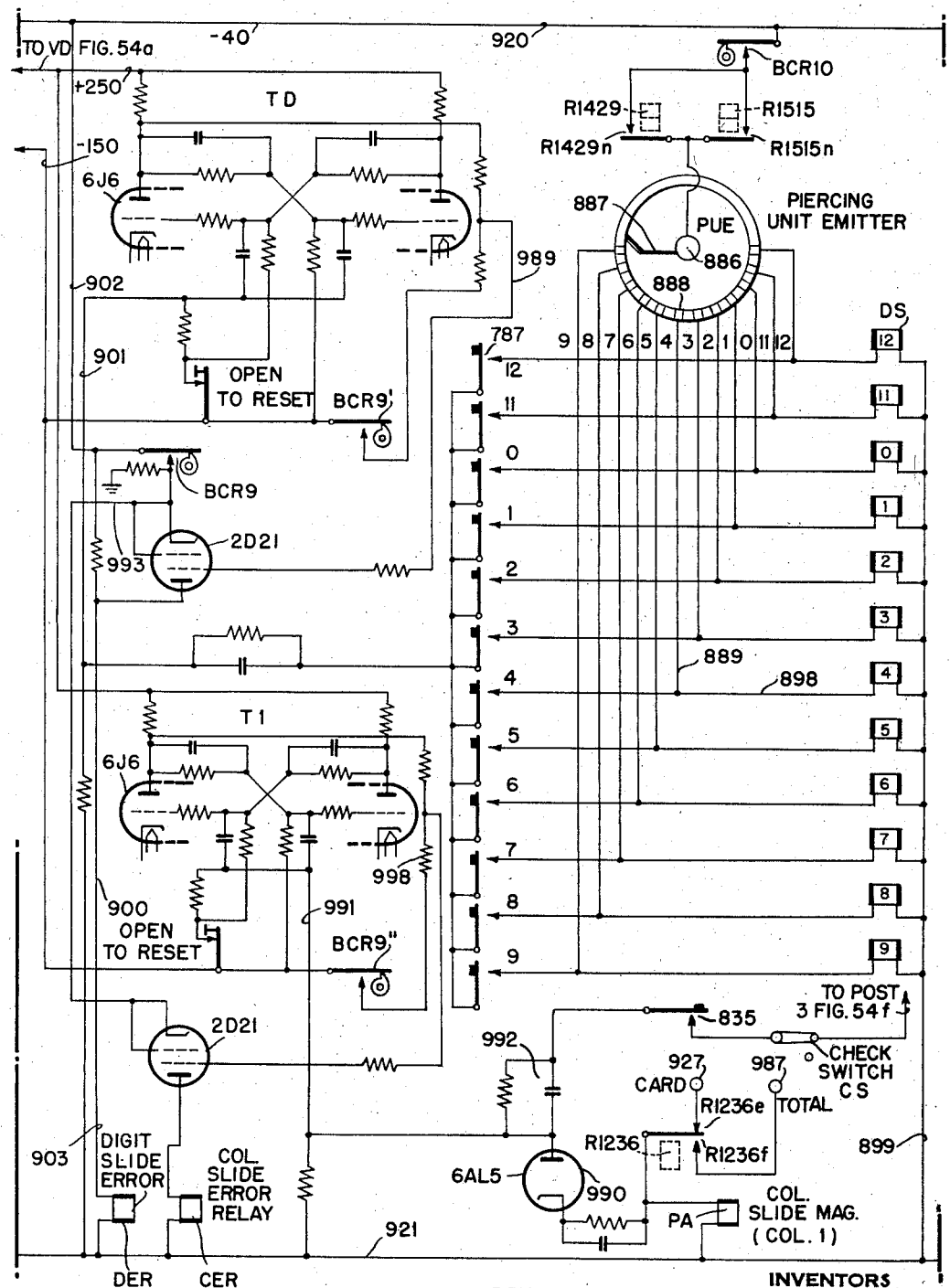
Figure 54J:
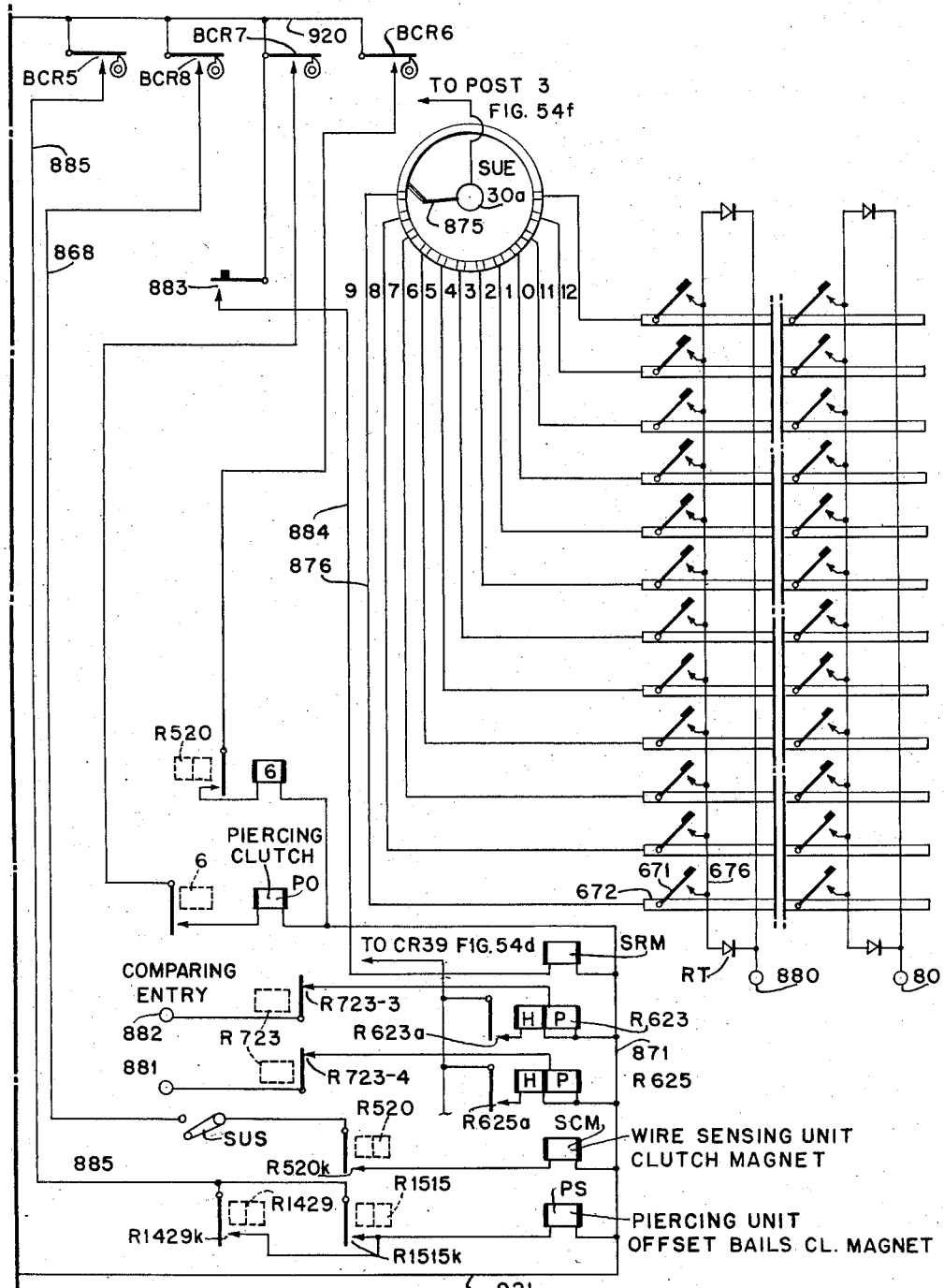

The electrical connections and controls of the tabulator and bill feed sensing and piercing devices are shown in Figs. 54a to 54j which are to be arranged and connected in that order from left to right to make up a unitary chart. Most of the tabulator card sensing, accumulating, printing and tape feed controls are shown in Figs. 54a–54h, and most of the controls affecting the bill feeding, sensing, checking and piercing controls are illustrated in Figs. 54i and 54j.

Only enough of the general tabulator controls are described here to furnish a basis for the novel bill unit controls; for further details, reference may be made to the tabulator disclosure of the Rabenda Patent 2,569,829 noted hereinbefore.

CF and CR cam contacts

In the description of the electrical circuits reference is made throughout to series of cam contacts of known construction designated as CR cam contacts which are continually opening and closing during each cycle of operation of the machine, and CF cam contacts which open and close during card reading operations of the machine accompanied or not by a card feed operation. The cams which operate the CR contacts may be driven by any continuously turning shaft.

The CF cam contacts are operated during each card reading operation of the machine by an arrangement involving a card feed clutch which is called into operation to effect rotation of a shaft for one revolution of the CF cams for each selected cycle.

Other CB or circuit breaker cam contacts are operated by connections to the main drive shaft.

Operation of machine in connection with circuit diagram

The initiation of card feeding, the sequential card feeding operations and printing operations will be best understood by describing the operation of the machine in connection with the circuit diagram (Figs. 54a etc).

A prerequisite to initiation of the card feed is that hopper contacts 270 (Figs. 11 and 54a) are closed and this is effected by the depression of a button by cards in the supply magazine TM. When all the cards have been fed out of the magazine the contacts will open and the machine will automatically stop.

Current is supplied by lines 920 and 921. With hopper contacts 270 closed, an obvious circuit to energize R1625 relay is closed, and a stick circuit for said relay is provided by R1625c relay contacts and cam contacts CR9.

Initiation of card feed is effected by depression of the Start Key which closes contacts 274 to close a circuit from the line 920, wire 872, start key contacts 274, the pickup coil of the start relay R1636, to line 921. It should be noted that in the circuit diagram all relays and magnets are connected to line 921 to complete the energizing circuit. R1636 relay closes its stick contacts R1636b and a stick circuit is provided back to line 920 through cam contacts CR6 to hold R1636 relay energized over and through part of the second machine cycle. Obviously, when CR6 contacts open during the second machine cycle, if the Start Key is not retained depressed, R1636 relay will deenergize and for this reason the start key is maintained depressed or redepressed until a card issues from the magazine.

At about the midpoint of a cycle, while R1636 relay coil is energized, cam contacts CR86 close to complete a circuit from line 920, wire 872, stop key contacts 877, normally closed card feed stop contacts R1470–1, closed carriage stop contacts R1471–1, CR86 cam contacts, start key R1636a relay contacts R1638 relay coil and 918 to line 921. The hold circuit for start relay R1638 is through the R1638b relay contacts and cam contacts CR7 which hold it energized until 235° of the next cycle.

R1638 relay closes R1638c relay contacts, completing a circuit at 245° from line 920, cam contacts CR5, relay contacts R1673b closed by a carriage skip relay when the machine is running, normally closed overflow start control relay contacts R1412–3, R1411–4, contacts R1638c, R1639P relay coil, and line 921. A hold circuit is maintained by cam contacts CR4 through R1639a relay contacts. CR4 holds the R1639 relay energized until 210° of the following cycle. When R1639b contacts are closed, they complete a circuit from line 920, R1639b relay contacts now closed, wire 878, multi line interlock relay contacts R1500–7 now closed, CR87 cam contacts, picker clutch magnet 64, and wires 879 and 918 to line 921; this also energizes the pickup coil of the R1640 relay coil.

The R1640a relay contacts complete the holding circuit for R1640H relay coil through such contacts, wire 878, and both CF2 cam contacts and R1639b relay contacts back to line 920. The CF cam contacts take the arc at the breaking of the hold circuit instead of having it affect the R1639b relay contacts.

Energization of picker clutch 64 at 250° when CR87 closes, causes the engagement of the picker clutch at about 285° of the first machine cycle, and the lowermost card is then advanced from the supply magazine 25 (Fig. 11) to the constantly rotating feed rolls 50, 51 and the card is fed by the latter to the Presensing Station P; and when this condition is obtained, a card lever is rocked to close the Presensing Station card lever contacts 71 at 144° of the second machine cycle, or the first card feed cycle, but are kept closed due to the combined presence of a card in the P station.

At 285° of the first machine cycle, cam contacts CR88 close completing a circuit from line 920, R1639b relay contacts, wire 878, R1630c relay contacts CR88 cam contacts, clutch magnet 285, wire 918 and line 921. Energization of this magent will cause the engagement of the conventional one-revolution clutch to initiate rotation of a card feed shaft at 310° which operates the CF contacts, as previously described. The aforementioned energizing circuit for the clutch magnet 285 is for the first machine cycle. In subsequent card feed cycles, as will be explained, and upon the presence of cards at station P, the R1628 relay will be energized to close the R1628c relay contacts to impulse the clutch magnet 285.

After pre-test contacts 71 are closed at 144° of the second machine cycle (or first card feed cycle) CR88 cam contacts close to complete an obvious circuit to the R1628P relay coil. R1628a relay contacts then close to complete a holding circuit back to line 920 through the CF5 cam contacts. CF5 cam contacts extend the energization of the relay over and through the next or second card feed cycle. When R1628c relay contacts close during this second machine cycle and cam contacts CF2 close during this and succeeding machine cycles, a circuit is completed to energize clutch magnet 285.

When cam contacts CR88 close for the cam clutch magnet 285, a parallel circuit is completed to a card cycle control relay pickup coil R1641 through the multi-line start and interlock relay contacts R1485–4, R1500–11 and second reading card control contacts R1632f. A hold circuit includes line 920, contacts CR6, wires 873 and 874, relay contacts R1641b, relay R1641 hold coil and wire 918 to line 921. A number of contacts of relay R1641 are in series with card cycle hubs (Fig. 54f) and the circuits to the plug hubs are completed through cam contacts CF29 and CF30 for energizing plus or minus accumulator controls or any other control panel function requiring a full card feed cycle impulse.

The start key (Fig. 54a) will be held down or depressed the second time to reenergize R1636 relay and the operation will be repeated to advance the card from the Presensing Station to the first Control Station and to feed the second or following card from the supply magazine into the feed rolls 50, 51 and thus to the Presensing Station.

Energization of the R1628 relay closes R1628d contacts which, it will be recalled, are closed only when a card is at the Presensing Station so as to complete at 165° a circuit during the second machine cycle or first card feed cycle from the line 920 through CR3 cam contacts (at the lower left corner, Fig. 54a), R1628d relay contacts, R1640b interlock relay contacts now closed, R1500–8 MLR relay contacts now closed, to the gripper clutch magnet 53 and line 921. This clutch magnet causes the operation of the mechanism which closes the gripping devices to feed the first card from the Presensing Station to the Control Station, and other cards from station to station. It also controls the card stops which are lowered to allow a card to advance, and raised to stop the card at the next station.

Closure of cam contacts CF22 (Fig. 54a) at 240° of the second machine cycle, or first card feed cycle, causes completion of a circuit from line 920 through cam contacts CF5 now closed, R1628a pre-test relay contacts now closed, and CF22 cam contacts to the pickup winding of the R1630 relay. The latter will close the R1630a relay contacts to complete a stick circuit for the holding winding of the R1630 relay extending back through the R1630a relay contacts, R1625b hopper relay contacts, or CF4 cam contacts during the cycle in which the last card run out passes the Control Station. R1630 relay will thereupon open the R1630C relay contacts so that the impulse emitted by CR88 cam contacts to the CF cam clutch magnet 285 will be subsequently directed through the R1628c relay contacts for card feed cycles after the first. During the third machine cycle, or the second card feed cycle, cam contacts CF23, which are timed to close slightly earlier than CF22, will close and complete a circuit from the line 920 through CF4 cam contacts, R1630a relay contacts now closed, CF23 cam contacts to the pickup winding of the R1632 relay. The latter closes the R1632a stick contacts providing a stick circuit for the holding winding of the R1632 relay extending back through CF3 cam contacts, or the R1625a hopper relay contacts back to line 920. CF3 cam contacts control the deenergization of R1632 relay during the cycle in which the last card passes the Adding-Printing Station. R1632 relay closes R1632d contacts which in conjunction with R1628b relay contacts and R1625d relay contacts now closed provide an alternate holding circuit for the R1638 relay to keep it active. This alternative circuit keeps the machine running until the hopper is empty, the stop key is depressed, or a card fails to feed to the Presensing Station.

It will be noted that the R1630 relay is energized as the card is about to enter the Control Station and that R1632 relay will later energize when the card is about to enter the Adding-Printing Station. Relays R1630 and R1632 also control relay contacts which supply current to the readout commutators as will be described with reference to Fig. 54f.

Under normal card feed conditions and so long as cards continue to feed through the Presensing Station, the card picker control clutch magnet 64, CF cam control clutch magnet 285 and gripper control clutch magnet 53 will also be reenergized each cycle under normal conditions so long as cards continue to feed through the machine. However, failure to feed a card from the supply magazine to the Presensing Station to close the contacts 71 will stop card feeding operations.

*Card analyzing or reading circuits*

The circuits whereby the perforated cards may be analyzed at the first reading station and the second reading station are shown in Fig. 54f wherein it will be seen that for column 1 the arrangement of the sensing commutator is shown diagrammatically. Of course, this arrangement is duplicated for the 80 columns in each of the reading stations. The sensing circuit for the first reading station is from the line side 920, circuit breaker contacts CB1–4, CF28 cam contacts, first reading relay R1630b contacts which are closed during the analyzing time, thence to a wire 890. The wire 890 has a respective wire connection 891 to the brush 85 of the first column commutator. It will be recalled that the brush readout 85 makes successive contact with the contact points 83 and the circuit will be closed through the particular brush 82 which passes through the card perforation. Each plate 81 which carries the series of analyzing brushes 82 has a wire connection to a respective plug socket such as socket 923 in the first column. For the first reading station there is a series of eighty plug sockets including 923, 925, 942 and 954, etc., from which plug connections are made for control purposes.

The sensing circuit for the second reading station extends from the CF28 cam contacts, thence through the second reading R1632g relay contacts to a wire 892 which has one first wire 893 of multiple wire connections to the brush readout 85 representative of a series of sensing commutators for the second reading station. There is, likewise, a series of eighty plug sockets including sockets 926, 929, 931, 933, 944, and 975 for the second reading station from which plug connections are made to the desired controls or printing orders to effect printing of information corresponding to the perforated data.

The CB1–4 circuit breaker contacts are timed to close and open at such times as it will prevent the arcing at the break and make between the brush readout and the contact points 83 so as to prevent damage at this point of contact. The construction and operation of circuit breaker contacts, such as are employed herein, are well known.

*Print magnet energizing circuits for normal printing operations*

The energizing circuits for the printing control magnets 161 are shown in Fig. 54f. The machine is intended to have a capacity of 120 printing columns requiring a corresponding number of printing control magnets 161, although only one illustrative order is noted in the drawings.

The machine is capable of being conditioned for multiple card field and storage unit reading and multiple line printing under control of a single heading card which is passed through the card feeding and analyzing mechanism. However, it is at times desirable to print in the normal fashion, that is, to merely print a single line under control of one or more perforated fields in a detail card. To accomplish this the desired plug sockets such as 944 of the second reading station have plug connections made therefrom to plug sockets such as 940 of the columns in which printing is to be effected. Therefore, according to the perforations in the columns analyzed, card reading impulses are directed to each of the plug sockets 940 through normally closed R843-1 MLR transfer relay contacts now in normal position, thence through R909-1 N print control relay upper contacts now in normal position, to the print control magnet 161, the normally closed zero print control contacts 166a, code relay contacts R1041-1 and line 921. Zero print control by shifting of contacts 165a, 166a is of the kind set forth in Patent 2,438,071 (see Fig. 1a and contacts 165, 166 of the patent). The second alphabet print control impulse, which is a code pulse, is sent through magnet 161 and the shifted zero contact 165a. Hence, the print control magnet will receive impulses singly or in combination, according to the code in Fig. 13b, depending upon whether numeral or alphabetical information is represented on the detail card analyzed at the second reading station.

When the data analyzed at the second reading station is numerical data, the N impulse to energize the print control magnet 161 to print the desired digit is effected by an energizing circuit from the line 920 (Fig. 54f) through circuit breakers CB, a wire 851 to cam contacts CR104, wire 852, thence through the lower R909-1 relay contacts which are transferred at the time that CR104 cam contacts transmit an impulse. The N control R909 relay coil (Fig. 54b) is energized by an obvious circuit which extends from line 920 through cam contacts CR20, R909 relay coil and wire 853 to line 921.

The circuit through the print magnet causes the translator to unlatch the selector gear which turns the typewheel to proper position for printing. When the character is alphabetic the zone impulse follows the same circuit as the numeric impulse through the print magnet and unlatches the print cam for the zone impulse received. This cams the typewheel forward causing printing of the character related to the code values sensed from punched holes in the card.

The second impulse circuit (zone impulse) through the print magnet is the same up to the zero print contact 165a, 166a. This contact was shifted when the first impulse (numeric) energized the print magnet. Therefore, the alphabet printing circuit is completed through the normally open side 165a of the zero print contact to line 921.

*Automatic group control*

In record controlled accounting machines of the kind in which the present invention is preferably embodied, it is desirable to initiate total taking, record feeding and other operations under control of the well known automatic group control means. Briefly, such means includes devices for analyzing the holes in corresponding card columns of successively fed cards, determining the presence of similar or dissimilar holes in the compared columns, and upon detecting a group number change, total taking operations are initiated. The arrangement for analyzing such holes and picking up comparing relays is well known and for that reason only sample circuits are noted which are understood to extend to minor, intermediate and major stages of control. Herein such controls are also used to initiate various stages of program operation.

As the cards are sensed and moved through the card feed stations, each card is compared with the card preceding it and also with the card following it and any disagreement is sensed and relay controls are set up for minor, intermediate and major controls.

A change in any of the three classes is normally used to stop card sensing and feeding and automatically start a program for printing accumulated totals.

To begin with, it is advisable to study an ordinary comparing circuit. Referring to Figs. 54d and 54f, it is seen that plug connections may be made from a socket 942 (Fig. 54f) in the first card reading station and a socket 943 (Fig. 54d) in series with a minor control pick-up coil R593. A similar set of connections may be made from the plug socket 944 (Fig. 54f) of the second reading station to socket 945 (Fig. 54d) in series with relay coil R595. It is understood that both of these comparing pickup controls agree as to the columnar position analyzed on the card. In the case of the minor control governed by item number perforations, it will be in one of such columns of the item field. There is a pair of comparing control relays such as R593, R595 for each column of each of the comparing classes of control.

At the middle of Fig. 54d, it is seen that comparing relays R593 and R595 have related contacts R593-2 and R595-2 connected in a series and parallel arrangement so that energization of both coils together, breaks a circuit, and energization of either alone establishes a through circuit connection. A number of such contact arrangements may be coupled together by cross-plugging to comprise a class of group controls such as minor, intermediate and major. As shown, there is only a single sample set of contacts for one class of control with plug socket 947 representative of minor control.

Turning now to consideration of a sample comparing circuit, much of this is similar to the card analyzing circuit already pointed out. The operation of the comparing circuit including the first reading station may be followed from line 920 (Fig. 54f) through the CB circuit breakers, cam contacts CF28, first reading relay contacts R1630b, wire 890 to one of the item number columns, then through the card analyzing commutator similar to the one shown in the first column position, socket 942 and a plug wire to socket 943 (Fig. 54d) through the pickup coil R593 and wire 894 to line 921. The second simultaneous comparing circuit is somewhat similar in going through the line 920 (Fig. 54f) circuit breakers CB, contacts CF28, second reading relay contacts R1632g, wire 892 to the card reading commutator of the second reading station and in the same item number column, to plug socket 944 and a plug wire to socket 945 (Fig. 54d) and then to pickup coil R595 and wire 894 to line 921.

A holding circuit is established for holding coils of both relays R593 and R595 through the relay contacts R593-1 and R595-1 picked up by the two comparing circuits already described. The holding circuit is through line 920 (Fig. 54d), cam contacts CR38 and CR39 closed together through most of the first half of an operating cycle, and through wire 895, relay contacts R593-1, the holding coil H of relay R593 and wire 894 to line 921. A parallel holding connection is made through relay contacts R595-1 and coil R595H.

Assuming first that the two compared positions bear agreeing perforations, then the contacts R593-2 and R595-2 are merely reversed in position simultaneously and the normally open circuit condition prevails and no group control impulse will be transmitted because both comparing relays are energized at the same time and there is no disagreement between the related data in the cards being compared and there is no comparing exit impulse.

However, should there be a disagreement in perforations, then one comparing relay is energized before the other and the contacts are shifted to provide a control impulse through the following connections; assuming that the relay R593 is operated first. The circuit includes line 920, cam contacts CR34 and CR35, wire 896, the right-hand relay contact R593-2, the right-hand relay contact R595-2, plug socket 947 and a plug wire to socket 948 (Fig. 54f), a minor control pickup coil R1407 and wire 897 to line 921.

Similar control pickups are made to intermediate and major control relays and the holding of such classes of group control and the effect they have on other functions in the machine is described next in connection with the Program Start Control section of the description.

*Program start control*

As already explained in the Automatic Group Control section, whenever a group change occurs, an impulse is emitted from the comparing unit and carried by plug wire to minor 948, or other intermediate or major plug sockets to call into operation singly, or in combination, program start control relays such as R1407, etc. They are available on the control panel for selective functions. There are three classes of program starting which may be initiated from the several comparing fields of the cards. In addition to the card comparing signals, the feed control tape TP has an overflow control perforation and sensing device which is adapted to initiate any program. This fourth class of total control is called the overflow program and has separate pluggable outlets available for selection of control. The overflow program control is described separately hereinafter as it may be used separately or in conjunction with other program operation.

The first three classes of total are designated Minor, Intermediate, Major and each has a separate plug socket for initiating the particular class of control. Any higher class of control will call into operation all minor classes of control.

The various classes of total control determine the start of the program operation and they also control stopping the program after the desired number of steps have been used according to the particular class of total initiated.

Assuming that the comparing devices sense a disagreement in the minor field, then an impulse is carried to plug socket 948 (Fig. 54f) and through minor-1 pickup coil R1407 and through wire 897 to line 921. The holding circuit for this first program start control is through line 920, cam contacts CR53 normally closed, heading control suppression contacts R1671-2, minor control contacts R1407-1, the holding coil R1407 and wire 897 to line 921. Other contacts of the minor-1 relay R1407 are used in the program operation and will be described hereinafter.

A transferral of the minor-1 program start controls to the minor-2 program control is accomplished by the closure of contacts R1407-2. This sets up a circuit including line 920, cam contacts CF16, relay contacts R1407-2, the minor-2 pickup coil R1412, wire 897 and line 921. A holding circuit is established through cam contacts CR54 and relay contacts R1412-1 to the holding coil of relay R1412. The cam contact CR54 is used for the purpose of governing the deenergization of the minor-2 relay R1412. A circuit is completed around contact CR54 through wire 854 and the contacts R1440-7 of the program end relay which serves to shunt out the cam contacts until such time as the program is completed and the program end relay becomes energized to open R1440-7 and disable all three secondary relays.

The minor-2 relay R1412 is held energized all during the program operation and the contacts associated therewith are used for interlocking other machine functions. For example, the relay contacts R1412-3 (Fig. 54a) when opened serve to suppress the pickup of the auto start relay R1639 and the automatic start circuit as already explained in the description of the starting circuits. This control serves to suppress card feeding operations during program operation.

*Program operation*

The program unit (Fig. 54e) is made up with plurality of program control relays and associated contacts operated successively to set up pluggable circuits for five steps of operation. The purpose of the unit is to provide a series of sets of contacts closed seriatim in series of five cycles so that one or more steps or sequences of control are available for such controls as successive classes of total print.

The program unit comprises sets of advancing relays R1429 to R1437 arranged in a vertical column down the center of Fig. 54e and pluggable emitting contacts shown at the right.

Relays R1429 to R1437 (only two of which are shown) when once started in operation by a minor group change or an overflow program start connection, continue to be picked up successively by cycle after cycle of machine operation until stopped selectively by shifted contacts of either of the minor-2, intermediate-2 or major-2 relays such as R1412. It is already noted in the last section of description that on any class of comparing group change, minor-1 relay contacts R1407-2 are closed, and here (Fig. 54e) companion contacts R1407-3 serve to start the program operation. When once started, relays R1429 to R1437 operate successively and then serve to call into play associated relays R1236, R1239, R1260, etc., the contacts of which are arranged in successive pluggable sets on the panel shown diagrammatically at the right of Fig. 54e.

The usual control exercised by the program unit is the control of successive accumulator total printing and the resetting of the related accumulators. However, the program unit may control various other functions such as punching or printing out of storage or out of accumulators.

The program start circuit includes line 920 (Fig. 54e), cam contacts CR46, stop interlock relay contacts R1693c, the minor-1 change contacts R1407-3, the step 1 control pickup coil R1429, wire 855 and line 921. A holding circuit is established through cam contacts CR48, relay contacts R1500-5, relay contacts R1429-1, the holding coil of relay R1429, wire 855 and line 921. A circuit parallel to the step 1 holding circuit is directed through wire 856, the normally closed overflow shift contact R1540-2, to the step 1 relay coils R1236 and R1239 and through wire 857 to the other line 921.

Relays R1236 and R1239 control contacts such as R1236-1 and R1239-1 connected to plug sockets such as 985 in the "step 1" position on the program control panel. The step 1 impulse is completed to the control panel along a circuit including line 920, cam contacts CR49 and CR50 through stop interlock relay contacts R1694a, and normally closed basic setup relay contacts R1198-3 and then through the contacts R1236-1, now closed, to the plug socket 985 and then by plug wire to whatever function is desired, usually the printing of a minor total from a certain accumulator order as noted later.

Assuming that only one step of total taking is required of the program unit, i.e., the operation is initiated by a minor class of total change, a program stop circuit is completed as follows: From line 920 the stop circuit impulse progresses through wire 858, the normally closed stop interlock relay contacts R1693b through the minor-2 relay contacts R1412-7 now closed, then through the normally closed basic relay contacts R1201-6, the step 1 relay contacts R1239-3, the normally closed left side of the intermediate-2 contacts R1417-4, the minor-2 relay contacts R1412-8, closed on a second stage of the minor selecting cycle, and then through the normally closed step 5 control contacts R1437-2, closed program repeat contacts R1443-5, cam contacts CR93 closed from 170 to 182° and then through the program end pickup coil R1440 and wire 857 to line 921. Relay R1440 then closes contacts R1440-1 in series with the holding coil to provide the holding circuit including line 920, wire 858, cam contacts CR44, contacts R1440-1, the holding coil of relay R1440 and wire 857 to line 921.

Relay R1440 controls contacts R1440-6 in series with the pickup circuits of the relays of all five steps and thereby breaks down the succession of energization of such relays.

Pilot selectors

Pilot selectors are provided to sense a special perforation in a card when the card is read at the first sensing station and then close contacts of said selectors while the card is being read at the second reading station. The purpose is to switch card reading impulses into accumulators or other receiving devices for one cycle of operation and then restore the switch to allow ordinary sensing operations to be carried on. For example, in the case of an invoice leader card it is desired to read the first invoice number off the leader card when it is at the second reading station and then when the second card (which is likely to be a heading card) appears at the same reading station, it is desired that the sensing devices have other connections from the same columns to accumulators or printing banks other than those associated with the invoice number accumulator.

The leader card has a special perforation in a certain column and this is used to initiate pilot selection when the leader card is at the first reading station.

The circuit to initiate the pilot selector pickup may be followed starting at the left of Fig. 54f. The perforation in the card at the first reading station is sensed by the related card reading emitter 83, 85 and through the circuit breakers CB as already noted. A plug connection is made from the socket 925 of the 79th column and the plug wire is connected to socket 922 (Fig. 54d). The circuit continues through the relay contact R1575-1 closed at the X time, the pickup coil of relay R1513 and wire 859 to line 921. The pickup coil closes contacts R1513-1 and a holding circuit is provided through line 920, cam contacts CR30, relay contacts R1513-1, the holding coil of relay R1513 and wire 859 to line 921. A second pickup coil R1513 is provided as in other instances to be called into operation by a digit selector should an impulse other than an X impulse be designated to control the pilot selector.

Near the end of the special initial sensing cycle, the relay contacts R1513-2 are closed in series with the No. 1 pilot selector relay R1515 to pick up a circuit for shifting pilot transfer contacts. The circuit may be followed from line 920 through cam contacts CR31 closed from 295° to 310° of the cycle, through the normally closed MLR interlock relay contacts R1500-13 and R1500-14, then through relay contacts R1513-2, the pickup coil of relay R1515 and wire 859 to line 921. A holding circuit is prepared for the No. 1 pilot selector by the closure of relay contacts R1515-1. The holding circuit includes line 920, cam contacts CF10 closed from 306° of one cycle to 286° of the next cycle, relay contacts R1515-1, the holding coil of relay R1515, and wire 859 to line 921.

At the lower left corner of Fig. 31d, it is seen that the No. 1 pilot selector relay R1515 controls a set of transfer points. In the set of points, the plug sockets 1034 and 1035 are connected to the normally closed set of the contacts and the other plug socket 1036 is wired to the normally open contact which is made effective by the transferral under control of the pilot relay.

Although the circuits for only one pilot selector are pointed out herein, it is understood that a plurality of such controls are provided, all working in a manner similar to that described in connection with the No. 1 pilot selector.

Direct entry into an accumulator

The direct entry style of operation is that of reading the numbers punched in the card directly into an accumulator without listing the numbers.

The second reading station (Fig. 54f) is available to read the record card and the sensing devices are provided with plug sockets to carry the impulses to the accumulator entry sockets.

The accumulator must be signaled to add the amount being read. Therefore, it is necessary to connect by plug wire from the card feed cycles plug socket 977 (Fig. 54f) to the accumulator control plus entry socket 978 (Fig. 54h). It is explained hereinbefore how the card feed cycles relay R1641 is picked up during starting and card sensing operations. Now it is used further as an indication that the accumulator is ready to receive a number without it being listed. A plug wire is also connected from socket 977 (Fig. 54f) to carry the card cycles impulse to the accumulator control plug socket 979 (Fig. 54h) which is for direct entry or direct reset.

The plus control circuit includes line 920 (Fig. 54f), wire 860, cam contacts CF29 and CF30, card cycles relay contact R1641a, plug socket 977 and a plug wire to socket 978 (Fig. 54h), relay R371 which is the plus control relay and wire 861 to line 921. A parallel circuit is completed by plug wire from socket 977 (Fig. 54f) to plug socket 979 (Fig. 54h) and the card cycles impulse is directed into the direct entry control relay R149 and then carried by wire 861 to the line 921. These two relays R149 and R371 serve to effect connections making direct entry possible.

The normally open plus relay contacts R371-5 at the lower right-hand corner of Fig. 54h are closed to complete the accumulator circuit to add any impulse read from the card at the second reading station. In series therewith are the relay contacts R149-7 controlled by the direct entry relay for the purpose of carrying the card reading impulse directly to the accumulator adding magnet AM.

Relay R371 also controls contacts for calling into operation the list control relay R223 (Fig. 54h) and it does this by shifting contacts R371–1. The circuit for the list control relay includes line 920 (Fig. 54g), cam contacts CR70, wire 1028 (Fig. 54h), relay contacts R371–1, list control relay R2223 and wire 861 to line 921.

At the bottom of Fig. 54h, it is seen that, in series with the adding magnet AM, are the normally open list control contacts R223–5, the normally open direct entry contacts R149–7 and the normally open plus contacts R371–5 and now all these points are closed to complete a circuit to add into the accumulator directly from the card at the second reading station as follows: From the line 920 (Fig. 54f), through the CB contacts, cam contacts CF28, card control relay contacts R1632g, wire 892 to a particular sensing device at the second station including brush structure 85, commutator contacts 83 and sensing brush 82 to a common conductor 81 in series with brush isolation contacts R1122–7 now closed, plug socket 975 and a plug wire to socket 976 (Fig. 54h), then through the normally closed read out relay contacts R445–7, the normally open list control relay contacts R223–5, the normally open direct relay contacts R149–7, the normally open plus relay contacts R371–5, the adding magnet AM and line 921.

The circuit breaker contacts CB direct impulses through any perforations sensed in the card and these, in turn, start the accumulator wheels rotating until they are stopped by the mechanical knock-off at 0 reading time (150°). The accumulator is thereby adapted to register the numeral value equal to the value of the perforation in the card.

All accumulator orders in the normal condition are actually standing at the position "9." Therefore, when the accumulator receives an impulse, it will latch up the 10's carry contact as it passes from the 9 position to the 0 position. Assuming that a 5 is to be added, the accumulator will latch the 10's contact and turn through 0, 1, 2, 3 and stop at 4. A carry impulse will then be sent through the 10's contact, advancing the accumulator one more unit of rotation, thus changing the accumulated 4 to the proper 5 and all other accumulator positions are advanced from 9 to 0.

The carry control relay R638 (Fig. 54g) is energized by the closure of cam contacts CR61 at 295 to 315° in time to complete the circuits from the 9 and 10's accumulator and carry contacts 141 and 140 (Fig. 54h) to direct impulses into the accumulator adding magnets AM. The contacts R638–4 of the carry control relay are seen to be in a series connection between the adding magnet AM and a carry control plug socket 981. The carry impulse is conducted by plug wire from the 9's contact of the highest order of the accumulator and transmitted to the adding magnet of the lowest order of the related accumulator group.

The complete carry circuit includes line 920 (Fig. 54f) through the CB contacts to post #3 and then by wire connection 862 to cam contacts CR76 (Fig. 54g), wire 1051 and through the latched up 10's contact 140 at the right (Fig. 54h), and through wire 1052 to normally open carry control contacts R638–2 of the next higher order and through that adding magnet AM to line 921. Parallel circuits are completed through other carry control relay points of relay R638 and closed 9's contacts 141 in other orders and the units adding circuit will be completed in those positions. There is also a parallel circuit through the 9's contact of the highest order and through a plug wire to the plug socket 981 already mentioned. From socket 981 an impulse is carried to any lower orders at "9" through the normally open carry control contacts R638–4, adding magnet AM and line 921.

*Type wheel control of accumulation*

The usual style of entry in an accumulator is through the printer so that there is assurance that the number printed is the same as the number added. This type wheel entry is performed by directing the type wheel "echo" impulse into the accumulator. Assuming that it is desired to accumulate the amount printed, the card perforation amount is read to the print unit which, in turn, governs the rotation of the type wheel. The type wheel, when it turns, closes contacts 112 (Figs. 12a and 54f) and emits an impulse which is entered into the accumulating magnet.

A number of plug wire connections must be made in order to condition the accumulator for control by the printer. Some of the connections already discussed under "Direct Entry" are the same and others of such connections are omitted. For example, the direct entry connection to plug socket 987 (Fig. 54h) is not made and therefore relay R149 is not picked up as was the case for direct entry. The plus entry control is effective by the plug wiring from socket 977 (Fig. 54f) to socket 978 (Fig. 54h) to pick up relay R371 the same as with the direct entry control. The plug wiring for accumulator entry, i.e., from socket 975 (Fig. 54f) to socket 976 (Fig. 54h) and the carry control connection to 981 are also the same. The amount perforated in the card is to be listed or printed as well as entered into the accumulator. Therefore, to complete the print circuit, it is necessary to connect the accumulator exit plug socket 984 (Fig. 54h) to the "Accumulator Controlled Printing" socket 983 (Fig. 54f) in the print unit. From the connections shown at the lower right-hand corner of Fig. 54h, it may be gathered that the connections for the accumulator entry controls are used for carrying the impulses to the printer and these same connections are also shifted and used to carry back the type wheel echo impulse into the accumulator add magnet on the second half of the machine cycle.

The card cycles control governs direction of an impulse through relay contacts R1641a (Fig. 54f). It is carried through plug socket 977 to plug socket 978 (Fig. 54h) to pick up the plus control relay R371. This relay R371 in turn energizes the list control relay R223. The circuits for both of said relays are the same as explained hereinbefore.

*Total printing and reset*

When the machine is conditioned for total printing and resetting, the accumulated total is printed and the echo impulse is used for resetting the accumulator to a 0 balance. This form of restoration provides a further indication that the amount printed agrees with the amount accumulated.

If a 5 is added in the accumulator, the 5 impulse will print the total 5 and the echo impulse is used to stop the accumulator from turning (when resetting, this is a debit accumulated amount). Therefore, resetting the accumulator is accomplished by adding the complement of the amount which has been printed as a total (resetting by subtraction).

Total printing and resetting is under selective control of the program stepping relays and the circuit is completed by a plug wire from any step of program desired (Fig. 54e) to the accumulator read out and reset plug socket 986 (Fig. 54h). The program control circuit is explained hereinbefore in connection with the program unit and the circuit used here is the same up to the point of plugging at socket 985 (Fig. 54e). A connection is made from socket 985 to socket 986 (Fig. 54h). The aforementioned connection is provided to pick up a reset control relay R519 which is connected to the opposite side of the line by wire 861. Arranged in parallel therewith is a read out control relay R445 also picked up by the same circuit.

The normally open reset relay contact R519–3 is closed to complete a circuit to energize a minus control relay R297 by a circuit including cam contacts CR69 (Fig. 54g), wire 1032, through the normally closed inversion relay contacts R75–1 (Fig. 54h) relay contacts R519–3, minus relay R297 and wire 861 to line 921.

The normally open minus relay contacts R297–5 shown at the lower right corner (Fig. 54h) are then closed to complete a circuit to start the accumulator wheel turning at the "9" echo reading time, said circuit including line 920 (Fig. 54f), circuit breakers CB, post #3, wire 862 (Fig. 54g), cam contacts CR73 and CR74, closed at 155° which coincides with the "9" echo time, wire 1033 (Fig. 54h) and through shifted reset relay contacts R519–4, wire 1037, normally open minus relay contacts R297–5, accumulator magnet AM and line 921. Parallel circuits are completed to all other adding magnets of the related group through their respective minus relay contacts. Therefore, all the accumulator wheels of the related group start rotating at the 9 echo impulse time.

The normally open read out relay contacts R445–7 (Fig. 54h) are closed to complete a circuit through the accumulator emitter to the printer unit to control total printing. The circuit includes line 920 (Fig. 54f), the circuit breakers CB, post #3, wire 1043 carrying an impulse at the 5 time (67 to 75°) through the total print emitter (Fig. 54g) comprising the brush structure 1039, a contact point 1040 in the 5 position and wire 1041 (Fig. 54h), and then through the normally closed inversion relay contact R75–5, wire 1042 to the accumulator contact 146, and then through the commutator brush structure 154 to the common contact strip 155 in series with the normally open read out contacts R445–7, thence through the normally open list control contact R223–5, the normally closed direct entry contact R149–7 to the socket 984 and by plug wire to socket 983 (Fig. 54f) and then through the normally closed contacts R777–1 contacts to the print magnet 161 and line 921 as already described. The 5 echo impulse is fed back into the accumulator stop magnet SM (Fig. 54h) from the accumulator exit socket 984 through the normally closed direct entry contacts R149–7, the normally closed list control contacts R223–5, the normally closed plus relay contacts R371–5 to the accumulator stop magnet SM and line 921.

This echo impulse comes from contacts 112 (Fig. 54f) and through cam contacts CR106 and CR107 and circuit breakers CB, so that the circuit is completed through the stop magnet SM at the 5 echo impulse time. Therefore, the accumulator wheel starts turning at the 9 echo impulse time and stops at the 5 time. Thus, turning the accumulator from 5 and through 4 units of motion to put the wheel to 9, this 9 is inverted when printed to the complement and will be represented as a "0." This is a 0 balance condition.

When resetting an accumulator, a portion of which stands at 0 and another portion of which stands at significant figures, then the portion standing at 0 is also started turning at the 9 echo impulse time. Because, in that operation there is no echo impulse read back, the mechanical knock-off stops the accumulator wheel at the 0 echo impulse reading time, adding 9 to all such orders. All accumulator orders are therefore set to 9 or a 0 balance thereby completing the resetting of all accumulator wheels of the group. There is no carry when resetting the accumulator to a 0 balance.

*Accumulator resetting without printing*

At times, conditions arise where accumulators are required to accumulate and then reset without printing. For example, in the case of an accumulator used for page numbering, it is required on a control change between numbers of cards that the related accumulator or accumulators be reset by plugging from socket 985 (Fig. 54e) to socket 987 (Fig. 54h) to pick up relay R149 and switch connections so that resetting may be effected without printing.

*Tape control of paper feed*

In Figs. 2 and 3, it is illustrated that a feed control tape TP is moved in synchronism with the movement of record cards BC or LC and bears feed control indicia in the form of perforations for determining the stopping positions of the records to receive lines of print. The mechanical aspects of the tape feed controls are described hereinbefore under the heading Tape Control of Sheet Feed. It is now proposed to set forth electrical controls exercised by the tabulator sensing devices over the clutching and declutching of the tape feed to advance the records and tape and also set forth the controls exercised by the electrical sensing devices cooperating with the tape to control the stopping positions of the records. Considered generally, the tabulator controls initiate bill card feeding and the tape sensing controls govern the stopping positions.

The electric controls about to be considered are simplified and presented merely in the form of sample circuits. For a more detailed description of the tape controls, reference may be made to the Patent 2,531,885 of A. W. Mills et al., Serial No. 609,854, filed on August 9, 1945 and issued November 28, 1950.

Most of the control magnets, relays and connections for the feeding devices are shown in Figs. 54b and 54c of the wiring diagram. In Fig. 54c, it is seen that the feed control motor M is in continuous operation by means of a circuit established across the main lines 920 and 921. Associated with drive connections from motor M are the two feed control clutches described hereinbefore, the one being controlled by the low speed magnet LS which is energized alone for line spacing and overflow skipping and the other clutch is called in by magnet LS in cooperation with the high speed interposer magnet HS which is energized to clutch other gearing to skip over a bill card end after the printing of a total. Most of the wiring controls are concerned with the operation of one or both of these clutch control magnets and stopping the platen and the pin feed tape drum to which the clutches are connected.

Also shown in Fig. 54c, is a diagrammatic showing of the pin feed drum 331 for holding the control tape in cooperation with a series of sensing brushes B1–B13 for contact through the feed control indicia in the tape.

The perforations in the tape cause the sensing brushes to signal the machine to stop the record or, in case of overflow, group change or total signals, to eject the record and feed to a predetermined line of the next card.

There are 12 tape reading brushes B1–B12 which sense, in different channels of the tape, the presence of feed control perforations. The first 10 brushes can be used to control the stopping of the strip at a given line after the strip movement has been initiated. Channel No. 11 is used to signal overflow conditions. Channel No. 12 is ordinarily used for selective spacing, that is, the arrangement to vary the spacing of a form according to the perforations for each printing line of the form.

The two forms of control exercised by the tabulator over the record feeding devices are provided by the group control mechanism and the X perforation sensing devices for determining the appearance of heading cards after detail cards or detail cards after heading cards. A perforation placed in the X position of the heading card HC is used to distinguish heading cards from detail cards. As the cards are advanced in succession through the machine, sensing devices cooperate with the particular column in which heading card indicators such as the X perforation are found to detect changes from heading to detail and detail to heading. This is sometimes referred to as X to no X and no X to X control. Because these sensing devices are usually used to initiate feeding, that is, to advance, for example, from a last heading line to a first detail line, they are called Skip Control impulses and are normally plugged to the Carriage Skip plug sockets which are associated with the first 10 channels of tape for controlling stopping the record.

Assuming that the record card is formed with forms 3″ long and allowing 6 printing lines to an inch, then there are 18 stop positions available in all channels.

Also assuming that the form is laid out to receive the first heading impression on line 4, then this becomes the first printing line of each card form and a perforation is punched in channel No. 1 of the tape in the fourth stop position. The street and city lines for heading follow directly thereafter but require no feed perforations in the tape. One space below the city line, the first item or detail line may be printed. This position is also called the first body line position. To control location of this printing line, a stop perforation is punched in channel No. 2 of the tape and in the seventh stop position.

Detail lines of print for items are listed to the fifteenth line, reserving three lines beyond that for printing minor, intermediate and major totals if a group change occurs.

Turning now to detection of the presence of heading cards at the first reading station, this is done by sensing all cards to determine whether they bear the X perforation of a heading card HC (Fig. 2). In Fig. 54f it is assumed that a plug socket 954 is connected to a card reading device 83, 85 in that column set aside for detection of heading card X perforations. When a heading card appears at the first reading station, the circuit is set up through the circuit breakers CB and the usual train of card reading connections to plug socket 954. From there a plug wire is connected to the X control plug socket 955 (Fig. 54b) and then passes through the normally open X relay contacts R1578-9 to the heading control first reading pickup coil R1668 and through wire 853 to line 921. This X control relay contact R1578-9 is closed by controls energized by a circuit through line 920 (Fig. 54a), cam contacts CR10, relays R1575, R1578 and R1581, wire 918 and line 921. This circuit energizes the X relays so that all normally open X control contacts are closed for "X," "R," and carriage skip impulses to pass through them.

A holding circuit for relay R1668 (Fig. 54b) is established from line 920 through wire 863, cam contacts CR24, contacts R1668a, the holding coil of relay R1668, and wire 853 to line 921. The contacts of relay R1668 are used to select the carriage skip control impulse and are described later.

With relay R1668 energized, a parallel circuit is established along with its holding coil through the cam contacts CF25 to the pickup coil of the heading control transfer relay R1669. The holding circuit for the transfer relay is established from line 920 through wire 863, cam contacts CF8, contacts R1669a and the holding coil of the relay R1669, wire 853 and line 921.

The transfer relay R1669 closes contacts R1669b in series with the heading control second reading relay R1670 which is energized at the time cam contacts CF7 close. Relay R1670, when energized, prepares a holding circuit which includes line 920, wire 863, cam contacts CR24, relay contacts R1670a, the holding coil of relay R1670 and wire 853 to line 921.

The contacts of the second reading relay R1670 are used to control skip impulses and the circuits will be described with the feed skip controls. These two heading control relays R1668 and R1670 control the bill feed advance to conform to the sequence relationship of heading and detail cards passing through the two card reading stations of the tabulator.

The other skipping control is governed by the group control or group comparing circuits described hereinbefore. Upon disagreement as to group number of successive cards, a circuit is established from the group control devices to the feed control relays. The comparing exit impulse will be carried from any socket such as plug socket 947 (Fig. 54d) to socket 957 (Fig. 54b) and then directed through the pickup coil of the skip control relay R1589 and wire 853 to line 921. A holding circuit is prepared for the error skip relay R1589 by the closure of contacts R1589-1 in series with cam contacts CR24, the holding coil of relay R1589 and wire 853 connected to line 921. The purpose of contacts operated by relay R1589 is to shift the feed skip control impulses from the normal exit plug sockets (top of Fig. 54c) to the transfer plug sockets in order to change the stopping control from the usual heading to detail or detail to heading variety to the form involving total printing or skipping to indicate missing tabulator cards.

Taking as an example a situation wherein a detail card is found at the second reading station and a heading card of a different account number is found at the first reading station, this is the usual arrangement when conditions warrant the change from card to card in the bill feed. The relationship of the tabulator cards is "detail to heading," i.e., no X to X with a coinciding group change. The purpose then is to prepare connections for advancing an incoming bill card to a first heading line and circuits are established to do this as noted with reference to the upper left-hand portion of Fig. 54c. There it is seen that a circuit will be completed through line 920, cam contacts CR27, the normally open heading control contacts R1632b, first card in relay contacts R1675b, MLR interlock contacts R1500-11, the normally open heading control first reading contacts R1668B, the normally closed heading control second reading relay contacts R1670c, the normally open error skip control contacts R1589-3 and then to the plug socket 958 which is a skip control exit. From socket 958, a plug wire connection is made with socket 959 (Fig. 54b), in order to pick up a relay R1597 which is connected through wire 1089 to the line 921. It is relays such as R1597 which are used to pick up the controls for selecting one or the other of the tape sensing brush circuits for governing the channel of the tape which is to control stopping of the bill card feed. The first two of a series of such controls are shown arranged down along the right side of Fig. 54b and these successive devices are related to the 10 stop control brushes cooperating with the tape. The plug connection 959 already mentioned is made to the first of such 10 controls because it is desired to use channel No. 1 of the tape to control stopping of the bill record with the first heading receiving line in printing position.

A holding circuit is established for R1597 through cam contacts CF9, wire 1090, contacts R1597-1, the holding coil of relay R1597 and wire 1089 to line 921. Then a circuit is directed through the pickup coil of relay R1612 through line 920, cam contacts CR25, the normally open first card in contacts R1689b, then either of the minor-2 relay contacts R1412-4 or program end R1440-4 contacts, space control relay contacts R1661b, the normally open contacts R1597-2, the pickup coil of relay R1612 and wire 1089 to line 921. A holding circuit for relay R1612 is established from line 920 through the skip end contacts R1685d, wire 1097, the normally open contacts R1612-1, the holding coil of relay R1612 and wire 1089 to line 921. Fig. 54c shows that relay R1612 controls contacts R1612-2 in series with the tape sensing brush B1 of the first tape channel and thus serves to connect the brush to feed stop controls in a manner pointed out hereinafter.

It is believed best to explain first how the tape and bill card are moved in synchronism and the tape sensing brushes sense the tape in order to initiate the controls exercised by the tape.

Ordinary line spacing of the bill record occurs before printing while, on the other hand, ejection of the record starts immediately after printing. Therefore, each of these two forms of operation will be described separately.

The circuit to initiate movement of the bill card for a single line space is completed from line 920 (Fig. 54c) through cam contacts CR28, the normally closed list contacts R1457-3, the first card in contacts R1675c, the space suppression contacts R1663b, the normally closed space or skip contacts R1662B, the common space control contacts R1661c, the pickup coil of relay R1676, and wire 1091 to line 921. A holding circuit is established through line 920, wire 1077, through the stop contacts ST, the normally open start relay contacts R1676b, the holding coil relay R1676, the normally closed stop No. 2 contacts R1684A, and wire 1091 to line 921.

Shifting of the start control relay contacts R1676B serves to deenergize the skip end control relay R1679 and at the same time complete a circuit through the clutch magnet LS, the circuit being through line 920, wire 1077, the normally open contacts R1676B, the normally open skip contacts R1673d, switch BFS3 closed for ordinary spacing, the normally closed stop 1 contacts R1683A, clutch magnet LS and wire 1091 to line 921. Energization of clutch magnet LS will cause the mechanism to engage and move the platen, bill card and record tape and at the same time operate the circuit breaker contacts 895 of the tape unit. The tape unit circuit breaker controls the impulses for all tape control and stopping circuits.

After movement of a single line space, the stopping circuit is completed from line 920 (Fig. 54c), through wire 1080, circuit breaker 895, plug connection 1082, wire 1083 and then in series through all normally closed channel transfer relay contacts R1612 to R1621 inclusive, wire 1084, end of form contacts R1681B, carriage restore contacts R1677c, wire 1085, the normally open carriage start contacts R1676a, the two feed stop relays R1683 and R1684, wire 1091 and line 921.

Relay R1683 has contacts R1683A in series with the feed clutch magnet LS and when they are opened the magnet is deenergized to stop movement of the platen, bill card and control tape.

The other stop relay R1684 has contacts R1684A, normally closed, in series with the start relay R1676 so that when they are opened, the holding coil of the start relay is deenergized to break the feed start hold circuit.

Deenergization of the start relay R1676 also serves to permit the shifting of start control contacts R1676B back to the normal position to complete a circuit to the skip end control relay R1679 through wires 1077 and 1091.

Relay R1676 serves in another way through the opening of the feed start contacts R1676a in series with the stopping control relays R1683 and R1684 so that they are again deenergized to allow connections for circuits controlling further feed movement.

It is already noted that related to each tape feed control channel are two relays for controlling skip stopping. For example, the first channel has relays R1597 and R1612 (Fig. 54b), the second channel has relays R1598 and R1613, etc. It is also noted that the pickup and holding coils of relays R1597 and R1612 are picked up successively.

Relay R1612 not only makes the channel No. 1 tape brush B1 effective (Fig. 54c) but it also operates to open the contacts R1612–1 (Fig. 54b), and thus break a series circuit through the skip impulse relays R1673 and R1674 usually energized by connections including line 920 (Fig. 54b), skip end contacts R1685d, wire 1097, transfer relay contacts R1612–1 to R1621–1 in series, wire 1096, relays R1673 and R1674, wire 1089 and line 921. Control over relays R1673 and R1674 is then shifted to cam contacts CR91 and the circuit includes line 920, skip end contacts R1685d, wire 1097, wire 1098, cam contacts CR91, contacts R1673a, relays R1673 and R1674, wire 1089 and line 921.

The skip impulse contacts R1673d (Fig. 54c) are in series with both clutch control magnets and serve to distinguish between ejection and space control when a start impulse is received and thereby call in the clutch magnets HS and LS accordingly.

In order to condition the controls to start ejection immediately after printing, the skip impulse contacts R1673c (Fig. 54b) are closed in series with the pickup coil of relay R1662 and a circuit is directed therefrom including cam contacts CR2 (Fig. 54a) and wire 1100. Then the space or skip control relay R1662 (Fig. 54b), is held by the closure of related contacts R1662a and the remainder of the holding circuit includes line 920 (Fig. 54a), cam contacts CR13, wire 1101 (Fig. 54b), the normally open contacts R1662a, the holding coil of relay R1662 and wire 853 to line 921.

Relay R1662 then shifts related contacts R1662B (Fig. 54c) to complete a circuit through the pickup coil of the carriage start relay R1676. The complete circuit included line 920, cam contacts CR29, wire 1110, the normally open contacts R1662B, normally open space contacts R1661c, pickup coil of relay R1676, wire 1091 and line 921. The carriage start holding circuit and the other circuits controlling the energization of the Skip End control are the same as described with reference to single line space circuits.

To eject a bill card by high speed ejection, the carriage start contacts R1676B (Fig. 54c) are shifted to close in series with interposer magnet HS. The ejection circuit is completed as follows: From line 920 through wire 1077, the normally open carriage start contacts R1676B, the normally closed skip impulse contacts R1673d, switch BFS2 closed for ordinary skipping, the normally closed overflow contacts R1682c, the normally closed carriage exit contacts R1680B, interposer magnet HS, and wire 1091 to line 921. Energization of the interposer magnet shifts the feed clutch drive to call in the high speed gearing and it also closes the interposer clutch control contact 317 which provides a branch circuit through wire 1111, the normally closed carriage stop contacts R1683A, clutch magnet LS, wire 1091 and line 921. Energization of the interposer magnet HS and clutch magnet LS causes the bill record card to be ejected at high speed along with rotation of the platen and movement of the control tape and operation of the carriage circuit breaker.

Energization of transfer No. 1 relay R1612 (Fig. 54b) will condition the feed unit to control stopping the record under control of the first tape sensing channel. The circuit to effect the stopping control will be established at the time the tape brush B1 (Fig. 54c) receives an impulse through a perforation in channel No. 1 of the tape. The stopping control circuit may be traced from line 920 (Fig. 54c), wire 1080, circuit breaker 895, wire 1081, the common brush B13, through the tape contact roll 331 and then through the perforation in channel No. 1 to the sensing brush B1. The circuit continues through the normally open transfer relay contacts R1612–2, wire 1084, "end of form" contacts R1681B, the normally closed carriage restore contacts R1677c, wire 1085, the normally open carriage start contacts R1676a, carriage stop relays R1683 and R1684, and wire 1091 to line 921. Opening of relay contacts R1683A deenergizes the feed clutch magnet LS. At the same time, a parallel circuit is established through skip impulse contacts R1674b and the skip end relay R1685. For the latter a holding circuit is completed by closure of contacts R1685a and a circuit is set up from line 920 (Fig. 54c) through a wire 1103, the normally closed skip end contacts R1679B, the normally open contacts R1685a, relay R1685, wire 1078 and line 921.

Then relay R1685 opens the related contacts R1685d (Fig. 54b) in series with all the transfer relays and in this way deenergizes any or all of the transfer relays and the overflow and carriage exit control relays if they are energized. When deenergized, the transfer relays close contacts such as contacts R1612–1 in series with the skip impulse relays R1673, R1674 which are again energized as they are at all times except during ejection.

The carriage start relay holding circuit for relay R1676, the clutch magnet circuit and the skip end pickup circuit are the same as explained in connection with single line space circuits. The opening of the normally closed skip end contacts R1679B (Fig. 54c) will open the skip end holding circuit through relay R1685.

Assuming that the bill record and the tape are arranged as described hereinbefore, after the three lines of heading have been read, and the name, street and city printed, the heading to detail card sensing change will be signaled through the carriage skip control exit (Fig. 54c) and from the associated plug socket 961, a circuit will be completed by plug wire to socket 962 (Fig. 54b) leading to the pickup coil R1598 of the second channel. The circuit for initiating record advancement will be the same as that already considered with the exception that the pickup relay R1598 relates to the second channel and brush B2 and the transfer No. 2 relay R1613 also relates to the same channel and their contacts will select tape sensing circuits (Fig. 54c) similar to the channel No. 1 circuits but advanced one step beyond such circuits.

The stop circuit will also be the same except that now channel No. 2 is controlling and a perforation in the tape at the position of the first detail line, that is, at the eighth stop position will control termination of the record movement through the normally open contacts R1613–2.

The foregoing sections of the description of the wiring controls deal mainly with the tabulator devices in a general way. For more detailed consideration, reference may be made to the Patents 2,531,885 and 2,569,829 already identified. The portions of the specification presented hereinafter are concerned mainly with the bill feeding controls and the means for sensing, piercing and checking the bill data under control of or in comparison with the data on the tabulator cards.

Referring to Fig. 54h it is seen that by closure of switch SW3 the bill feed motor 467 is energized by a circuit including the main lines and wire 864.

Before considering the sensing and piercing operations performed in conjunction with the bill or ledger cards, it is believed advisable to first consider the manner in which the bill cards are issued out of the magazine or bill feed and brought over by picker mechanism to the stopping gate at the first station which is the sensing station and then later brought over to a second gate which is the one near the platen and then progerssively line spaced and skipped for spacing from heading to detail and finally skip spaced for ejection purposes to carry the bill card still further into the bill feed unit where piercing is performed, and that is followed by ironing and stacking.

The picker mechanism cooperating with the bill feed mechanism is usually operated along with a group change of the cards in the tabulator because that is the function accompanied by total printing as the final printing operation on a bill. Therefore, ejection of such a finally printed card usually requires the reinsertion of a successive card which is to be drawn from the magazine. The picker clutch magnet PCM is shown in Fig. 54c and the circuit for energizing it includes line 920, wire 1077, the bill feed switch BFS1, cam contacts BCR1, wire 865, contacts R1236k (operated by relay R1236 mentioned hereinbefore as energized by a minor group change for the purpose of initiating a first program stop), contacts PHC closed by the presence of cards in the hopper or magazine of the bill feed, picker clutch magnet PCM and wire 1091 to the line 921. Arranged in shunt around the minor change contacts R1236k are a pair of key operated contacts for use in operating the picker in connection with initiating starting or clear out cycles.

When picker magnet PCM is energized it connects the clutch shown in Fig. 28 and operates the picker mechanism to issue a bill card out of the magazine M. This card is then brought into the sensing unit S and stopped by the gate 535, Fig. 27, as described more fully hereinafter with respect to clutching and operation of the sensing unit. For the time being, it may be assumed that the bill card is past the sensing unit S and also past the second gate 563, Fig. 29, at the platen and frictionally held on the platen and ready for a series of line spacing operations.

Assuming that a listing cycle has taken place and printing has been effected, and then later in that cycle the closure of cam contacts BCR2, Fig. 54c, serves to pick up a spacing control relay BR1662 for operating the line spacing clutch magnet LS of the tape control carriage unit which has been considered hereinbefore. The circuit for picking up the spacing control relay includes line 920, wire 1077, switch BFS1, cam contacts BCR2, the single item ejection switch SW4 which is now set for normal listing and skipping operations, the normally closed contacts BR5b, the pickup coil of relay BR1662 and wire 1091 to line 921. The relay is held energized through a holding circuit including line 920, wire 1077, switch BFS1, wire 867, contacts R1684c of the carriage stop relay, hold contacts BR1662a, the holding coil of relay BR1662, wire 1091 and line 921. Relay BR1662 then closes contacts BR1662b shown near the top of Fig. 54c and a circuit is completed through the line spacing control magnet LS including line 920, relay contacts BR1686b, relay contacts R1685g, contacts BR1662b, the bill feed switch BFS3, relay contacts R1683A, space clutch magnet LS, wire 1091 and line 921. Magnet LS then operates the carriage to advance for a line space at the completion of which the carriage stop relay R1684 becomes operative to open contacts R1684c and break the circuit to the spacing relay BR1662 and thereby limit the amount of platen movement. The space clutch magnet LS is immediately de-energized by operation of the other carriage stop control relay R1683 which opens the contacts R1683A in series with the magnet.

As an example of a space skipping operation; i.e., a movement of the platen involving more than one line space and usually for the purpose of ejecting a card after the printing of the total, it may be assumed that a minor group change takes place and in such instances the related relay R1236 is energized as pointed out hereinbefore. Then the relay contacts R1236k of minor relay R1236 pick up a relay BR5 which serves to switch the connections from those requiring spacing operations to those selecting skipping operations. The initial circuit is the one picking up relay BR5 and involves line 920, wire 1077, switch BFS1, cam contacts BCR3, minor control contacts R1236k, the pickup coil of relay BR5 and wire 1091 to line 921. A holding circuit is established for the relay through the closure of contacts BCR4, the related relay contacts BR5a, the holding coil and wire 1091 to line 921. The relay BR5 then serves to shift the contacts BR5b to open them in series with the space relay BR1662 and instead close the alternative contacts BR5c arranged in series with the skipping control relay BR1673. The skipping pickup circuit includes line 920, wire 1077, switch BFS1, cam contacts BCR2, switch SW4, contacts BR5c, the pickup coil of relay BR1673 and wire 1091 to line 921. The skipping control magnet is held through its own shifted contacts and through the normally closed contacts of the carriage stop relay R1684. The circuit includes line 920, wire 1077, switch BFS1, wire 867, contacts 1684c, BR1673b, the holding coil of relay BR1673, wire 1091 and line 921. The skipping relay then closes contacts in series with the high speed interposer clutch magnet HS of the carriage drive unit and also operates the carriage clutch magnet LS through the usual closure of the connecting contacts 317. The circuit for picking up the interposer magnet HS for purposes of skipping operation includes the closure of relay contacts BR1673c and the complete circuit involves line 920, relay contacts BR1686b, contacts R1685g, contacts BR1673c, the bill feed switch BFS2, normally closed relay contacts R1682c and R1680B, magnet HS and wire 1091 to line 921.

At the end of the skipping operation a circuit is established through the hole in the control tape and a pair of skip stop relays R1685 and BR1686 are energized and they cause not only the de-energization of the feeding drive connections by the de-energization of the magnets HS and LS through the opening of series contacts BR1686b and R1685g but they also cause the initiation of circuit connections for operating the magnet BPM which is illustrated in Fig. 29, and in connection with which it was explained that this magnet controls the clutch for driving connections for shifting the stopping gate and pressure rollers controlling the positioning of an incoming card before it reaches the platen P. A holding circuit for the skip stop relay BR1686, Fig. 54c, comprises line 920, wire 1077, switch BFS1, wire 867, normally open contacts BR1686a, normally closed contacts BR3a of the automatic start relay, the holding coil BR1686 and wire 1091 to line 921.

Magnet BPM operates the clutch which is designed to rotate a cam for two movements of 180° of rotation for each energization and release of the clutch. The first movement is one designed to raise the gate and lower the pressure rollers so that an incoming bill card is stopped at a definite position before it is frictionally engaged with the platen to advance to the first line recording position. Therefore, as an incident to the ejection skipping or spacing of a bill card after total printing, the platen gate magnet BPM is energized for the first time to close the gate for reception of a new bill card and then shortly thereafter the gate is lowered and the pressure rollers engaged and concurrently therewith another space skipping operation is automatically restarted to bring the positioned bill card to the first recording line position.

The first thing that happens to control the platen gate is the closure of contacts BR1686b by the skip end relay denoting that the ejection is completed and then the gate operating relay BPM is energized by a circuit including line 920, wire 1077, switch BFS1, wire 867, normally closed and mechanically operated gate contacts 620a, relay contacts BR1686b, magnet BPM, wire 1091 and line 921. Magnet BPM then releases the clutch for allowing 180° of movement of the cam 589 shown in Fig. 29 for operating lever 598 to raise the gate 563 and lower the pressure rollers 430. The gate is held elevated long enough to stop the incoming card which is drawn out of the sensing unit and brought over to the platen. As it comes over toward the platen it closes card lever contacts 580 and they are in series with the gate operating magnet BPM for permitting the second energization of the magnet which happens later to allow the completion of the cam movement for another 180° to again lower the gate and engage the pressure rollers so that the bill is then advanced around the platen to the first line position.

Referring again to Fig. 29, it is noted that when lever 598 is operated by the cam 589 it is moved gradually in a counterclockwise direction and it is this movement which is used to operate the series of three contacts 620a, 620b and 620c for successively de-energizing the magnet, causing an automatic restart of the skipping controls and causing a second energization magnet BPM to bring the lever back to the normal position wherein the gate is lowered and the pressure rollers engaged, and finally causing an automatic restart condition for skipping the new bill card to the first line position.

Turning again to Fig. 54c it is noted that on the initial operation the mechanical switch contacts 620a are opened and this causes de-energization of magnet BPM. This is followed by closure of switch gate contact 620b at a time when a new card is stopped at the gate and then a second energization magnet BPM is accomplished by a circuit including line 920, wire 1077, switch BFS1, wire 867, normally closed contacts R1684c, relay contacts BR1673a closed until the end of the skipping operation, gate switch contact 620b, card lever contact 580, magnet BPM, wire 1091 and line 921.

Along with the second energization of magnet BPM is the closure of contacts 620c for energization of the auto start skip relay BR3. The circuit for start relay BR3 includes line 920, wire 1077, switch BFS1, wire 867, contacts 620c, magnet BR3, and wire 1091 to line 921. Magnet BR3 has related normally closed contacts BR3a in series with the holding coil of skip end control relay BR1686 and it is this relay which terminated skipping operation previously, but now by the energization of the auto start relay and by the opening of contacts BR3a, BR1686 is again de-energized and consequently the related contacts near the top of Fig. 54c, namely contacts BR1686b, are again allowed to close and thereby reinitiate the space skipping operation so that the incoming bill card is brought to the first line position where it is stopped as determined by a spaced hole in the control tape in the usual way.

The time of the arrival of the incoming bill card at the gate 563, Fig. 29, is determined mainly by the timing of energization of a picker clutch magnet PCM. However, this may be modified and delayed by the operation of the gate 535, Fig. 27, at the sensing station which is in turn controlled by the timing of the cam 542 shown in Fig. 41 for controlling the operation of the first gate.

The skipping operation for causing the movement of the incoming bill card to the first line position is terminated along with the energization of the carriage stop relays R1683 and R1684, Fig. 54c. The former operates to open contacts R1683A to de-energize space clutch magnet LS and the other relay R1684 operates to open contacts R1684c in series with the magnet BPM and thereby terminates the second energization of the same.

When the card in the bill feed is of the form of a ledger card, or any other document requiring vertification of its identity in comparison with the item cards in the tabulator, then such a ledger card is stopped at the sensing unit while the sensing wires are lifted through the ledger account number perforations to take a reading thereof. Operation of the sensing unit is controlled by rotation of shaft 498, Fig. 41, and that in turn is controlled by the clutch shown in Fig. 28 with its control magnet SCM. The timing of the sensing unit clutch magnet SCM is in part controlled by relay contacts R520K, Fig. 54j, which are operated by a counter reset test relay R520 energized in the tabulator as an incident to counter resetting operation and therefore of a timing suited to make ready the circuits for comparing incoming detail and ledger cards.

In Fig. 54h it is seen that a relay R519 is energized as an incident to counter resetting through the plug hubs 966 and 986. Relay R519 has contacts R519a in series with cam contacts CR66 and the pickup coil of relay R520. The holding coil of relay R520 is held energized through R520a and cam contacts CR67 remaining closed in the cycle following resetting. Late in the cycle, cam contacts BCR8 close, Fig. 54j, and a circuit is established to impulse the sensing unit clutch magnet SCM as follows: line 920, cam contacts BCR8, wire 868, switch SUS closed when the sensing unit is used, relay contacts R520K, clutch magnet SCM and wire 871 to line 921. Magnet SCM then serves to connect the gears 493 and 494a, Fig. 28, to drive the shaft 498 which operates to lift and lower the sensing unit and set the wires 671 therein for making contact selectively according to the data perforations encountered.

In preparation for the use of the sensing unit pulses for comparing, Fig. 54j, plug connections are established to pairs of comparing relays, and regular tabulator zero control relay contacts R723 are put in series with such comparing relays R623 and R625 to limit the scope of the comparison. The comparing relays are used in the same way as the group control comparing relays R593 and R595 shown and described with reference to Fig. 54d.

The purpose of the comparison is to determine whether the account number appearing as perforations in the ledger card LC at the bill feed sensing station is the same as the account number perforations of the tabulating cards sensed at the first sensing station in the tabulator. Since the comparison is made before a tabulator card reaches the second sensing station it is possible to stop the machine automatically before items are printed improperly on unrelated ledger cards.

Examples of the two parts of the comparing circuits may be traced with reference mainly to the diagrammatic showing of the electrical parts of the sensing unit in Fig. 54j. Assuming that a "9" is sensed in the first column of the ledger card in the sensing unit, then the bottom wire 671, Fig. 54j, will be touching the column contact bar 676 and an impulse will be directed through the sensing unit emitter SUE a "9" time as follows: line 920, Fig. 54f, master circuit breakers CB1–4, post 3, a wire to the brush holder 30a with the wiping brushes 875 of the emitter SUE, Fig. 54j, said holder being on any CR shaft rotated in unison with the first station commutator shaft 30, Fig. 11, of the tabulator, then through wire 876 and the wire holder 672, displaced "9" wire 671, column contact bar 676, rectifier RT for preventing back circuits, plug socket 880, a plug wire to socket 881, closed contacts R723–4, the pickup coil of relay R625, and wire 871 to line 921.

The other part of the comparing circuit involves line 920, Fig. 54f, circuit breakers CB1–4, post 3, cam contacts CF28, relay contacts R1630b now closed, wire 891, shaft 30, brush 85, the "9" commutator spot 83, then through a "9" hole in the record card, a brush 82, bar 81, plug socket 923 and a plug wire to socket 882, Fig. 54j, relay contacts R723–3, pickup coil R623, wire 871 and line 921.

A holding circuit is established for both relays R623 and R625 through their related contacts and cam contacts CR38 and CR39, Fig. 54d. When agreement is found of ledger card and record card numbers then relays R623 and R625 are energized simultaneously and through their contact controls to plug socket 947a, Fig. 54d, there is no pulse and no control pulse for group change is created as is the case when there is disagreement marked by a stop control pulse through socket 947a.

The actual wire shifting operation of wires through holes in ledger or bill cards, Fig. 54j, does not require much time as noted in the timing chart, but the setting so made may be held or stored and in the meantime the card can be ejected out of the sensing unit as governed by cam 542 which lowers the first card gate or bill stop at the forward end of the sensing unit. The the card receives heading, detail and total print impressions at the platen, as already noted, before being carried over to the piercing unit, the operation of which is about to be considered.

When a bill or ledger card goes into the piercing unit it is stopped and properly positioned by the gate or stop 633, Fig. 51, which is the third gate it has encountered. It is only after piercing has been effected that the related magnet SRM is energized due to the closure of contacts 883 by the rack slide 792 which is used to rock the interposer wires back to normal after piercing. When magnet SRM is energized, the stop 633 is lowered and the card is free to go to the right through the ironing station and to the stacker. The circuit for magnet SRM is shown on Fig. 54j to include line 920, mechanically operated contacts 883, wire 884, magnet SRM and wire 871 to line 921.

The piercing operation is attended by the preliminary functioning of one or more setting up cycles under control of clutch magnet PS, Fig. 54j, before the final actual piercing cycle under control of clutch magnet PO. Thus, an account number may be read into the pierce unit and stored from the first record card of a group, then a series of items may also be read in and stored from other item cards of the same group, and finally one or more totals may be read in before piercing is finally effected.

The piercing set up clutch magnet PS and the piercing set up emitter PUE, Fig. 54i, are both called into operation as attending item entering and total taking operations as signified, respectively, by the action of relays R1515 and R1429.

Relay R1515, Fig. 54d, is seen to be a pilot selector relay which is picked up as an incident to the appearance of a record card at the first sensing station in every card feeding cycle. Relay R1429, Fig. 54e, is shown to be a program step one control relay which is called into operation as an incident to every group change and total taking cycle. Contacts of relays R1515 and R1429 are found in parallel with respect to each other but in series with each of piercing set up control elements, magnet PS and emitter PUE.

Considering first the piercing set up clutch magnet PS, Fig. 54j, the circuit for it is found to include line 920, cam contacts BCR5, wire 885, either contacts R1429k or R1515k depending on total taking or item entering conditions, clutch magnet PS, wire 871 and line 921. Magnet PS then connects the set up clutch shown in Fig. 28 and driving connections are established to the two shafts 750 to operate many ancillary parts used in the setting of the pierce unit interposer wires. Along with the mechanical action of the clutch released by magnet PS it is necessary to make electrical connections and propagate impulses to aid in the set up action. It will be recalled that the digit slides 770, Figs. 46 and 53, are tripped seriatim by the twelve digit release magnets DS which are energized successively on every item entering and total taking cycle. The circuit for energizing magnets DS involves the impulse emitter PUE, Fig. 54i, and includes line 920, cam contacts BCR10 closed 5 degrees after master circuit breaker impulses, either relay contacts R1429n or R1515n, shaft and brush holder 886 of the CR kind of shaft synchronized with card reading and total emitter readout shafts, brush 887, and then in contact successively with the commutator contact spots 888 in the usual order of 9, 8, 7, etc., and through wires such as wires 889 and 898 to the several digit slide release magnets DS in successive order and in delayed synchronism with the reading of card indicia or total data being read off an accumulator, and wire 899 to line 921.

In Fig. 53 it is seen that when a digit slide 770 is released and operates correctly it shifts to the left and causes the closure of the related error checking contact 787. Therefore, directly after the impulsing of each magnet DS there should be a following closure of related contacts 787, Fig. 54i, and direction of a pulse through wire 900 and also a drop in voltage along wire 901 coming from the digit error detecting trigger TD normally conductive at the left but subject to changes by the first and alternate odd impulses to be conductive then at the right. Since a full cycle of piercing emission by emitter PUE involves the impulsing of the twelve digit slide magnets DS and closure successively of the twelve related checking contacts 787, and since complete response of all digit slides results in twelve pulses to the trigger TD which is restored to normal condition by the influence of such an even number of pulses, it is only when there is failure of a slide to move and lack of a pulse which causes an odd number of swings of the trigger TD and a resulting shifted conductive condition out of normal. If near the end of a pierce setting cycle it is found that the right side of trigger TD is conductive then that is a sign of an error in digit slide setting and as a result the upper wire 989 sets up conditional bias on the grid of upper tube 2D21 so that when cam contacts BCR9 close, the digit slide error relay DER is energized. The circuit includes line 920, wire 902, cam contacts BCR9, upper tube 2D21, wire 903, magnet DER and line 921. Error magnet DER may then cause the switching of a light or stopping of the machine by opening contacts such as contacts R1470–1, Fig. 54a, in series with the stop key contacts 877.

Turning aside from the error detection and checking feature for a moment and returning to consideration of the operations attending piercing per se, it will be remembered that in any one column there will be a single or double energization of a column slide control magnet PA, Fig. 45, and a related closing of contacts 835. The single pulse will be for digit settings and the dual pulses for alphabetic code settings. These energizations of magnets PA are synchronized with the energizations of magnets DS so that the column slide 769 shifts the upper wire end in time for the digit slide 770 to engage it. Although only one magnet PA and one set of contacts 835 are shown in Fig. 54i it will be realized that there is such a pair for each column to be pierced in the bill, i.e., about eighty for the usual card size. So also relative to the associated trigger T1 and lower tubes 6AL5 and 2D21, only one of the eighty combinations are shown.

A single set of the twelve digit slide controls DS and a single set of trigger controls TD are enough for digit setting and checking because it will be remembered that each digit slide extends through the full length of the piercing unit and serves for all eighty columns.

It is well to recall also that while magnets DS are invariably and sequentially operated, a magnet PA is selectively and differentially pulsed from either a card or from the total readout of an accumulator.

Figure 47:
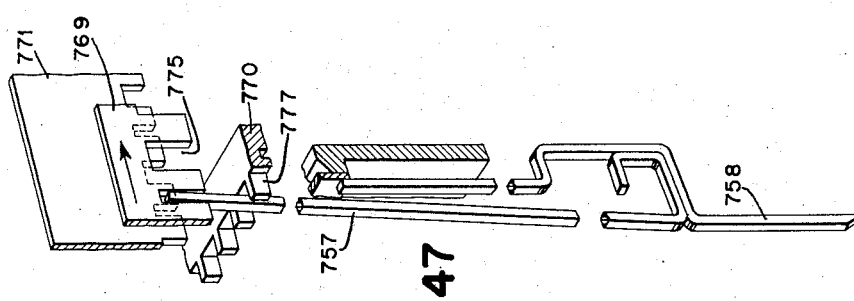
Fig. 47 is a diagrammatic view of the piercing parts of Fig. 46 showing the first motion imparted to the upper end of the settable wire by a column slide operated by a magnet impulsed from a tabulator card or accumulator.

Consider first the setting of a column slide say at "4" by the related magnet PA due to sensing a 4 perforation in column 1 of a card. The circuit involves line 920, Fig. 54f, circuit breakers CB1-4, post 3, cam contacts CF28, relay contacts R1632g, wires 892, 893, brush 85, the "4" commutator sector 83, through a four hole in column one of the card, brush 82, bar 81, relay contacts R1104, plug socket 926 and a plug wire to socket 927, Fig. 54i, normally closed contacts R1236e, magnet PA and line 921. As a result of the energization of magnet PA at "4" the related column slide 769, Figs. 45 and 47, is shifted in time to put the upper ends of the wires 757 of column one over against the tines of all the digit slides 770, but it is only the "4" digit slide 770 which is being released at that particular instant by the related magnet DS and therefore it is only the "4" offsetting or interposer wire 757 which is set for subsequent piercing operation.

Concurrent with the shift of the column slide 769, Fig. 45, there is a checking indication given of its proper response by the closure of checking contacts 835, Figs. 45 and 54i. The use of these contacts will be considered after first considering alternative operation of magnets PA by a total readout as distinguished from the card reading control already noted.

When piercing of the bill is to be controlled also by the reading of an accumulator, then proper plug connections are made to direct total readings into the pierce control magnets PA in much the same fashion that the printing magnets are controlled for total printing as noted hereinbefore. The circuit includes line 920, Fig. 54f, circuit breakers CB1-4, post 3, wire 1043 to the total print emitter, Fig. 54g, comprising the brush structure 1039, a contact point 1040 at a certain digit position (say at "5"), then through wire 1041 and the normally closed inversion relay contacts R75-5, Fig. 54h, wire 1042 to the accumulator contact 146, and then through the commutator brush structure 154 to the common contact strip 155 in series with the normally open read out contacts R445-7, thence through the normally open list control contact R223-5, the normally closed direct entry contact R149-7 to a socket 984 and a plug wire to socket 987, Fig. 54i, through normally open contacts R1236f (closed by selection of a total taking operation), magnet PA and line 921. The "5" pulse from an accumulator read out serves to set a related piercing interposer wire just as did the "4" card pulse noted hereinbefore.

When magnet PA is energized from either the card or accumulator source there is a parallel circuit established through a 6AL5 diode 990 and since the latter is connected through the wire 991 to the first of eighty triggers T1, that device is affected by the drop in voltage between 920 and 921 and caused to become conductive at the right and the normally conductive left side is cut off. This one alternation of the trigger T1 is only one half of what is usually a complete cycle of two alternations caused by a first pulse through magnet PA followed by a checking pulse through related contacts 835. Both pulses are effective to alternate the trigger through the wire 991 already noted.

Assuming that operation of magnet PA is followed by proper closure of related contacts 835, then a circuit is completed for a correction pulse an instant later through the connected capacitor and resistor 992 as follows: line 920, Fig. 54f, circuit breakers CB1-4, post 3, to check switch CS, Fig. 54i, check contacts 835, capacitor 992 and line 921. This second or non-error correction pulse relating to one setting of the piercing unit is effective through wire 991 to cause a second alternation of trigger T1 to recondition it with the right side cut off and the left in the normally conductive state.

In the event of a failure of magnet PA to cause a column slide movement and consequent failure of contacts 835 to close, then trigger T1 remains conductive out of normal due to receiving only one of the usual paired alternations. The right side of trigger T1 is then conductive and that causes the wire to divider 998 to make the connected lower 2D21 conductive so that at test time when BCR9 close, a circuit is directed through the column slide error relay CER as follows: line 920, wire 902, cam contacts BCR9, wire 993, lower tube 2D21, relay CER and line 921. An error is indicated by relay CER stopping the machine in the same fashion as digit slide error relay DER.

After piercing is effected, the card release feed magnet SRM, Fig. 27, is energized to lower the card gate and then the feed picker 638, pressure rollers 549 and belts B are effective to carry the bill card further on under the ironing rollers at IR and then up and over into the stacker ST.

Figure 55:
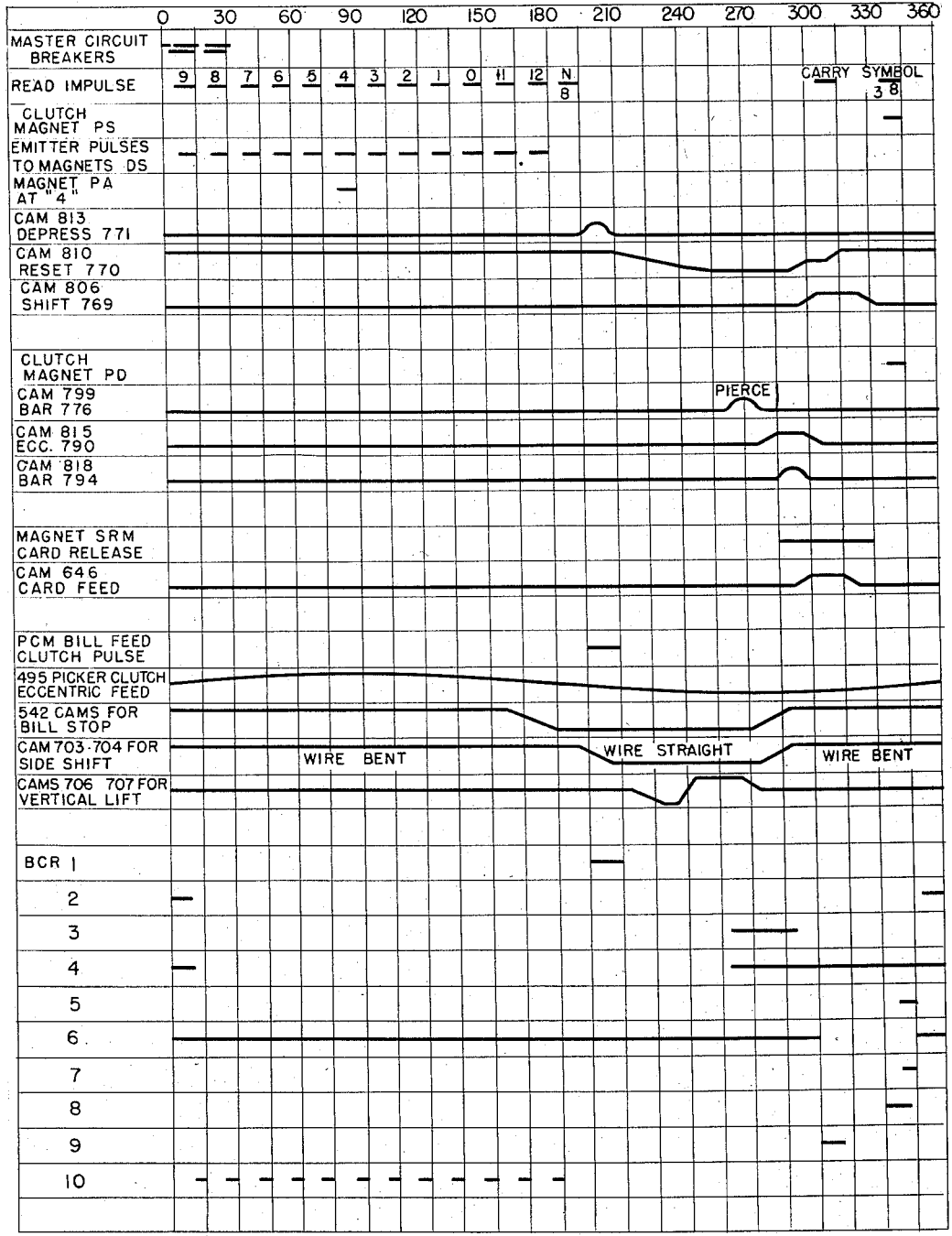

The timing of the many mechanical cams and electrical contacts of the Bill Feed are shown in Fig. 55 and some of the tabulator controls are shown coordinated therewith. Other of the tabulator controls are found with the related timing illustrated in the timing charts shown in Patent 2,569,829.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for piercing a record, a shouldered operator, a slender flexible piercing member normally bent against said operator with one end slightly above said shoulder, an interposer cooperating with said member, means for operating said interposer to cause said member to be shifted to bring said end under said shoulder of the operating member, and means for operating the operating member to move the piercing member to puncture the record.

2. In a device for piercing a record, an operating member, a piercing wire with one pointed end and an opposite end tensioned to press alongside said operating member, an interposer wire cooperating with said piercing wire, means for setting said interposer wire in an effective position, means for operating said interposer wire to shift said piercing wire so that the end opposite said pointed end is brought under said operating member, and means for operating said operating member to depress the piercing wire and project it through a record.

3. In a device for piercing a record, a piercing operator, a pointed piercing element, a flexible interposer wire one end of which engages said element and the other end of which is free to be bent for adjustment, means for adjusting the free end of said wire, means for depressing said free end of the adjusted wire to operate said element and cause it to cooperate with said operator, and means for actuating the operator to cause the element to pierce the record.

4. In a device for piercing a record, a piercing operator, a flexible piercing wire one end of which is formed with cutting edges and the other end of which is flexed against the side of said operator, an interposer one part of which engages said piercing wire and another part of which is formed for adjustment, means for adjusting said interposer, means for operating the adjusted interposer to give the piercing wire a preliminary movement to bring the flexed wire end under said operator, a plate with a channel under said wire end with cutting edges to support the record between the wire and the plate, and means to operate the operator to push the wire end through the record to pierce it over said channel.

5. In a device for piercing a record, a piercing operator, a flexible piercing wire of polygonal cross-section one end of which is formed with cutting edges on all except one side of said polygonal cross-section and the other end of which is flexed against the side of said operator, an interposer one end of which engages said piercing wire and the other end of which is free for adjustment, means for adjusting said free end of said interposer, means for operating the adjusted interposer to impart to the piercing wire a preliminary movement to bring the flexed wire in under said operator, and means to operate the operator to push the wire end with the cutting edges through the record to cut a flap which remains attached to the record.

6. In a device for piercing a record, a piercing operator, a flexible piercing wire one end of which is formed with a cutting edge and the other end of which is flexed against the side of said operator, an interposer one part of which engages said piercing wire and the other part of which is formed for adjustment, means for adjusting said interposer, means for operating the adjusted interposer to give the piercing wire a preliminary movement to bring the flexed wire end under said operator, means to actuate the operator to push the wire end through the record to pierce it, a cam cooperating with the side of the flexed wire end to move it out from under said operator after piercing, means for operating said cam, and restoring means for lifting said piercing wire and the interposer to restore the parts with the wire end out of the record.

7. In a device for piercing a record, a piercing operator, a pointed piercing member, a flexible interposer wire one end of which engages said member and the other end of which is free to be adjusted, a first slide with teeth engaging said free wire end for adjustment laterally, a second operating slide with teeth for engaging an adjusted wire and for shifting it longitudinally and a third operating slide with notches for engaging an adjusted wire and for shifting said interposer wire perpendicularly to the plane of movement laterally and longitudinally, the last-mentioned movement being effective to operate said piercing member and cause it to cooperate with said operator, means for controlling the operation of said three slides to make said interposer wire effective, and means for actuating said operator to impart a final movement to said piercing member to cause it to puncture the record.

8. In a device for piercing a record to represent data, a piercing operator, a series of pointed piercing members arranged in a column, a series of flexible interposer wires one for each of said members in the column, each of said wires having one end engaging a member and another end which is free to be adjusted, an adjusting slide with teeth cooperating with all of said free wire ends, means for operating said slide at a differential time to shift said wire ends, a series of secondary slides arranged at right angles to the aforementioned slide and formed with teeth to engage one of said wire ends with each of said second slides, means for shifting said second slides seriatim to correspond with time intervals representative of different data and one of which will engage the particular one of said column of shifted wires according to the time of the preliminary shifting, and a third slide alongside said first slide and in a position to receive the wire end having been shifted twice by said first and second slides, means for depressing said third slide to operate the particular selected interposer wire which in turn operates a selected piercing member and causes it to cooperate with said operator, and means for actuating the operator to cause the selected member to pierce the record 9. In a device for piercing a record to represent multi-ordered data, a series of piercing operators, a plurality of series of pointed piercing members arranged in rows and columns, a plurality of flexible interposer wires one for each of said members, said wires having one end which engages a member and another end which is free to be adjusted, a series of column slides related to the columns of interposer wires, each of said slides having a series of teeth for engaging said free wire ends, means for adjusting said column slides differentially at different times, said times being representative of data, a series of digit code slides arranged at right angles to said column slides and each having teeth cooperating with a row of said interposer wires, means for operating said digit slides invariably and seriatim at fixed time intervals coordinated with the intervals of timing of said columnar slides, said column and digit slides cooperating with the free end of a selected wire so that when a column slide is moved differentially and selectively the intersecting digit slide engages said adjusted wire end to impart a secondary adjustment thereto, a third set of slides arranged alongside said column slides and in a position to receive selected wire ends which have had two movements imparted thereto, said third slide being effective to impart a third movement to a selected interposer wire as the final set up movement of said interposer, means for operating said third set of slides so that operated interposer wires cause movement of selected piercing members to cause them to cooperate with certain of said piercing operators, and means for actuating the operators to depress selected piercing members in rows and columns to pierce the record to be representative of a multi-ordered form of data.

10. A device of the kind set forth in claim 9 wherein a series of column control magnets are provided, one for each of said column slides, means for operating a column slide under control of a magnet, means for setting up control data, and means under control of said setting means for energizing said magnets differentially.

11. A device of the kind set forth in claim 10 with a series of contacts one for each of said column slides and closed whenever the column slide is properly moved by operation of a related magnet, a plurality of electronic trigger means one for each of said column slides and associated magnet and contacts, each of said trigger means having associated therewith a circuit influenced both by the closure of the contacts and by energization of said magnet whereupon an alternation back to the normal conductive state of the trigger is caused when an energization of the magnet is followed by the proper operation of the column slide, and means associated with each of said trigger means and operative thereby when it is out of normal conduction at the end of a cycle to indicate an error due to the failure of a column slide to close related contacts as an accompaniment to the energization of a related magnet.

12. A device of the kind set forth in claim 9 to be controlled by records bearing indicia, means for sensing the indicia on said records, a series of ordinal magnets controlled by said sensing means, means under control of each of said ordinal magnets for controlling the movement of one of said column slides.

13. A device of the kind set forth in claim 9, means for entering numbers, an accumulator for totalizing said numbers, means for reading the amount standing in said accumulator, a series of ordinal magnets, means for controlling the energization of said magnets under control of said reading means, and means under control of said ordinal magnets for controlling the adjustment of said column slides.

14. A device of the kind set forth in claim 9 wherein said digit slides are adjusted by a series of magnets, means under control of the magnets for operating the slides, an impulse emitter, and connections from said emitter to said magnets to energize them invariably and seriatim for each cycle.

15. In a device of the kind set forth in claim 9, means for entering data from a plurality of sources in different cycles, means for directing control from said sources to different ones of said column slides on different cycles, whereby a plurality of preliminary setting cycles precede a final piercing cycle.

16. A device of the kind set forth in claim 9 further characterized by the provision of means for analyzing records with data indicia, accumulating means under control of said records, means for reading the amounts standing in said accumulating means, means for directing control from either of said card reading means or accumulating reading means to control the setting of said column slides on one or more successive cycles, whereby settings of certain portions of the piercing device are stored until a complete setting is made before the final piercing action.

17. A device of the kind set forth in claim 9 wherein the code slides are of an even number and operated by a set of release magnets, an impulse emitter for energizing said magnets seriatim, a series of sets of contacts, one pair for each of said code slides and operated thereby to close when the slide is properly operated, an electronic trigger means, a circuit therefor including all of said contacts arranged in parallel and operable to cause alternation of the conductive state of said trigger means, and means operative under control of said trigger means when it is out of the normal conductive state at the end of a cycle indicating an error due to the failure of one of said code slides to operate and close the related contacts.

18. In a device for piercing a record, a series of piercing members normally out of the path of an operator, an interposing means for putting each of the piercing members in the path of the operator, a series of lateral and longitudinal setting slides for shifting said interposing member to a selected position, means for operating the selected interposers to cause setting of the piercing members under the operator, a main operating means, a clutch between the main operating means and said interposer operating means, means for operating said clutch as a preliminary to the operation of piercing, a second clutch, connections from said second clutch to said operator for the piercing members, means for restoring the piercing members and the related interposers, connections between said second clutch and said restoring means and means for operating said second clutch to cause the selected piercing members to puncture the record and be restored at the end of the operation.

19. A combined tabulator and summary punch having, in combination, minor and major totalizers with means for calculating amounts therein, printer and punch selectors adjusted differentially under control of timed impulses from said totalizers, groups of piercing wires, groups of type carriers, means under control of said adjusted selectors for selecting certain of said type and said wires for operation, and means operated under control of the tabulator for operating and restoring the selected type carriers and selected piercing wires to print on and punch a common record.

20. In a machine for printing and punching totals on a record, means for entering amounts, an accumulator for calculating the totals of said amounts, a printer, means under control of said accumulator for operating said printer to print totals on said record, punching devices, storage devices in said punching devices, means under control of said accumulator for operating said storage devices simultaneously with the operation of the printer to store a total therein while it is being printed, means for feeding said record from the printer to the punching devices, and means for operating the punching devices to perforate the record with the total related to the total printed thereon.

21. A machine of the kind set forth in claim 20 wherein said storage operating means includes control magnets and punch setting elements responsive to energization of said magnets, contacts closed by proper movement of said elements, and checking means operable under control of said magnets and said contacts for checking the proper operation of the punching devices.

22. A machine of the kind set forth in claim 21 and further characterized by the fact that said checking means includes electronic trigger means operated alternately by the magnets and contacts to verify the setting of the punch storage devices.

23. A machine of the kind set forth in claim 22 and further characterized by the fact that said control magnets are arranged in digital and columnar groups with the former impulsed invariably and the latter differentially, and said checking electronic trigger means is in two sections, one pulsed with the digital magnets and the other with the columnar magnets.

24. A machine of the kind set forth in claim 20 wherein said punching devices include pointed punches for merely rupturing the record, whereby the punching devices provide unnoticeable index points of weakness in the record.

25. A machine of the kind set forth in claim 20 wherein said punching devices include punches with a sharpened end of less than a full periphery for rupturing the record, and ironing devices for restoring the ruptured record material back into the plane of the record, whereby the ruptured and restored material provides unnoticeable index points in the record.

26. In a machine for printing and punching items and totals on a bill, means for entering item amounts, an accumulator for calculating the totals of said amounts, a printer, means under control of said entering means and said accumulator for operating said printer to print items and totals on a bill, punching devices, a plurality of storage devices in said punching devices, means under control of said entering means for operating a number of said plurality of storage devices to store item amounts therein as they are printed, means under control of said accumulating means for operating certain of said plurality of storage devices to store total amounts therein as they are printed, means for feeding a bill from the printer to the punching devices after recording of the last total, and means for operating the punching devices to perforate each bill with representations of the items and totals printed thereon.

27. In a machine for printing and punching account identifications, items and totals on a bill, means for entering account identifications and item amounts, an accumulator for calculating the totals of said amounts, a printer, means under control of said entering means and said accumulator for operating said printer to print account identifications, items and totals on a bill, punching devices, a plurality of storage devices in said punching devices, means under control of said entering means for operating successively a number of said storage devices to store identifications and items therein as the printer is operated thereby means under control of said accumulating means for operating certain of the storage devices to store therein the total amounts printed, means for feeding a bill from the printer to the punching devices after printing thereon is completed, and means for operating the punching devices to perforate said bill with representations of the account identification, items and totals printed thereon.

28. In a machine for perforating data in a record bearing identification indicia under control of control elements arranged in groups and bearing identification and item indicia, means for sensing the identification indicia of the record, means for sensing the indicia of the elements, comparing means under control of both sensing means for comparing the related identifications of a record and a group of elements, perforating devices including pointed piercing members arranged to rupture the record with code representations of data, means under control of the element sensing means for setting certain members of said perforating devices representing a related group of identification and item data, and means for operating the set members to pierce the record with unnoticeable representations of related identifications and items.

29. A machine of the kind set forth in claim 28 wherein the record is in the form of a bill with a main retained section and a plurality of stub sections to be sent out, one of said stub sections to be returned with payment, said perforating devices being divided into three sections to operate in triplicate on the main and stub sections of the bill, whereby a delivered stub section bears unnoticeable representations but when returned is adapted for automatic comparison of the supposedly similar data with the supposedly related retained main section.

30. In a portable record handling device, a supporting frame with castors, an upper overhanging mechanism container, a record magazine in said container, a stacker for receiving printed records in said container, record feeding devices for advancing the records successively out of said magazine and through the device to said stacker, a pair of closely spaced record ejecting and record receiving stations for putting the records into another machine to receive recording thereon, a stopping station for the records intermediate said magazine and stacker, means for forming indicia on said records at said stopping station, and means for controlling said indicia forming means to form the printed record with data representing indicia corelated with the recorded data thereon, whereby said device is portable to be assembled with one of several tabulating machines to be corelated therewith for recording and forming indicia on the records.

31. A device of the kind set forth in claim 30 wherein said indicia forming means comprises a perforator with slender punch wires arranged in columns and rows in alignment with the recorded character representing positions of a record, means for operating one or more of said piercing wires in each column in code formation to perforate code data indicia representations in said record, whereby said device is portable and of overhanging form and yet suited for forming indicia because of the light weight of the wire piercing devices.

32. A portable bill feeding and forming device comprising a supporting frame with castors and an upper overhanging mechanism support section, a magazine for said bills in one part of said support section, a stacker for receiving said bills in another part of said support section, bill feeding devices between said magazine and said stacker, a bill piercing unit in the path of said bill intermediate the magazine and stacker, means for controlling said piercing unit to form the bill with chadless data representations, ironing devices between said piercing unit and said stacker, said ironing devices serving to roll back into the plane of the bill material the material disturbed by the piercing operation, means for printing on each bill data related to the representations perforated therein, whereby said portable device may be assembled with one of several tabulators and controlled thereby to form bills with imperceptible but permanent indicia corelated with the printed data simultaneously recorded on the bills.

33. In a portable bill feed device for cooperating with one of several tabulating machines of the kind controlled by sensing a succession of record cards arranged in groups, said bill feeding device comprising a supporting frame with castors and upper overhanging mechanism holding portion, a bill magazine in said upper portion, a bill receiving stacker in said upper portion, a bill feeding means between said magazine and said stacker, a bill sensing mechanism in which the said bills are analyzed after they leave the magazine, and electrical connections between the sensing mechanism of the portable bill feed and the card sensing devices of the tabulator for comparing the two to determine whether the bill is properly related to the cards of the tabulator.

34. A device of the kind set forth in claim 33 wherein said sensing mechanism includes a series of wires arranged in columns and rows to cooperate with perforated positions in the bills and movable relative thereto to close said electrical connections for electrical comparison with the cards of the tabulator, whereby the said device is of overhanging form and capable of comparing bill and card and also portable because of the light weight nature of the wire sensing mechanism.

35. In a bill printing machine controlled by records with data indicia, said records being arranged in groups each group including heading and item records, a magazine for said bills, a platen for supporting the bills for print reception, a separately motorized bill feeding device for feeding said bills in succession out of the magazine and onto said platen, printing devices, means for sensing said indicia on said records, group control devices operated under control of said sensing means, accumulating devices operated under control of said sensing means, total taking devices cooperating with said accumulating devices, a printer operating motor, means controlled by said sensing means and total taking means and operated by said printer motor for controlling said printing devices to print heading, item and total data from the records on the bills, a feed control tape with feed control indicia for governing the line spacing and long feeding operations of the platen to advance the bills thereon, clutch connections between said platen and said tape, a platen motor for operating said platen and tape in synchronism, and means under control of said indicia sensing means and said group control devices for controlling the operation of said platen clutch connections to govern line spacing of the heading and item data on the bills and long feeding of the bills for space skipping between heading and items and ejection after total printing.

36. A ledger sheet printing machine controlled by records with data indicia, said ledger sheets bearing identifying indicia related to the indicia of the records, a magazine for said ledger sheets, a platen, a separately motorized sheet feeding device for feeding said ledger sheets in succession out of the magazine and onto said platen, a sheet sensing device interspersed between said magazine and said platen, printing devices, means for sensing the indicia on said record, indicia comparing means operated jointly by said sheet sensing devices and said record sensing means, means under control of said comparing means for controlling said machine to indicate a failure of the sheet identification indicia, a separate printer operating means, means controlled by said record sensing means and operated by said printer operating means for controlling said printing devices to print an item of a corresponding record upon a ledger sheet, a feed control tape with feed control indicia for governing the line spacing and ejection of said sheets on said platen, clutch connections between said platen and said tape, a platen motor for operating said platen and tape in synchronism, and means under control of said indicia sensing means for controlling the operation of said clutch connections to govern line spacing and ejection of the ledger sheets after one or more items are posted thereon under control of the records.

37. In a bill printing tabulator controlled by records and having printing devices and a platen with automatic spacing devices controlled by said records and having, in combination, a removable portable platenless bill feeding device, said device having a bill magazine, a bill receiving stacker and between them an articulated feed extension section acting as a bridge between the bill feeding device and the platen of the tabulator, operating means for advancing a bill out of the magazine and through said articulated section to the platen and then back from the platen through the articulated section and to the stacker, and means under control of said records and printing devices of the tabulator for coordinating the operation of said bill advancing means of the bill feeding device with the operations of printing devices of the tabulator.

38. In a bill printing tabulator controlled by records and having a platen with automatic spacing devices controlled by said records and having, in combination, a removable bill feeding device, said device including a bill magazine, a bill sensing unit, a connector unit for bridging between the device and the platen of the tabulator, a piercing device for piecing the bill under control of said records, an ironing device for flattening the bill material in the pierced areas of the bill as it is fed therethrough, a stacker, and a series of endless belts arranged side by side and having cooperating rollers for carrying the bills from the magazine and from unit to unit and from device to device in the bill feeding device in the order mentioned.

39. In a bill printing tabulator controlled by records and having accumulators and total taking devices for totalizing the items found on the records and having, in combination, a bill feeding, piercing and printing device, said device including a magazine, a stacker and printing and piercing units interspersed between said magazine and stacker, said printing and piercing units including settable devices, means under control of the tabulator records and tabulator total taking devices for setting and operating said settable devices to control the data printed and pierced in the bill under control of the tabulator, and means for operating said feeding device for advancing the bills in succession out of the magazine, through the printing and piercing units and into the stacker.

40. A machine of the kind set forth in claim 39 including a plurality of sets of ironing rollers placed between said piercing unit and said stacker of the bill feeding device for pressing on both sides of the passing bill for restoring back into the plane of the bill material all material disturbed by the data puncturing of the bills in the piercing unit.

41. In a record making machine, a magazine for holding the records, a sensing station for reading data on the records, a printing station for recording on the records, a punching station for perforating data in the records, a stacker for gathering the records, a gate at said sensing station for holding a record while it is being sensed, a second gate at said printing station for holding said record momentarily before being printed upon, and a third gate for holding said record at said punching station for holding the record while it is being perforated, and means for carrying each record successively from one station to the next in the order mentioned, said carrying means including a series of endless belts for conveying records, said belts being arranged with detour portions around each of said three gates whereby a record is momentarily diverted before being again conveyed by the belts.

42. A machine of the kind set forth in claim 41 with an ironing station between said punching station and the stacker for smoothing the surfaces of the punched record, said belts being formed with other detour portions around said ironing station.

References Cited in the file of this patent

UNITED STATES PATENTS

| | | |
|---|---|---|
| Re. 21,133 | Lake | June 27, 1939 |
| 2,027,177 | Kluge et al. | Jan. 7, 1936 |
| 2,046,001 | Scharr | June 30, 1936 |
| 2,093,529 | Tauschek | Sept. 21, 1937 |
| 2,172,758 | Rice et al. | Sept. 12, 1939 |
| 2,178,879 | Miles | Nov. 7, 1939 |
| 2,224,765 | Dickinson et al. | Dec. 10, 1940 |
| 2,244,242 | Buhler | June 3, 1941 |
| 2,255,794 | Lake | Sept. 16, 1941 |
| 2,354,549 | Rindfleisch | July 25, 1944 |
| 2,415,279 | Daly et al. | Feb. 4, 1947 |
| 2,426,049 | Rabenda et al. | Aug. 19, 1947 |
| 2,480,780 | Sens-Olive | Aug. 30, 1949 |
| 2,490,346 | Furman | Dec. 6, 1949 |
| 2,516,013 | Mixer | July 18, 1950 |
| 2,531,885 | Mills et al. | Nov. 28, 1950 |
| 2,537,778 | McCormick | Jan. 9, 1951 |
| 2,540,026 | Haley et al. | Jan. 30, 1951 |
| 2,557,797 | Rand | June 19, 1951 |
| 2,580,693 | Mueller | Jan. 1, 1952 |
| 2,632,643 | Egan et al. | Mar. 24, 1953 |
| 2,660,372 | Le Clerc | Nov. 24, 1953 |
| 2,667,535 | Slayton | Jan. 26, 1954 |